(12) United States Patent
Usui et al.

(10) Patent No.: US 6,536,861 B1
(45) Date of Patent: Mar. 25, 2003

(54) LIQUID CONTAINER HAVING LIQUID CONSUMPTION DETECTING DEVICE

(75) Inventors: Minoru Usui, Nagano (JP); Kenji Tsukada, Nagano (JP); Munehide Kanaya, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/574,012

(22) Filed: May 19, 2000

(30) Foreign Application Priority Data

May 20, 1999 (JP) ............................................ 11-139683
May 27, 1999 (JP) ............................................ 11-147538
Sep. 10, 1999 (JP) ............................................ 11-256522

(51) Int. Cl.⁷ ............................. B41J 2/195; B41J 2/175
(52) U.S. Cl. ............................................. 347/7; 347/86
(58) Field of Search ............................... 347/7, 86, 92, 347/87; 73/290 R; 116/227; 137/557

(56) References Cited

U.S. PATENT DOCUMENTS

| | | | | |
|---|---|---|---|---|
| 4,636,814 A | * | 1/1987 | Terasawa | 347/86 |
| 5,583,544 A | | 12/1996 | Stamer et al. | 347/7 |
| 5,619,238 A | * | 4/1997 | Higuma et al. | 347/86 |
| 5,689,288 A | | 11/1997 | Wimmer et al. | 247/7 |
| 5,975,102 A | | 11/1999 | Schalk | |
| 6,012,793 A | * | 1/2000 | Haigo | 347/7 |
| 6,044,694 A | | 4/2000 | Anderson et al. | |

FOREIGN PATENT DOCUMENTS

| | | | | |
|---|---|---|---|---|
| EP | 0 803 364 A2 | 10/1997 | ............ | B41J/2/175 |
| EP | 0 853 236 A1 | 7/1998 | | |
| EP | 1 088 668 A1 | 4/2001 | | |
| JP | 362095225 | * 5/1987 | ............ | 347/7 |
| JP | 07137276 | 5/1995 | | |
| JP | 10026549 | 1/1998 | | |
| JP | 10-305590 | 11/1998 | ............ | B41J/2/175 |
| JP | 2000318183 | 11/2000 | | |

OTHER PUBLICATIONS

Japanese Abstract No. 06297726, dated Oct. 25, 1994.
Japanese Abstract No. 63247047, dated Oct. 13, 1988.
European Search Report.

* cited by examiner

*Primary Examiner*—John Barlow
*Assistant Examiner*—Michael S. Brooke
(74) *Attorney, Agent, or Firm*—Sughrue Mion, PLLC

(57) ABSTRACT

A liquid container, comprising: a housing containing therein liquid; a liquid supply opening formed in the housing for withdrawing the liquid from the housing; a liquid sensor mounted on the housing for detecting a level of the liquid which is variable in accordance with a consumption of the liquid; and a first partition wall extending in an interior of the housing and defining the interior of the housing into at least two liquid accommodating chambers which communicate with each other, the liquid accommodating chambers comprising: an air-communication side liquid accommodating chamber which communicates with ambient air; and a detection side liquid accommodating chamber in which the liquid sensor is disposed at an upper portion thereof.

16 Claims, 105 Drawing Sheets

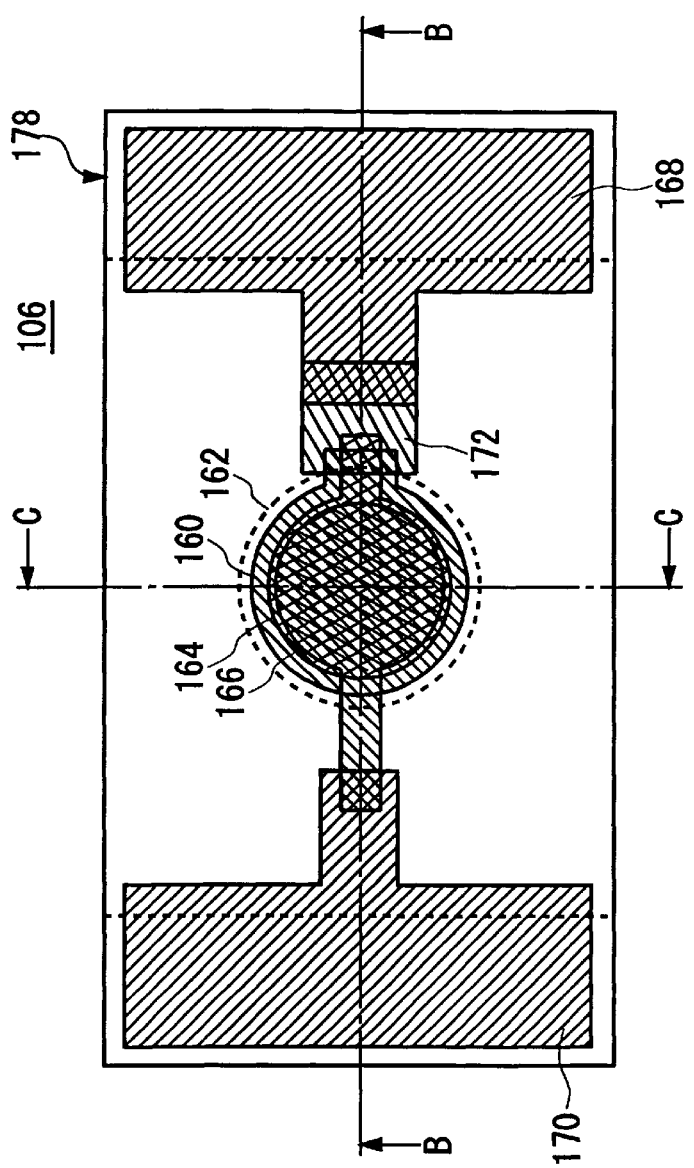
FIG. 22(A)
FIG. 22(B)
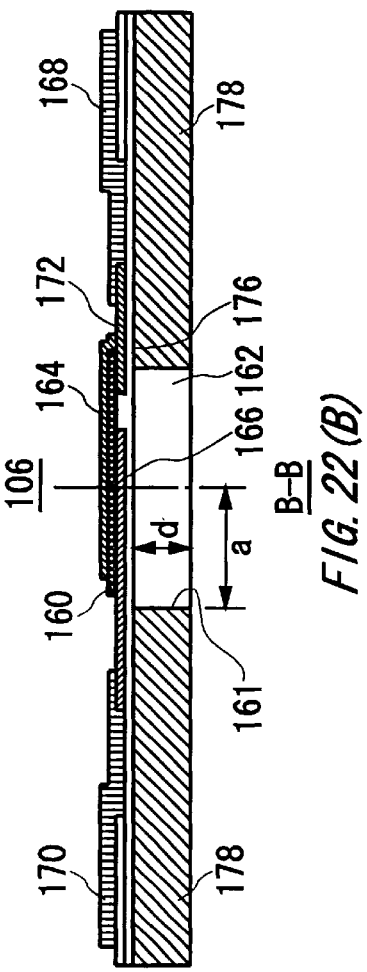
FIG. 22(C)

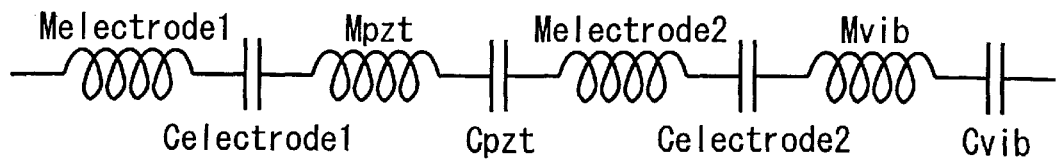
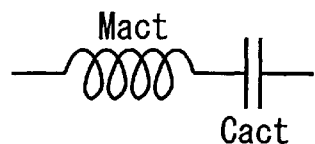
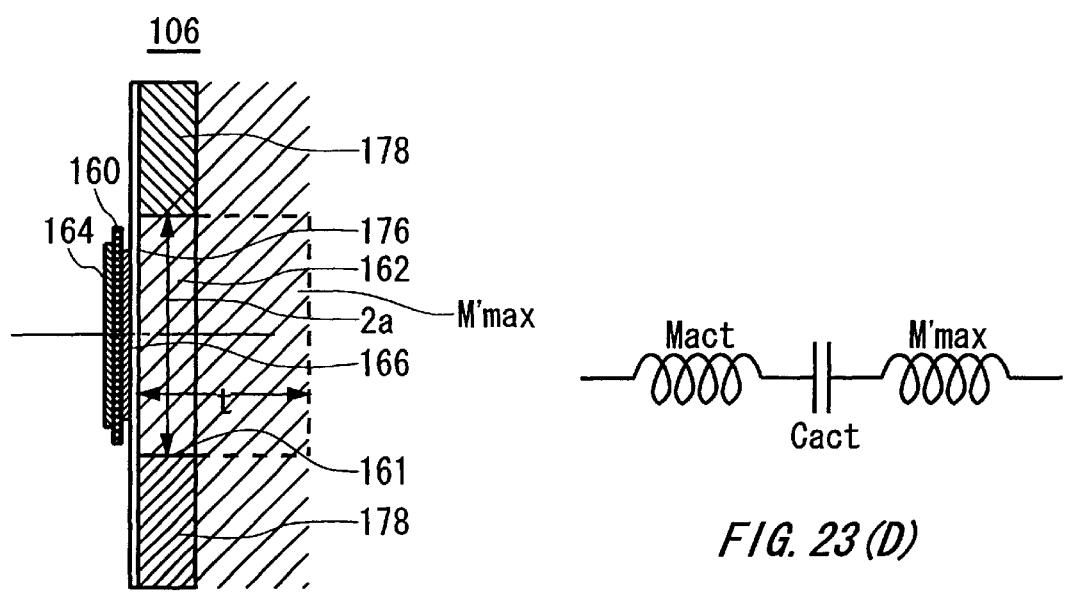
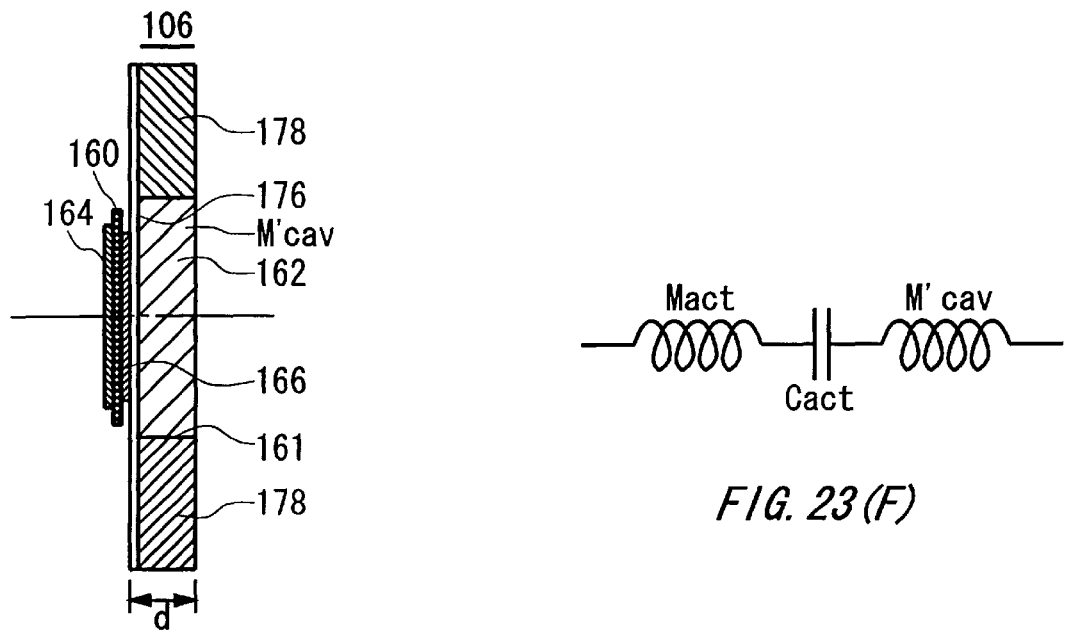

FIG. 32(A) 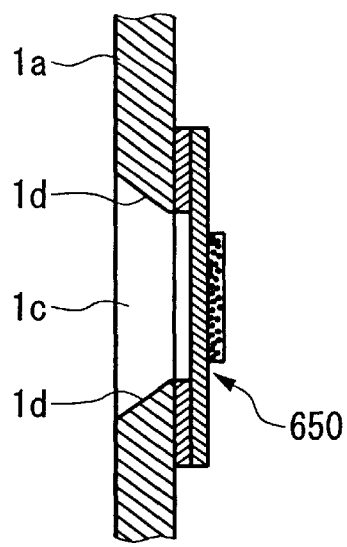  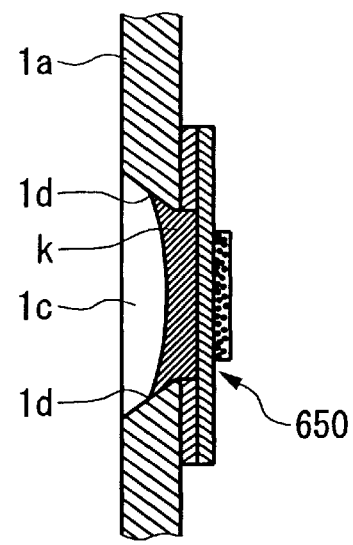
FIG. 32(B) 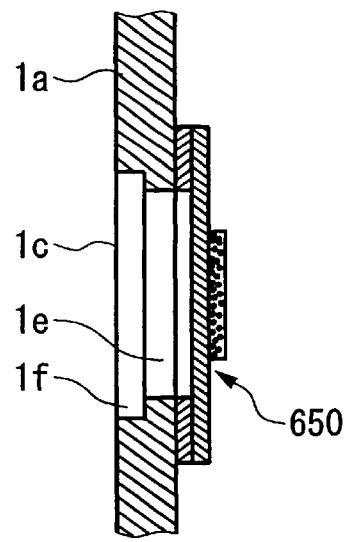  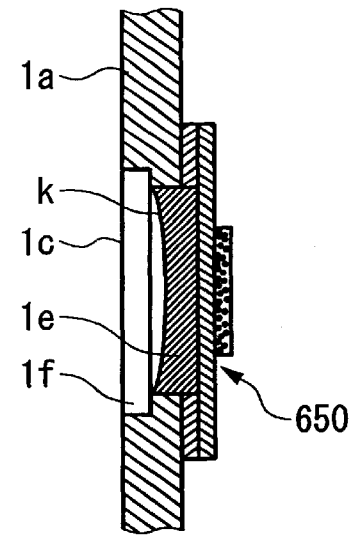
FIG. 32(C) 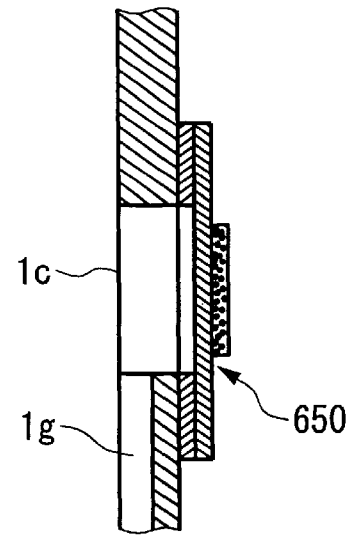  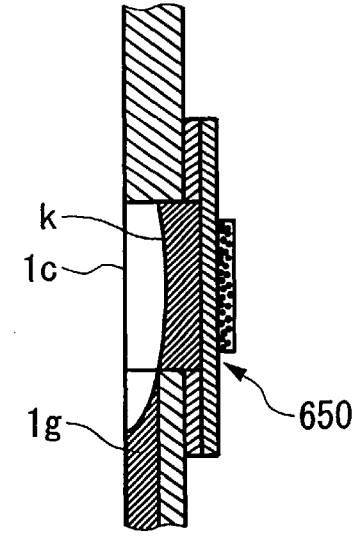

670

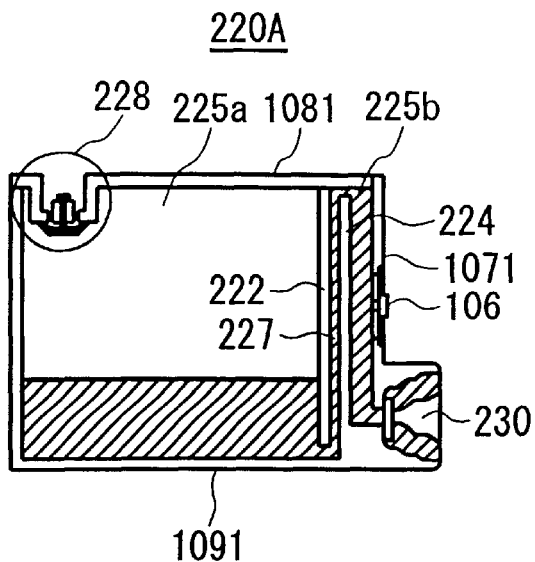
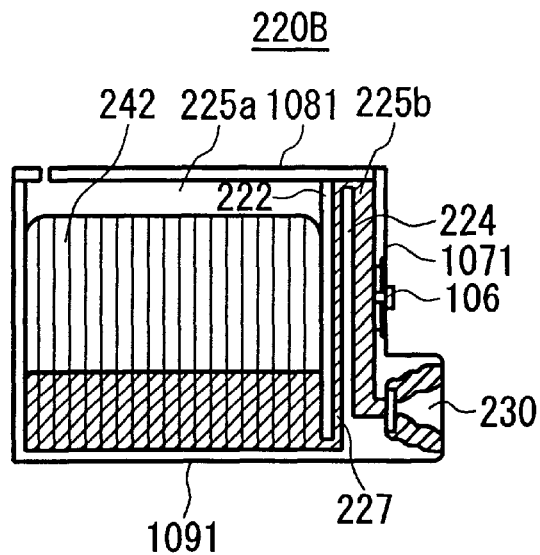
FIG. 51 (A)  FIG. 51 (B)
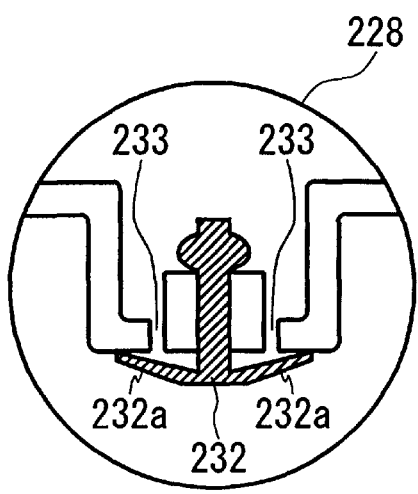
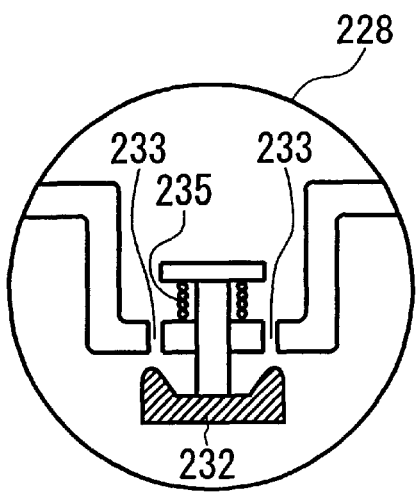
FIG. 51 (C)  FIG. 51 (D)

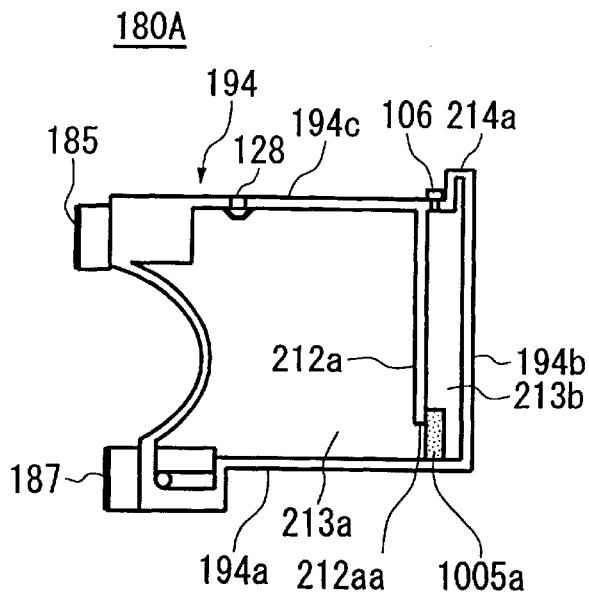
FIG. 72
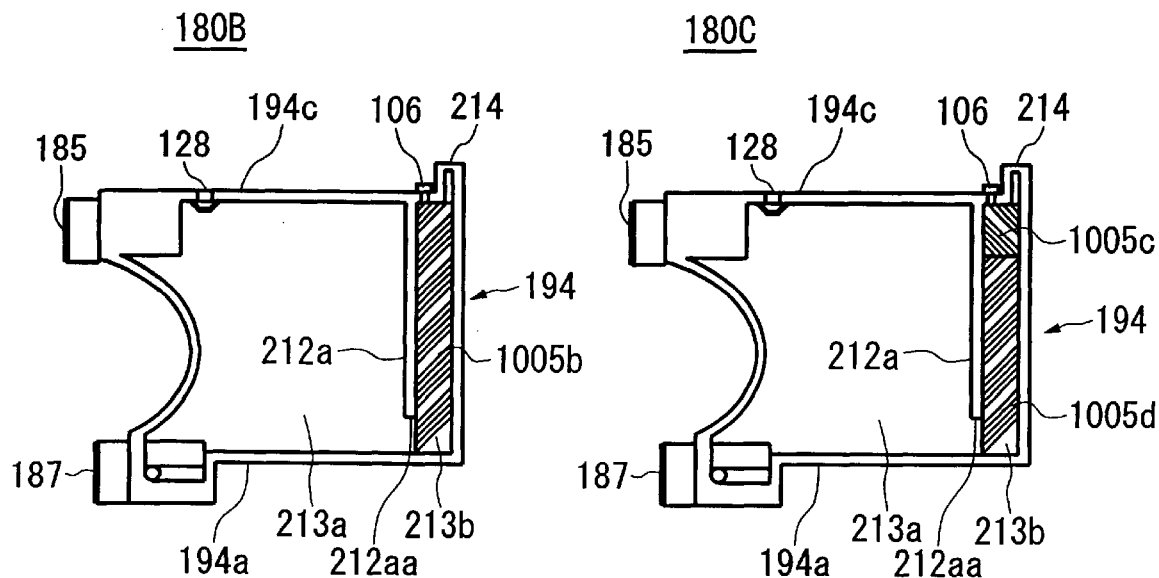
FIG. 73
FIG. 74

LIQUID CONTAINER HAVING LIQUID CONSUMPTION DETECTING DEVICE

The present patent application claims priority from Japanese patent applications Nos. H. 11-139683 filed on May 20, 1999, H. 11-147538 filed on May 27, 1999 and H. 11-256522 filed on Sep. 10, 1999, the contents of which are incorporated herein by reference.

BACKGROUND OF THE INVENTION

1. Field of the Invention

The present invention relates to a liquid container equipped with a piezoelectric apparatus therein which detects the consumption state of liquid inside a liquid container which houses the liquid. More particularly, the present invention relates to the liquid container equipped with a piezoelectric apparatus that detects liquid consumption status in a liquid container which provides liquid to a recording head of an ink-jet recording apparatus.

2. Description of the Related Art

An ink cartridge mounted on an ink-jet type recording apparatus is taken as an example of a liquid container and is described below. In general, an ink-jet recording apparatus comprises: a carriage equipped with an ink-jet type recording head comprised of a pressure generating means which compresses a pressure generating chamber and a nozzle opening which discharges the compressed ink from a nozzle opening in the form of ink droplets; and an ink tank which houses ink supplied to the recording head through a passage, and is structured such that the printing operation can be performed continuously. In general, the ink tank is structured as a cartridge that can be detached from the recording apparatus, so that a user can easily replace it at the time when the ink is used up.

Conventionally, as a method of controlling the ink consumption of the ink cartridge, a method is known of controlling the ink consumption by means of a calculation in which the counted number of ink droplets discharged by the recording head and the amount of ink sucked in a maintenance process of the printing head are integrated by software, and another method of controlling the ink consumption in which the time at which the ink is actually consumed is detected by directly mounting to the ink cartridge two electrodes for use in detecting the liquid surface, and so forth.

However, in the calculation-based method of controlling the ink consumption by integrating the discharged number of ink droplets and the amount of ink or the like by the software, the pressure inside the ink cartridge and the viscosity of the ink change depending on usage environment such as ambient temperature and humidity, elapsed time after an ink cartridge has been opened for use, and usage frequency at a user side. Thus, a problem is caused where a considerable error occurs between the calculated ink consumption and the actual ink consumption. Moreover, another problem is caused in which the actual amount of ink remaining is not known because once the same cartridge is removed and then mounted again, the integrated counted value is reset.

On the other hand, in the method of controlling by electrodes the time at which the ink is consumed, the remaining amount of ink can be controlled with high reliability since the actual ink consumption can be detected at one point. However, in order that the liquid surface of the ink can be detected, the ink need be conductive, so suitable types of ink for use are very limited. Moreover, a problem is caused in that a fluid-tight structure between the electrodes and the cartridge might be complicated. Moreover, since precious metal is usually used as the electrode material, which is highly conductive and erosive, manufacturing costs of the ink cartridge increases thereby. Moreover, since it is necessary to attach the two electrodes to two separate positions of the ink cartridge, the manufacturing process increases, thus causing a problem which increases the manufacturing costs.

Moreover, when managing the ink consumption status by mounting a piezoelectric device on the ink cartridge, ink inside the ink cartridge may roll or bubble by the scanning of the ink cartridge during the printing operation. By the waving or bubbling of ink near by the piezoelectric device, ink or bubble of ink attaches to the piezoelectric device. Then, there is a cases arises that the piezoelectric device cannot detect the ink consumption quantity by the ink or bubble of ink attached to the piezoelectric device. In other words, even there is only small amount of ink inside the ink cartridge, if the ink attaches to the piezoelectric device mistakenly by the waving of ink, there is a danger that the piezoelectric device detects mistakenly that there is still enough ink inside the ink cartridge. Moreover, if the bubble attaches to the piezoelectric device, there is danger that the piezoelectric device detects mistakenly that there is no ink inside the ink cartridge even if the ink cartridge 180 is filled by ink.

Furthermore, there is problem that the position of mounting the piezoelectric device on the ink cartridge is limited for detecting the ink end status in side the ink cartridge. For example, if mounting the piezoelectric device on the wall at the lower side of the ink surface, the piezoelectric device can detect the ink end. On the other hand, if mounting the piezoelectric device on the wall at the upper side of the ink surface, the piezoelectric device cannot detect the ink end.

SUMMARY OF THE INVENTION

Therefore, it is an object of the present invention to provide a liquid container capable of reliably detecting a liquid consumption status and dispensing with a complicated sealing structure.

Moreover, it is another object of the present invention to prevent the waving or bubbling of liquid around the piezoelectric device inside the liquid container.

Furthermore, it is still another object of the present invention to provide a liquid container, the piezoelectric device of which can reliably detect a liquid consumption status by detecting the liquid surface even in the case that liquid inside the liquid container rolls and bubbles.

Furthermore, it is still another object of the present invention to provide a liquid container, the piezoelectric device of which can reliably detect a liquid consumption status even in the case that the liquid container tilts or fell down because the gas does not contacts with the piezoelectric device.

Furthermore, it is still another object of the present invention to provide a liquid container capable of reliably detecting a liquid consumption status in the liquid container even if the piezoelectric device is mounted on the upper side of the liquid surface in the liquid container.

Furthermore, it is still another object of the present invention to provide a liquid container which does not need to be mounted on the accurate position, in other words, the mounting position of the piezoelectric device on the liquid container can be freely designed.

These objects are achieved by combinations described in the independent claims. The dependent claims define further advantageous and exemplary combinations of the present invention.

According to an aspect of the present invention, there is provided a liquid container which may comprise: a housing containing therein liquid; a liquid supply opening formed in the housing for withdrawing the liquid from the housing; a liquid sensor mounted on the housing for detecting a level of the liquid which is variable in accordance with a consumption of the liquid; and a first partition wall extending in an interior of the housing and defining the interior of the housing into at least two liquid accommodating chambers which communicate with each other, the liquid accommodating chambers comprising: an air-communication side liquid accommodating chamber which communicates with ambient air; and a detection side liquid accommodating chamber in which the liquid sensor is disposed at an upper portion thereof.

The liquid container may further comprises a porous member accommodated within the detection side liquid accommodating chamber. The liquid supply opening may be formed in the air-communication side liquid accommodating chamber. The liquid supply opening may be formed in the detection side liquid accommodating chamber. A volume of the air-communication side liquid accommodating chamber may be different from that of the detection side liquid accommodating chamber. The volumes of the at least two liquid accommodating chambers may decrease from one side wall of the housing to the other opposite wall.

The liquid container may further comprising a second partition wall extending in the detection side liquid accommodating chamber and defining at least two small detection chambers. The second partition wall may be formed with a liquid communication opening at a lower part thereof. The second partition wall may be formed with a liquid communication opening at an upper part thereof. The detection sensor may be disposed on each of the small detection chambers. The volumes of the small detection chambers may be different from each other. The volumes of the at least two small detection chambers may decrease from one side wall of the housing to the other opposite wall.

The detection side liquid accommodating chamber may generate no capillary force for holding the liquid. The small detection chamber may generate no capillary force for holding the liquid. The detection side liquid accommodating chamber may comprise a recessed part formed at a top wall thereof. The liquid sensor may comprise a cavity which opens toward an interior of the housing for holding the liquid. The liquid sensor may comprise a piezoelectric device having a vibrating section, the vibrating section generates a counter electromotive force in accordance with a residual vibration of the vibrating section.

The liquid sensor may detect at least an acoustic impedance of the liquid and detects a liquid consumption status in accordance with the acoustic impedance. The liquid container may be mounted on an ink-jet printing apparatus having a printhead which ejects ink droplets, and the liquid container supplies the liquid contained therein to the printhead through the liquid supply opening. The volume of the detection side liquid accommodating chamber may be equal to or less than half the volume of the air-communication side liquid accommodating chamber. The volumes of the liquid accommodating chambers may decrease from one side wall of the housing to the other opposite wall.

The porous member may comprise a first porous material disposed close to the liquid sensor and a second porous material disposed far from the liquid sensor compared with the first porous material, and the second porous material has a higher liquid-philic characteristics than the first porous material. The liquid sensor may comprise a piezoelectric device having a vibrating section, the vibrating section generates a counter electromotive force in accordance with a residual vibration of the vibrating section. The liquid sensor may detect at least an acoustic impedance of the liquid and detects a liquid consumption status in accordance with the acoustic impedance. The liquid container may be mounted on an ink-jet printing apparatus having a printhead which ejects ink droplets, and the liquid container supplies the liquid contained therein to the printhead through the liquid supply opening.

According to another aspect of the present invention, there is provided a liquid container which may comprise: a housing containing there in liquid; a liquid supply opening supplying liquid to an exterior of the housing; a detection device mounted on the housing, the detection device comprising a piezoelectric element for detecting a liquid consumption status; and a wave absorbing wall extending in an interior of the housing disposed at a place facing the detection device. A gap may be defined between the detection device and the wave absorbing wall. The gap may not generate a capillary force for holding the liquid.

The gap may generate a capillary force which is smaller than a force for holding the liquid. The detection device may comprise a cavity for receiving and holding liquid, the cavity being formed to open toward the interior of the housing. The wave absorbing wall may be secured to and extends from an interior wall of the housing. The detection device may be attached to a first wall of the housing which extends in a vertical direction of the liquid level, and the wave absorbing wall may extend in parallel with the first wall of the housing.

The detection device may be attached to a bottom wall of the housing, and the wave absorbing wall may extend in parallel with the liquid level. The wave absorbing wall may extend in an inclined direction with respect to the liquid level. The wave absorbing wall may extend from a side wall of the housing which is perpendicular to the liquid level. The a capillary force may be generated between at least a part of the internal wall and an inner wall of the housing. The wave absorbing wall may comprise a bending section which is formed by bending at least a part of an edge of the wave absorbing wall toward a wall on which the detection device is mounted, and a gap defined by the bending section and the detection device generates a capillary force while a gap defined by the wave absorbing wall and the detection device does not generate a capillary force.

The wave absorbing wall may comprise a plurality of wave absorbing wall pieces, and at least one of the plurality of wave absorbing wall pieces may extend from a side wall of the housing which is perpendicular to the liquid level. The detection device may comprise a vibrating section which generates a counter electromotive force in accordance with a residual vibration of the vibrating section. The liquid container may be mounted on an ink-jet printing apparatus having a printhead which ejects ink droplets, and the liquid container may supply the liquid contained therein to the printhead through the liquid supply opening.

According to the other aspect of the present invention, there is provided a liquid container may comprise: a housing containing therein liquid; a liquid supply opening formed in a wall of the housing for withdrawing the liquid to an exterior; a detection device mounted on the housing, the detection device comprising a piezoelectric element for detecting a liquid consumption status; and a porous member disposed within the housing in the vicinity of the detection device. The detection device may contact the porous member. A gap may be defined between the porous member and the detection device.

The detection device may comprise a cavity and a vibrating section which contacts the liquid through the cavity, and the porous member is disposed in the cavity. A capillary force of the porous member may be smaller than a force which holds the liquid. The detection device may comprise a base plate, a vibrating portion and a through hole formed in the base plate, and the porous member covers at least a part of the through hole. The detection device may further comprise a groove connecting with the through hole, and the porous member is disposed on the groove. The detection device and the porous member may be disposed on a plane where the liquid supply opening is formed.

The detection device may comprise a vibrating section which generates a counter electromotive force in accordance with a residual vibration of the vibrating section, and the detection device detects the liquid consumption status in accordance with the counter electromotive force. The detection device may comprise a piezo electric element and a mounting structure unitarily formed with the piezoelectric element, and the mounting structure is attached to the housing. The liquid container may be mounted on an ink-jet printing apparatus having a printhead which ejects ink droplets, and the liquid container supplies the liquid contained therein to the printhead through the liquid supply opening.

This summary of the invention does not necessarily describe all necessary features of the present invention. The present invention may also be a sub-combination of the above described features. The above and other features and advantages of the present invention will become more apparent from the following description of embodiments taken in conjunction with the accompanying drawings.

BRIEF DESCRIPTION OF THE DRAWINGS

FIGS. 22(A) to 22(C) show a detail and equivalent circuit of an actuator 106, which is an embodiment of the piezoelectric device of the present invention.

FIGS. 23(A) to 23(F) show a detail and equivalent circuit of an actuator 106, which is an embodiment of the piezoelectric device of the present invention.

FIGS. 32(A) to 32(C) show other embodiment of the through hole 1c.

FIGS. 51(A) to 51(D) show other embodiment of the ink cartridge using the actuator 106.

FIG. 72 shows further another embodiment of the ink cartridge using the actuator 106.

FIG. 73 shows further another embodiment of the ink cartridge using the actuator 106.

FIG. 74 shows further another embodiment of the ink cartridge using the actuator 106.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

The basic concept of the present invention is to detect a state of the liquid inside a liquid container by utilizing vibration phenomena. The state of the liquid includes whether or not the liquid in the liquid container is empty, amount of the liquid, level of the liquid, types of the liquid and combination of liquids. Several specific methods realizing for detection of the state of the liquid inside the liquid container utilizing vibration phenomena are considered. For example, a method is considered in which the medium and the change of its state inside the liquid container are detected in such a manner that an elastic wave generating device generates an elastic wave inside the liquid container, and then the reflected wave which is thus reflected by the liquid surface or a wall disposed counter thereto is captured. There is another method in which a change of acoustic impedance is detected by vibrating characteristics of a vibrating object.

As a method utilizing the change of the acoustic impedance, a vibrating portion of a piezoelectric device or an actuator having a piezoelectric element therein is vibrated. Thereafter, a resonant frequency or an amplitude of the back electromotive force waveform is detected by measuring the back electromotive force which is caused by residual vibration which remains in the vibrating portion, so as to detect the change of the acoustic impedance. As another method utilizing the change of the acoustic impedance, the impedance characteristic or admittance characteristic of the liquid is measured by a measuring apparatus such as an impedance analyzer and a transmission circuit, so that the change of a current value or a voltage value, or the change of the current value or voltage value due to the frequency caused by the vibration given to the liquid is measured.

In the present embodiment, the medium in the liquid container and the change of the status of the medium in the liquid container is detected using the piezoelectric device or actuator to detect the residual vibration remained in the vibrating section of the piezoelectric device and the actuator.

FIG. 1 to FIG. 13 is a cross sectional view of an embodiment of an ink cartridge for use with a single color, for example, the black ink as an embodiment of the liquid container according to the present invention. An ink cartridge according to the present embodiment comprises a container 1 which contains liquid K, a ink supply port 2 which supplies liquid K outside the container 1, an actuator 106 which detects ink consumption status inside the container 1, and a wave preventing wall which provided at the position that faced to the actuator 106.

Figure 18:
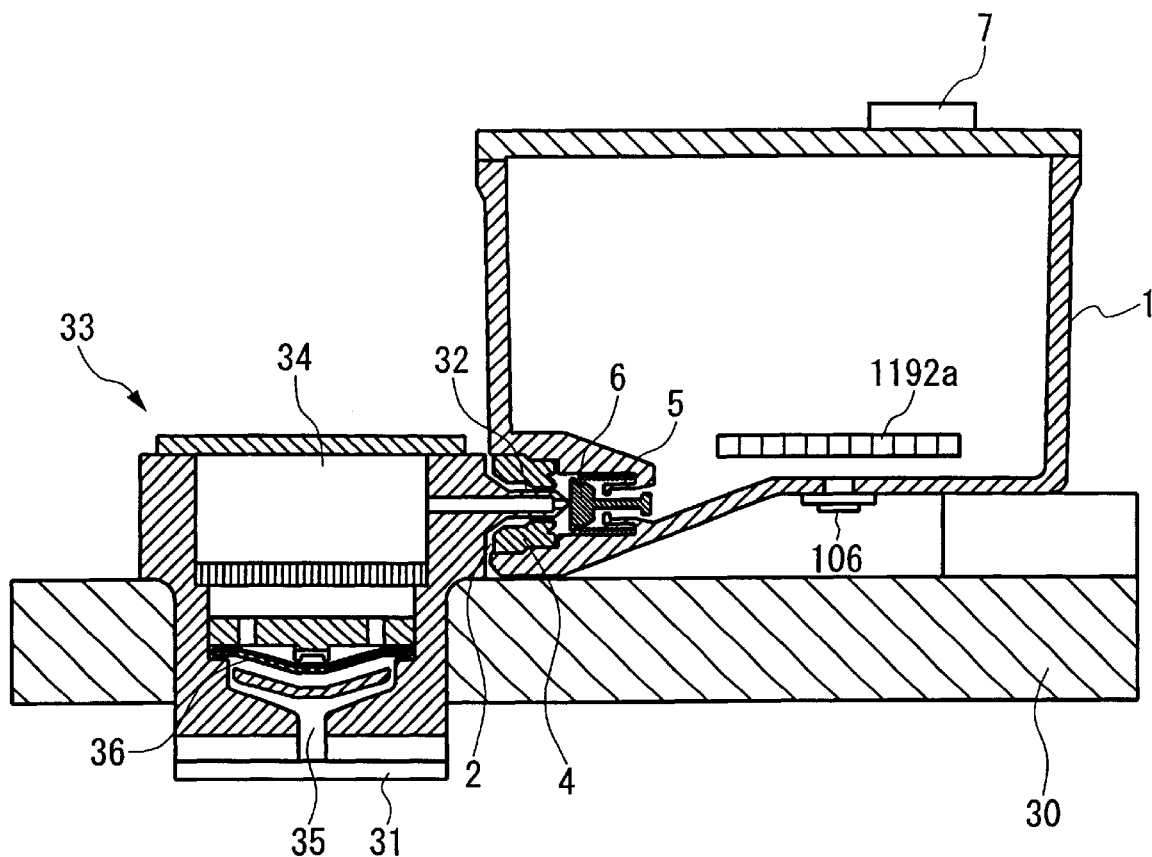
FIG. 18 is a cross sectional view showing an embodiment of a major part of the ink-jet recording apparatus suitable for the ink cartridge shown in FIG. 1.

A packing ring 4 and a valve body 6 are provided in the ink supply port 2. Referring to FIG. 18, the packing ring 4 is engaged with the ink supply needle 32 communicating with a recording head 31, in a fluid-tight manner. The valve body 6 is constantly and elastically contacted against the packing ring 4 by way of a spring 5. When the ink supply needle 32 is inserted, the valve body 6 is pressed by the ink supply needle 32 so as to open an ink passage, so that ink inside the container 1 is supplied to the recording head 31 via the ink supply port 2 and the ink supply needle 32. On an upper wall of the container 1, there is mounted a semiconductor memory means 7 which stores data on ink inside the ink cartridge.

Figure 1A:
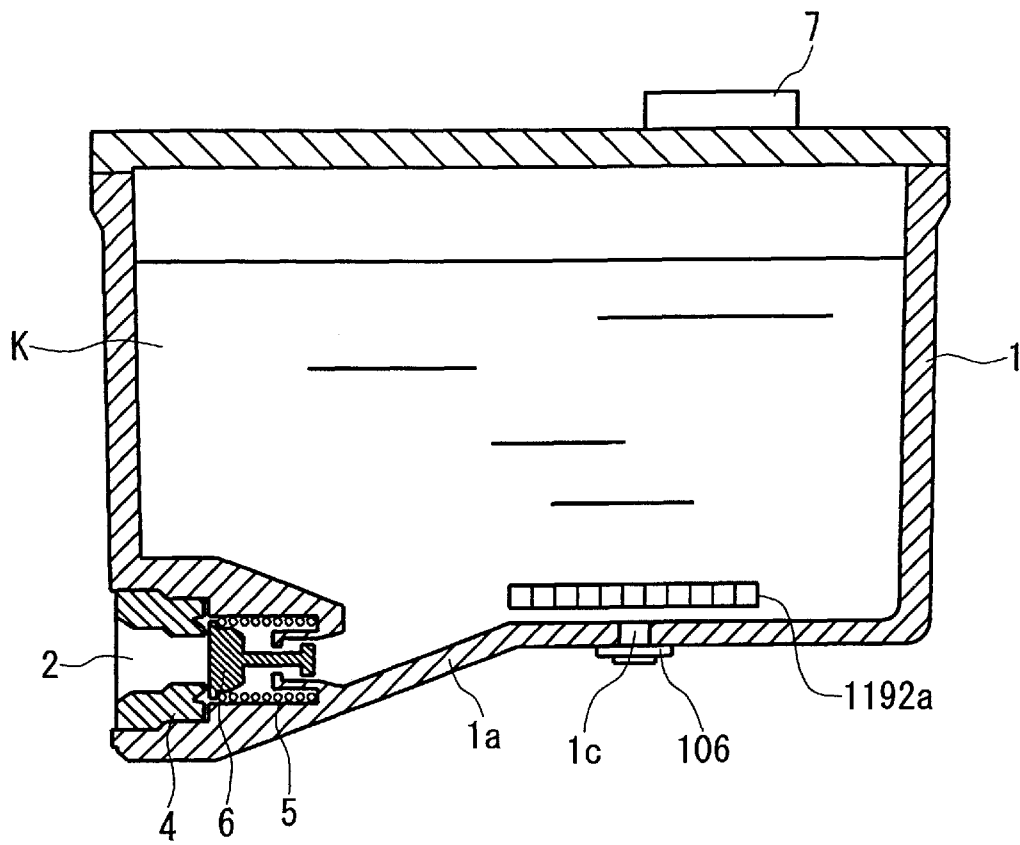
FIGS. 1(A) and 1(B) show a side cross sectional view of an embodiment of the ink cartridge according to the present invention.

FIG. 1(A) shows a side cross sectional view of an embodiment of the ink cartridge according to the present invention. In FIG. 1 to FIG. 4, the wave preventing wall 1192a to 1192d is extended horizontally to the ink surface. Furthermore, the actuator 106 is mounted on the bottom face 1a which is located lower side of the ink surface. As shown in FIG. 1(A), the ink supply port 2 that engages with the ink supply needle of the recording apparatus is provided on the container 1 which contains ink. The actuator 106 is mounted on the outside the bottom face 1a of the container 1 so that the actuator 106 can contacts with ink inside the container 1 through the through hole 1c which is provided on he container 1. The actuator 106 is provided on the position which is higher than the ink supply port 2 so that when ink K is almost used up, that is, at the time of the ink near end, the propagation of the elastic wave can change from ink to gas. The actuator 106 can be used as only for the means of merely detecting the vibration generated in the ink cartridge without generating a vibration by itself.

Figure 1B:
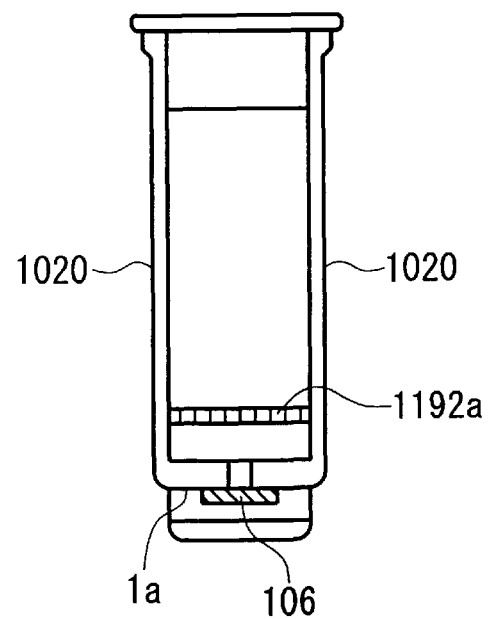

FIG. 1(B) shows a cross sectional view from the front of an embodiment of the ink cartridge according to the present embodiment. As shown in FIG. 1(B), the container 1 has a side wall 1020 which extends substantially vertical direction to the liquid surface. The wave preventing wall 1192a is fixed to the container 1 by mounting on the side wall 1020 of the container 1.

A gap is provided between the actuator 106 and the wave preventing wall 1192a. If ink is filled in the ink cartridge, ink is filled in the gap between the actuator 106 and the wave preventing wall 1192a. On the other hand, the gap is designed such that ink is not held in the gap between the actuator 106 and the wave preventing wall 1192a if ink in the ink cartridge is used up. In other words, no capillary force for holding ink arises between the actuator 106 and the wave preventing wall 1192a.

Because the through hole 1c is provided on the container 1, ink remains in the through hole 1c even the ink inside the container 1 is consumed. Therefore, even when the ink cartridge vibrates by such as scanning operation during the printing process and thus ink nearby the ink supply port 2 rolls, ink does not mistakenly attach to the actuator 106 because ink previously remains in the through hole 1c. Thus, there is only little possibility for the actuator 106 to mistakenly detect the existence of ink.

The wave preventing wall is provided to face to the actuator 106 in the ink cartridge according to the present embodiment. Therefore, even ink nearby the ink supply port 2 rolls, the wave preventing wall prevents the rolled ink to be contact with the actuator 106. Therefore, Thus, there is only little possibility for the actuator 106 to mistakenly detect the existence of ink.

Furthermore, bubbles may be generated by the waving of ink, which is caused by the vibration of ink cartridge generated by such as the scanning operation during the printing process. Then, there is danger that the actuator 106 may detect mistakenly that there is no ink if the bubble attaches to the actuator 106 even if the ink is filled in the container 1. However, according to the configuration of the present embodiment, the wave preventing wall prevents the waving of ink around the piezoelectric device even when the ink cartridge vibrates by such as the scanning operation during the printing process. By preventing the waving of ink around the piezoelectric device, the wave preventing wall prevents the generation of the bubbles. Furthermore, even the bubbles generate, the wave preventing wall prevents the bubbles to move close to the actuator 106 and contact with the actuator 106 because the wave preventing wall is provided such that the wave preventing wall faces to the actuator 106.

There is no limitation of the size, shape, flexibility, and material for the wave preventing wall. Therefore, the size of the wave preventing wall can be made further larger or can be made further smaller. The thickness of the wave preventing wall can be made further thick or can be made further thinner. Furthermore, the shape of the wave preventing wall can be square, rectangular, polygon, or an ellipse. Furthermore, the wave preventing wall can be made from the hard material or flexible material. Furthermore, the wave preventing wall can be made from the air-tight or liquid-tight material. Conversely, the wave preventing wall can be made from the breathability material or material which can pass through liquid. As an example of the air-tight or liquid-tight material, there are plastic, tefron, nylon, polypropylene, or PET. On the other hand, as an example of the breath ability material or a material which pass through liquid, there are porous material constituted by such as nylon or a material having a mesh structure. Furthermore, the porous material used for the wave preventing wall can be negative pressure generating member.

Preferably, the container 1 and the wave preventing wall is formed by a same material such that both of the container 1 and the wave preventing wall can be formed as one body. Then, the manufacturing process of the ink cartridge can be reduced.

Because ink cannot be supplied from the ink supply port 2 to the recording head if the pressure inside the ink cartridge becomes extremely negative with the ink consumption, airhole, not shown in figure, is provided on a part of the container so that the pressure inside the ink cartridge does not become extreme negative.

Figure 2:
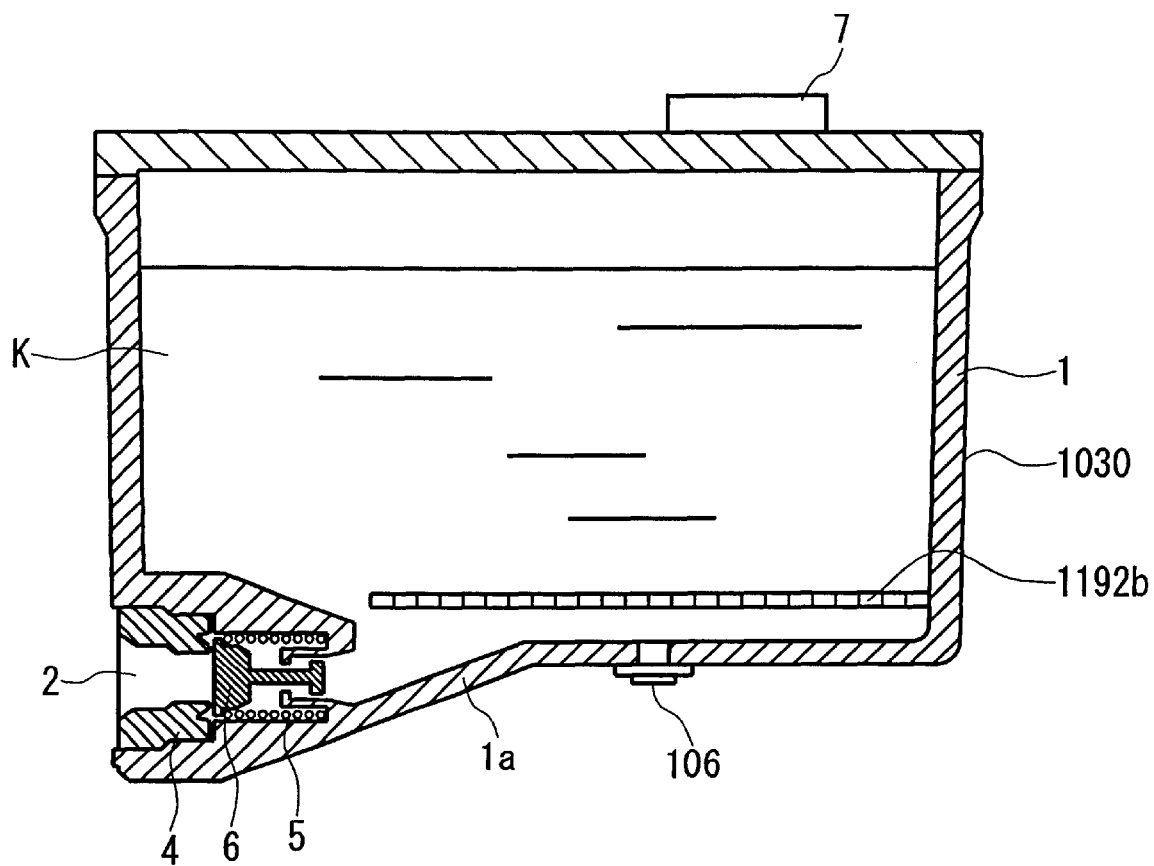
FIG. 2 shows a side cross sectional view of the other embodiment of the ink cartridge according to the present invention.

FIG. 2 shows a side cross sectional view of the other embodiment of the ink cartridge according to the present invention. As shown in FIG. 2, a wave preventing wall 1192b is mounted on the side wall 1030 which extends to the vertical direction to the ink surface. The cross section viewed from the front of the ink cartridge according to the present embodiment is same as the cross section shown in one of FIG. 1(B) or FIG. 3(B).

The wave preventing wall 1192b of the ink cartridge of the present embodiment extends longer than the wave preventing wall 1192a of the embodiment shown in FIG. 1. Therefore, the wave preventing wall 1192b can effectively protects the actuator 106 from the wave of ink.

Figure 3A:
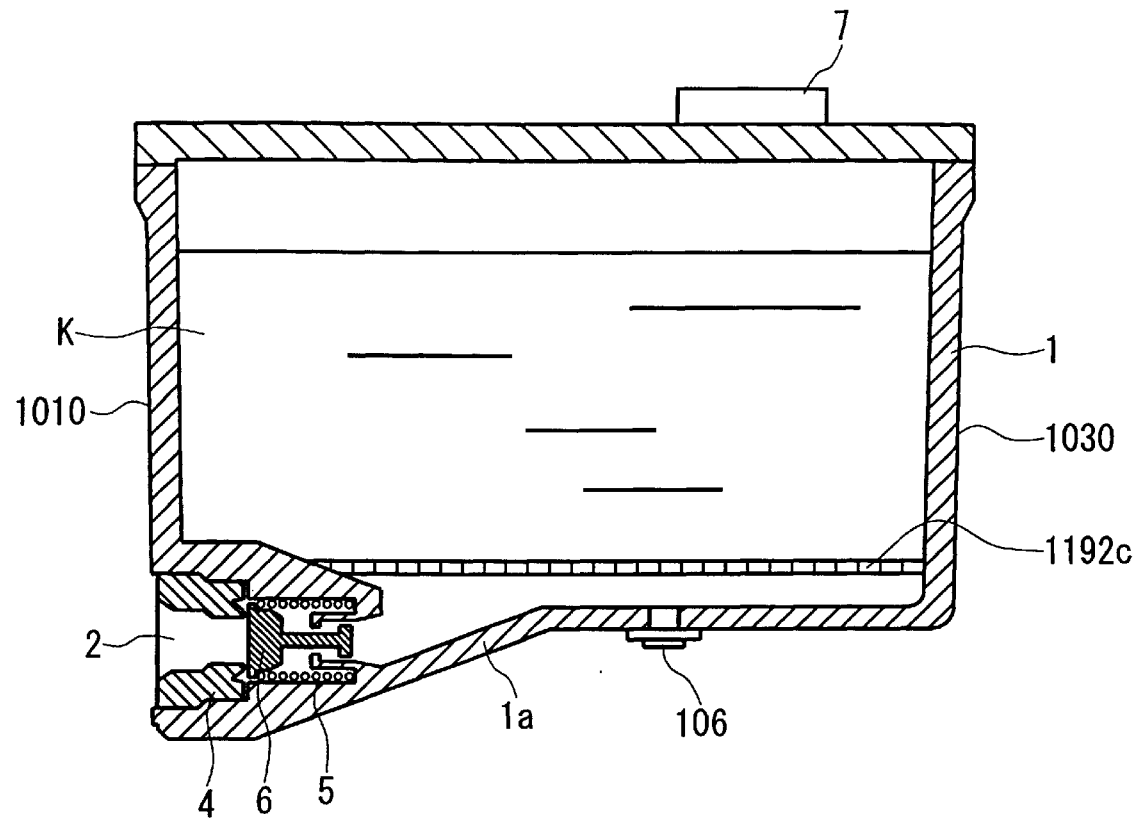
FIGS. 3(A) and 3(B) show a side cross sectional view of the further other embodiment of the ink cartridge according to the present invention.

FIG. 3(A) shows a side cross sectional view of the further other embodiment of the ink cartridge according to the present invention. As shown in FIG. 3(A), a side wall 1010 and a side wall 1030, which extend to the vertical direction to the ink surface, faces each other. The wave preventing wall 1192c extends from the side wall 1010 to the side wall 1030.

Figure 3B:
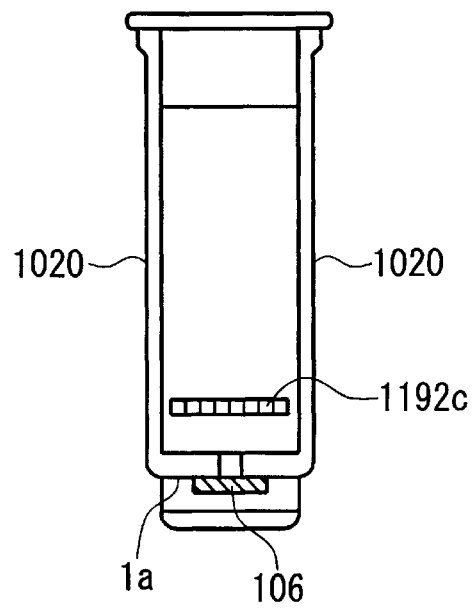

FIG. 3(B) shows a cross sectional view from the front of the ink cartridge of FIG. 3(A). A gap is provided between the side wall 1020 and the wave preventing wall 1192c so that ink can pass through the gap.

Figure 4:
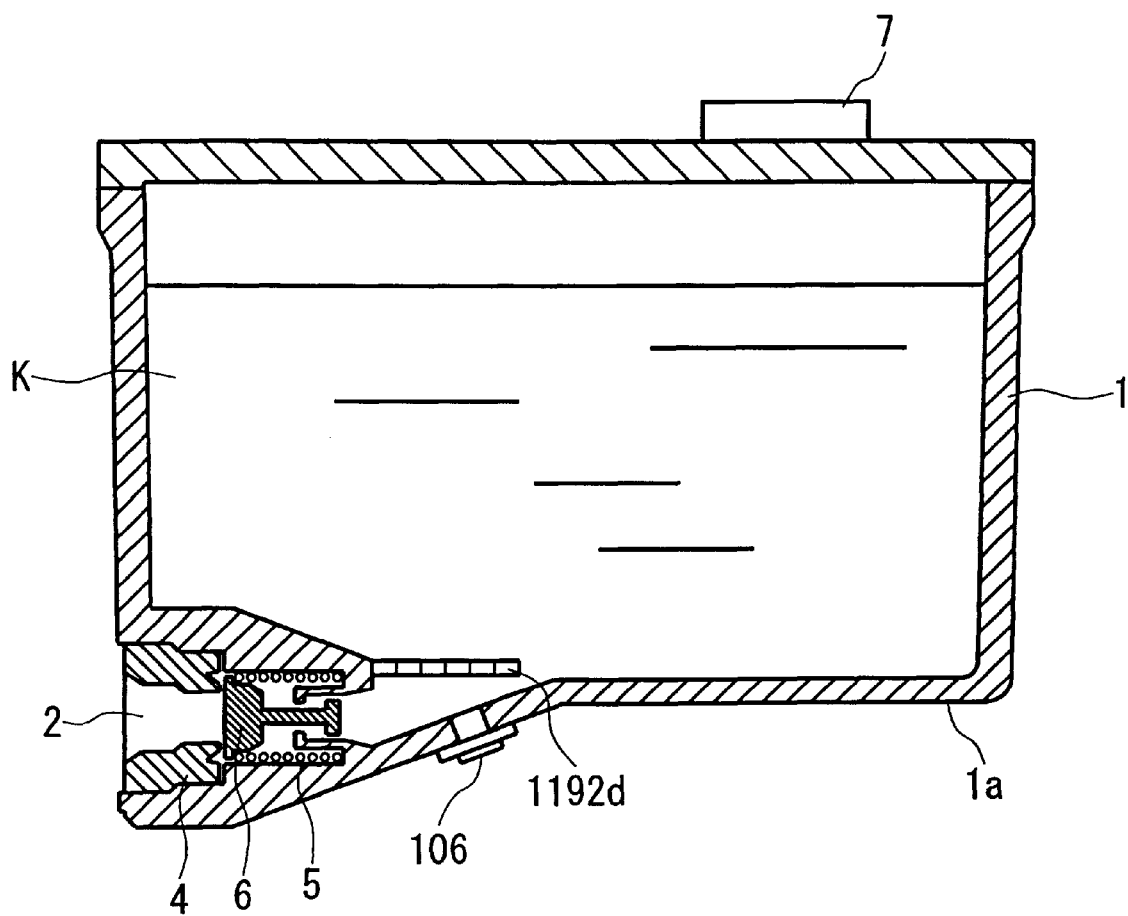
FIG. 4 shows a side cross section of the further other embodiment of the ink cartridge according to the present invention.

FIG. 4 shows a side cross section of the further other embodiment of the ink cartridge according to the present invention. In the present embodiment, the actuator 106 is provided on the sloped face formed on the bottom face 1a. The wave preventing wall 1192d extends from the periphery of the ink supply port 2 within the inside wall of the container to face to the actuator 106.

Figure 5A:
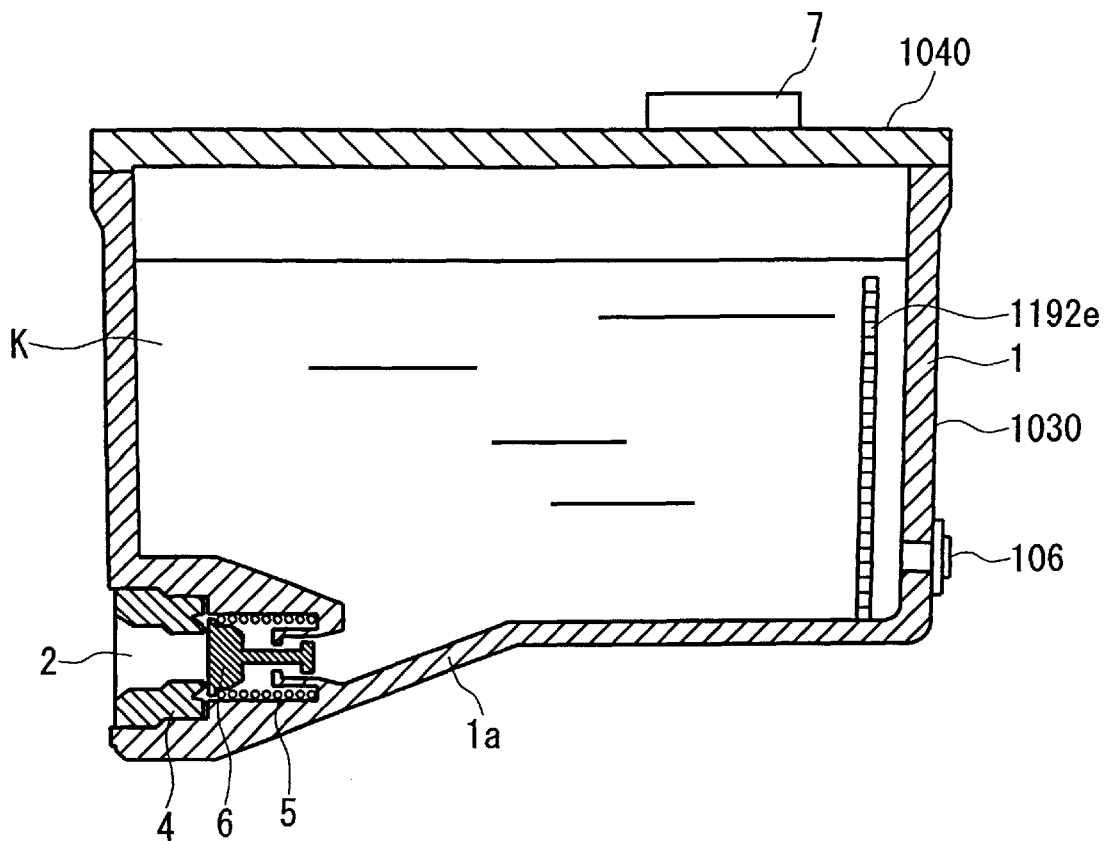
FIGS. 5(A) and 5(B) show a side cross section of the further other embodiment of the ink cartridge according to the present invention.

FIG. 5(A) shows a side cross section of the further other embodiment of the ink cartridge according to the present invention.

In FIG. 5 to FIG. 7, the actuator 106 is mounted on the side wall 1030 which extends to the vertical direction to the ink surface. Furthermore, the wave preventing wall 1192e to 1192g extends substantially vertical to the ink surface, that is, parallel with the side wall 1030.

The wave preventing wall 1192e is provided on the position where directly faces to the actuator 106. The wave preventing wall 1192e extends from the bottom face 1a. Furthermore, a gap is provided between the top wall 1040 and the top of wave preventing wall 1192e.

Figure 5B:
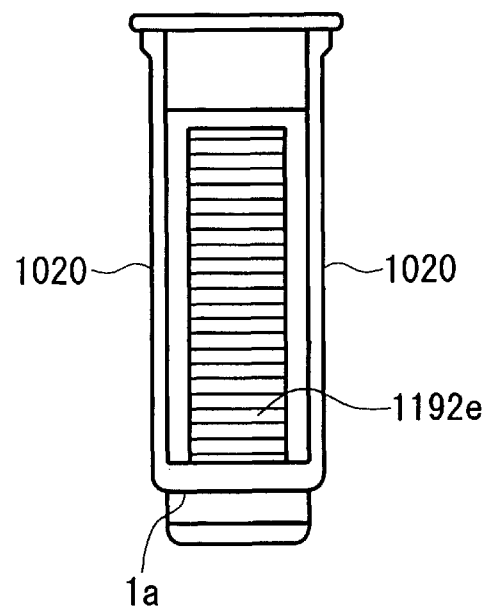

FIG. 5(B) shows a cross sectional view from the front of the ink cartridge of FIG. 5(A). A gap is provided between the side wall 1020 and the wave preventing wall 1192e so that ink can pass through the gap. Because of the gap, ink does not remain in the actuator 106 side of the container 1, which is formed by partitioning the container 1 by the wave preventing wall 1192e, even if ink is consumed. Therefore, the level of ink surface around the actuator 106 is always equal to the level of the ink surface of the other region of the container 1. Thus, the actuator 106 does not detect mistakenly the ink consumption status.

Furthermore, the length of the wave preventing wall 1192e from the bottom face 1a can be changed according to the height of the actuator 106 to the level of the ink surface and the probability of the generation of ink wave which is influenced by the viscosity of ink. Furthermore, interval of the gap between the wave preventing wall 1192e and the side wall 1020 can be changed according to the position of the actuator 106 on the width direction of the ink cartridge, the magnitude of the vibrating region of the actuator 106, or the characteristic of ink.

Figure 6A:
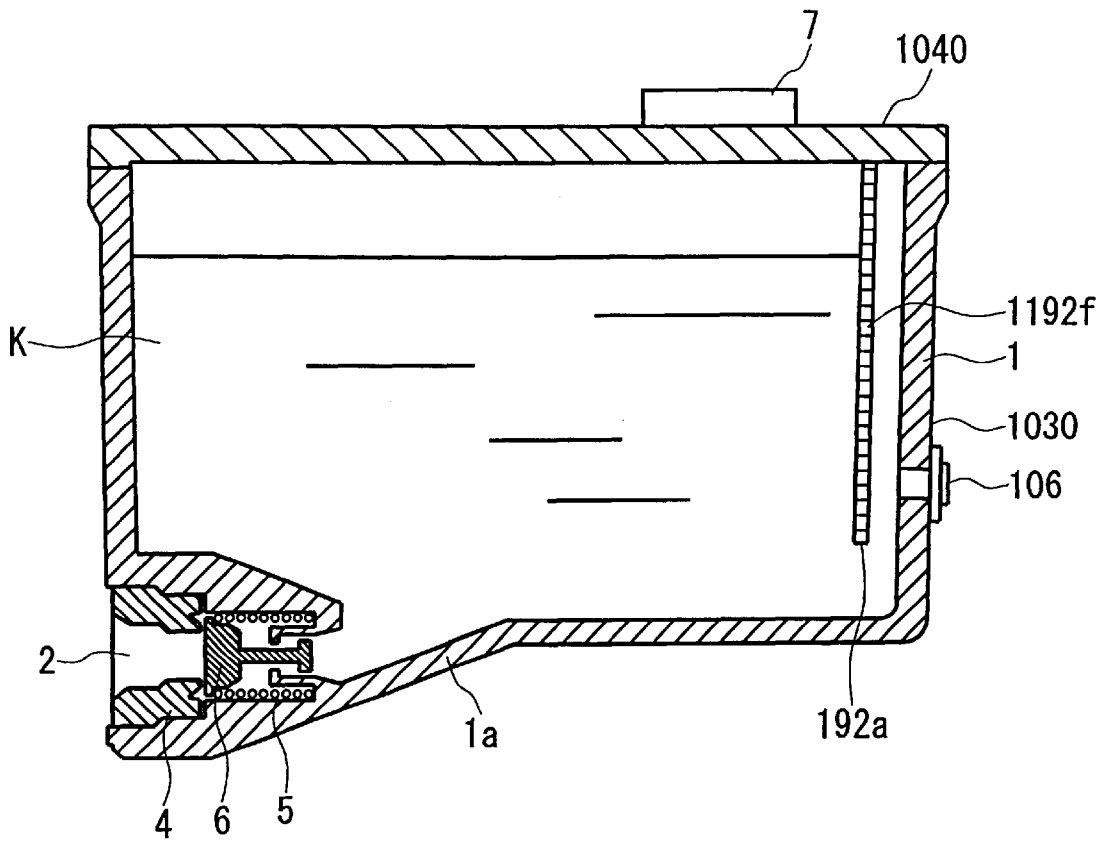
FIGS. 6(A) and 6(B) show a side cross section of the further other embodiment of the ink cartridge according to the present invention.

FIG. 6(A) shows a side cross section of the further other embodiment of the ink cartridge according to the present invention. the actuator 106 is mounted on the side wall 1030. A wave preventing wall 1192f is mounted on the position where directly faces to the actuator 106. The wave preventing wall 1192f extends from the top wall 1040. Furthermore, a gap is provided between the bottom face 1a and the wave preventing wall 1192f.

Figure 6B:
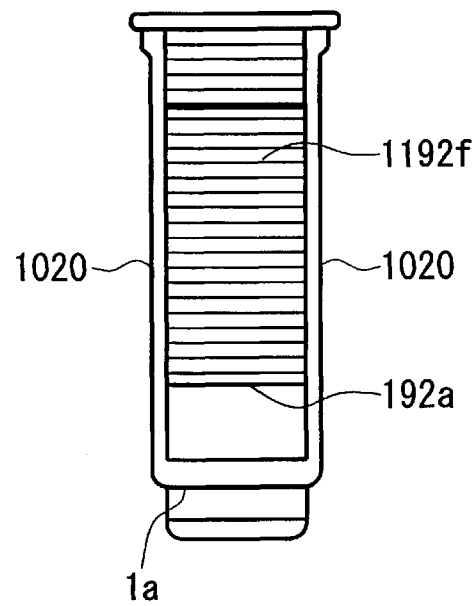

FIG. 6(B) shows a cross sectional view from the front of the ink cartridge of FIG. 6(A). The wave preventing wall 1192f is coupled to the side wall 1020 liquid tightly so that ink can not pass through between the wave preventing wall 1192f and the side wall 1020. By this configuration, ink remains only in the side of the actuator 106 which is formed by partitioning the container 1 by the wave preventing wall 1192f, even if ink is consumed. However, when ink surface reaches to the lower end of the wave preventing wall 1192f, gas enters to the actuator 106 side of the container 1 partitioned by the wave preventing wall 1192f. By the entering of the gas, ink remained in the actuator 106 side of the container 1 partitioned by the wave preventing wall 1192f flows out to the ink supply port 2 side, then the medium exits around the actuator 106 changes from ink to gas. Thereby the actuator 106 can detect that the ink inside the ink cartridge is in status of ink end. According to the present embodiment, lower end 192a determines the level of ink surface to be an ink end. Therefore, as far as the actuator 106 is provided on the position upper than the lower end 192a to the ink surface, actuator 106 can be located in any position on the wall face 1030. An airhole, which introduces gas, is provided on the top wall of the ink supply port 2 side of the container 1 partitioned by the wave preventing wall 1192f.

Figure 7A:
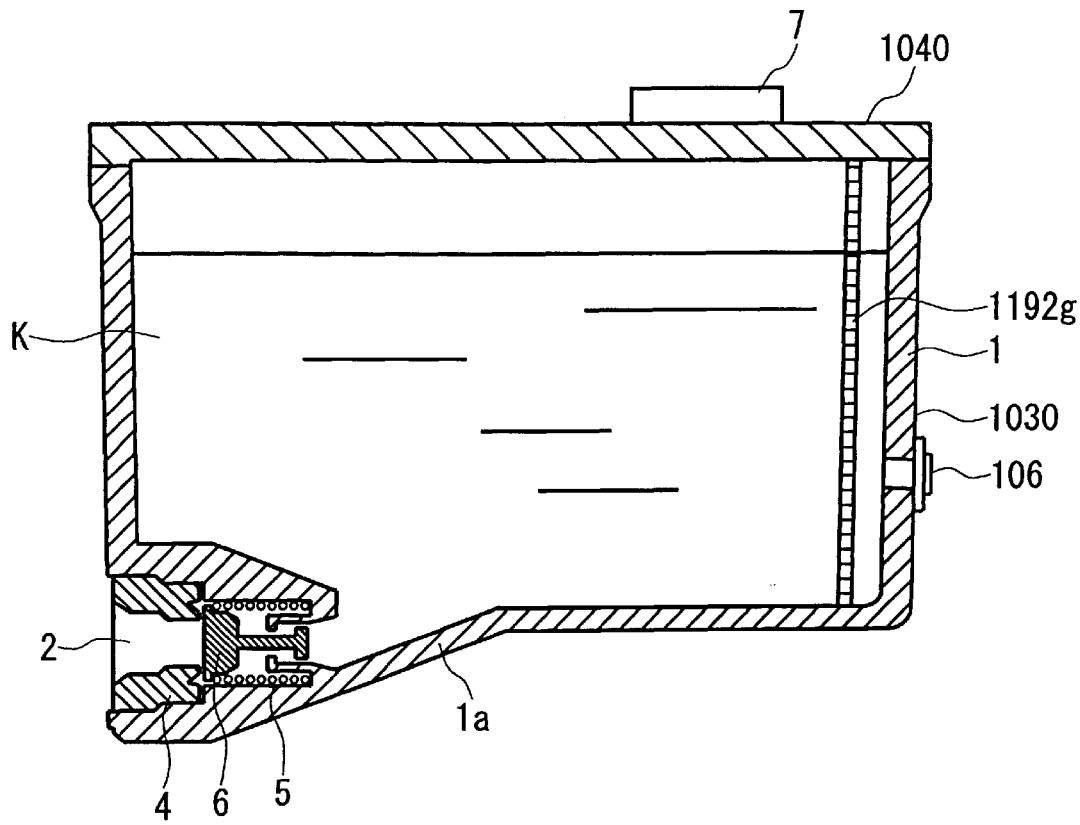
FIGS. 7(A) and 7(B) show a side cross section of the further other embodiment of the ink cartridge according to the present invention.

FIG. 7(A) shows a side cross section of the further other embodiment of the ink cartridge according to the present invention. The actuator 106 is mounted on the side wall 1030 which is vertical to the ink surface among the wall of the container 1. A wave preventing wall 1192g is provided on the position where directly faces to the actuator 106. The wave preventing wall 1192g extends from the bottom face 1a to the top wall 1040.

Figure 7B:
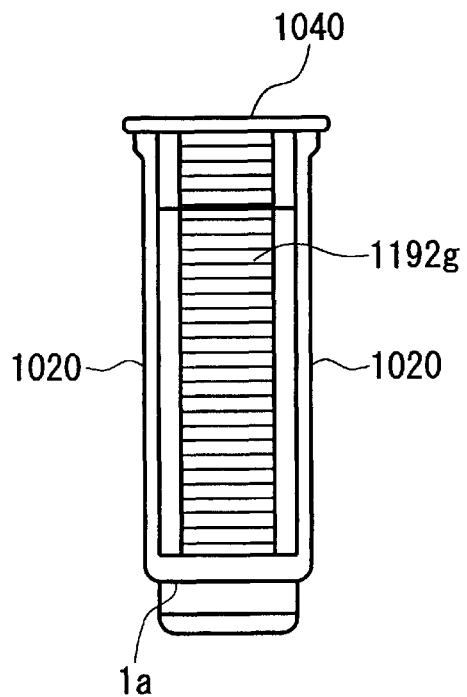

FIG. 7(B) shows a cross sectional view from the front of the ink cartridge of FIG. 7(A). A gap is provided between the wave preventing wall 1192g and the side wall 1020 so that ink can pass through the gap. By this configuration, ink does not remain in the side of the actuator 106 which is formed by partitioning the container 1 by the wave preventing wall 1192g, even if ink is consumed. Therefore, the level of ink surface around the actuator 106 is always equal to the level of ink surface of the other region of container 1. Furthermore, the interval of the gap between the wave preventing wall 1192g and the side wall 1020 can be changed according to the position of the actuator 106 on the width direction of the ink cartridge, or the characteristic of ink.

FIG. 8 to FIG. 11 show a side cross section of the further other embodiment of the ink cartridge according to the present invention. The actuator 106 is mounted on the side wall 1010 where the ink supply port 2 is provided.

Figure 8:
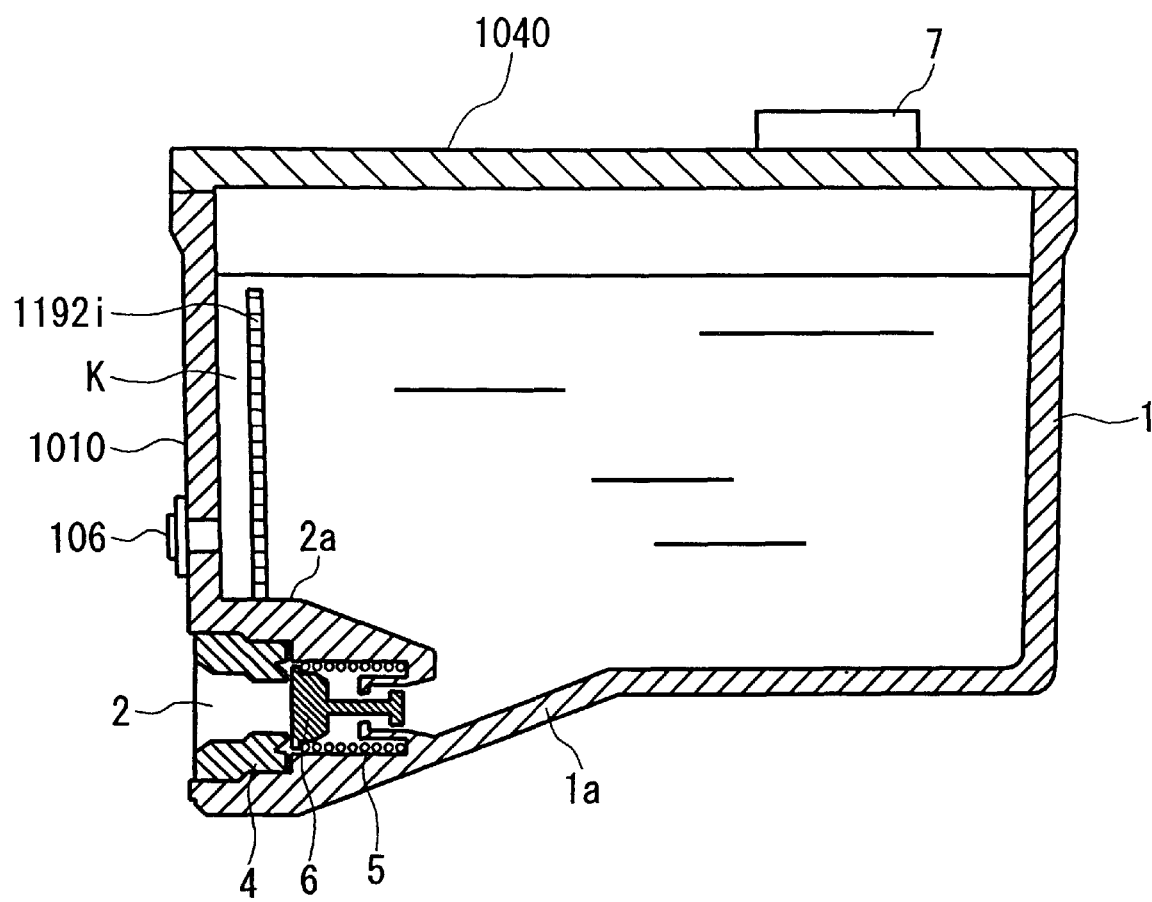
FIG. 8 shows a side cross section of the further other embodiment of the ink cartridge according to the present invention.

In FIG. 8, the wave preventing wall 1192i is provided on the position where directly faces to the actuator 106. The wave preventing wall 1192i extends from the supply port wall 2a which is a outside wall of the ink supply port 2 among the inside wall nearby the ink supply port 2 of the ink cartridge. On the other hand, a gap is provided between the top wall 1040 and the wave preventing wall 1192i.

Because the cross section viewed from the front of the ink cartridge of the present invention is similar to FIG. 5(B), the figure of which will be omitted for FIG. 8. There is a gap between the wave preventing wall 1192i and the side wall 1020. Because of the gap, ink does not remain in the actuator 106 side of the container 1, which is formed by partitioning the container 1 by the wave preventing wall, even if ink is consumed 1192i as the embodiment shown in FIG. 5. Therefore, the level of ink surface around the actuator 106 is always equal to the level of the ink surface of the other region of the container 1.

Figure 9:
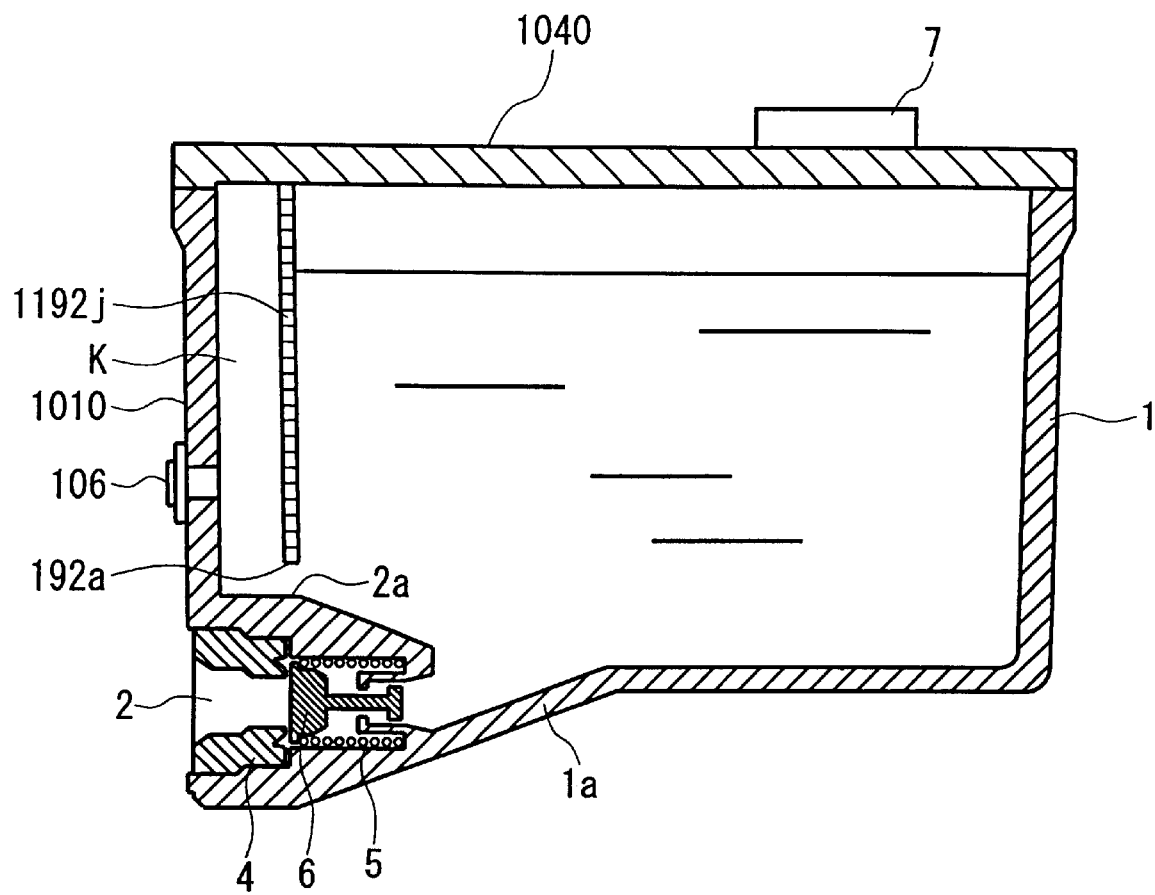
FIG. 9 shows a side cross section of the further other embodiment of the ink cartridge according to the present invention.

In FIG. 9, the wave preventing wall 1192j is provided on the position where directly faces to the actuator 106. The wave preventing wall 1192j extends from the top wall 1040. On the other hand, a gap is provided between the supply port wall 2a and the wave preventing wall 1192j.

Because the cross section viewed from the front of the ink cartridge of the present invention is similar to FIG. 6(B), the figure of which will be omitted for FIG. 9. The wave preventing wall 1192j is coupled to the side wall 1020 liquid so that ink can not pass through between the wave preventing wall 1192j and the side wall 1020. Therefore, as the embodiment shown in FIG. 6, as far as the actuator 106 is provided on the position upper than the lower end 192a to the ink surface, the actuator 106 can be located in any position on the wall face 1030.

Figure 10:
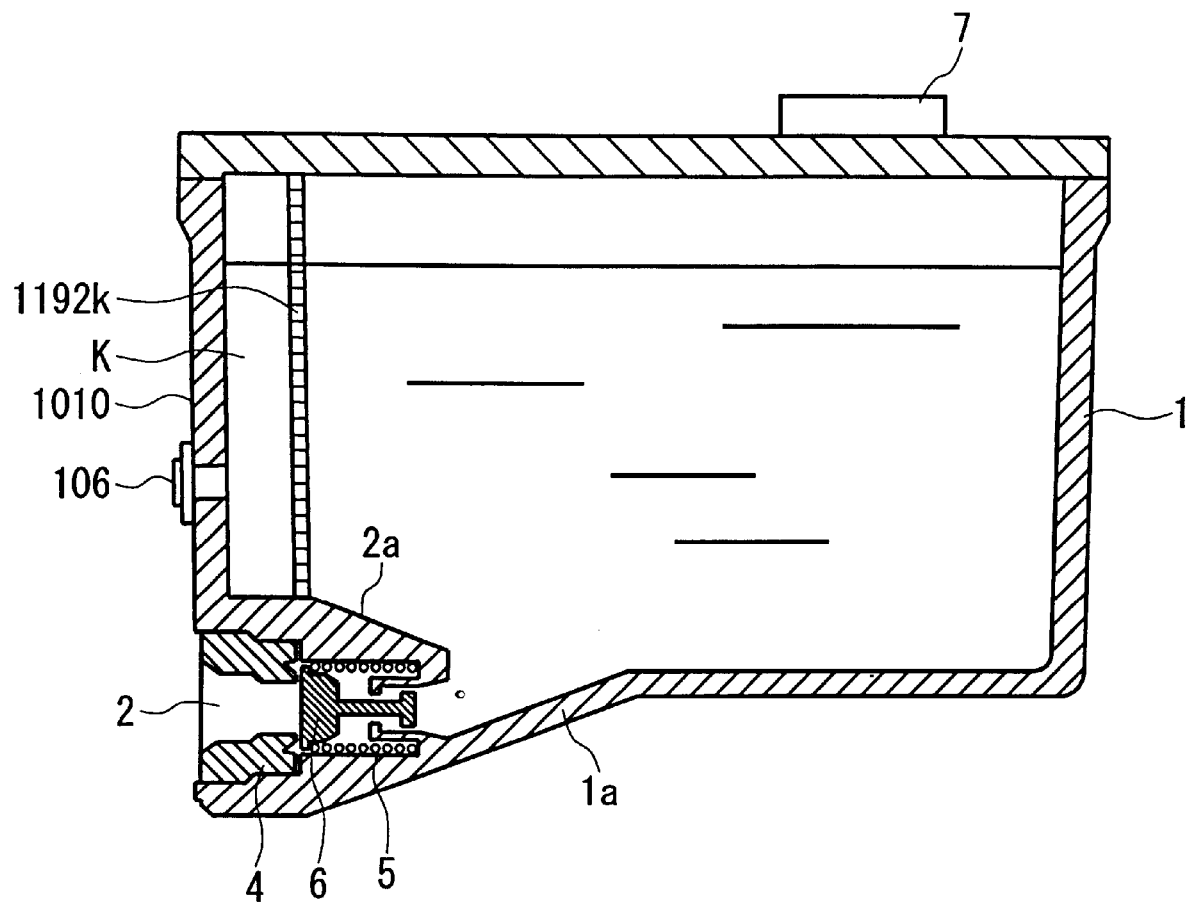
FIG. 10 shows a side cross section of the further other embodiment of the ink cartridge according to the present invention.

In FIG. 10, the wave preventing wall 1192k is provided on the position where directly faces to the actuator 106. The wave preventing wall 1192k extends from the top wall 1040 to the supply port wall 2a.

Because the cross section viewed from the front of the ink cartridge of the present invention is similar to FIG. 7(B), the figure of which will be omitted for FIG. 10. A gap is provided between the wave preventing wall 1192k and the side wall 1020 as shown in FIG. 7(B). Therefore, ink does not remain in the side of the actuator 106 which is formed by partitioning the container 1 by the wave preventing wall 1192k, even if ink is consumed as same as the embodiment of FIG. 5. Therefore, the level of ink surface around the actuator 106 is always equal to the level of ink surface of the other region of container 1.

Figure 11:
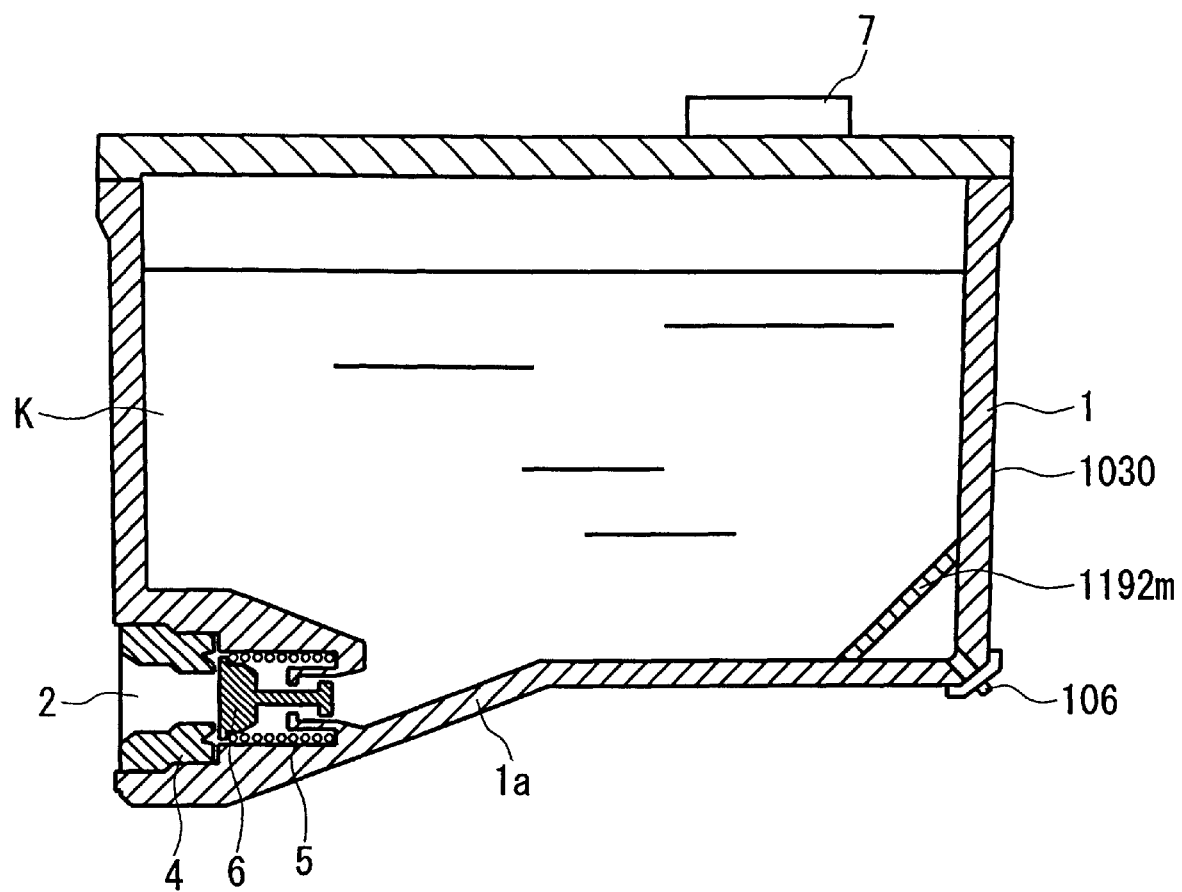
FIG. 11 shows a side cross section of the further other embodiment of the ink cartridge according to the present invention.
Figure 12:
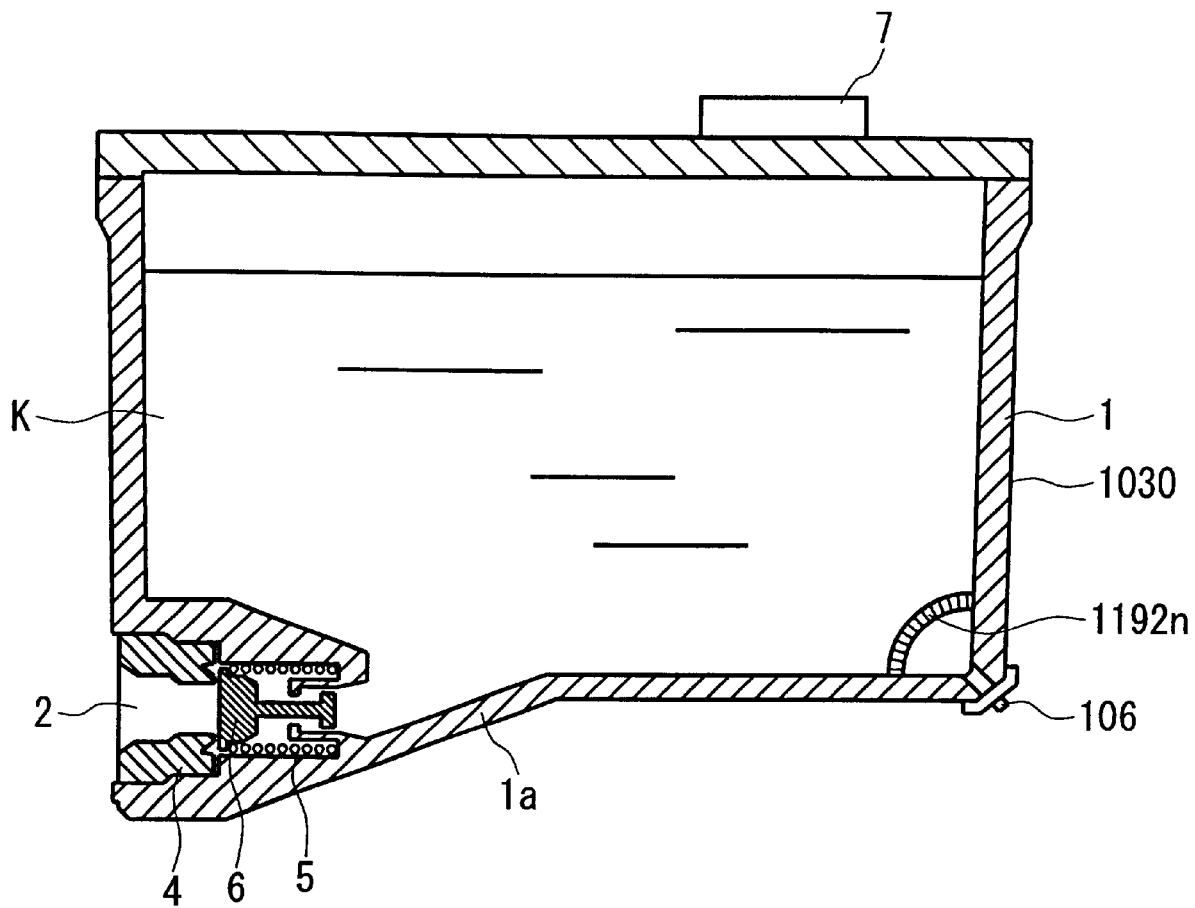
FIG. 12 shows a side cross section of the further other embodiment of the ink cartridge according to the present invention.
Figure 13:
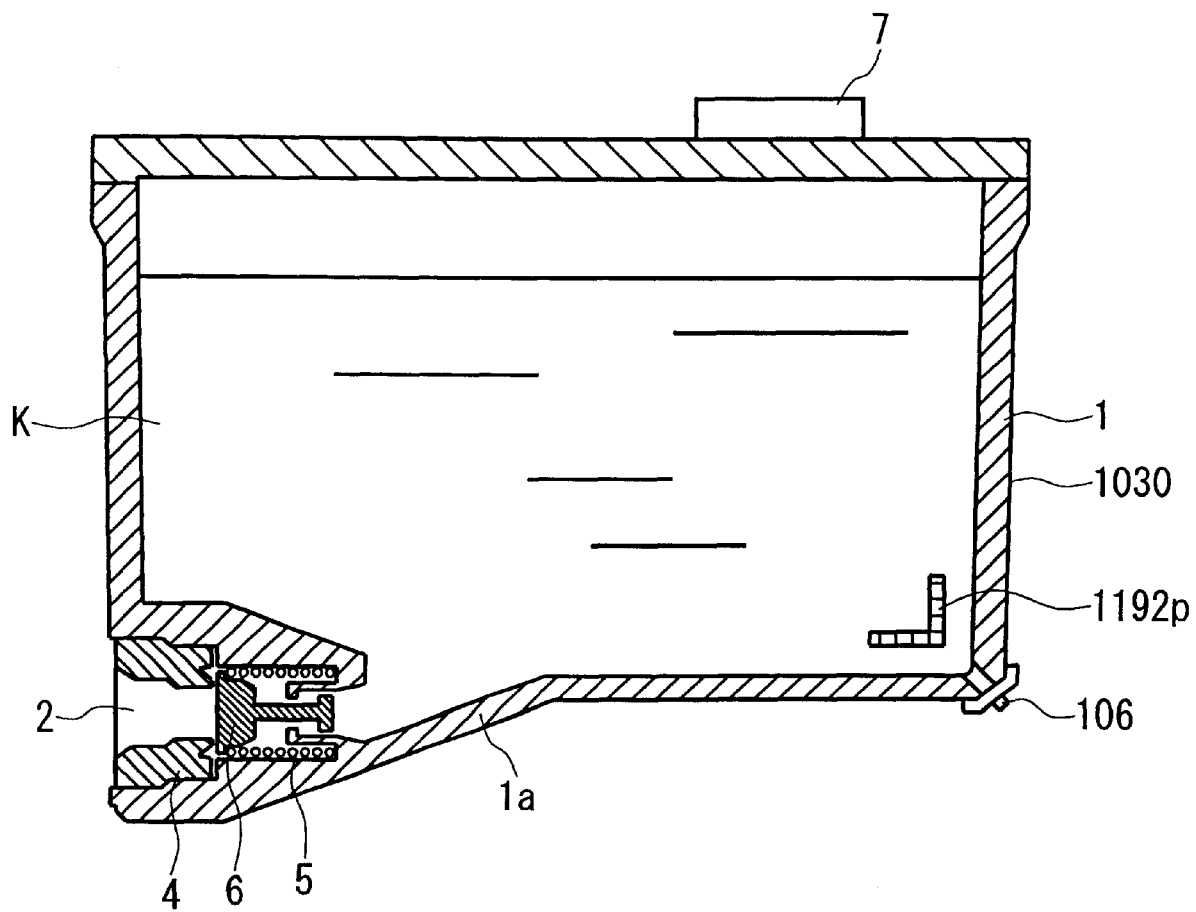
FIG. 13 shows a side cross section of the further other embodiment of the ink cartridge according to the present invention.

FIG. 11 to FIG. 13 show a side cross section of the further other embodiment of the ink cartridge according to the present invention. The actuator 106 is mounted on the boundary between the bottom face 1a, which is located below the ink surface, and the side wall 1030, which extends vertical to the ink surface.

In FIG. 11, a wave preventing wall 1192m is fixed to the container 1 such that one end of a wave preventing wall 1192m is connected to the bottom face 1a, and the other end of which is connected to the side wall 1030. The wave preventing wall 1192m is provided on the container 1 such that the wave preventing wall 1192m directly faces to the actuator 106 and slopes to the ink surface. There is a gap between the side wall 1020 and the wave preventing wall 1192m among the wall of the container 1 in the present embodiment. Therefore, the level of ink surface around the actuator 106 is always equal to the level of ink surface of the other region of container 1 even if ink is consumed. Furthermore, the shape of the wave preventing wall 1192m of the present embodiment is substantially plane shape.

Because the ink cartridge according the present embodiment mounting the actuator 106 on the boundary of the wall of the container 1, the positioning of the actuator 106 on the container 1 during the manufacturing of the ink cartridge becomes easy. Moreover, because the length or the width of the wave preventing wall 1192m can be shorten, the quantity of the material used for manufacturing the wave preventing wall 1192m is reduced. Furthermore, even in the case of manufacturing the wave preventing wall 1192m as a independent material with the container 1, it is relatively easy to positioning the wave preventing wall 1192m on the boundary of the wall of the container 1. Therefore, the manufacturing of the ink cartridge 180 becomes easy.

In FIG. 12, the position of mounting the actuator 106 and the wave preventing wall 1192n on the container 1 is same as the embodiment of the FIG. 11. On the other hand, the shape of the wave preventing wall 1192n is a part of the spherical shell in the present embodiment. By shaping the wave preventing wall 1192n in a shape of spherical shell, the distance between the actuator 106 and the all the part of the wave preventing wall 1192n becomes equal. Thereby the wave preventing wall 1192n does not influence the residual vibration detected by the actuator 106.

Furthermore, the wave preventing wall 1192n can be formed as a part of the hollow cylindrical shape.

In FIG. 13, the position of mounting the actuator 106 and the wave preventing wall 1192p on the container 1 is same as the embodiment of the FIG. 11. On the other hand, the wave preventing wall 1192p is formed in an L-shape in the present embodiment. The wave preventing wall 1192p is provided on the container 1 such that the wave preventing wall 1192p has a same distance with the side wall 1030 and the bottom face 1a. By shaping the wave preventing wall 1192n in a L-shape and reducing the gap between the wave preventing wall 1192p and the actuator 106 as long as the capillary force does not arise between the wave preventing wall 1192p and the actuator 106, the waving and bubbling of ink around the actuator 106 can be effectively prevented.

Figure 14:
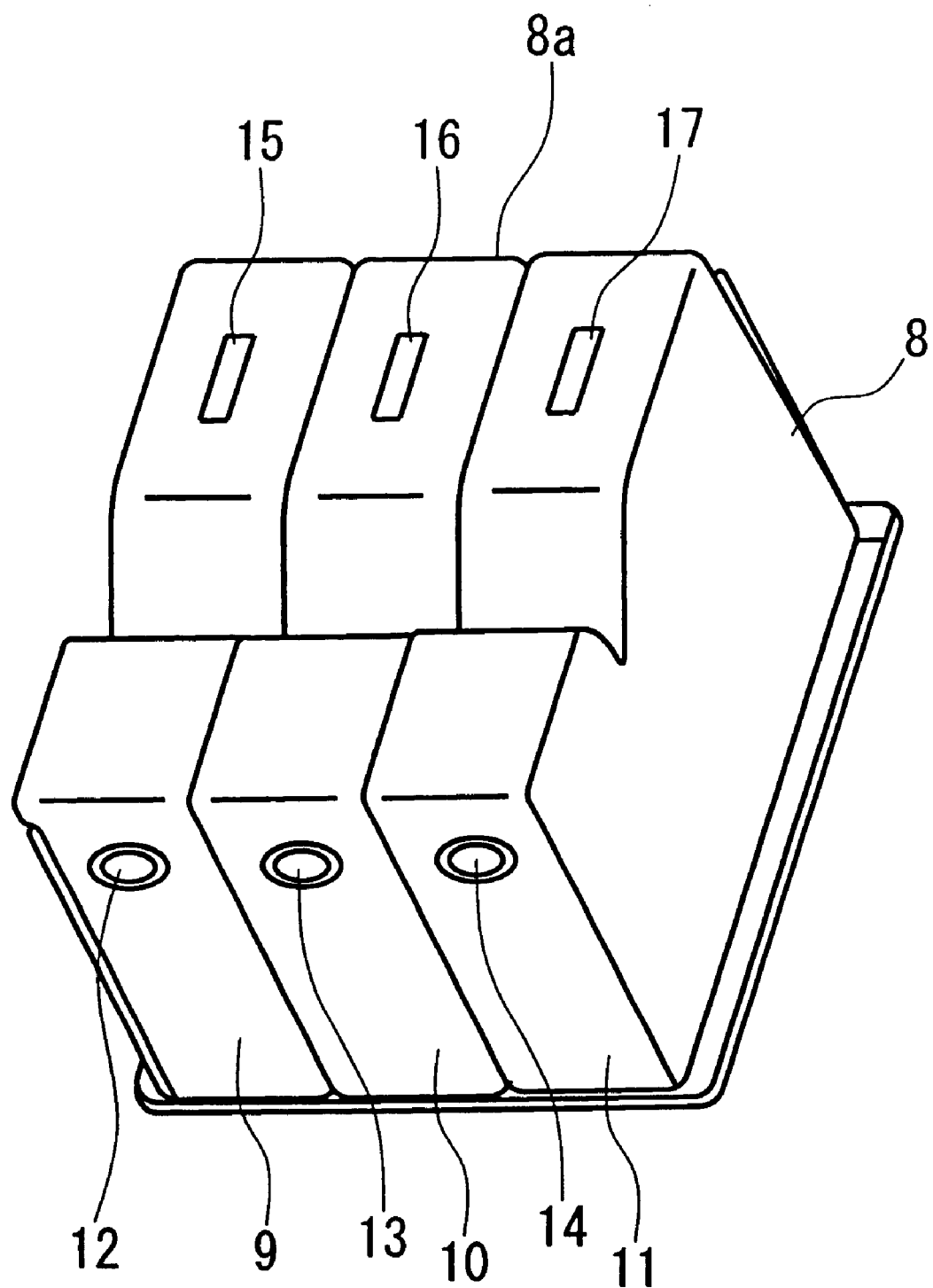
FIG. 14 is a perspective view of the ink cartridge which stores plural types of inks, viewed from a back side thereof, according to an embodiment.

FIG. 14 is a perspective view of the ink cartridge which stores plural types of inks, viewed from a back side thereof, according to an embodiment. A container 8 is divided by division walls into three ink chambers 9, 10 and 11. Ink supply ports 12, 13 and 14 are formed for the respective ink chambers. In a bottom face 8a of the respective ink chambers 9, 10 and 11, the respective actuator 15, 16 and 17 are mounted on the container 8 so that the actuator can contact with the ink which is housed in each ink chamber via the through hole provided on the container 8.

Each of three different wave preventing walls, not shown in the figure, is provided on the position of each of inside of the ink container 9, 10 and 11 such that the each of the wave preventing walls faces to the each of actuators 15, 16, and 17.

Figure 15:
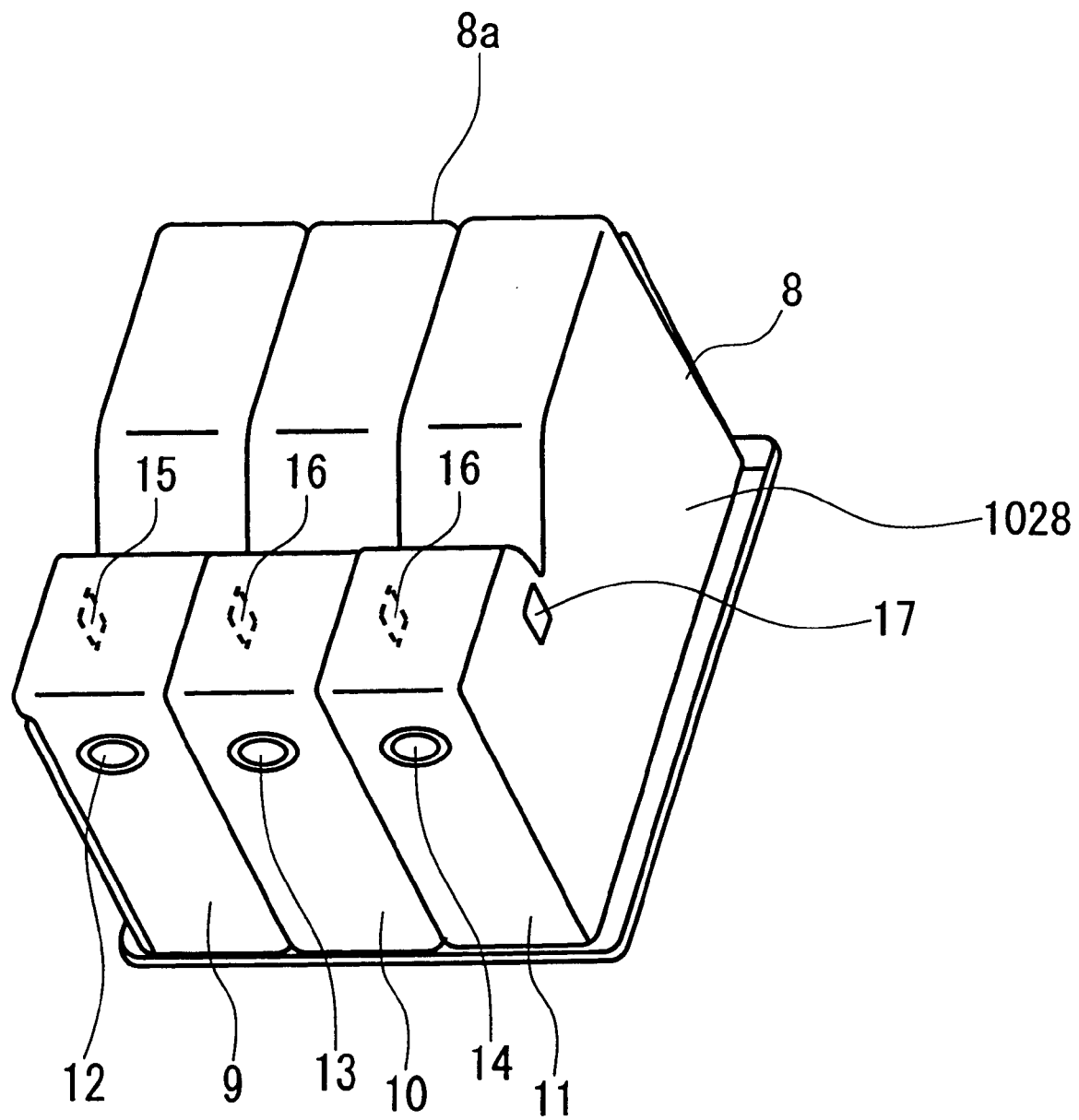
FIG. 15 is a perspective view of the ink cartridge which stores plural types of inks, viewed from a back side thereof, according to an embodiment.

FIG. 15 is a perspective view of the ink cartridge which stores plural types of inks, viewed from a back side thereof, according to an embodiment. A container 8 is divided by partition walls into three ink chambers 9, 10 and 11. Ink supply ports 12, 13 and 14 are formed for the respective ink chambers. In a side wall 1028 which extends vertically to the ink surface of the respective ink chambers 9, 10 and 11, the respective actuators 15, 16 and 17 are mounted on the container 8. Each of the actuators 15, 16, and 17 is mounted on the each of the ink chambers 9, 10, 11 so that the each of the actuators 15, 16, and 17 can contact with the ink which is housed in each ink chamber via the through hole, not shown in the figure, provided on the container 8. The actuator 16 is mounted a tone of the partition wall, which is provided between the ink chamber 9 and the ink chamber 10, and the partition wall, which is provided between the ink chamber 10 and the ink chamber 11.

Each of the wave preventing walls, not shown in the figure, is provided inside the each of the ink chamber 9, 10, and 11 such that each of the wave preventing walls faces to the actuators 15, 16, and 17 and extends to the vertical direction to the ink surface.

Figure 16:
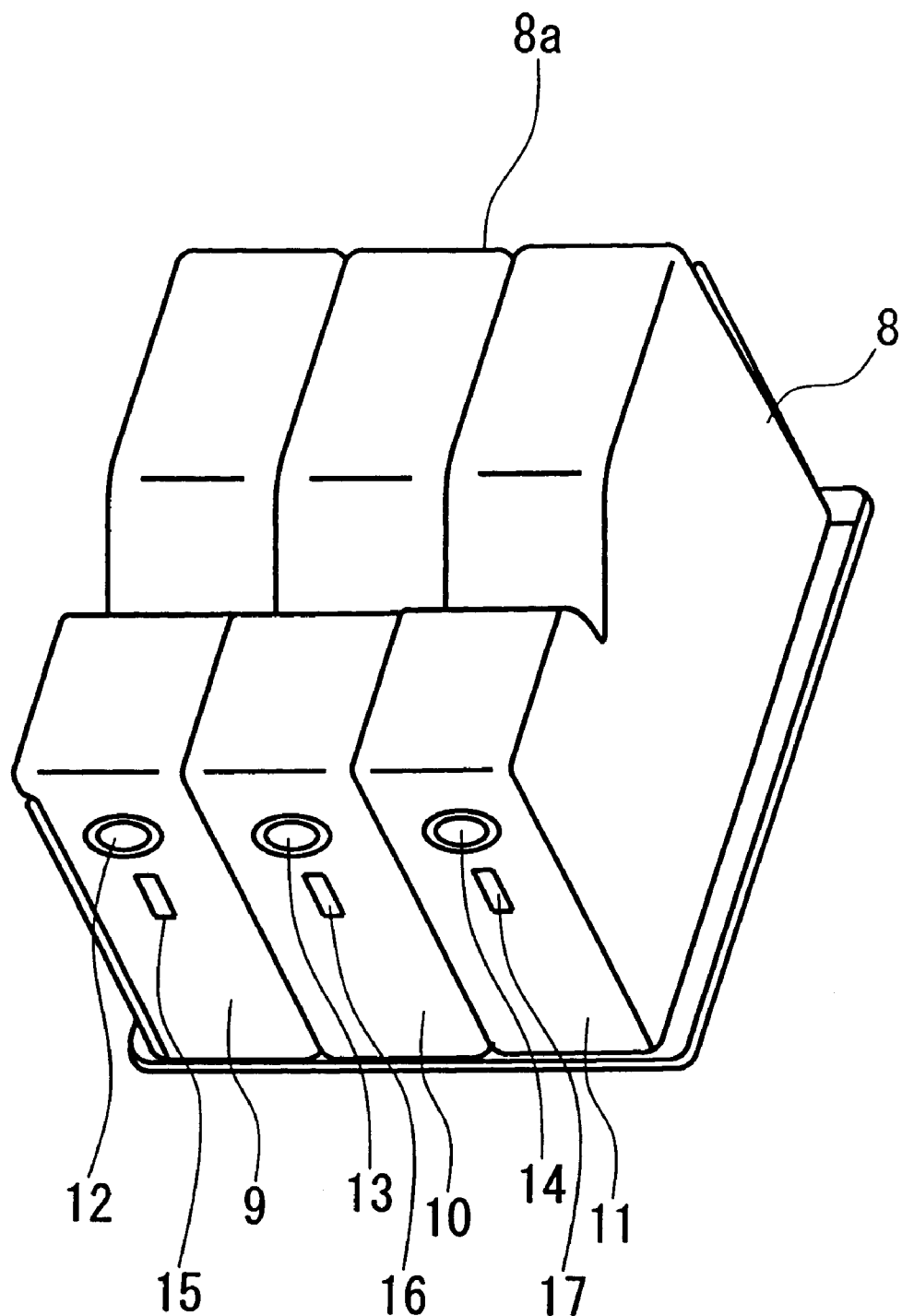
FIG. 16 is a perspective view of the ink cartridge which stores plural types of inks, viewed from a back side thereof, according to an embodiment.

FIG. 16 is a perspective view of the ink cartridge which stores plural types of inks, viewed from a back side thereof, according to an embodiment. A container 8 is divided by partition walls into three ink chambers 9, 10 and 11. Ink supply ports 12, 13 and 14 are formed for the respective ink chambers. Each of actuators 15, 16 and 17 is mounted on the container 8 just nearby the each of the ink supply port 12, 13, and 14, respectively. Each of the actuators 15, 16, and 17 is mounted on the each of the ink chambers 9, 10, 11 so that the each of the actuators 15, 16, and 17 can contact with the ink which is housed in each ink chamber via the through hole, not shown in the figure, provided on the container 8.

Each of the wave preventing walls, not shown in the figure, is provided inside the each of the ink chamber 9, 10, and 11 such that each of the wave preventing walls faces to the actuators 15, 16, and 17 as shown in FIG. 8 to FIG. 11.

Figure 17:
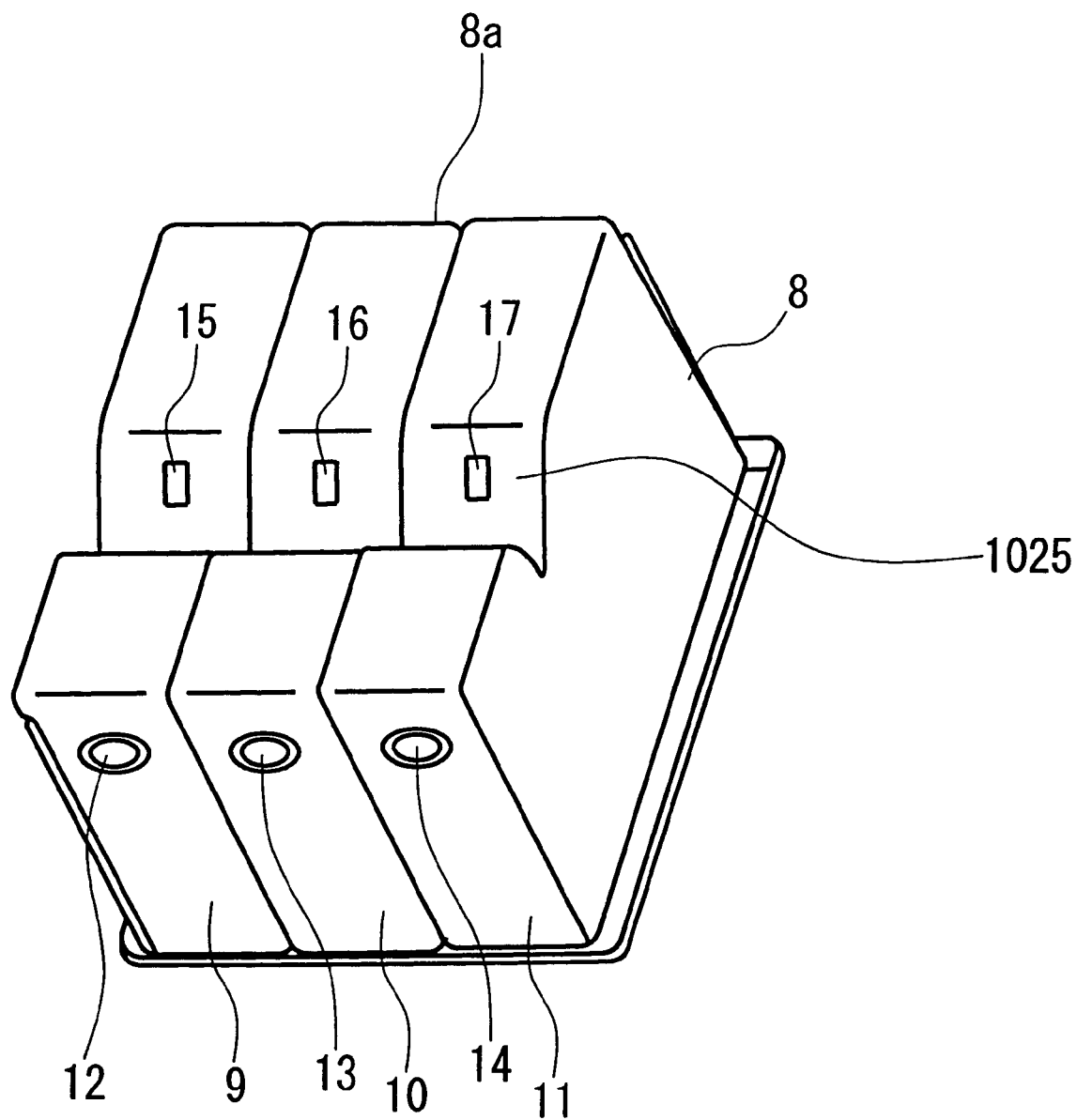
FIG. 17 is a perspective view of the ink cartridge which stores plural types of inks, viewed from a back side thereof, according to an embodiment.

FIG. 17 is a perspective view of the ink cartridge which stores plural types of inks, viewed from a back side thereof, according to an embodiment. A container 8 has same constitute element as shown in FIG. 14 to FIG. 16. A sloped face which slopes to the ink surface is provided on the bottom face 8a. Each of actuators 15, 16 and 17 is mounted on the sloped face 1025 of each of the ink chambers 9, 10, and 11.

Each of the wave preventing walls, not shown in the figure, is provided inside the each of the ink chamber 9, 10, and 11 as shown in FIG. 4.

Furthermore, the actuators 15, 16, and 17 can be provided on the boundary of the walls that adjoin each other in the container 8. In this case, each of the wave preventing walls is provided inside the each of the ink chambers 9, 10, and 11 as shown in FIG. 11 to FIG. 13.

FIG. 18 is a cross sectional view showing an embodiment of a major part of the ink-jet recording apparatus suitable for the ink cartridge shown in FIG. 1. A carriage 30 capable of reciprocating in the direction of the width of the recording paper is equipped with a subtank unit 33, while the recording head 31 is provided in a lower face of the subtank unit 33. Moreover, the ink supply needle 32 is provided in an ink cartridge mounting face side of the subtank unit 33. In the present embodiment, the ink cartridge shown in FIG. 1 is used. Therefore, the wave preventing wall 1192a is mounted on the position which faces to the actuator 106. However, the ink cartridge shown in FIG. 2 to FIG. 17 can be used instead of the ink cartridge shown in FIG. 1. Therefore, the wave preventing wall shown in FIG. 2 top FIG. 17 can be used for the present embodiment.

Figure 19:
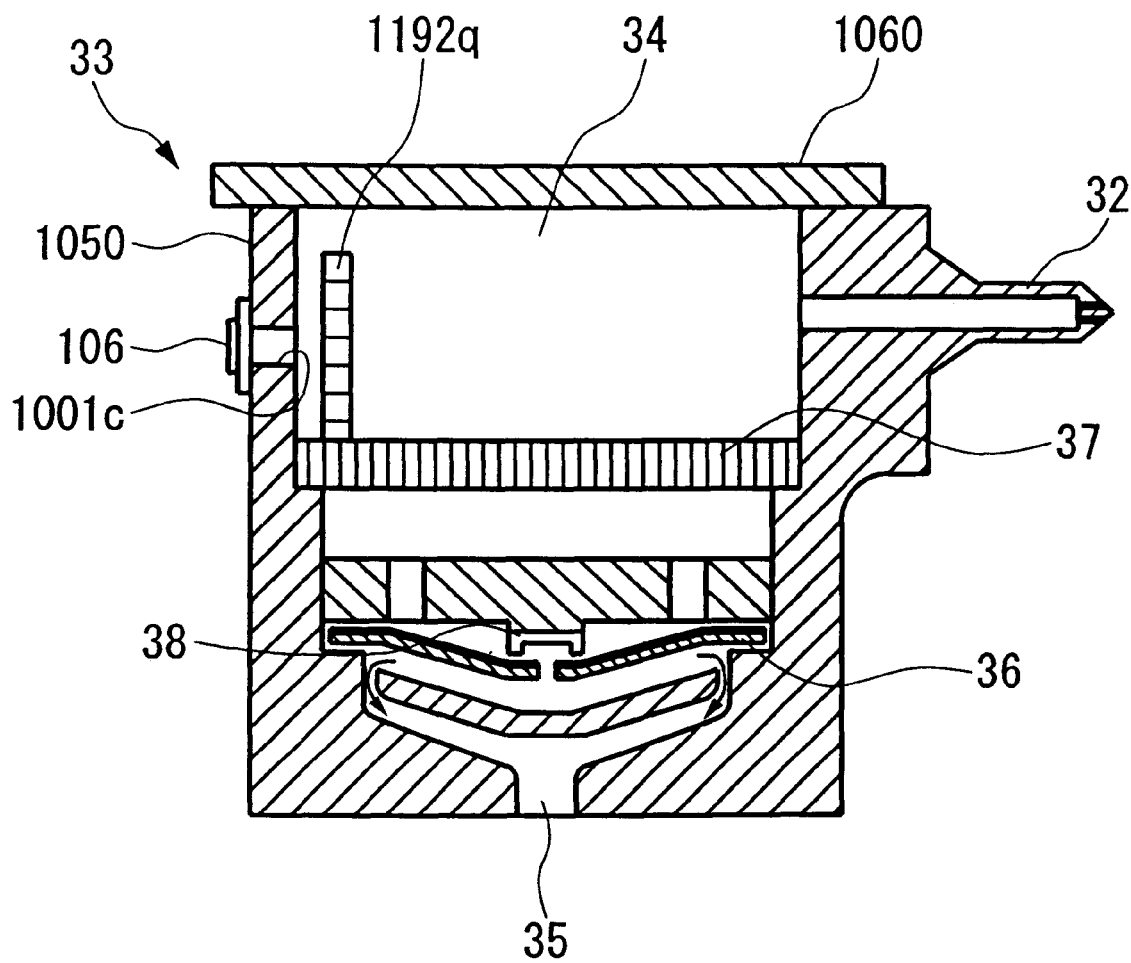
FIG. 19 is a detailed cross sectional view of a subtank unit 33 as an embodiment of the liquid container according to the present invention.

FIG. 19 is a detailed cross sectional view of a subtank unit 33 as an embodiment of the liquid container according to the present invention. The subtank unit 33 comprises the ink supply needle 32, the ink chamber 34, a flexible valve 36 and a filter 37. In the ink chamber 34, the ink is housed which is supplied from the ink cartridge via ink supply needle 32. The flexible valve 36 is so designed that the flexible valve 36 is opened and closed by means of the pressure difference between the ink chamber 34 and the ink supply passage 35. The subtank unit 33 is so constructed that the ink supply passage 35 is communicated with the recording head 31 so that the ink can be supplied up to the recording head 31.

Furthermore, the actuator 106 can be mounted on the side wall 1050 which extends to vertical direction to the ink surface among the wall of the subtank unit 33. The actuator 106 is mounted on the side wall 1050 so that the actuator 106 can contacts with ink inside the ink chamber 34 through the through hole 1001c which is provided on the side wall 1050. The wave preventing wall 1192q extends from the filter 37 to the upward direction to the ink surface so that the wave preventing wall 1192q faces to the actuator 106. A gap is provided between the top wall 1060, which locates upward the ink surface, and the wave preventing wall 1192q.

A gap is provided between the actuator 106 and the wave preventing wall 1192q. If ink is filled in the ink cartridge, ink is filled in the gap between the actuator 106 and the wave preventing wall 1192q. On the other hand, if the ink inside the ink cartridge is consumed, ink is not held in the gap between the actuator 106 and the wave preventing wall 1192q. That is, the capillary force, which holds ink, does not works between the actuator 106 and the wave preventing wall 1192q.

The cross section of the subtank unit 33 viewed from the direction of the side wall 1050 is similar to the cross section of the ink cartridge shown in FIG. 5(B). A gap is provided between the side wall, not shown in the figure, which adjacent to the side wall 1050 and the wave preventing wall 1192q. The level of the ink surface around the actuator 106 is always equal to the level of the ink surface of the other region of the container 1. Therefore, with the consumption of the ink inside the ink chamber 34, the level of ink surface between the side wall 1050 and the wave preventing wall 1192q also decreases. The actuator 106 thereby does not mistakenly detect the ink consumption status.

Furthermore, the length of the wave preventing wall 1192q from the filter 37 can be changed according to the position of the actuator 106 to the level of the ink surface and the probability of the generation of ink wave which is influenced by the viscosity of ink. Furthermore, interval of the gap between the wave preventing wall 1192q and the side wall 1020 can be changed according to the position of the actuator 106 on the subtank unit 33, the magnitude of the vibrating region of the actuator 106, or the characteristic of ink.

Referring to FIG. 18, when the ink supply port 2 of the container 1 is inserted through the ink supply needle 32 of the subtank unit 33, the valve body 6 recedes against the spring 5, so that an ink passage is formed and the ink inside the container 1 flows into the ink chamber 34. At a stage where the ink chamber 34 is filled with ink, a negative pressure is applied to a nozzle opening of the recording head 31 so as to fill the recording head with ink. Thereafter, the recording operation is performed.

When the ink is consumed in the recording head 31 by the recording operation, a pressure in the downstream of the flexible valve 36 decreases. Then, the flexible valve 36 is positioned away from a valve body 38 so as to become opened as shown in FIG. 19. When the flexible valve 36 is opened, the ink in the ink chamber 34 flows into the recording head 31 through the ink passage 35. Accompanied by the ink which has flowed into the recording head 31, the ink in the container 1 flows into the subtank unit 33 via the ink supply needle 32.

Moreover, the actuator 106 and the wave preventing wall are provided at least one of the ink cartridge and the subtank unit. However, the actuator 106 and the wave preventing wall can be provided both of the ink cartridge and the subtank unit.

By providing the actuator 106 and the wave preventing wall on both of the ink cartridge and the subtank unit, the ink end status of the ink cartridge and the subtank unit can be accurately detected. For example, the recording apparatus can be set to stop the recording operation when one of the cases arises such that the number of the droplets discharged from the recording head reach to the predetermined number of droplets during the measuring of the number of droplets after the actuator 106, which is mounted on the ink cartridge, detects the ink end or that the actuator 106 mounted on the subtank unit 33 detects the ink end.

Furthermore, the recording apparatus can be set to stop the recording operation when both of the cases arises such that the number of the droplets discharged from the recording head reach to the predetermined number of droplets after the actuator 106, which is mounted on the ink cartridge, detects the ink end and that the actuator 106 mounted on the subtank unit 33 detects the ink end.

While the recording apparatus is operating, a drive signal is supplied to the actuator 106 at a period which is set in advance.

Figure 20:
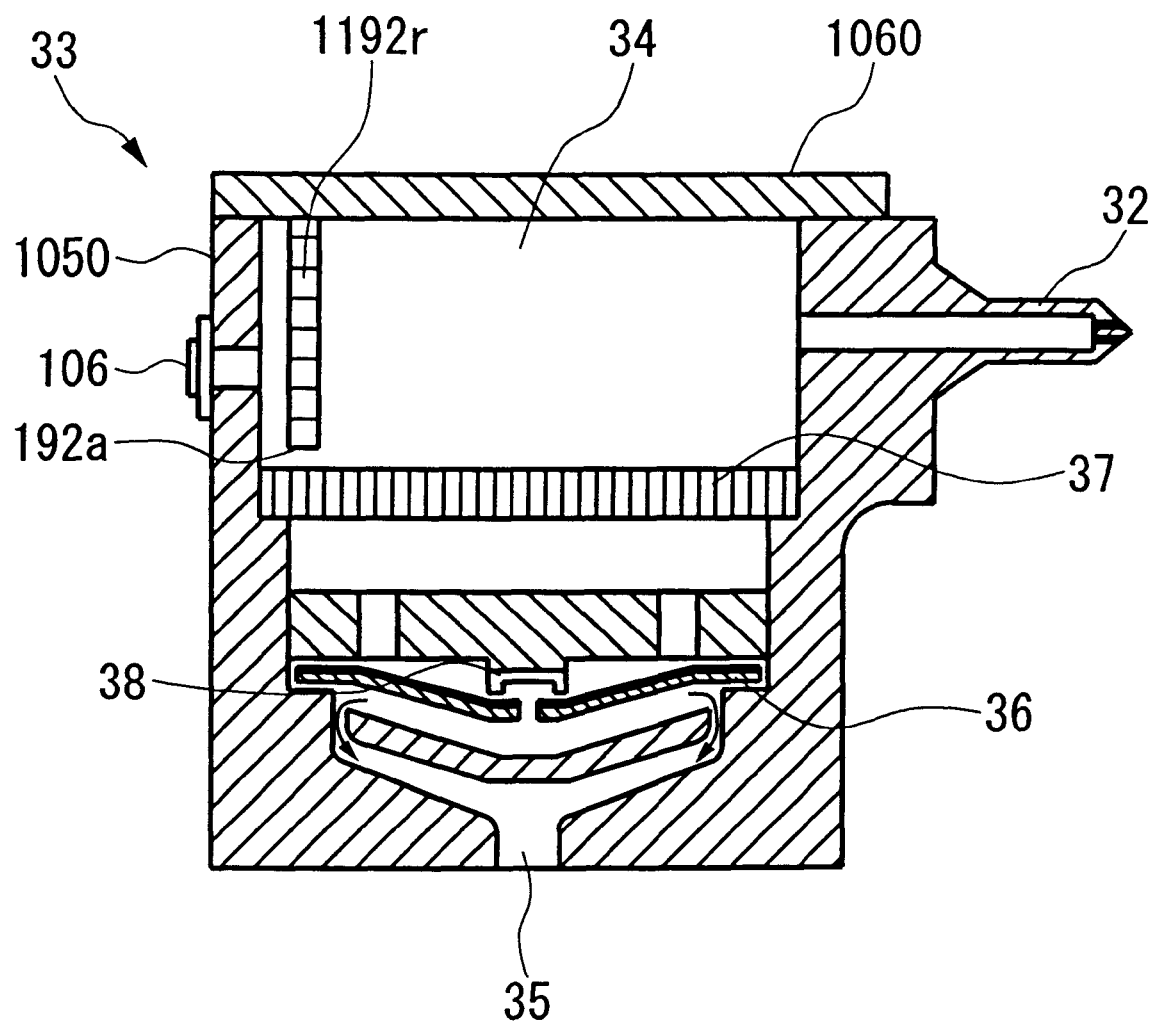
FIG. 20 is a cross sectional view of another embodiment of a subtank unit 33 of the liquid container according to the present invention.

FIG. 20 is a cross sectional view of another embodiment of a subtank unit 33 of the liquid container according to the present invention. The actuator 106 is mounted on the side wall 1050. The wave preventing wall 1192r extends from the top wall 1060, which is located upside of the ink surface, downward to the ink surface. There is a gap between the lower end 192a of the wave preventing wall 1192r and the filter 37. Moreover, a gap is provided between the wave preventing wall 1192r and the side wall adjacent to the side wall 1050. No capillary force, which holds ink, arises between the wave preventing wall 1192r and the actuator 106 as similar to the embodiment shown in FIG. 19.

Because a gap is provided between the wave preventing wall 1192r and the side wall adjacent to the side wall 1050, the level of the ink surface around the actuator 106 is always equal to the level of the ink surface of the other region of the container 34. Therefore, the actuator 106 detects the ink end status by detecting the ink surface at the mounting position of the actuator 106.

Figure 21:
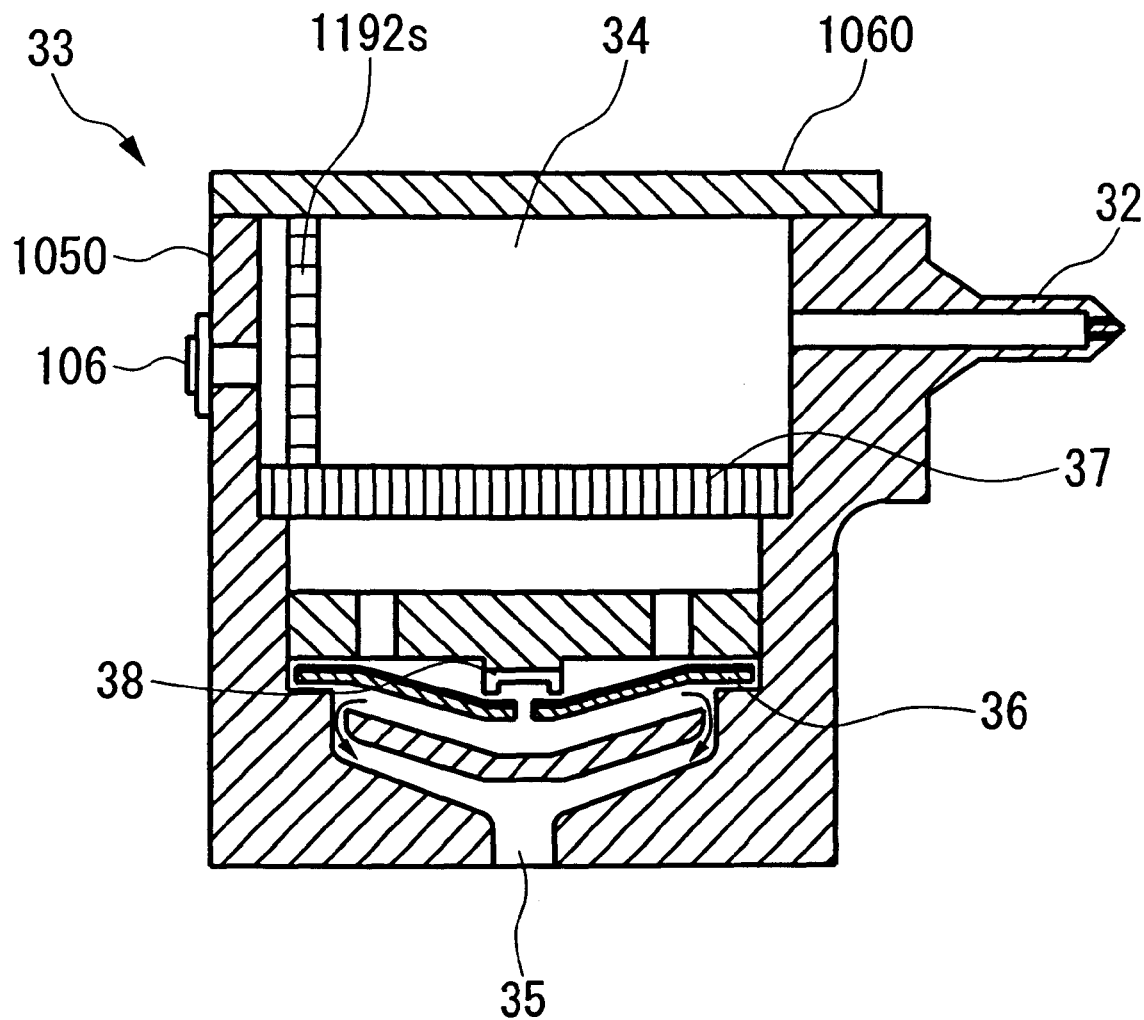
FIG. 21 is a cross sectional view of further another embodiment of a subtank unit 33 of the liquid container according to the present invention.

FIG. 21 is a cross sectional view of further another embodiment of a subtank unit 33 of the liquid container according to the present invention. The actuator 106 is mounted on the side wall 1050. The wave preventing wall 1192s extends from the top wall 1060 until the filter 37. No capillary force, which holds ink, arises between the wave preventing wall 1192s and the actuator 106 as similar to the embodiment shown in FIG. 19.

Furthermore, a gap is provided between the wave preventing wall 1192s and the side wall adjacent to the side wall 1050. Therefore, the level of the ink surface around the actuator 106 is always equal to the level of the ink surface of the other region of the container 34.

FIG. 22 and FIG. 23 shows a detail and equivalent circuit of an actuator 106, which is an embodiment of the piezoelectric device of the present invention. The actuator explained herein is used at least for the method which detects the liquid consumption status in the liquid container by detecting a change in acoustic impedance. Especially, the actuator is used for the method which detects the liquid consumption status in the liquid container by detecting at least the change in acoustic impedance by detecting the resonant frequency from residual vibration. FIG. 22(A) is an enlarged plan view of the actuator 106. FIG. 22(B) shows a B—B cross-section of the actuator 106. FIG. 22(C) shows a C—C cross-section of the actuator 106. FIG. 23(A) and FIG. 23(B) shows an equivalent circuit of the actuator 106. Each of FIG. 23(C) and FIG. 23(D) shows the actuator 106 and around the actuator 106, and the equivalent circuit of the actuator 106 when an ink is filled in the ink cartridge. FIG. 23(E) and FIG. 23(F) shows the actuator 106 and around the actuator 106, and the equivalent circuit of the actuator 106 when there is no ink in the ink cartridge.

The actuator 106 includes a base plate 178, a vibrating plate 176, a piezoelectric layer 160, an upper electrode 164 and a lower electrode 166, an upper electrode terminal 168, a lower electrode terminal 170, and a supplementary electrode 172. The base plate 178 has a circular shape opening 161 on approximately its center. The vibrating plate 176 is provided on one of the face, which is called as "right side" in following, of the base plate 178 such as to cover the opening 161. The piezoelectric layer 160 is disposed on right side of the surface of the vibrating plate 176. The upper electrode 164 and the lower electrode 166 sandwich the piezoelectric layer 160 from both sides. The upper electrode terminal 168 connects to the upper electrode 164 electrically. The lower electrode terminal 170 connects to the lower electrode 166 electrically. The supplementary electrode 172 is disposed between the upper electrode 164 and the upper electrode terminal 168 and connects both of the upper electrode 164 and the upper electrode terminal 168. Each of the piezoelectric layer 160, upper electrode 164, and the lower electrode 166 has a circular portion as its main portion. Each of the circular portion of the piezoelectric layer 160, the upper electrode 164, and the lower electrode 166 form a piezoelectric element.

The vibrating plate 176 is formed on the right side of the surface of the base plate 178 to cover the opening 161. The cavity 162 is formed by the portion of the vibrating plate 176, which faces the opening 161, and the opening 161 of the on the surface of the base plate 178. The face of the base plate 178 which is opposite side of the piezoelectric element, called as "back side" in following, is faced with the liquid container side. The cavity 162 is constructed such that the cavity 162 contacts with liquid. The vibrating plate 176 is mounted on the base plate 178 such that the liquid does not leak to the right side of the surface of the base plate 178 even if the liquid enters inside the cavity 162.

The lower electrode 166 is located on the right side of the vibrating plate 176, that is, opposite side against the liquid container. The lower electrode 166 is provided on the vibrating plate 176 such that the center of the circular portion of the lower electrode 166, which is a main portion of the lower electrode 166, and the center of the opening 161 substantially matches. The area of the circular portion of the lower electrode 166 is set to be smaller than the area of the opening 161. The piezoelectric layer 160 is formed on the right side of the surface of the lower electrode 166 such that the center of the circular portion and the center of the opening 161 substantially match. The area of the circular portion of the piezoelectric layer 160 is set to be smaller than the area of the opening 161 and larger than the area of the circular portion of the lower electrode 166.

The upper electrode 164 is formed on the right side of the surface of the piezoelectric layer 160 such that the center of the circular portion, which is a piezoelectric layer 160, and the center of the opening 161 substantially match. The area of the circular portion of the upper electrode 164 is set to be smaller than the area of the circular portion of the opening 161 and the piezoelectric layer 160 and larger than the area of the circular portion of the lower electrode 166.

Therefore, the main portion of the piezoelectric layer 160 has a structure to be sandwiched by the main portion of the upper electrode 164 and the main portion of the lower electrode each from right side face and back side face, and thus the main portion of the piezoelectric layer 160 can effectively drive and deform the piezoelectric layer 160. The circular portion, which is a main portion of each of the piezoelectric layer 160, the upper electrode 164, and the lower electrode 166, forms the piezoelectric element in the actuator 106. As explained above, the electric element contacts with the vibrating plate. Within the circular portion of the upper electrode 164, circular portion of the piezoelectric layer 160, the circular portion of the lower electrode, and the opening 161, the opening 161 has the largest area. By this structure, the vibrating region which actually vibrates within the vibrating plate is determined by the opening 161. Furthermore, each of the circular portion of the upper electrode 164 and the circular portion of the piezoelectric layer 160 and the circular portion of the lower electrode has smaller area than the area of the opening 161, The vibrating plate becomes easily vibrate. Within the circular portion of the lower electrode 166 and the circular portion of the upper electrode 164 which connects to the piezoelectric layer 160 electrically, the circular portion of the lower electrode 166 is smaller than the circular portion of the upper electrode 164. Therefore, the circular portion of the lower electrode 166 determines the portion which generates the piezoelectric effect within the piezoelectric layer 160.

The center of the circular portion of the piezoelectric layer 160, the upper electrode 164, and the lower electrode 166, which form the piezoelectric element, substantially match to the center of the opening 161. Moreover, the center of the circular shape opening 161, which determines the vibrating section of the vibrating plate 176, is provided on the approximately center of the actuator 106. Therefore, the center of the vibrating section of the actuator 106 matches to the center of the actuator 106. Because the main portion of the piezoelectric element and the vibrating section of the vibrating plate 176 have a circular shape, the vibrating section of the actuator 106 is symmetrical about a center of the actuator 106.

Because the vibrating section is symmetrical about a center of the actuator 106, the excitation of the unnecessary vibration occurred owing to the asymmetric structure can be prevented. Therefore, the accuracy of detecting the resonant frequency increases. Furthermore, because the vibrating section is symmetric about the center of the actuator 106, the actuator 106 is easy to manufacture, and thus the unevenness of the shape for each of the piezoelectric element can be decreased. Therefore, the unevenness of the resonant frequency for each of the piezoelectric element 174 decreases. Furthermore, because the vibrating section has an isotropic shape, the vibrating section is difficult to be influenced by the unevenness of the fixing during the bonding process. That is, the vibrating section is bonded to the liquid container uniformly. Therefore, the actuator 106 is easy to assemble to the liquid container.

Furthermore, because the vibrating section of the vibrating plate 176 has a circular shape, the lower resonant mode, for example, the primary resonant mode dominates on the resonant mode of the residual vibration of the piezoelectric layer 160, and thus the single peak appears on the resonant mode. Therefore, the peak and the noise can be distinguished clearly so that the resonant frequency can be clearly detected. Furthermore, the accuracy of the detection of the resonant frequency can be further increased by enlarge the area of the vibrating section of the circular shape vibrating plate 176 because the difference of the amplitude of the counter electromotive force and the difference of the amplitude of the resonant frequency occurred by whether the liquid exists inside the liquid container increase.

The displacement generated by the vibration of the vibrating plate 176 is larger than the displacement generated by the vibration of the base plate 178. The actuator 106 has a two layers structure that is constituted by the base plate 178 having a small compliance which means it is difficult to be displaced by the vibration, and the vibrating plate 176 having a large compliance which means it is easy to be displaced by the vibration. By this two layers structure, the actuator 106 can be reliably fixed to the liquid container by the base plate 178 and at the same time the displacement of the vibrating plate 176 by the vibration can be increased. Therefore, the difference of the amplitude of the counter electromotive force and the difference of the amplitude of the resonant frequency depended on whether the liquid exists inside the liquid container increases, and thus the accuracy of the detection of the resonant frequency increases. Furthermore, because the compliance of the vibrating plate 176 is large, the attenuation of the vibration decreases so that the accuracy of the detection of the resonant frequency increases. The node of the vibration of the actuator 106 locates on the periphery of the cavity 162, that is, around the margin of the opening 161.

The upper electrode terminal 168 is formed on the right side of the surface of the vibrating plate 176 to be electrically connected to the upper electrode 164 through the supplementary electrode 172. The lower electrode terminal 170 is formed on the right side of the surface of the vibrating plate 176 to be electrically connected to the lower electrode 166. Because the upper electrode 164 is formed on the right side of the piezoelectric layer 160, there is a difference in depth that is equal to the sum of the thickness of the piezoelectric layer 160 and the thickness of the lower electrode 166 between the upper electrode 164 and the upper electrode terminal 168. It is difficult to fill this difference in depth only by the upper electrode 164, and even it is possible to fill the difference in depth by the upper electrode 164, the connection between the upper electrode 164 and the upper electrode terminal 168 becomes weak so that the upper electrode 164 will be cut off. Therefore, this embodiment uses the supplementary electrode 172 as a supporting member to connects the upper electrode 164 and the upper electrode terminal 168. By this supplementary electrode 172, both of the piezoelectric layer 160 and the upper electrode 164 are supported by the supplementary electrode 172, and thus the upper electrode 164 can have desired mechanical strength, and also the upper electrode 164 and the upper electrode terminal 168 can be firmly connected.

The piezoelectric element and the vibrating section which faces to the piezoelectric element within the vibrating plate 176 constitute the vibrating section which actually vibrates in the actuator 106. Moreover, it is preferable to form the actuator 106 in one body by firing together the member included in the actuator 106. By forming the actuator 106 as one body, the actuator 106 becomes easy to be handled. Further, the vibration characteristic increases by increasing the strength of the base plate 178. That is, by increasing the strength of the base plate 178, only the vibrating section of the actuator 106 vibrates, and the portion other than the vibrating section of the actuator 106 does not vibrates. Furthermore, the prevention of the vibration of the portion other than the vibrating section of the actuator 106 can be achieved by increasing the strength of the base plate 178 and at the same time forming the actuator 106 as thinner and smaller as possible and forming the vibrating plate 176 as thinner as possible.

It is preferable to use lead zirconate titanate (PZT), lead lanthanum zirconate titanate (PLZT), or piezoelectric membrane without using lead as a material for the piezoelectric layer 160. It is preferable to use zirconia or alumina as a material of the base plate 178. Furthermore, it is preferable to use same material as base plate 178 for a material of vibrating plate 176. The metal such as gold, silver, copper, platina, aluminum, and nickel having a electrical conductivity can be used for the material of the upper electrode 164, the lower electrode 166, the upper electrode terminal 168, and the lower electrode terminal 170.

The actuator 106 constructed as explained above can be applied to the container which contains liquid. For example, the actuator 106 can be mounted on an ink cartridge used for the ink jet recording apparatus, an ink tank, or a container which contains washing liquid to wash the recording head.

The actuator 106 shown in the FIG. 22 and FIG. 23 is mounted on the predetermined position on the liquid container so that the cavity 162 can contact with the liquid contained inside the liquid container. When the liquid container is filled with liquid sufficiently, the inside and outside of the cavity 162 is filled with liquid. On the other hand, if the liquid inside liquid container consumed and the liquid level decreased under the mounting position of the actuator, there are conditions that liquid does not exit inside the cavity 162 or that liquid is remained only in the cavity 162 and air exits on outside the cavity 162. The actuator 106 detects at least the difference in the acoustic impedance occurred by this change in condition. By this detection of the difference in acoustic impedance, the actuator 106 can detects the whether the liquid is sufficiently filled in the liquid container or liquid is consumed more than predetermined level. Furthermore, the actuator 106 can detects the type of the liquid inside the liquid container.

The principle of the detection of the liquid level by the actuator will be explained.

To detect the acoustic impedance of a medium, an impedance characteristic or an admittance characteristic is measured. To measure the impedance characteristic or the admittance characteristic, for example, transmission circuit can be used. The transmission circuit applies a constant voltage on the medium and measure a current flow through the medium with changing a frequency. The transmission circuit provides a constant current to the medium and measures a voltage applied on the medium with changing a frequency. The change in current value and the voltage value measured at the transmission circuit shows the change in acoustic impedance. Furthermore, the change in a frequency fm, which is a frequency when the current value or the voltage value becomes maximum or minimum, also shows the change in acoustic impedance.

Other than method shown above, the actuator can detects the change in the acoustic impedance of the liquid using the change only in the resonant frequency. The piezoelectric element, for example, can be used in a case of using the method of detecting the resonant frequency by measuring the counter electromotive force generated by the residual vibration, which is remained in the vibrating section after the vibration of the vibrating section of the actuator, as a method of using the change in the acoustic impedance of the liquid. The piezoelectric element is element which generates the counter electromotive force by residual vibration remained in the vibrating section of the actuator. The magnitude of the counter electromotive force changes with the amplitude of the vibrating section of the actuator. Therefore, the larger the amplitude of the vibrating section of the actuator, the easier to detect the resonant frequency. Moreover, depends on the frequency of the residual vibration at the vibrating section of the actuator, the period, on which the magnitude of the counter electromotive force changes, changes. Therefore, the frequency of the vibrating section of the actuator corresponds to the frequency of the counter electromotive force. Here, the resonant frequency means the frequency when the vibrating section of the actuator and the medium, which contacts to the vibrating section, are in a resonant condition.

To obtain the resonant frequency fs, the waveform obtained by measuring the counter electromotive force when the vibrating section and the medium are in resonant condition is Fourier transformed. Because the vibration of the actuator is not a displacement for only one direction, but the vibration involves the deformation such as deflection and extension, the vibration has various kinds of frequency including the resonant frequency fs. Therefore, the resonant frequency fs is judged by Fourier transforming the waveform of the counter electromotive force when the piezoelectric element and the medium are in the resonant condition and then specifying the most dominating frequency components.

The frequency fm is a frequency when the admittance of the medium is maximum or the impedance is minimum. The frequency fm is different from the resonant frequency fs with little value because of the dielectric loss and the mechanical loss. However, the frequency fm is generally used as substitution for resonant frequency because it needs time for deriving the resonant frequency fs from the frequency fm which is actually measured. By inputting output of the actuator 106 to the transmission circuit, the actuator 106 can at least detect the acoustic impedance.

It is proved by the experiment that there is almost no differences with the resonant frequency obtained by the method, which measures the frequency fm by measuring the impedance characteristic and admittance characteristic of the medium, and the method, which measures the resonant frequency fs by measuring the counter electromotive force generated by the residual vibration at the vibrating section of the actuator.

The vibrating region of the actuator 106 is a portion which constitutes the cavity 162 that is determined by the opening 161 with in the vibrating plate 176. When liquid is sufficiently filled in the liquid container, liquid is filled in the cavity 162, and the vibrating region contacts with liquid inside the liquid container. When liquid does not exists in the liquid container sufficiently, the vibrating region contacts with the liquid which is remained in the cavity inside the liquid container, or the vibrating region does not contacts with the liquid but contacts with the gas or vacuum.

The cavity 162 is provided on the actuator 106 of the present invention, and it can be designed that the liquid inside the liquid container remains in the vibrating region of the actuator 106 by the cavity 162. The reason will be explained as follows.

Depends on the mounting position and mounting angle of the actuator 106 on the liquid container, there is a case in which the liquid attaches to the vibrating region of the actuator even the liquid level in the liquid container is lower than the mounting position of the actuator. When the actuator detects the existence of the liquid only from the existence of the liquid on the vibrating region, the liquid attached to the vibrating region of the actuator prevents the accurate detection of the existence of the liquid. For example, If the liquid level is lower than the mounting position of the actuator, and the drop of the liquid attaches to the vibrating region by the waving of the liquid caused by the shaking of the liquid container caused by the movement of the carriage, the actuator 106 will misjudges that there is enough liquid in the liquid container. In this way, the malfunction can be prevented by using the actuator having cavity.

Furthermore, as shown in FIG. 23(E), the case when the liquid does not exit in the liquid container and the liquid of the liquid container remains in the cavity 162 of the actuator 106 is set as the threshold value of the existence of the liquid. That is, if the liquid does not exist around the cavity 162, and the amount of the liquid in the cavity is smaller than this threshold value, it is judged that there is no ink in the liquid container. If the liquid exist around the cavity 162, and the amount of the liquid is larger than this threshold value, it is judged that there is ink in the liquid container. For example, when the actuator 106 is mounted on the side wall of the liquid container, it is judged that there is no ink in the liquid container when the liquid level inside the liquid container is lower than the mounting position of the actuator 106, and it is judged that there is ink inside the liquid container when the liquid level inside the liquid container is higher than the mounting position of the actuator 106. By setting the threshold value in this way, the actuator 106 can judge that there is no ink in the liquid container even if the ink in the cavity is dried and disappeared. Furthermore, the actuator 106 can judge that there is no ink in the liquid container even if the ink attaches to the cavity again by shaking of the carriage after the ink in the cavity disappears because the amount of the ink attaches to the cavity again does not exceed the threshold value.

The operation and the principle of detecting the liquid condition of the liquid container from the resonant frequency of the medium and the vibrating section of the actuator 106 obtained by measuring the counter electromotive force will be explained reference to FIG. 22 and FIG. 23. A voltage is applied on each of the upper electrode 164 and the lower electrode 166 through the upper electrode terminal 168 and the lower electrode terminal 170. The electric field is generated on the portion of the piezoelectric layer 160 where the piezoelectric layer 160 is sandwiched by the upper electrode 164 and the lower electrode 166. By this electric field, the piezoelectric layer 160 deforms. By the deformation of the piezoelectric layer 160, the vibrating region within the vibrating plate 176 deflects and vibrates. For some period after the deformation of the piezoelectric layer 160, the vibration with deflection remains in the vibrating section of the actuator 106.

The residual vibration is a free oscillation of the vibrating section of the actuator 106 and the medium. Therefore, the resonant condition between the vibrating section and the medium can be easily obtained by applying the voltage of a pulse wave or a rectangular wave on the piezoelectric layer 160. Because the residual vibration vibrates the vibrating section of the actuator 106, the residual vibration also deforms the piezoelectric layer 160. Therefore, the piezoelectric layer. 160 generates the counter electromotive force. This counter electromotive force is detected through the upper electrode 164, the lower electrode 166, the upper electrode terminal 168, and the lower electrode terminal 170. Because the resonant frequency can be specified by this detected counter electromotive force, the liquid consumption status in the liquid container can be detected.

Generally, the resonant frequency fs can be expressed as following.

$$fs = 1/(2*\pi*(M*Cact)^{1/2}) \tag{1}$$

where M denotes the sum of an inertance of the vibrating section Mact and an additional inertance M'; Cact denotes a compliance of the vibrating section.

FIG. 22(C) shows a cross section of the actuator 106 when the ink does not exist in the cavity in the present embodiment. FIG. 23(A) and FIG. 23(B) shows the equivalent circuit of the vibrating section of the actuator 106 and the cavity 162 when the ink does not exist in the cavity.

The Mact is obtained by dividing the product of the thickness of the vibrating section and the density of the vibrating section by the area of the vibrating section. Furthermore, as shown in the FIG. 23(A), the Mact can be expressed as following in detail.

$$Mact = Mpzt + Melectrode1 + Melectrode2 + Mvib \tag{2}$$

Here, Mpzt is obtained by dividing the product of the thickness of the piezoelectric layer 160 in the vibrating section and the density of the piezoelectric layer 160 by the area of the piezoelectric layer 160. Melectrode1 is obtained by dividing the product of the thickness of the upper electrode 164 in the vibrating section and the density of the upper electrode 164 by the area of the upper electrode 164. Melectrode2 is obtained by dividing the product of the thickness of the lower electrode 166 in the vibrating section and the density of the lower electrode 166 by the area of the lower electrode 166. Mvib is obtained by dividing the product of the thickness of the vibrating plate 176 in the vibrating section and the density of the vibrating plate 176 by the area of the vibrating region of the vibrating plate 176. However each of the size of the area of the vibrating region of the piezoelectric layer 160, the upper electrode 164, the lower electrode 166, and vibrating plate 176 have a relationship as shown above, the difference among each of the area of the vibrating region is prefer to be microscopic to enable the calculation of the Mact from the thickness, density, and area as whole of the vibrating section. Moreover, it is preferable that the portion other than the circular portion which is a main portion of each of the piezoelectric layer 160, the upper electrode 164, and the lower electrode 166 is microscopic so that it can be ignored compared to the main portion. Therefore, Mact is sum of the inertance of the each of the vibrating region of the upper electrode 164, the lower electrode 166, the piezoelectric layer 160, and the vibrating plate 176 in the actuator 106. Moreover, the compliance Cact is a compliance of the portion formed by the each of the vibrating region of the upper electrode 164, the lower electrode 166, the piezoelectric layer 160, and the vibrating plate 176.

FIG. 23(A), FIG. 23(B), FIG. 23(D), and FIG. 23(F) show the equivalent circuit of the vibrating section of the actuator 106 and the cavity 162. In these equivalent circuits, Cact shows a compliance of the vibrating section of the actuator 106. Each of the Cpzt, Celectrode1, Celectrode2, and Cvib shows the compliance of the vibrating section of the piezoelectric layer 160, the upper electrode 164, the lower electrode 166, and the vibrating plate 176. Cact can be shown as following equation.

$$1/Cact = (1/Cpzt) + (1/Celectrode1) + (1/Celectrode2) + (1/Cvib) \tag{3}$$

From the equation (2) and (3), FIG. 23(A) can be expressed as FIG. 23(B).

The compliance Cact shows the volume which can accept the medium by the deformation generated by the application of the pressure on the unit area of the vibrating section. In other words, the compliance Cact shows the easiness to be deformed.

FIG. 23(C) shows the cross section of the actuator 106 when the liquid is sufficiently filled in the liquid container, and the periphery of the vibrating region of the actuator 106 is filled with the liquid. The M'max shown in FIG. 23(C) shows the maximum value of the additional inertance when the liquid is sufficiently filled in the liquid container, and the periphery of the vibrating region of the actuator 106 is filled with the liquid. The M'max can be expressed as $$M'max = (\pi*\rho/(2*k^3))*(2*(2*k*a)^3/(3*\pi))/(\pi*a^2)^2 \tag{4}$$

where a denotes the radius of the vibrating section; ρ denotes the density of the medium; and k denotes the wave number. The equation (4) applies when the vibrating region of the actuator 106 is circular shape having the radius of "a". The additional inertance M' shows the quantity that the mass of the vibrating section is increased virtually by the effect of the medium which exists around the vibrating section.

As shown in equation (4), the M'max can changes significantly by the radius of the vibrating section "a" and the density of the medium ρ.

The wave number k can be expressed by following equation.

$$k = 2*\pi*fact/c \tag{5}$$

where fact denotes the resonant frequency of the vibrating section when the liquid does not contact with the vibrating section; and c denotes the speed of the sound propagate through the medium.

FIG. 23(D) shows an equivalent circuit of the vibrating section of the actuator 106 and the cavity 162 as in the case of FIG. 23 (C) when the liquid is sufficiently filled in the liquid container, and the periphery of the vibrating region of the actuator 106 is filled with the liquid.

FIG. 23(E) shows the cross section of the actuator 106 when the liquid in the liquid container is consumed, and there is no liquid around the vibrating region of the actuator 106, and the liquid remains in the cavity 162 of the actuator 106. The equation (4) shows the maximum inertance M'max determined by such as the ink density ρ when the liquid container is filled with the liquid. On the other hand, if the liquid in the liquid container is consumed and liquid existed around the vibrating section of the actuator 106 becomes gas or vacuum with the liquid remaining in the cavity 162, the M' can be expressed as following equation.

$$M' = \rho * t / S \quad (6)$$

where t denotes the thickness of the medium related to the vibration; S denotes the area of the vibrating region of the actuator 106. If this vibrating region is circular shape having a radius of "a", the S can be shown as $S = \pi * a^2$. Therefore, the additional inertance M' follows the equation (4) when the liquid is sufficiently filled in the liquid container, and the periphery of the vibrating region of the actuator 106 is filled with the liquid. The additional inertance M' follows the equation (6) when the liquid in the liquid container is consumed, and there is no liquid exits around the vibrating region of the actuator 106, and the liquid is remained in the cavity 162.

Here, as shown in FIG. 23(E), let the additional inertance M', when the liquid in the liquid container is consumed, and there is no liquid exits around the vibrating region of the actuator 106, and the liquid is remained in the cavity 162, as M'cav to distinguish with the additional inertance M'max, which is the additional inertance when the periphery of the vibrating region of the actuator 106 is filled with the liquid.

FIG. 23(F) shows an equivalent circuit of the vibrating section of the actuator 106 and the cavity 162 in the case of FIG. 23(E) when the liquid in the liquid container is consumed, and there is no liquid around the vibrating region of the actuator 106, and the liquid remains in the cavity 162 of the actuator 106.

Here, the parameters related to the status of the medium are density of the medium ρ and the thickness of the medium t in equation (6). When the liquid is sufficiently filled in the liquid container, the liquid contacts with the vibrating section of the actuator 106. When the liquid is insufficiently filled in the liquid container, the liquid is remained in the cavity, or the gas or vacuum contacts with the vibrating section of the actuator 106. If let the additional inertance during the process of the shifting from the M'max of FIG. 23(C) to the M'var of FIG. 23(E) when the liquid around the actuator 106 is consumed, because the thickness of the medium t changes according to the containing status of the liquid in the liquid container, the additional inertance M'var changes, and resonant frequency also changes. Therefore, the existence of the liquid in the liquid container can be detected by specify the resonant frequency. Here, if let t=d, as shown in FIG. 23(E) and using the equation (6) to express the m'cav, the equation (7) can be obtained by substituting the thickness of the cavity "d" into the "t" in the equation (6).

$$M'cav = \rho * d / S \quad (7)$$

Moreover, if the medium are different types of liquid with each other, the additional inertance M' changes and resonant frequency fs also changes because the density ρ is different according to the difference of the composition. Therefore, the types of the liquid can be detected by specifying the resonant frequency fs. Moreover, when only one of the ink or air contacts with the vibrating section of the actuator 106, and the ink and air is not existing together, the difference in M' can be detected by calculating the equation (4).

Figure 24A:
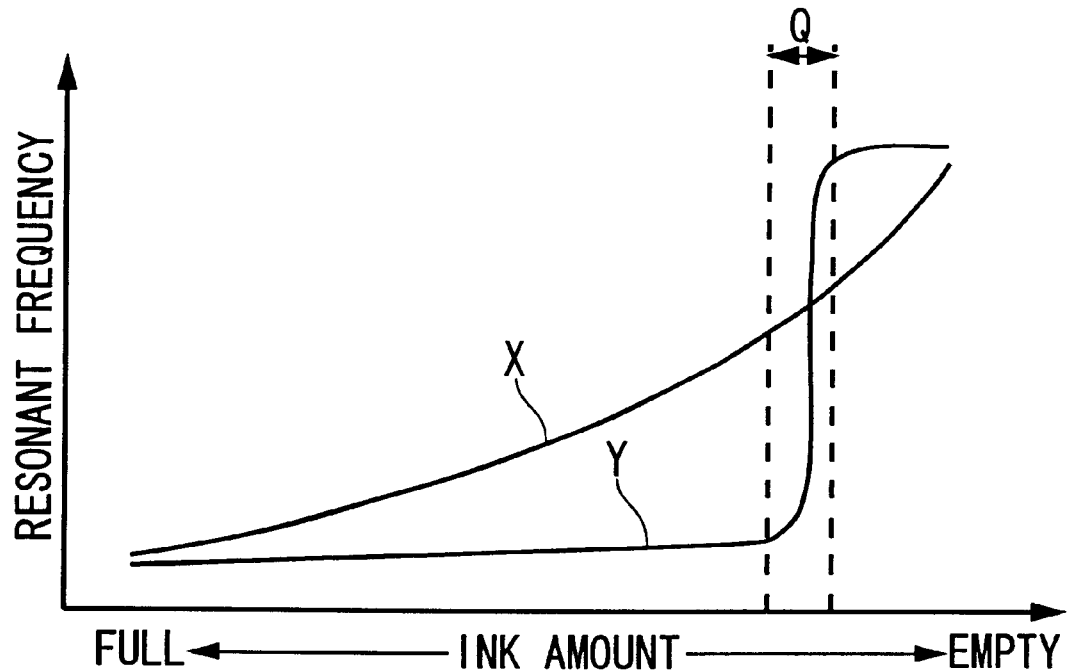
FIGS. 24(A) and 24(B) are graphs which show the relationship between the ink quantity inside the ink tank and the resonant frequency fs of the ink and the vibrating section.

FIG. 24(A) is a graph which shows the relationship between the ink quantity inside the ink tank and the resonant frequency fs of the ink and the vibrating section. Here, the case for the ink will be explained as an example of the liquid. The vertical axis shows the resonant frequency fs, and the horizontal axis shows the ink quantity. When the ink composition is constant, the resonant frequency increases according to the decreasing of the ink quantity.

When ink is sufficiently filled in the ink container, and ink is filled around the vibrating region of the actuator 106, the maximum additional inertance M'max becomes the value shown in the equation (4). When the ink is consumed, and there is no ink around the vibrating region of the actuator 106, and the ink remains in the cavity 162, the additional inertance M'var is calculated by the equation (6) based on the thickness of the medium t. Because the "t" used in the equation (6) is the thickness of the medium related to the vibration, the process during which the ink is consumed gradually can be detected by forming the "d" (refer to FIG. 22(B)) of the cavity 162 of the actuator 106 as small as possible, that is, forming the thickness of the base plate 178 as sufficiently thinner as possible (refer to FIG. 23(C)). Here, let the t-ink as the thickness of the ink involved with the vibration, and t-ink-max as the t-ink when the additional inertance is M'max. For example, the actuator 106 is mounted on the bottom of the ink cartridge horizontally to the surface of the ink. If ink is consumed, and the ink level becomes lower than the height t-ink-max from the actuator 106, the M'var gradually changes according to the equation (6), and the resonant frequency fs gradually changes according to the equation (1). Therefore, until the ink level is within the range of "t", the actuator 106 can gradually detect the ink consumption status.

Furthermore, by enlarge or lengthen the vibrating section of the actuator 106 and arrange the actuator 106 along a lengthwise direction, the "S" in the equation (6) changes according to the change of ink level with ink consumption. Therefore, the actuator 106 can detect the process while the ink is gradually consumed. For example, the actuator 106 is mounted on the side wall of the ink cartridge perpendicularly to the ink surface. When the ink is consumed and the ink level reaches to the vibrating region of the actuator 106, because the additional inertance M' decreases with the decreasing of the ink level, the resonant frequency fs gradually increases according to the equation (1). Therefore, unless the ink level is within the range of the radius 2a of the cavity 162 (refer to FIG. 23(C)), the actuator 106 can gradually detect the ink consumption status.

The curve X in FIG. 24(A) shows the relationship between the ink quantity contained inside of the ink tank and the resonant frequency fs of the ink and the vibrating section when the vibrating region of the actuator 106 is formed sufficiently large or long. It can be understand that the resonant frequency fs of the ink and vibrating section gradually changes with the decrease of the ink quantity inside the ink tank.

In detail, the case when the actuator 106 can detect the process of the gradual consumption of the ink is the case when the liquid and gas having different density with each other are existed together and also involved with vibration. According to the gradual consumption of the ink, the liquid decreases with increasing of the gas in the medium involved with the vibration around the vibrating region of the actuator 106. For example, the case when the actuator 106 is mounted on the ink cartridge horizontally to the ink surface, and t-ink is smaller than the t-ink-max, the medium involved with the vibration of the actuator 106 includes both of the ink and the gas. Therefore, the following equation (8) can be obtained if let the area of the vibrating region of the actuator 106 as S and express the status when the additional inertance is below M'max in the equation (4) by additional mass of the ink and the gas.

$$M'=M'\text{air}+M'\text{ink}=\rho\text{air}*t\text{-air}/S+\rho\text{ink}*t\text{-ink}/S \qquad (8)$$

where M'max is an inertance of an air; M'ink is an inertance of an ink; ρair is a density of an air; ρink is a density of an ink; t-air is the thickness of the air involved with the vibration; and t-ink is the thickness of the ink involved with the vibration. In case when the actuator 106 is mounted on the ink cartridge approximately horizontally to the ink surface, the t-air increases and the t-ink decreases with the increase of the gas and the decrease of the ink within the medium involved with the vibration around the vibrating region of the actuator 106. The additional inertance M' gradually decreases, and the resonant frequency gradually increases by above changes of the t-air and the t-ink. Therefore, the ink quantity remained inside the ink tank or the ink consumption quantity can be detected. The equation (7) depends only on the density of the liquid because of the assumption that the density of the air is small compare to the density of the liquid so that the density of the air can be ignored.

When the actuator 106 is provided on the ink cartridge substantially perpendicular to the ink surface, the status can be expressed as the equivalent circuit, not shown in the figure, on which the region, where the medium involved with the vibration of the actuator 106 is ink only, and the region, where the medium involved with the vibration of the actuator 106 is gas, can be expressed as parallel circuit. If let the area of the region where the medium involved with the vibration of the actuator 106 is ink only as Sink, and let the area of the region where the medium involved with the vibration of the actuator 106 is gas only as Sair, the following equation (9) can be obtained.

$$1/M'=1/M'\text{air}+1/M'\text{ink}=S\text{air}/(\rho\text{air}*t\text{-air})+S\text{ink}/(\rho\text{ink}*t\text{-ink}) \qquad (9)$$

The equation (9) can be applied when the ink is not held in the cavity of the actuator 106. The case when the ink is held in the cavity can be calculated using the equation (7), (8), and (9).

In the case when the thickness of the base plate 178 is thick, that is, the depth of the cavity 162 is deep and d is comparatively close to the thickness of the medium t-ink-max, or in the case when using actuator having a very small vibrating region compared to height of the liquid container, the actuator does not detect the process of the gradual decrease of the ink but actually detects whether the ink level is higher or lower than the mounting position of the actuator. In other words, the actuator detects the existence of the ink at the vibrating region of the actuator. For example, the curve Y in FIG. 24 (A) shows the relationship between the ink quantity in the ink tank and the resonant frequency fs of the vibrating section when the vibrating section is small circular shape. The curve Y shows that the resonant frequency fs of the ink and the vibrating section changes extremely during the range of change of ink quantity Q, which corresponds to the status before and after the ink level in the ink tank passes the mounting position of the actuator. By this changes of the resonant frequency fs, it can be detected whether the ink quantity remained in the ink tank is more than the predetermined quantity.

The method of using the actuator 106 for detecting the existence of the liquid is more accurate than the method which calculates the quantity of ink consumption by the software because the actuator 106 detects the existence of the ink by directly contacting with the liquid. Furthermore, the method using an electrode to detects the existence of the ink by conductivity is influenced by the mounting position to the liquid container and the ink type, but the method using the actuator 106 to detects the existence of the liquid does not influenced by the mounting position to the liquid container and the ink type. Moreover, because both of the oscillation and detection of the existence of the liquid can be done by the single actuator 106, the number of the sensor mounted on the liquid container can be reduced compare to the method using separate sensor for oscillation and the detection of the existence of the liquid. Therefore, the liquid container can be manufactured at a low price. Furthermore, the sound generated by the actuator 106 during the operation of the actuator 106 can be reduced by setting the vibrating frequency of the piezoelectric layer 160 out of the audio frequency.

Figure 24B:
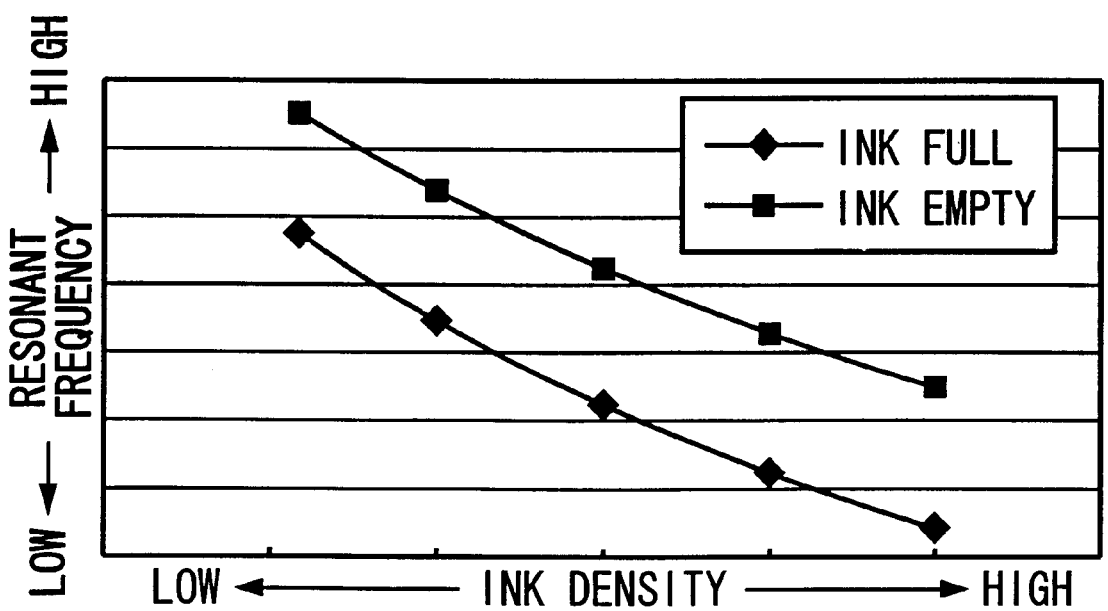

FIG. 24(B) shows the relationship between the density of the ink and the resonant frequency fs of the ink and the vibrating section of the curve Y shown in FIG. 24(A). Ink is used as an example of liquid. As shown in FIG. 24(B), when ink density increases, the resonant frequency fs decreases because the additional inertance increases. In other words, the resonant frequency fs are different with the types of the ink. Therefore, By measuring the resonant frequency fs, it can be confirmed whether the ink of a different density has been mixed together during the re-filling of the ink to the ink tank.

Therefore, the actuator 106 can distinguish the ink tank which contains the different type of the ink.

The condition when the actuator 106 can accurately detects the status of the liquid will be explained in detail in following. The case is assumed that the size and the shape of the cavity is designed so that the liquid can be remained in the cavity 162 of the actuator 106 even when the liquid inside the liquid container is empty. The actuator 106 can detect the status of the liquid even when the liquid is not filled in the cavity 162 if the actuator 106 can detect the status of the liquid when the liquid is filled in the cavity 162.

The resonant frequency fs is a function of the inertance M. The inertance M is a sum of the inertance of the vibrating section Mact and the additional inertance M'. Here, the additional inertance M' has the relationship with the status of the liquid. The additional inertance M' is a quantity of a virtual increase of a mass of the vibrating section by the effect of the medium existed around the vibrating section. In other words, the additional inertance M' is the amount of increase of the mass of the vibrating section which is increased by the vibration of the vibrating section that virtually absorbs the medium.

Therefore, when the M'cav is larger than the M'max in the equation (4), all the medium which is virtually absorbed is the liquid remained in the cavity 162. Therefore, the status when the M'cav is larger than the M'max is same with the status that the liquid container is fill with liquid. The resonant frequency fs does not change because the M' does not change in this case. Therefore, the actuator 106 cannot detect the status of the liquid in the liquid container.

On the other hand, if the M'cav is smaller than the M'max in the equation (4), the medium which is virtually absorbed is the liquid remained in the cavity 162 and the gas or vacuum in the liquid container. In this case, because the M' changes, which is different with the case when the liquid is filled in the liquid container, the resonant frequency fs changes. Therefore, the actuator 106 can detect the status of the liquid in the liquid container.

The condition whether the actuator 106 can accurately detect the status of the liquid is that the M'cav is smaller than the M'max when the liquid is remained in the cavity 162 of the actuator 106, and the liquid container is empty. The condition M'max>M'cav, on which the actuator 106 can accurately detect the status of the liquid, does not depend on the shape of the cavity 162.

Here, the M'cav is the mass of the liquid of the volume which is substantially equal to the volume of the cavity 162. Therefore, the condition, which can detect the status of the liquid accurately, can be expressed as the condition of the volume of the cavity 162 from the inequality M'max>M'cav. For example, if let the radius of the opening 161 of the circular shaped cavity 162 as "a" and the thickness of the cavity 162 as "d", then the following inequality can be obtained.

$$M'\text{max} > \rho * d/\pi a^2 \qquad (10)$$

By expanding the inequality (10), the following condition can be obtained.

$$a/d > 3*\pi/8 \qquad (11)$$

The inequality (10) and (11) are valid only when the shape of the cavity 162 is circular. By using the equation when the M'max is not circular and substituting the area $\pi a^2$ with its area, the relationship between the dimension of the cavity such as a width and a length of the cavity and the depth can be derived.

Therefore, if the actuator 106 has the cavity 162 which has the radius of the opening 161 "a" and the depth of the cavity "d" that satisfy the condition shown in inequality (11), the actuator 106 can detect the liquid status without malfunction even when the liquid container is empty and the liquid is remained in the cavity 162.

Because the additional inertance influences the acoustic impedance characteristic, it can be said that the method of measuring the counter electromotive force generated in actuator 106 by residual vibration measures at least the change of the acoustic impedance.

Furthermore, according to the present embodiment, the actuator 106 generates the vibration, and the actuator 106 itself measures the counter electromotive force in actuator 106 which is generated by the residual vibration remained after the vibration of the actuator 106. However, it is not necessary for the vibrating section of the actuator 106 to provide the vibration to the liquid by the vibration of the actuator 106 itself which is generated by the driving voltage. Even the vibrating section itself does not oscillates, the piezoelectric layer 160 deflects and deforms by vibrates together with the liquid, which contacts with the vibrating section with some range. This residual vibration generates the counter electromotive force voltage in the piezoelectric layer 160 and transfer this counter electromotive force voltage to the upper electrode 164 and the lower electrode 166. The status of the liquid can be detected using this phenomenon. For example, in case of the ink jet recording apparatus, the status of the ink tank or the ink contained inside the ink tank can be detected using the vibration around the vibrating section of the actuator which is generated by the vibration generated by the reciprocating motion of the carriage to scanning the print head during the printing operation.

Figure 25A:
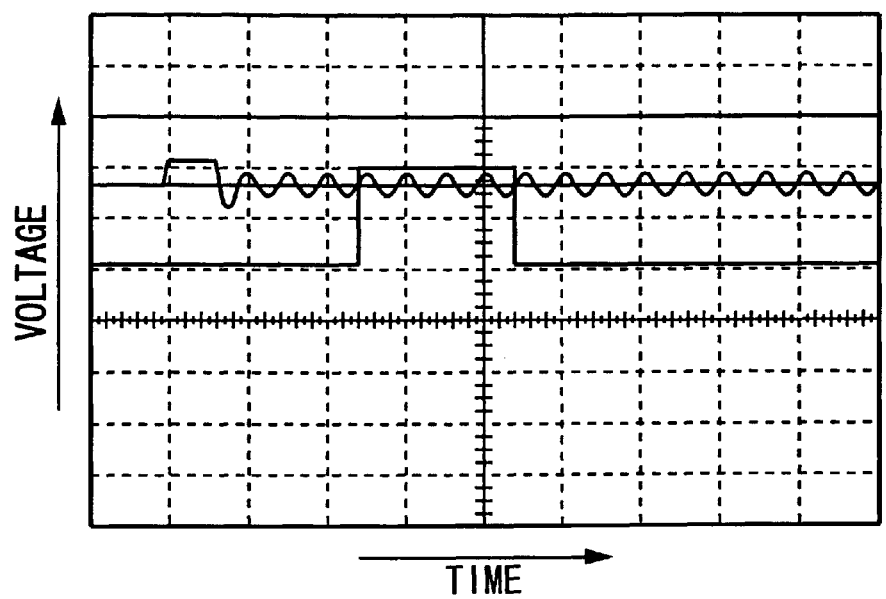
FIGS. 25(A) and 25(B) show a waveform of the residual vibration of the actuator 106 and the measuring method of the residual vibration.
Figure 25B:
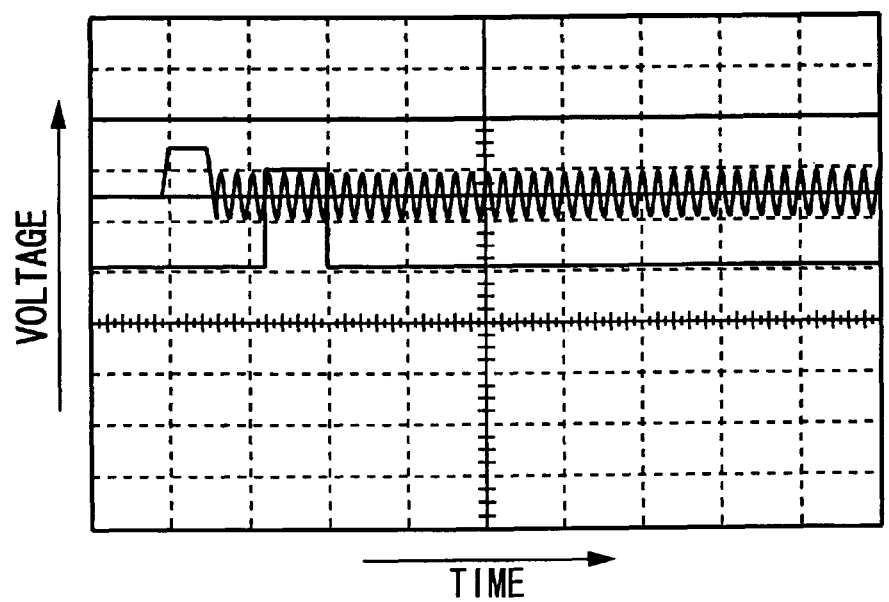

FIG. 25(A) and FIG. 25(B) shows a waveform of the residual vibration of the actuator 106 and the measuring method of the residual vibration. The change of the ink level at the level of the mounting position of the actuator 106 in the ink cartridge can be detected by the change in the frequency or the amplitude of the residual vibration remained after the oscillation of the actuator 106. In FIG. 25(A) and FIG. 25(B), the vertical axis shows the voltage of the counter electromotive force generated by the residual vibration of the actuator 106, and the horizontal axis shows the time. By the residual vibration of the actuator 106, the waveform of the analog signal of the voltage generates as shown in FIG. 25(A) and FIG. 25(B). Then, the analog signal is converted to a digital numerical value corresponding to the frequency of the signal.

In the example sown in FIG. 25(A) and FIG. 25(B), the existence of the ink is detected by measuring the time during the generation of the four numbers of pulses from the fourth pulse to the eighth pulse of the analog signal.

In detail, after the actuator 106 oscillates, the number of the times when the analog signal get across the predetermined reference voltage form the low voltage side to the high voltage side. The digital signal is set to be high while the analog signal becomes fourth counts to the eighth counts, and the time during fourth counts to the eighth counts is measured by predetermined clock pulse.

FIG. 25(A) shows the waveform when the ink level is above the level of the mounting position of the actuator 106. FIG. 25(B) shows the waveform when the ink level is below the level of the mounting position of the actuator 106. Comparing the FIG. 25(A) and FIG. 25(B), the time of the FIG. 25(A) during the fourth counts to the eighth counts is longer than the time of the FIG. 25(B). In other words, depends on the existence of the ink, the time from the fourth counts to the eighth counts is different. By using this difference of the time, the consumption status of the ink can be detected. The reason to count the analog signal from the fourth counts is to start the measurement of the time after the vibration of the actuator 106 becomes stable. It is only one of the example of starting the measurement from fourth counts, but measurement can be started from the desired counts.

The signals from the fourth counts to the eighth counts are detected, and the time from the fourth counts to the eighth counts is measured by the predetermined clockpulse. By this measurement, the resonant frequency can be obtained. The clockpulse is prefer to be a pulse having a same clock with the clock for controlling such as the semiconductor memory device which is mounted on the ink cartridge. It does not necessary to measure the time until the eighth counts, but the time until the desired counts can be measured. In FIG. 25, the time from the fourth counts to the eighth counts is measured, however, the time during the different interval of the counts also can be detected according to the circuit configuration which detects the frequency.

For example, when the ink quality is stable and the fluctuation of the amplitude of the peak is small, the resonant frequency can be detected by detecting the time from the fourth counts to the sixth counts to increase the speed of detection. Moreover, when the ink quality is unstable and the fluctuation of the amplitude of the pulse is large, the time from the fourth counts to the twelfth counts can be detected to detect the residual vibration accurately.

Furthermore, as other embodiments, the wave number of the voltage waveform of the counter electromotive force during the predetermined period can be counted. More specifically, after the actuator 106 oscillates, the digital signal is set to be high during the predetermined period, and the number of the times when the analog signal is get across the predetermined reference voltage from the low voltage side to the high voltage side is counted. By measuring the count number, the existence of the ink can be detected.

Furthermore, it can be known by comparing FIG. 25(A) with FIG. 25(B), the amplitude of the waveform of the counter electromotive force is different when the ink is filled in the ink cartridge and when the ink is not existed in the ink cartridge. Therefore, the ink consumption status in the ink cartridge can be detected by measuring the amplitude of the waveform of the counter electromotive force without calculating the resonant frequency. More specifically, for example, a reference voltage is set between the peak point of the waveform of the counter electromotive force of the FIG. 25(A) and the peak point of the waveform of the counter electromotive force of the FIG. 25(B). Then, after the actuator 106 oscillates, set the digital signal to be high at the predetermined time. Then, if the waveform of the counter electromotive force get across the reference voltage, it can be judged that there is no ink in the ink cartridge. If the waveform of the counter electromotive force does not get across the reference voltage, it can be judged that there is ink in the ink cartridge.

Figure 26:
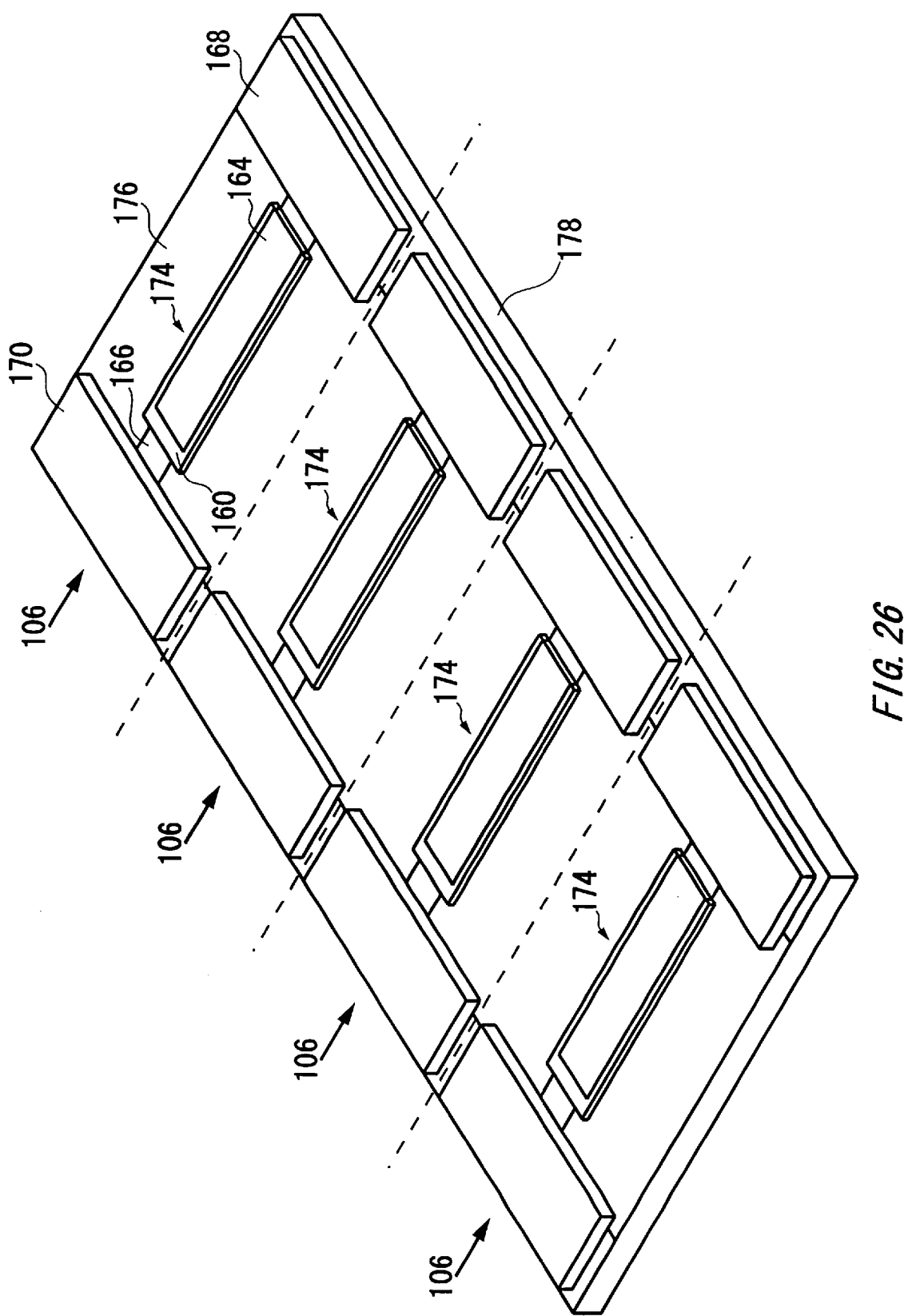
FIG. 26 shows the manufacturing method of the actuator 106. A plurality of the actuators 106, four numbers in the case of the FIG. 26, are formed as one body.
Figure 27:
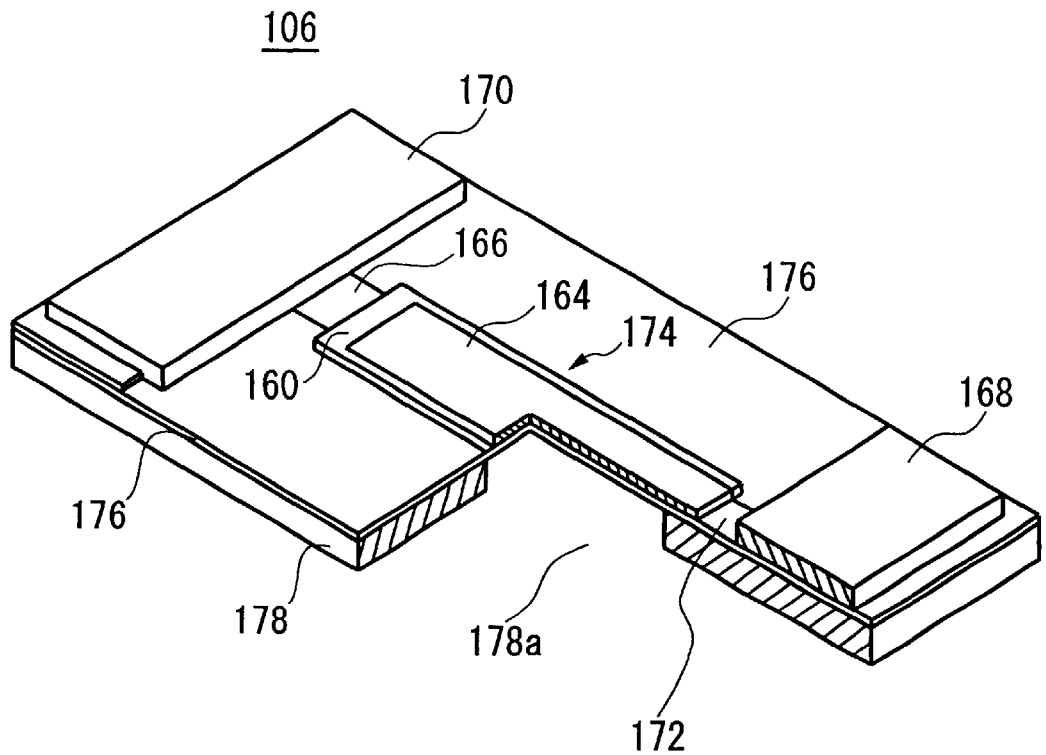
FIG. 27 shows a cross-section of a part of the actuator 106.

FIG. 26 shows the manufacturing method of the actuator 106. A plurality of the actuators 106, four numbers in the case of the FIG. 26, are formed as one body. The actuator 106 shown in FIG. 27 is manufactured by cutting the plurality of actuator 106, which is formed in one body as shown in FIG. 26, at each of the actuator 106. If the each of the piezoelectric elements of the each of the plurality of the actuator 106, which is formed in one body as shown in FIG. 26, are circular shape, the actuator 106 shown in FIG. 22 can be manufactured by cutting the actuator 106, which is formed as one body, at each of actuator 106. By forming a plurality of the actuator 106 in one body, a plurality of actuator 106 can be manufactured effectively at the same time, and also the handling during the transportation becomes easy.

The actuator 106 has a thin plate or a vibrating plate 176, a base plate 178, an elastic wave generating device or piezoelectric element 174, a terminal forming member or an upper electrode terminal 168, and a terminal forming member or a lower electrode terminal 170. The piezoelectric element 174 includes a piezoelectric vibrating plate or a piezoelectric layer 160, an upper electrode 164, and a lower electrode 166. The vibrating plate 176 is formed on the top surface of the base plate 178, and the lower electrode 166 is formed on the top surface of the vibrating plate 176. The piezoelectric layer 160 is formed on the top surface of the lower electrode 166, and the upper electrode 164 is formed on the top surface of the piezoelectric layer 160. Therefore, the main portion of the piezoelectric layer 160 is formed by sandwiching the main portion of the piezoelectric layer 160 by the main portion of the upper electrode 164 and the main portion of the lower electrode 166 from top side and from bottom side.

A plurality of the piezoelectric element 174, four numbers in the case of FIG. 26, is formed on the vibrating plate 176. The lower electrode 166 is formed on the top surface of the vibrating plate 176. The piezoelectric layer 160 is formed on the top surface of the lower electrode 166, and the upper electrode 164 is formed on the top surface of the piezoelectric layer 160. The upper electrode terminal 168 and the lower electrode terminal 170 are formed on the end portion of the upper electrode 164 and the lower electrode 166. The four numbers of the actuator 106 are used separately by cutting each of the actuator 106 separately.

FIG. 27 shows a cross-section of a part of the actuator 106. The through hole 178a is formed on the face of the base plate 178 which faces with the piezoelectric element 174. The through hole 178a is sealed by the vibrating plate 176. The vibrating plate 176 is formed by the material which has electric insulating characteristic such as alumina and zirconium oxide and also possible to be deformed elastically. The piezoelectric element 174 is formed on the vibrating plate 176 to face with the through hole 178a. The lower electrode 166 is formed on the surface of the vibrating plate 176 so as to be extended to the one direction, left direction in FIG. 28, from the region of the through hole 178a. The upper electrode 164 is formed on the surface of the piezoelectric layer 160 so as to be extended to the opposite direction of the lower electrode 166, which is right direction in FIG. 28, from the region of the through hole 178a. Each of the upper electrode terminal 168 and the lower electrode terminal 170 is formed on the surface of the each of supplementary electrode 172 and the lower electrode 166, respectively. The lower electrode terminal 170 with the lower electrode 166 electrically, and the upper electrode terminal 168 contacts with the upper electrode 164 electrically through the supplementary electrode 172 to deliver a signal between the piezoelectric element and the outside of the actuator 106. The upper electrode terminal 168 and the lower electrode terminal 170 has a height higher than the height of the piezoelectric element which is the sum of the height of the electrodes and the piezoelectric layer.

Figure 29:
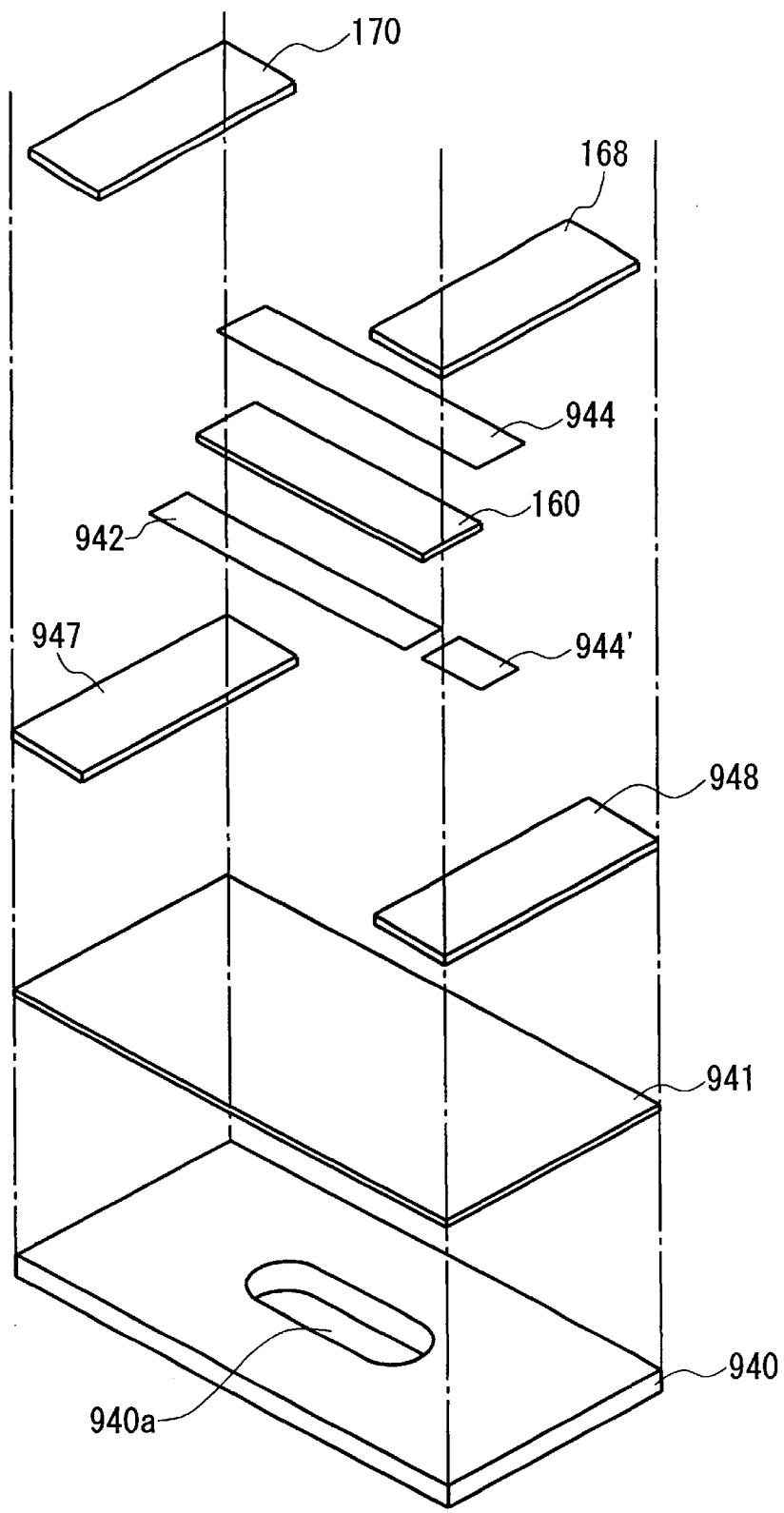
FIG. 29 shows the manufacturing method of the actuator 106 shown in FIG. 26.

FIG. 29 shows the manufacturing method of the actuator 106 shown in FIG. 26. First, a through hole 940a is formed on a green sheet 940 by perforating the green sheet 940 by a press or laser processing. The green sheet 940 becomes the base plate 178 after the burning process. The green sheet 940 is formed by the material such as ceramic material. Then, a green sheet 941 is laminated on the surface of the green sheet 940. The green sheet 941 becomes the vibrating plate 176 after the burning process. The green sheet 941 is formed by the material such as zirconium oxide. Then, a conductive layer 942, the piezoelectric layer 160, and a conductive layer 944 is formed on the surface of the green sheet 941 sequentially by the method such as printing. The conductive layer 942 becomes the lower electrode 166, and the conductive layer 944 becomes the upper electrode 164 after the burning process.

Next, the green sheet 940, the green sheet 941, the conductive layer 942, the piezoelectric layer 160, and the conductive layer 944 are dried and burned. The spacer member 947 and 948 are provided on the green sheet 941 to raising the height of the upper electrode terminal 168 and the lower electrode terminal 170 to be higher than the piezoelectric element. The spacer member 947 and 948 is formed by printing the same material with the green sheet 940 and 941 or by laminating the green sheet on the green sheet 941. By this spacer member 947 and 948, the quantity of the material of the upper electrode terminal 168 and the lower electrode terminal 170, which is a noble metal, can be reduced. Moreover, because the thickness of the upper electrode terminal 168 and the lower electrode terminal 170 can be reduced, the upper electrode terminal 168 and the lower electrode terminal 170 can be accurately printed to be a stable height.

If a connection part 944', which is connected with the conductive layer 944, and the spacer member 947 and 948 are formed at the same time when the conductive layer 942 is formed, the upper electrode terminal 168 and the lower electrode terminal 170 can be easily formed and firmly fixed. Finally, the upper electrode terminal 168 and the lower electrode terminal 170 are formed on the end region of the conductive layer 942 and the conductive layer 944. During the forming of the upper electrode terminal 168 and the lower electrode terminal 170, the upper electrode terminal 168 and the lower electrode terminal 170 are formed to be connected with the piezoelectric layer 160 electrically.

Figure 30:
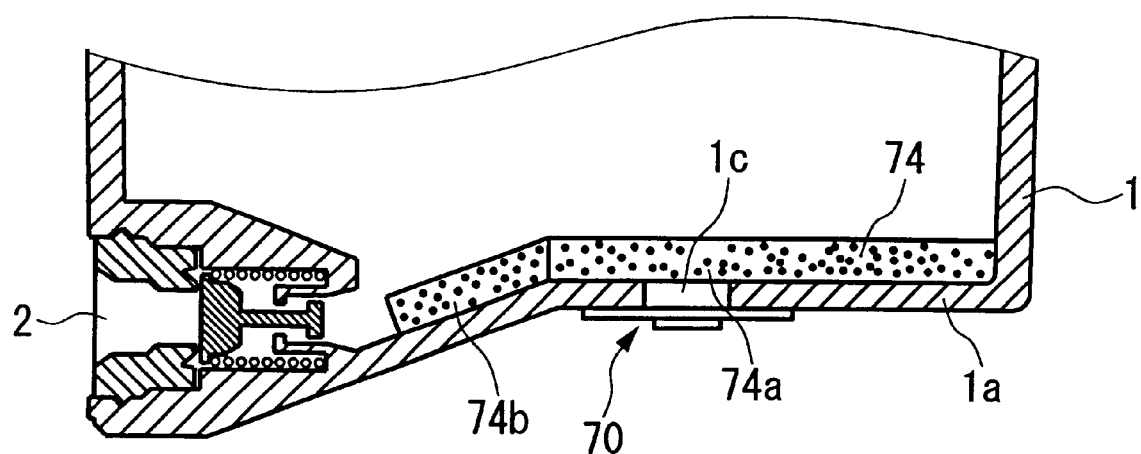
FIG. 30 shows the further other embodiment of the ink cartridge of the present invention.

FIG. 30 shows the further other embodiment of the ink cartridge of the present invention. In the ink cartridge shown in FIG. 30, ink absorbing member 74 is provided in the container 1 to face to the through hole 1c, which is provided inside the container 1, as a wave preventing wall. The actuator 70 is fixed to the bottom of the container 1 to face to the through hole 1c. The ink absorbing member 74 prevents the wave or bubbles of ink inside the ink cartridge to enter into the through hole 1c. The ink absorbing member thereby prevents the wave or bubbles of ink to move close to the actuator 70 and attach to the actuator 70.

The ink absorbing member 74 is designed such that the hole diameter of the porous part 74b around the ink supply port 2 is smaller than the hole diameter of the porous part 74a around the actuator 70. Furthermore, the ink absorbing member 74 is designed such that the capillary force of the porous part 74b around the ink supply port 2 is smaller than the capillary force in a degree which holds ink.

Thereby, if the ink absorbing member 74 exposes from ink by consuming of ink inside the container 1, ink in the ink absorbing member 74 flows out from the ink absorbing member 74 by its own weight to the ink supply port 2. If all the ink inside the container 1 consumed up, the ink absorbing member 74 absorbs the ink remained in the through hole 1c by the capillary force. Therefore, ink is drained from the concave part of the through hole 1c. Therefore, because the residual vibration of the actuator 70 changes at the ink end status, the timing of the ink end can be further reliably detected.

Therefore, the ink absorbing member 74 can protect the actuator 70 from the wave of ink and also absorbs the ink remained in the through hole 1c to improve the accuracy of the ink end detection of the actuator 106.

Figure 31:
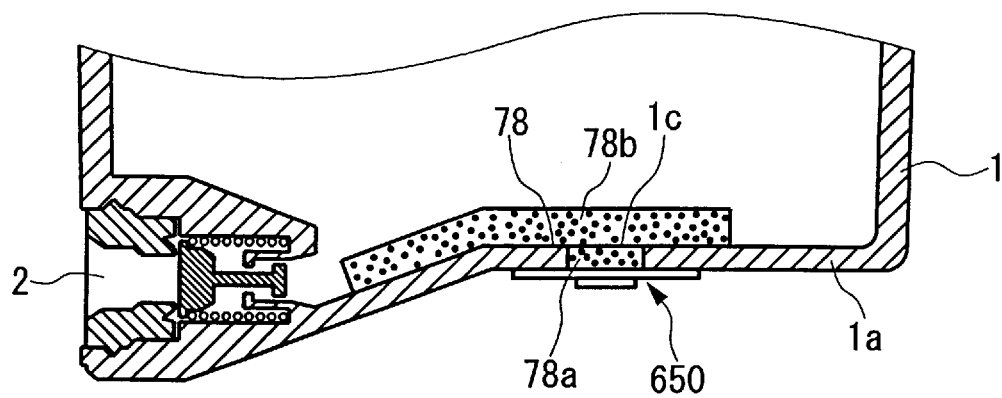
FIGS. 31(A) to 31(C) show further other embodiment of the ink cartridge of the present invention.
Figure 31:
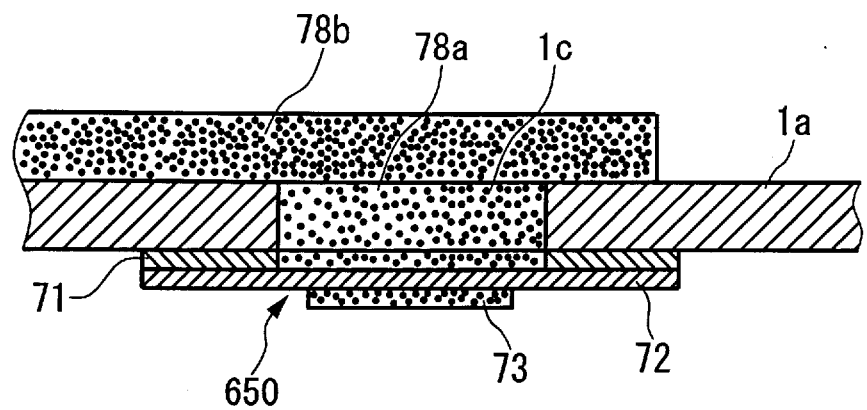
Figure 31:
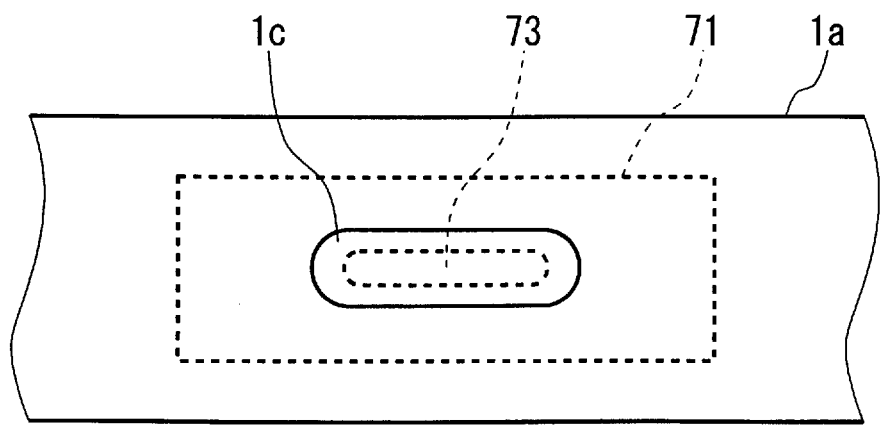

FIG. 31 shows further other embodiment of the ink cartridge of the present invention. FIG. 31(A) is a cross sectional view of the bottom part of the ink cartridge of the present embodiment. The ink cartridge of the present embodiment has a through hole 1c on the bottom face 1a of the container 1, which contains ink. The bottom part of the through hole 1c is closed by the actuator 650 and forms an ink storing part. The ink absorbing member 78 is provided around the inside the through hole 1c which is provided inside the container 1 and around the through hole 1c as a wave preventing wall. The ink absorbing member 78 has a ink absorbing member 78a which is provided inside the through hole 1c and the ink absorbing member 78b which is provided around the through hole 1c.

FIG. 31(B) shows a detailed cross section of the actuator 650 and the through hole 1c shown in FIG. 31(A). FIG. 31(C) shows a plan view of the actuator 650 and the through hole 1c shown in FIG. 31(B). The actuator 650 has a vibrating plate 72 and a piezoelectric element 73 which is fixed to the vibrating plate 72. The vibrating plate 72 can be elastically deformed and is ink resistant. In the present embodiment, the shape of the piezoelectric element 73 and the through hole 1c is long and narrow rectangular, and both ends of which is circular shape.

FIG. 32 shows other embodiment of the through hole 1c. In each of FIG. 32(A), (B), and (C), the left hand side of the figure shows the status that there is no ink K in the through hole c, and the right hand side of the figure shows the status that ink K is remained in the through hole 1c. In the embodiment of FIG. 31, the side face of the through hole 1c is formed as the vertical wall. In FIG. 32(A), the side face 1d of the through hole 1c is slanted in vertical direction and opens with expanding to the outside. In FIG. 32(B), a stepped portion 1e and if are formed on the side face of the through hole 1c. The stepped portion 1f, which is provided above the stepped portion 1e, is wider than the stepped portion 1e. In FIG. 32(C), the through hole 1c has a groove 1g that extends to the direction in which ink is easily discharged, that is, the direction to a ink supply port 2.

A wave preventing wall, not shown in the figure, is provided in the container 1 such that the wave preventing wall faces to the actuator 650.

According to the shape of the through hole 1c shown in FIG. 32(A) to (C), the quantity of ink K in the ink storing part can be reduced. Therefore, because the M'cav can be smaller than the M'max explained in FIG. 22 and FIG. 23, the vibration characteristic of the actuator 650 at the time of the ink end status can be greatly different with the vibration characteristic when enough quantity of ink K for printing is remained in the container 1, and thus the ink end status can be reliably detected.

Figure 33A:
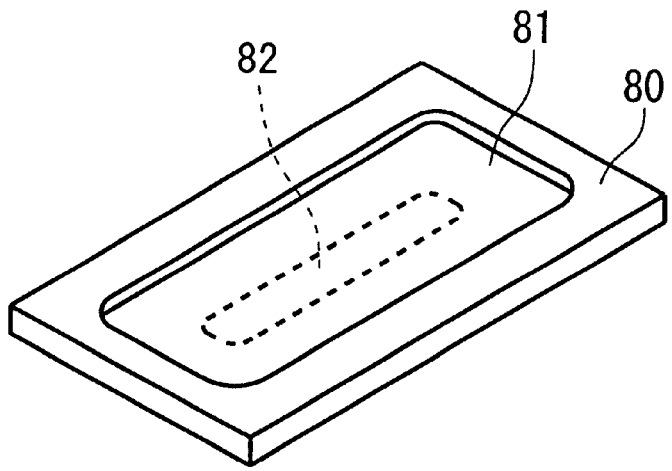
FIGS. 33(A) and 33(B) are slant views of the further other embodiment of the actuator.
Figure 33B:
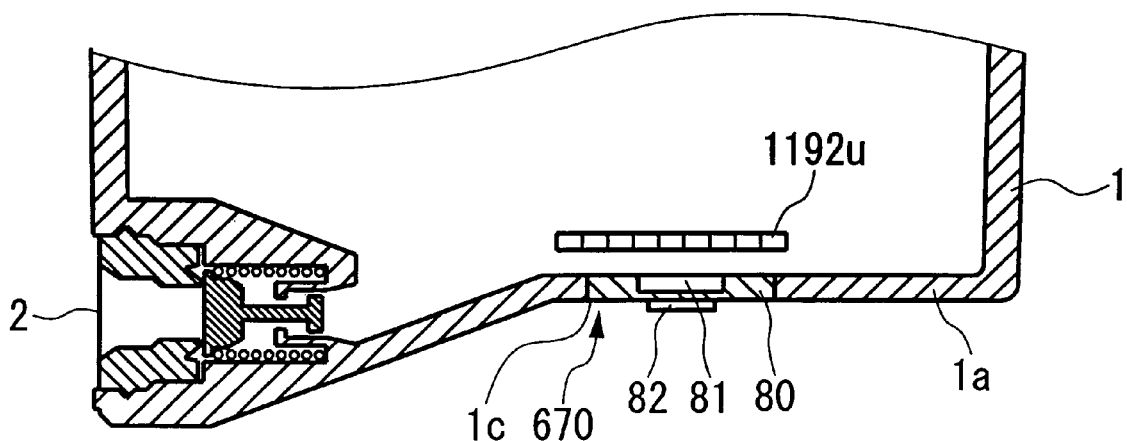

FIG. 33(A) and (B) is a slant view of the further other embodiment of the actuator. FIG. 33(B) shows a part of a side cross section of the ink cartridge, on which an actuator 670 of the embodiment shown in FIG. 33(A) is mounted. In the present embodiment, the actuator 670 comprises a concave part forming base plate 80 and a piezoelectric element 82. The concave part 81 is formed on the one side of the face of the concave part forming base plate 80 by the technique such as etching, and piezoelectric element 82 is mounted on the other side of the face of the concave part forming base plate 80. The bottom portion of the concave part 81 operates as a vibrating region within the concave part forming base plate 80. Therefore, the vibrating region of the actuator 670 is determined by the periphery of the concave part 81. Furthermore, the actuator 670 has the similar structure with the structure of the actuator 106 shown in FIG. 22, in which the base plate 178 and the vibrating plate 176 is formed as one body. Therefore, the manufacturing process during the manufacturing an ink cartridge can be reduced, and the cost for manufacturing an ink cartridge also can be reduced. The actuator 670 has a size which can be embedded into the through hole 1c provided on the container 1. By this embedding process, the concave part 81 can operates as the cavity. The actuator 106 shown in FIG. 22 can be formed to be embedded into through hole 1c as actuator 670 shown in FIG. 33. Moreover, the wave preventing wall 1192u is provided nearby the concave part 81 in the container 1 such that the wave preventing wall 1192u faces to the actuator 670.

Figure 34:
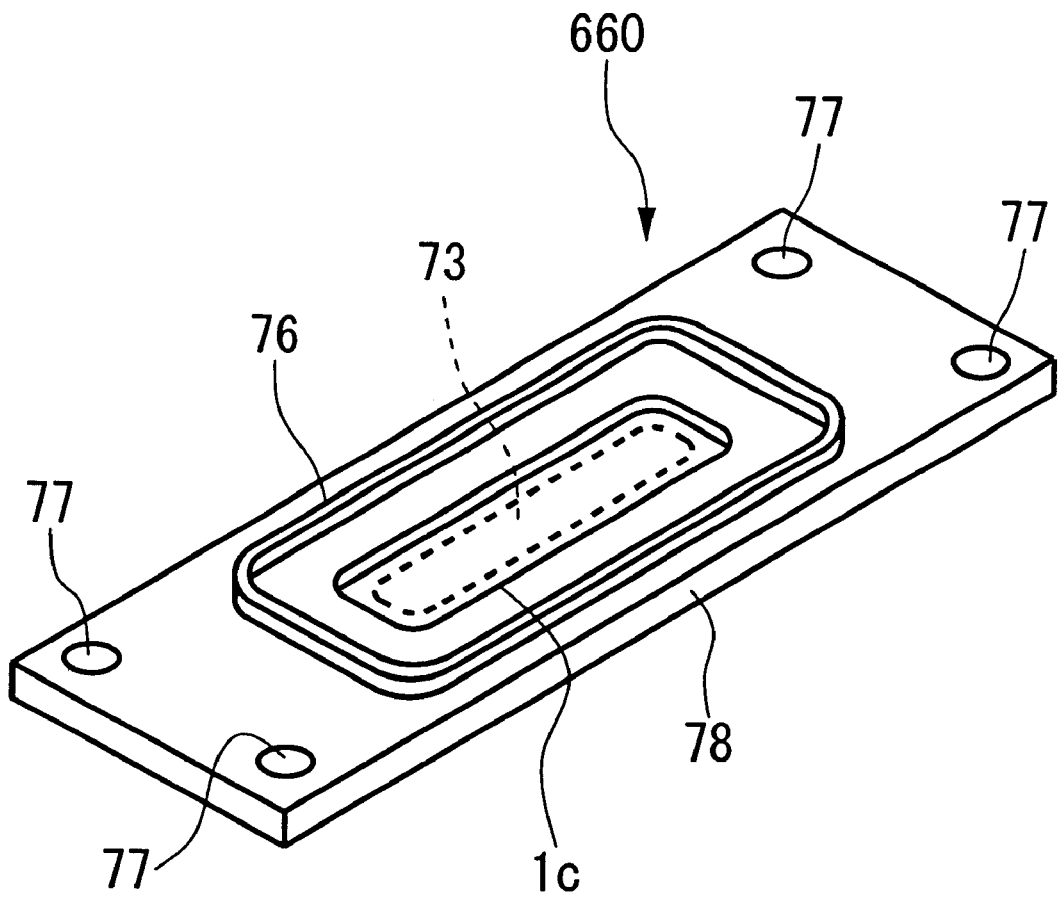
FIG. 34 shows a slant view of the other embodiment of the actuator.

FIG. 34 shows a slant view of the other embodiment of the actuator. The actuator 660 has packing 76 on the outside of the base plate, which constitutes the actuator 660, or the through hole 1c of a mounting plate 72. Caulking holes 77 are formed on the outskirts of the actuator 660. The actuator 660 is fixed to the container 1 through the caulking hole 77 with caulking.

Furthermore, also in the present embodiment, the wave preventing wall, not shown in the figure, can be provided nearby the packing 76 such that the wave preventing wall faces to the actuator 670 as shown in FIG. 33(B). If the wave preventing wall, not shown in the figure, is form of a mesh or a material which pass through ink such as porous material, the wave preventing wall can be previously mounted on the periphery of the packing 76. If the wave preventing wall is the member which pass through ink, the actuator 660 can detects ink. In this case, the wave preventing wall 1192u is mounted on the ink cartridge together with the actuator 670 as one body. Because the process of mounting the wave preventing wall on the ink cartridge is abbreviate, the manufacturing process is reduced, and the cycle time and cost of manufacturing the ink cartridge are reduced.

Figure 35A:
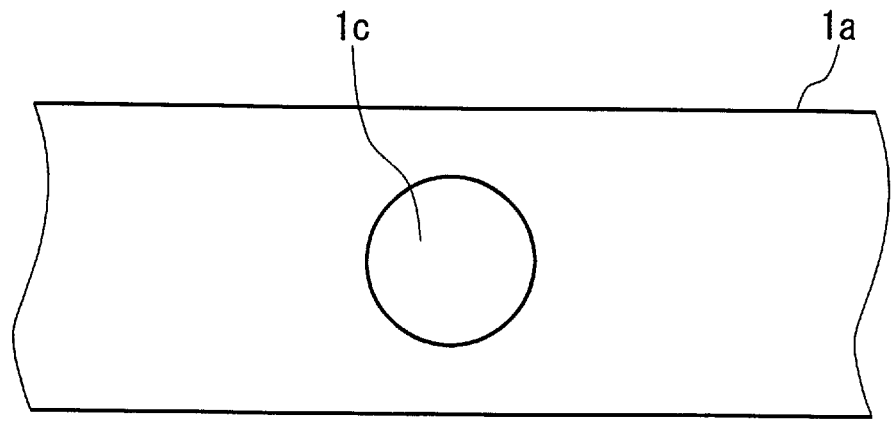
FIGS. 35(A) to 35(C) show plan views of the through hole 1c according to another embodiment.
Figure 35B:
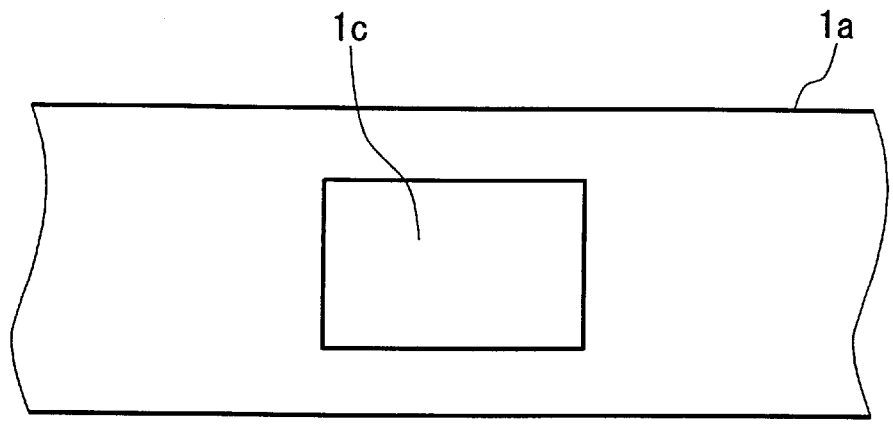
Figure 35C:
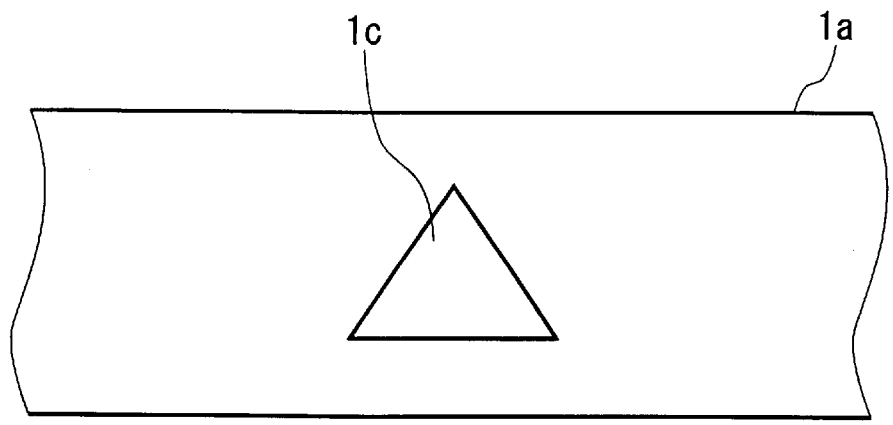

FIGS. 35A, 35B and 35C show plan views of the through hole 1c according to another embodiment. As shown respectively in FIGS. 35A, 35B and 35C, the plane shape of the through hole 1c may be of arbitrary shapes such as circular, rectangular, and triangle shape as long as the elastic wave generating device is capable of being mounted thereto.

Figure 36:
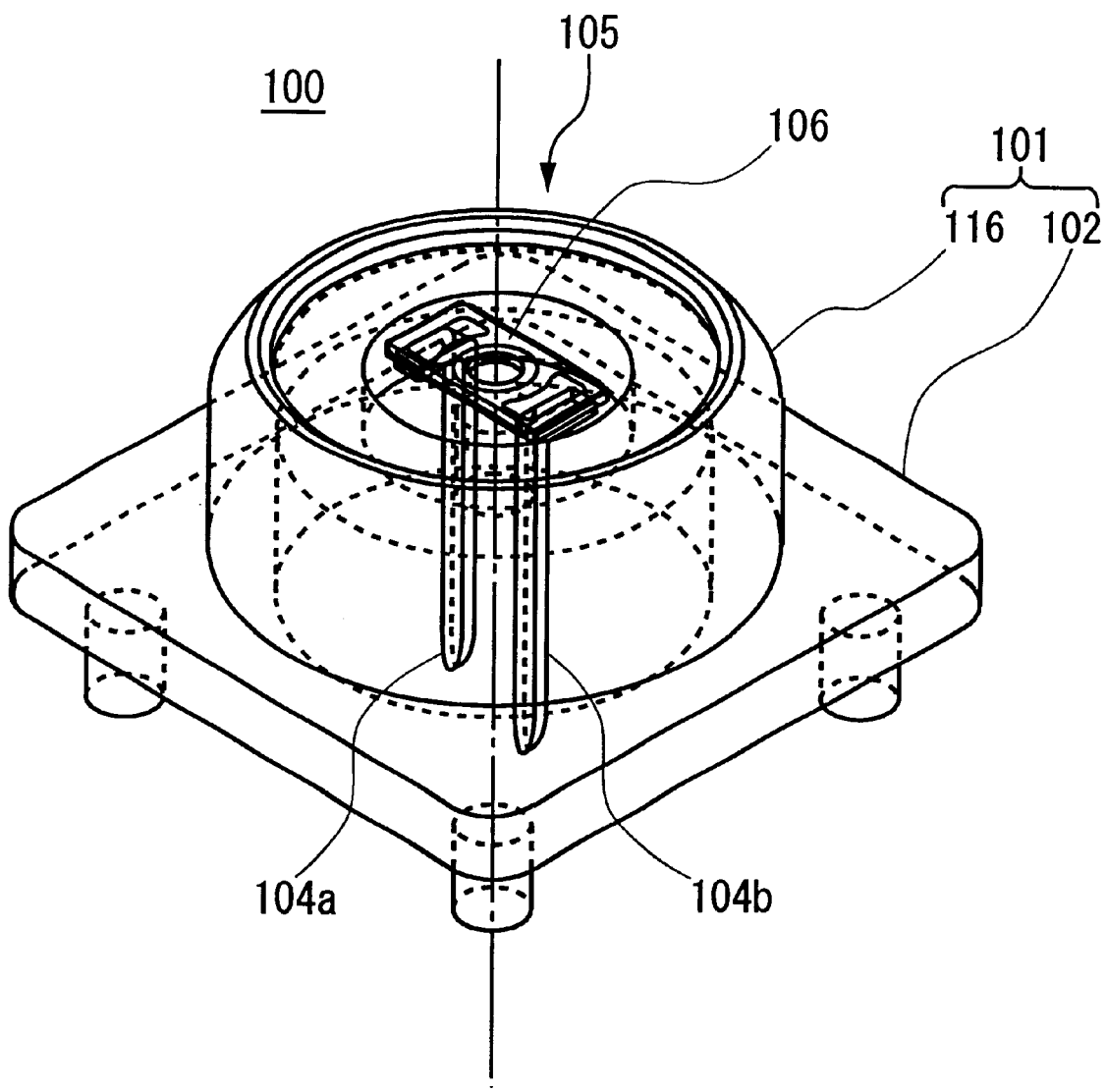
FIG. 36 shows a slant view of the configuration that forms the actuator 106 in one body as a mounting module 100.

FIG. 36 shows a slant view of the configuration that forms the actuator 106 in one body as a mounting module 100. The module 100 is mounted on the predetermined position of the container 1 of an ink cartridge. The module 100 is constituted to detect the ink consumption status in the container 1 by detecting at least the change of acoustic impedance of the ink liquid. The module 100 of the present embodiment has a liquid container mounting member 101 for mounting the actuator 106 to the container 1. The liquid container mounting member 101 has a structure which mounts a cylindrical part 116 that contains the actuator 106 which oscillates by the driving signal on a base mount 102, the plan of which is substantially rectangular. Because the module 100 is constructed so that the actuator 106 of the module 100 can not be contact from outside when the module 100 is mounted on the ink cartridge, the actuator 106 can be protected from outside contact. The top side of the edge of the cylindrical part 116 is chamfered so that the cylindrical part 116 can be easily fit into the hole which is formed in the ink cartridge.

Figure 37:
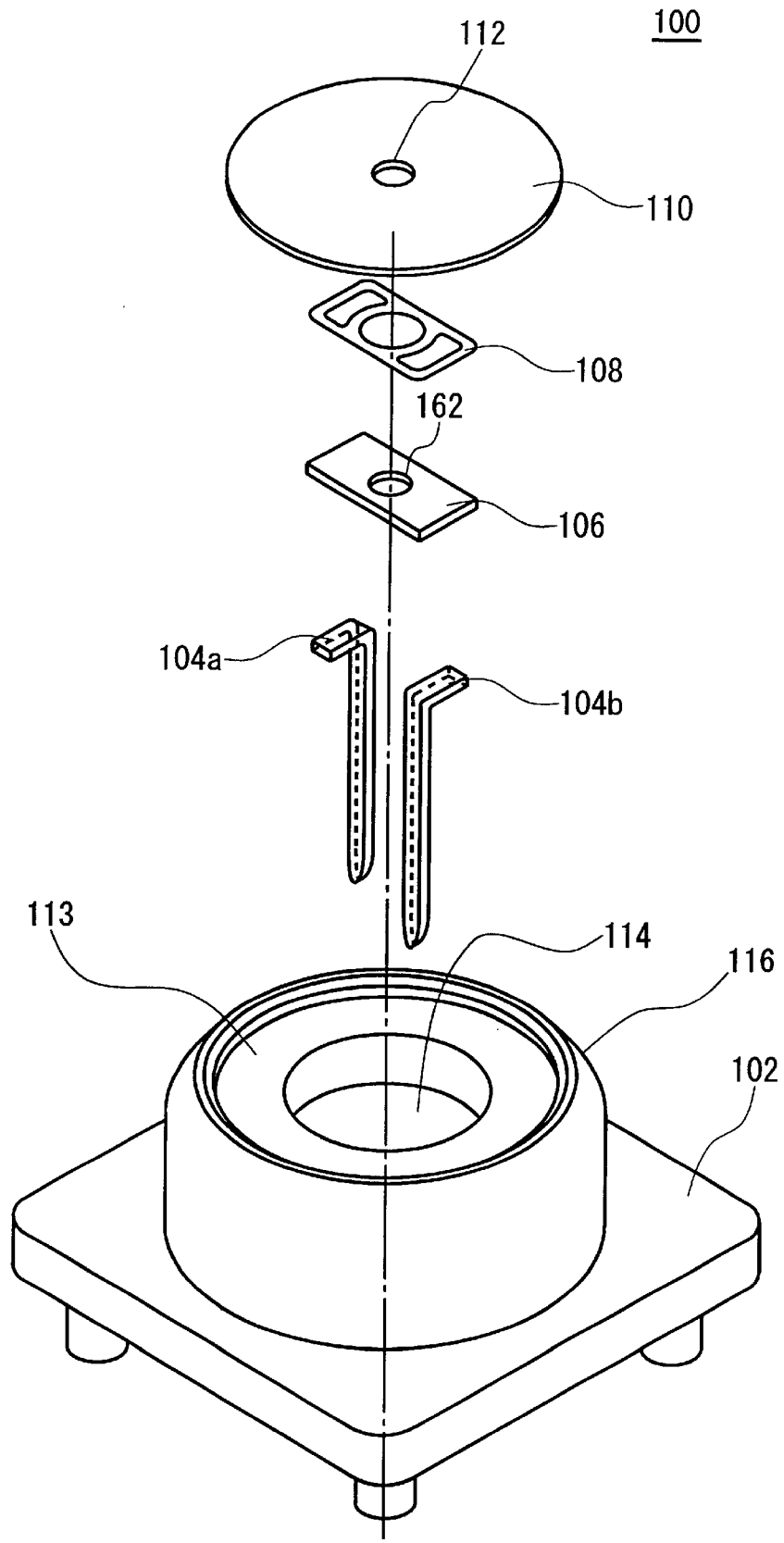
FIG. 37 shows an exploded view of the module 100 shown in FIG. 36 to show the structure of the module 100.

FIG. 37 shows an exploded view of the module 100 shown in FIG. 36 to show the structure of the module 100. The module 100 includes a liquid container mounting member 101 made from a resin and a piezoelectric device mounting member 105 which has a plate 110 and a concave part 113. Furthermore, the module 100 has a lead wire 104a and 104b, actuator 106, and a film 108. Preferably, the plate 110 is made from a material which is difficult to be rust such as stainless or stainless alloy. The opening 114 is formed on the central part of the cylindrical part 116 and the base mount 102 which are included in the liquid container mounting member 101 so that the cylindrical part 116 and the base mount 102 can contain the lead wire 104a and 104b. The concave part 113 is formed on the central part of the cylindrical part 116 and the base mount 102 so that the cylindrical part 116 and the base mount 102 can contain the actuator 106, the film 108, and the plate 110. The actuator 106 is connected to the plate 110 through the film 108, and the plate 110 and the actuator 106 are fixed to the liquid container mounting member 101. Therefore, the lead wire 104a and 104b, the actuator 106, the film 108 and the plate 110 are mounted on the liquid container mounting member 101 as one body. Each of the lead wire 104a and 104b transfer a driving signal to piezoelectric layer by coupling with the upper electrode and the lower electrode 166 of the actuator 106, and also transfer the signal of resonant frequency detected by the actuator 106 to recording apparatus. The actuator 106 oscillates temporally based on the driving signal transferred from the lead wire 104a and 104b. The actuator 106 vibrates residually after the oscillation and generates a counter electromotive force by the residual vibration. By detecting the vibrating period of the waveform of the counter electromotive force, the resonant frequency corresponding to the consumption status of the liquid in the liquid container can be detected. The film 108 bonds the actuator 106 and the plate 110 to seal the actuator 106. The film 108 is preferably formed by such as polyolefin and bonded to the actuator 106 and the plate 110 by heat sealing. By bonding the actuator 106 and the plate 110 with the film 108 face with face, the unevenness of the bonding on location decreases, and thus the portion other than the vibrating plate does not vibrate. Therefore, the change of the resonant frequency before and after bonding the actuator 106 to plate 110 is small.

The plate 110 is circular shape, and the opening 114 of the base mount 102 is formed in cylindrical shape. The actuator 106 and the film 108 are formed in rectangular shape. The lead wire 104, the actuator 106, the film 108, and the plate 110 can be attached to and removed from the base mount 102. Each of the base mount 102, the lead wire 104, the actuator 106, the film 108, and the plate 110 is arranged symmetric with respect to the central axis of the module 100. Furthermore, each of the centers of the base mount 102, the actuator 106, the film 108, and the plate 110 is arranged substantially on the central axis of the module 100.

The opening 114 of the base mount 102 is formed such that the area of the opening 114 is larger than the area of the vibrating region of the actuator 106. The through hole 112 is formed on the center of the plate 110 where the vibrating section of the actuator 106 faces. As shown in FIG. 22 and FIG. 23, the cavity 162 is formed on the actuator 106, and both of the through hole 112 and the cavity 162 forms ink storing part. The thickness of the plate 110 is preferably smaller than diameter of the through hole 112 to reduce the influence of the residual ink. For example, the depth of the through hole 112 is preferably smaller than one third of the diameter of the through hole 112. The shape of the through hole 112 is substantially true circle and symmetric with respect to the central axis of the module 100. Furthermore, the area of the through hole 112 is larger than the area of opening of the cavity 162 of the actuator 106. The periphery of the shape of the cross-section of the through hole 112 can be tapered shape of stepped shape. The module 100 is mounted on the side, top, or bottom of the container 1 such that the through hole 112 faces to the inside of the container 1. When the ink is consumed, and the ink around the actuator 106 is exhausted, the resonant frequency of the actuator 106 greatly changes. The change of the ink level can thus be detected.

Figure 38:
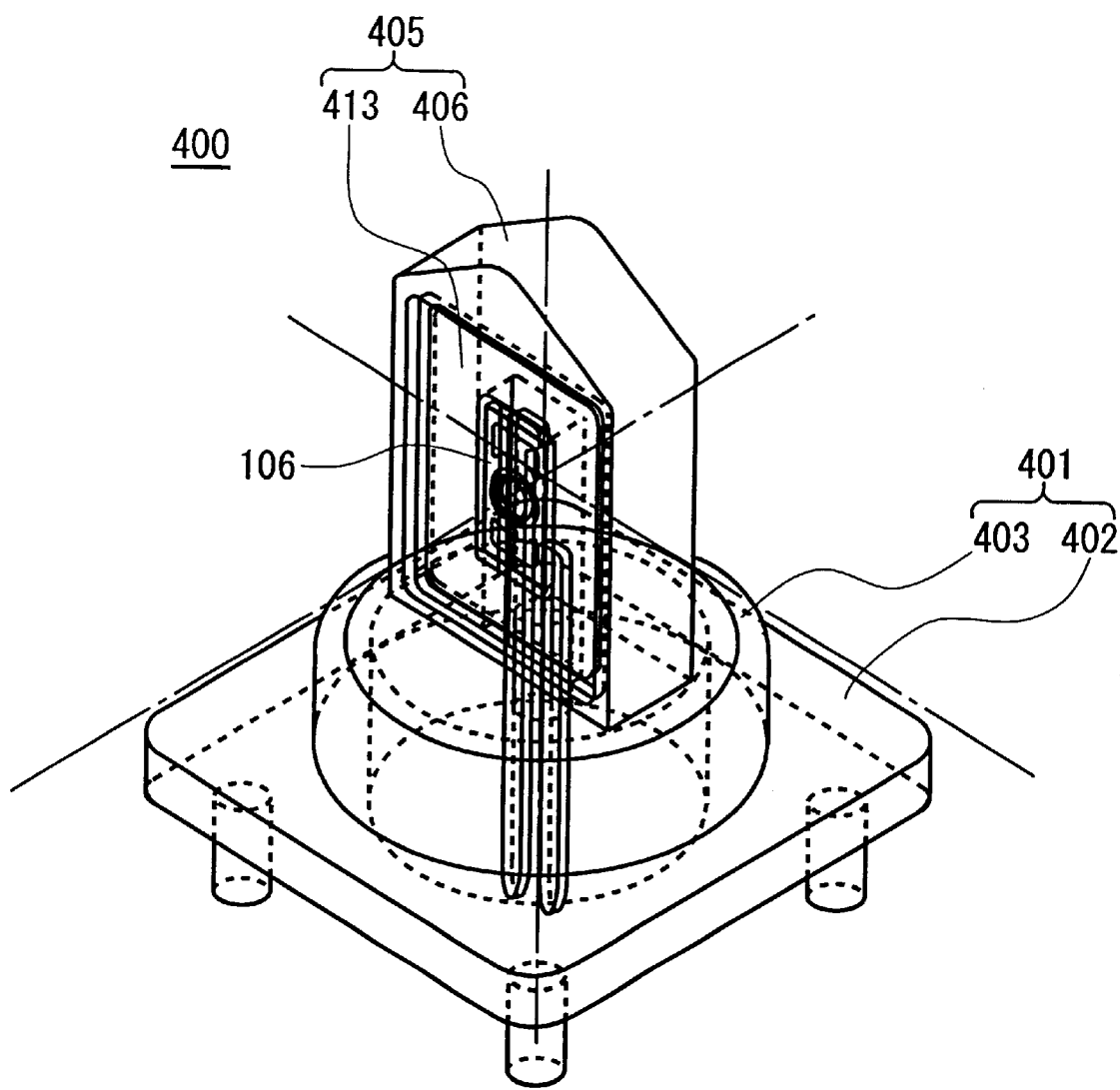
FIG. 38 shows the slant view of the other embodiments of the module.

FIG. 38 shows the slant view of the other embodiments of the module. The piezoelectric device mounting member 405 is formed on the liquid container mounting member 101 in the module 400 of the present embodiment. The cylindrical part 403, which has a cylindrical shape, is formed on the base mount 102, which has a square shaped plan, the edges of which are rounded, in the liquid container mounting member 401. Furthermore, the piezoelectric apparatus mounting member 405 includes a board shaped element 405, which is set up on the cylindrical part 403, and a concave part 413. The actuator 106 is arranged on the concave part 413 provided on the side face of the board shaped element 406. The top end of the board shaped element 406 is chamfered in predetermined angle so that the board shaped element is easy to fit into hole formed on the ink cartridge when mounting the actuator 106 to ink cartridge.

Figure 39:
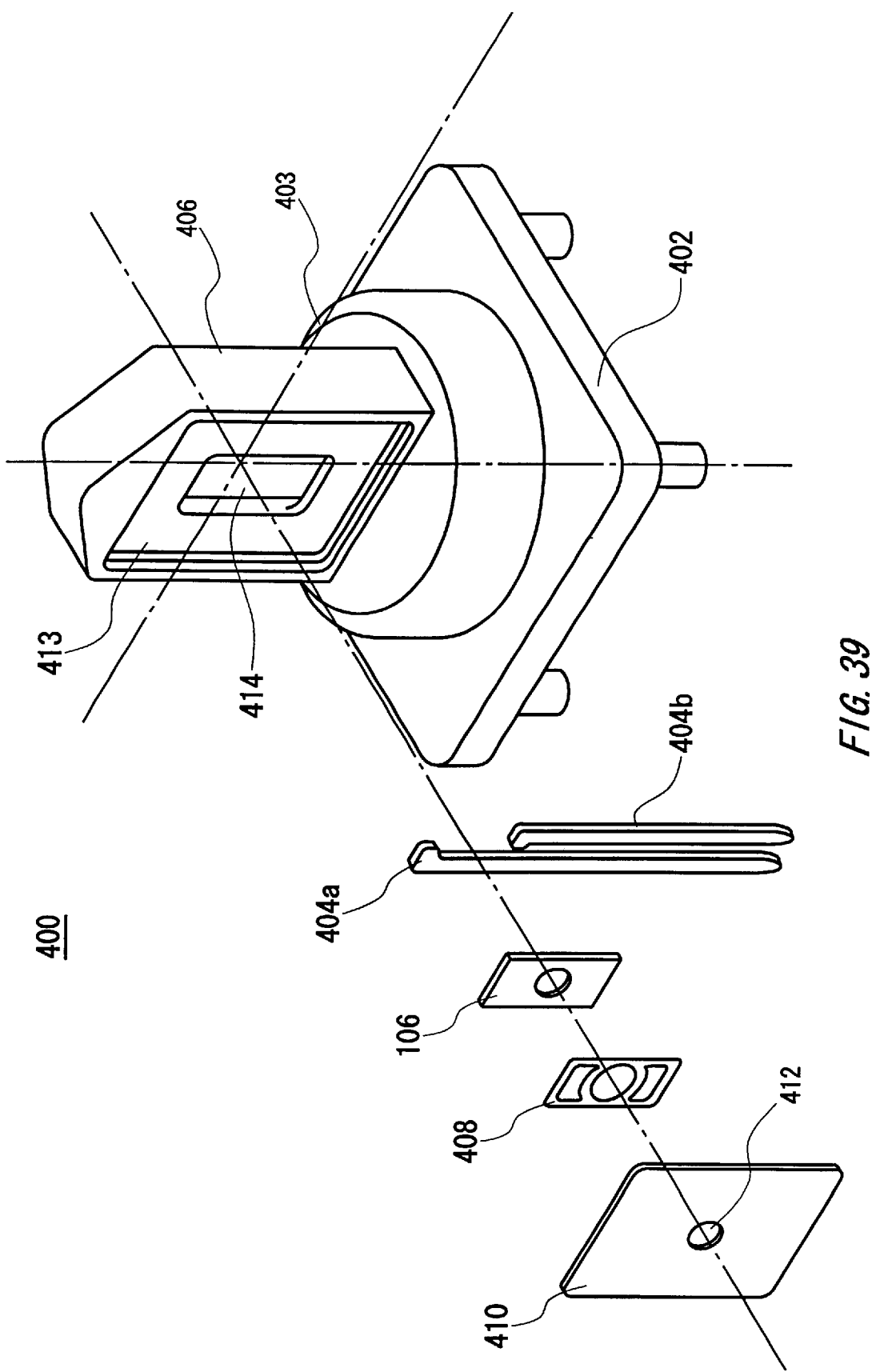
FIG. 39 shows an exploded view of the module 400 shown in FIG. 38 to show the structure of the module 400.

FIG. 39 shows an exploded view of the module 400 shown in FIG. 38 to show the structure of the module 400. As the module 100 shown in FIG. 36, the module 400 includes a liquid container mounting member 401 and a piezoelectric device mounting member 405. The liquid container mounting member 401 has the base mount 402 and the cylindrical part 403, and the piezoelectric device mounting member 405 has the board shaped element 406 and the concave part 413. The actuator 106 is connected to the plate 410 and fixed to the concave part 413. The module 400 has a lead wire 404a and 404b, actuator 106, and a film 408.

According to the present embodiment, the plate 410 is rectangular shape, and the opening 414 provided on the board shaped element 406 is formed in rectangular shape.

The lead wire 404a and 404b, the actuator 106, the film 408, and the plate 410 can be attached to and removed from the base mount 402. Each of the actuator 106, the film 408, and the plate 410 is arranged symmetric with respect to the central axis which is extended to perpendicular direction to the plan of opening 414 and also pass through the center of opening 414. Furthermore, each of the centers of the actuator 106, the film 408, and the plate 410 is arranged substantially on the central axis of the opening 414.

The through hole 412 provided on the center of the plate 410 is formed such that the area of the through hole 412 is larger than the area of the opening of the cavity 162 of the actuator 106. The cavity 162 of the actuator 106 and the through hole 412 together forms ink storing part. The thickness of the plate 410 is preferably smaller than diameter of the through hole 412. For example, the thickness of the plate 410 is smaller than one third of the diameter of the through hole 412. The shape of the through hole 412 is substantially true circle and symmetric with respect to the central axis of the module 400. The shape of the cross-section of the periphery of the through hole 112 can be tapered shape or stepped shape. The module 400 can be mounted on the bottom of the container 1 such that the through hole 412 is arranged inside of the container 1. Because the actuator 106 is arranged inside the container 1 such that the actuator 106 extends in the vertical direction, the setting of the timing of the ink end can be easily changed by changing the height of the mounting position of the actuator 106 in the container 1 by changing the height of the base mount 402.

Figure 40:
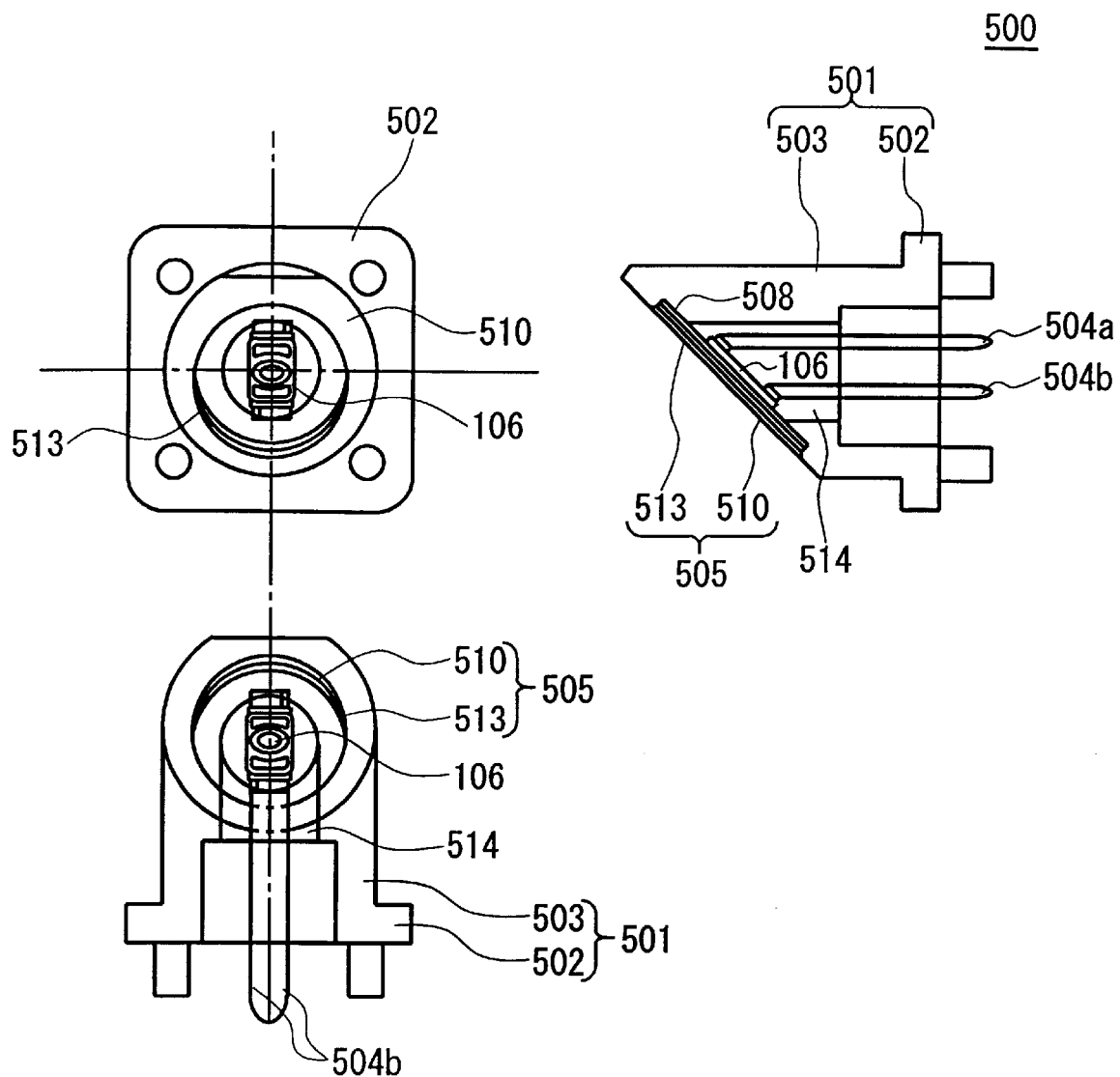
FIG. 40 shows the further other embodiment of the module.

FIG. 40 shows the further other embodiment of the module. As the module 100 shown in FIG. 36, the module 500 of FIG. 40 includes a liquid container mounting member 501 which has a base mount 502 and a cylindrical part 503. Furthermore, the module 500 further has a lead wire 504a and 504b, actuator 106, a film 508, and a plate 510. The opening 514 is formed on the center of the base mount 502, which is included in the liquid container mounting member 501, so that the base mount 502 can contain the lead wire 504a and 504b. The concave part 513 is formed on the cylindrical part 503 so that the cylindrical part 503 can contain the actuator 106, the film 508, and the plate 510. The actuator 106 is fixed to the piezoelectric device mounting member 505 through the plate 510. Therefore, the lead wire 504a and 504b, the actuator 106, the film 508, and the plate 510 are mounted on the liquid container mounting member 501 as one body. The cylindrical part 503, the top face of which is slanted in vertical direction, is formed on the base mount which has a square shaped plan and the edges of which are rounded. The actuator 106 is arranged on the concave part 513 which is provided on the top surface of the cylindrical part 503 that is slanted in vertical direction.

The top end of the module 500 is slanted, and the actuator 106 is mounted on this slanted surface. Therefore, if the module 500 is mounted on the bottom or the side of the container 1, the actuator 106 slants in the vertical direction of the container 1. The slanting angle of the top end of the module 500 is substantially between 30 degree and 60 degree with considering the detecting performance.

The module 500 is mounted on the bottom or the side of the container 1 so that the actuator 106 can be arranged inside the container 1. When the module 500 is mounted on the side of the container 1, the actuator 106 is mounted on the container 1 such that the actuator 106 faces the upside, downside, or side of the container 1 with slanting. When the module 500 is mounted on the bottom of the container 1, the actuator 106 is preferable to be mounted on the container 1 such that the actuator 106 faces to the ink supply port side of the container 1 with slanting.

Figure 41:
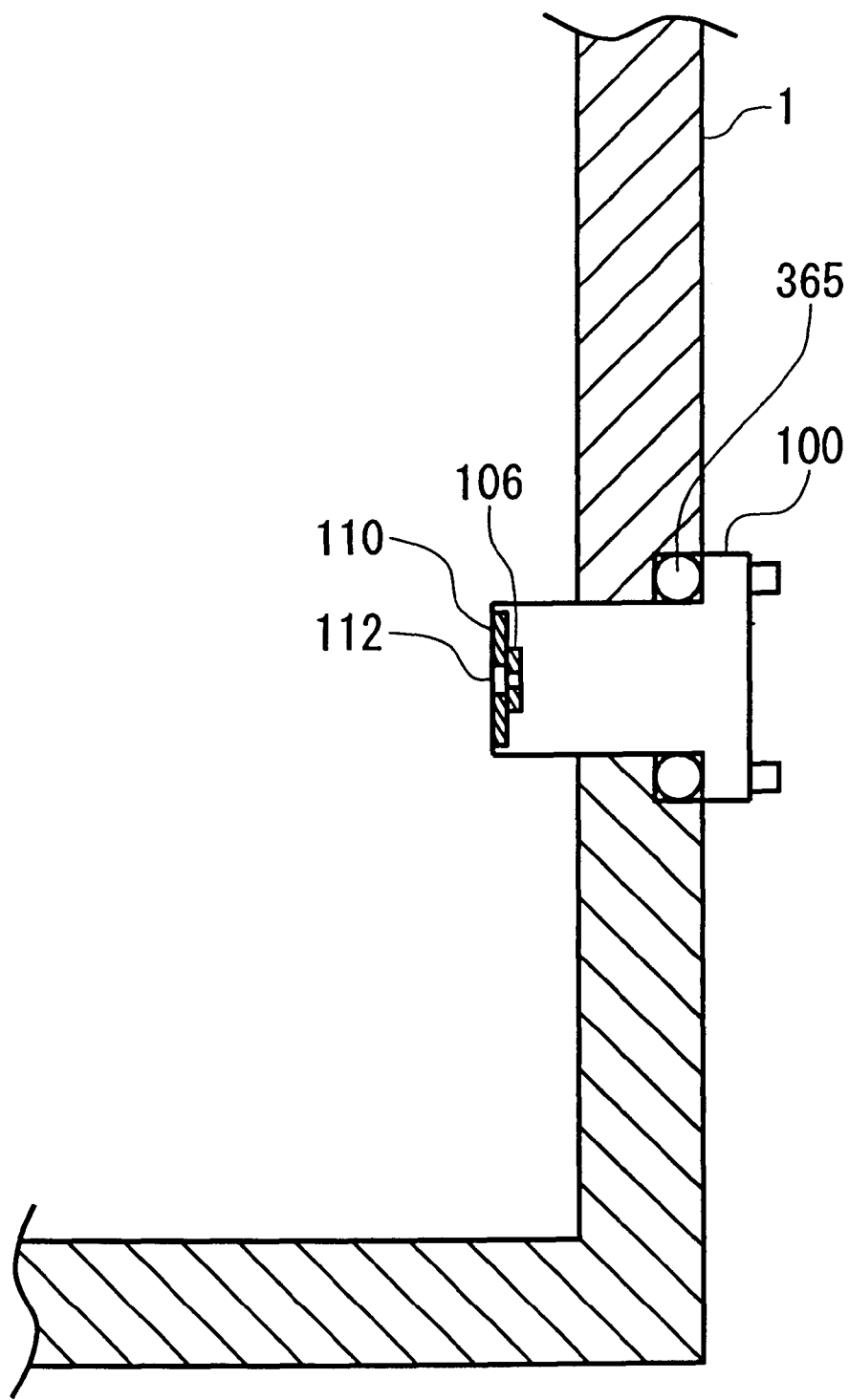
FIG. 41 shows a cross-sectional view around the bottom of the container 1 when the module 100 shown in FIG. 36 is mounted on the container 1.

FIG. 41 shows a cross-sectional view around the bottom of the container 1 when the module 100 shown in FIG. 36 is mounted on the container 1. The module 100 is mounted on the container 1 so that the module 100 penetrates through the side wall of the container 1. The O-ring 365 is provided on the connection face of between the side wall of the container 1 and the module 100 to seal between the module 100 and the container 1. The module 100 is preferable to include the cylindrical part as explained in FIG. 36 so that the module 100 can be sealed by the O-ring. By inserting the top end of the module 100 inside the container 1, ink in the container 1 contacts with the actuator 106 through the through hole 112 of the plate 110. Because the resonant frequency of the residual vibration of the actuator 106 is different depends on whether the circumference of the vibrating section of the actuator 106 is liquid or gas, the ink consumption status can be detected using the module 100. Furthermore, not only the module 100 can be mounted on the container 1 and detect the existence of ink, but also the module 400 shown in FIG. 38, module 500 shown in FIG. 40, or the module 700A and 700B shown in FIG. 42, and a mold structure 600 can be mounted on the container 1 and detect the existence of the ink.

Figure 42:
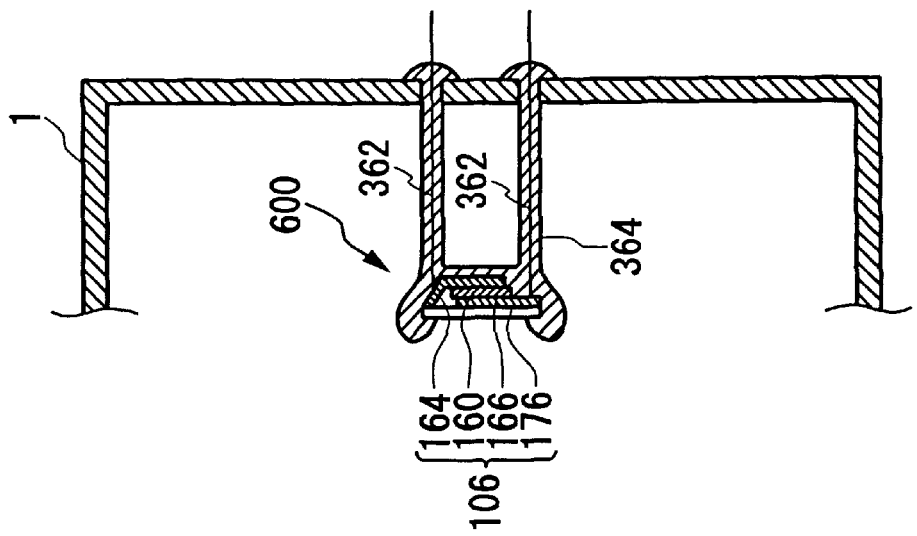
FIGS. 42(A) to 42(C) show the cross section of the ink container when mounting module 700B on the container 1.
Figure 42:
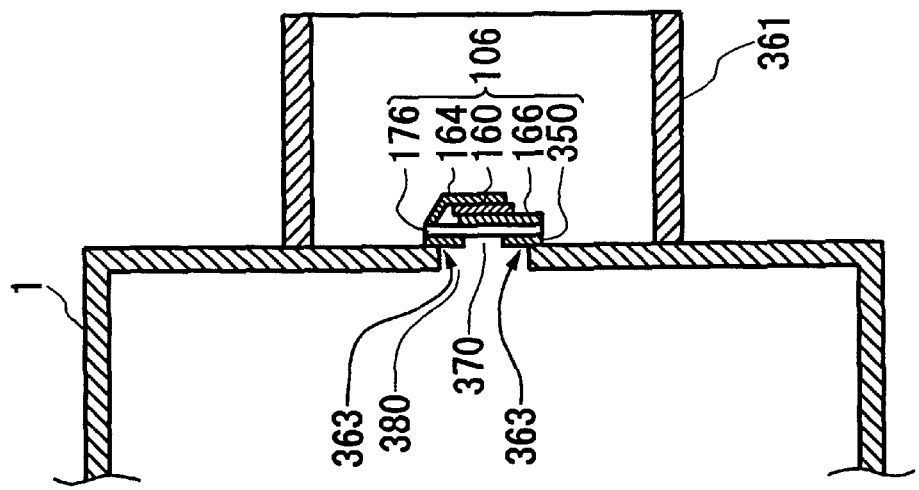
Figure 42:
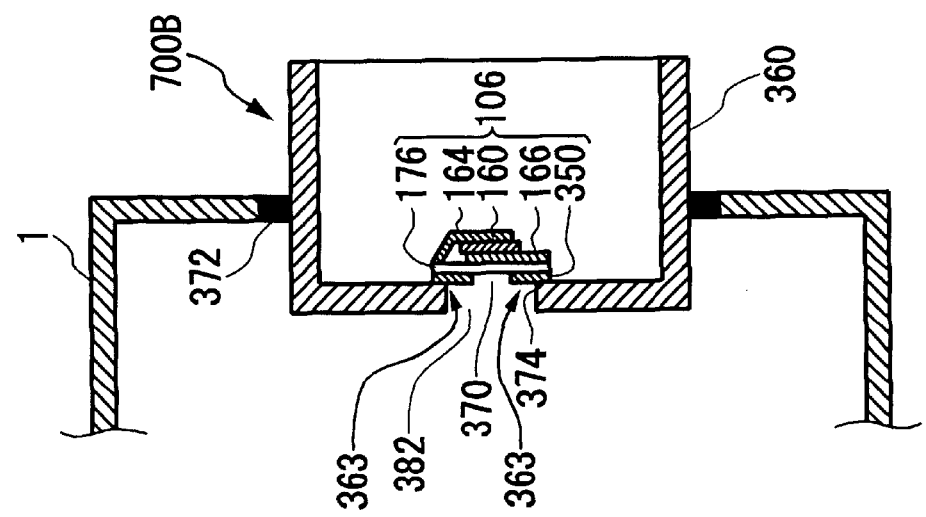

FIG. 42 (A) shows the cross section of the ink container when mounting module 700B on the container 1. The present embodiment uses a module 700B as an example of amounting structure. The module 700B is mounted on the container 1 such that the liquid container mounting member 360 protrude into the inside of the A through hole 370 is formed in the mounting plate 350, and the through hole 370 faces to the vibrating section of the actuator 106. Furthermore, a hole 382 is formed on the bottom wall of the module 700B, and a piezoelectric device mounting member 363 is formed. The actuator 106 is arranged to close the one of the face of the hole 382. Therefore, ink contacts with the vibrating plate 176 through the hole 382 of the piezoelectric device mounting member 363 and the through hole 370 of the mounting plate 350. The hole 382 of the piezoelectric device mounting member 363 and the through hole 370 of the mounting plate 350 together forms an ink storing part. The piezoelectric device mounting member 363 and the actuator 106 are fixed by the mounting plate 350 and the film material. The sealing structure 372 is provided on the connection part of the liquid container mounting member 360 and the container 1. The sealing structure 372 can be formed by the plastic material such as synthetic resin or O-ring. In FIG. 42(A), the module 700B and the container 1 is separate body, however, the piezoelectric device mounting member can be constituted by a part of the container 1 as shown in FIG. 42(B).

The module 700B shown in FIG. 42 does not need to embed the lead wire into the module as shown in FIG. 36 to FIG. 40. Therefore, the forming process becomes simple. Also, the exchange of the module 700B becomes possible so that the recycling of the module 700B also becomes possible.

There is possibility that the actuator 106 malfunctions by the contact of the ink which is dropped from a top face or a side face of the container 1 with the actuator 106, the ink of which is attached to the top face or the side face of the container 1 when the ink cartridge is shaken. However, because the liquid container mounting member 360 of the module 700B protrudes into the inside of the container 1, the actuator 106 does not malfunction by the ink dropped from the top face or the side face of the container Furthermore, the module 700B is mounted on the container 1 so that only part of the vibrating plate 176 and the mounting plate 350 are contact with ink inside of the container 1 in the embodiment of FIG. 42(A). The embedding of the electrode of the lead wire 104a, 104b, 404a, 40b, 504a, and 504 shown in FIG. 36 to FIG. 40 into the module becomes unnecessary for the embodiment shown in FIG. 42(A). Therefore, the forming process becomes simple. Also, the exchange of the actuator 106 becomes possible so that the recycling of the actuator 106 also becomes possible.

FIG. 42(B) shows the cross section of the ink container when mounting actuator 106 on the container 1. A protecting member 361 is mounted on the container separately with the actuator 106 in the ink cartridge of the embodiment shown in FIG. 42(B). Therefore, the protecting member 361 and the actuator 106 is not one body as a module, and the protecting member 361 thus can protect the actuator 106 not to be contact by the user. A hole 380 which is provide on the front face of the actuator 106 is arranged on the side wall of the container 1. The actuator 106 includes the piezoelectric layer 160, the upper electrode 164, the lower electrode 166, the vibrating plate 176, and the mounting plate 350. The vibrating plate 176 is formed on the mounting plate 350, and the lower electrode 166 is formed on the vibrating plate 176. The piezoelectric layer 160 is formed on the top face of the lower electrode 166, and the upper electrode 164 is formed on the top face of the piezoelectric layer 160.

Therefore, the main portion of the piezoelectric layer 160 is formed by sandwiching the main portion of the piezoelectric layer 160 by the main portion of the upper electrode 164 and the lower electrode 166 from top and bottom. The circular portion, which is a main portion of each of the piezoelectric layer 160, the upper electrode 164, and the lower electrode 166, forms a piezoelectric element. The piezoelectric element is formed on the vibrating plate 176. The vibrating region of the piezoelectric element and the vibrating plate 176 constitutes the vibrating section, on which the actuator 106 actuary vibrates. A through hole 370 is provided on the mounting plate 350. Furthermore, a hole 380 is formed on the side wall of the container 1.

Therefore, ink contacts with the vibrating plate 176 through the hole 380 of the container 1 and the through hole 370 of the mounting plate 350. The hole 380 of the container 1 and the through hole 370 of the mounting plate 350 together forms ink storing part.

Moreover, because the actuator 106 is protected by the protecting member 361, the actuator 106 can be protected form the outside contact. The base plate 178 shown in FIG. 22 can be used instead of the mounting plate 350 in the embodiment shown in FIG. 42(A) and (B).

FIG. 42(C) shows an embodiment that comprises a mold structure 600 which includes the actuator 106. In the present embodiment, a mold structure 600 is used as one example of the mounting structure. The mold structure 600 has the actuator 106 and a mold member 364. The actuator 106 and the mold member 364 are formed in one body. The mold member 364 is formed by a plastic material such as silicon resin. The mold member 364 includes a lead wire 362 in its inside. The mold member 364 is formed so that the mold member 364 has two legs extended from the actuator 106. The end of the two legs of the mold member 364 are formed in a shape of hemisphere to liquid tightly fix the mold member 364 with container 1. The mold member 364 is mounted on the container 1 such that the actuator 106 protrudes into the inside of the container 1, and the vibrating section of the actuator 106 contacts with ink inside the container 1. The upper electrode 164, the piezoelectric layer 160, and the lower electrode 166 of the actuator 106 are protected from ink by the mold member 364.

Figure 43:
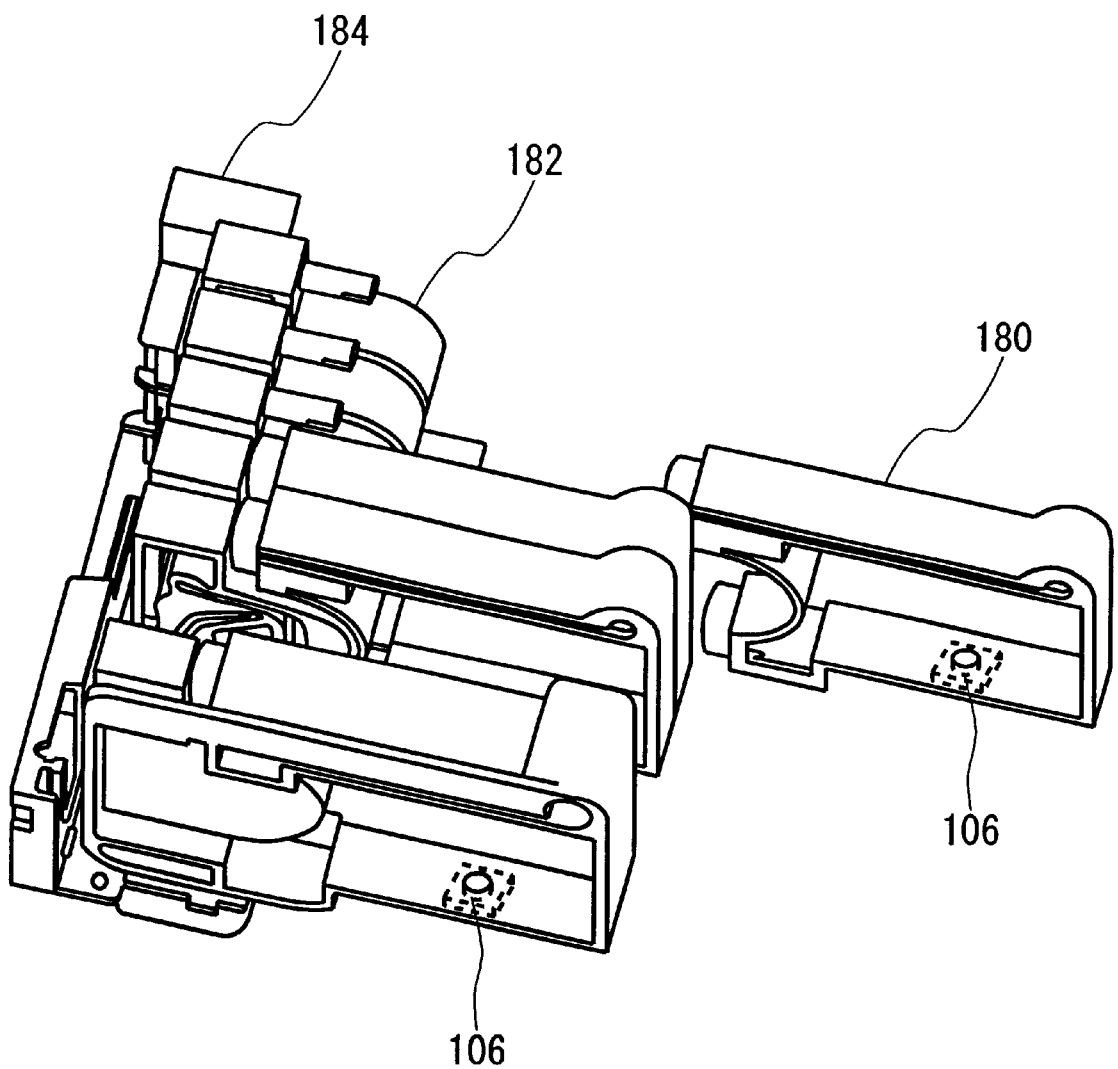
FIG. 43 shows an embodiment of an ink cartridge and an ink jet recording apparatus which uses the actuator 106 shown in FIG. 22.

Because the mold structure 600 shown in FIG. 42 does not need the sealing structure 372 between the mold member 364 and the container 1, the leaking of ink from the container 1 can be reduced. Moreover, because the mold structure 600 has a form that the mold structure 600 does not protrude from the outside of the container 1, the mold structure 600 can protect the actuator 106 from the outside contact. There is possibility that the actuator 106 malfunctions by the contact of the ink which is dropped from a top face or a side face of the container 1 with the actuator 106, the ink of which is attached to the top face or the side face of the container 1 when the ink cartridge is shaken. Because the mold member 364 of the mold structure 600 protrudes into the inside of the container 1, the actuator 106 does not malfunction by the ink dropped from the top face or the side face of the container FIG. 43 shows an embodiment of an ink cartridge and an ink jet recording apparatus which uses the actuator 106 shown in FIG. 22. A plurality of ink cartridges 180 is mounted on the ink jet recording apparatus which has a plurality of ink introducing members 182 and a holder 184 each corresponding to the each of ink cartridge 180, respectively. Each of the plurality of ink cartridges 180 contains different types of ink, for example, different color of ink. The actuator 106, which detects at least acoustic impedance, is mounted on the each of bottom of the plurality of ink cartridge 180. The residual quantity of ink in the ink cartridge 180 can be detected by mounting the actuator 106 on the ink cartridge 180.

Furthermore, the wave preventing wall, not shown in the figure, is provided inside the ink cartridge 180 such that the wave preventing wall faces to the actuator 106.

Figure 44:
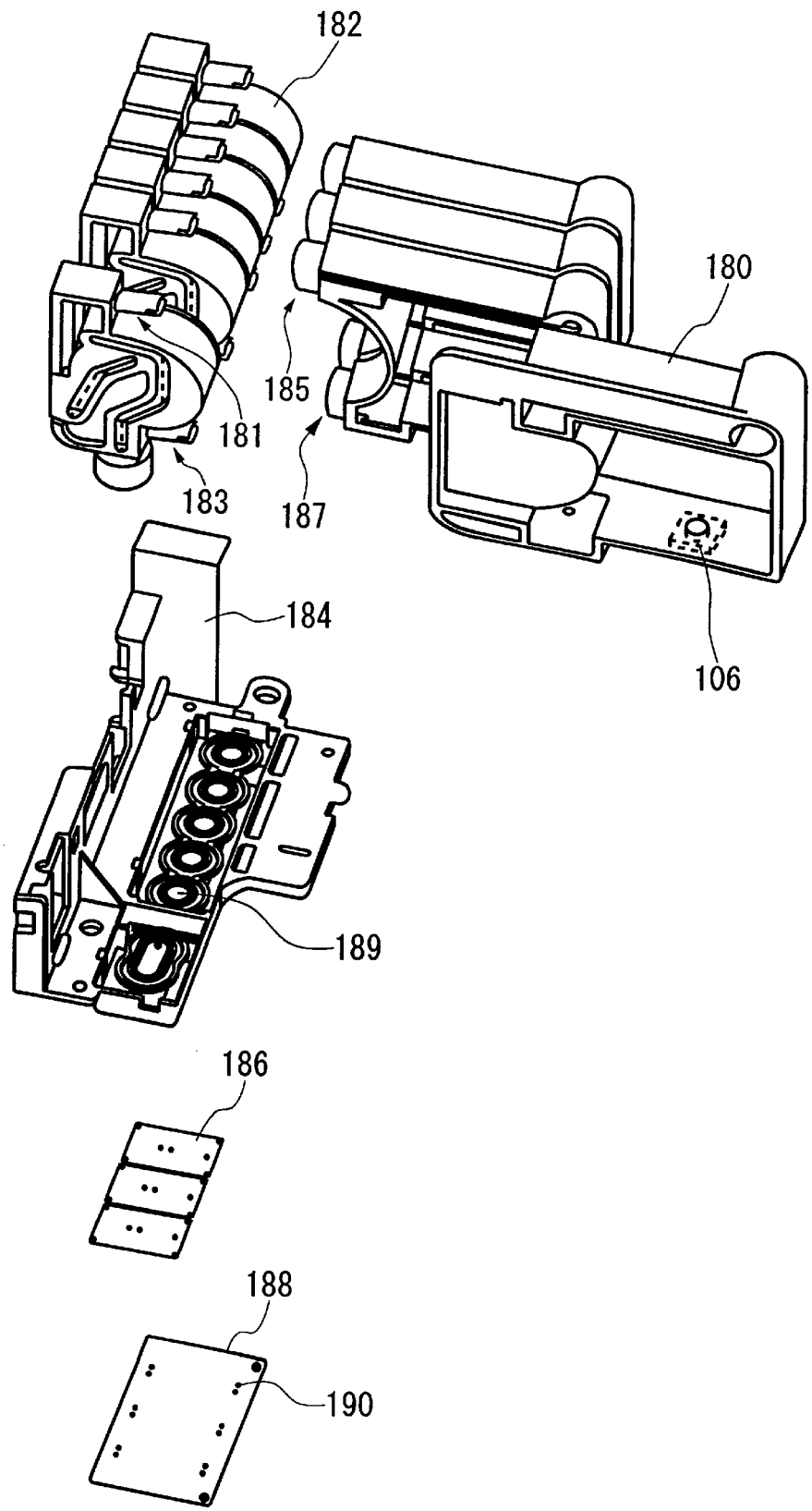
FIG. 44 shows a detail around the head member of the ink jet recording apparatus.

FIG. 44 shows a detail around the head member of the ink jet recording apparatus. The ink jet recording apparatus has an ink introducing member 182, a holder 184, a head plate 186, and a nozzle plate 188. A plurality of nozzle 190, which jet out ink, is formed on the nozzle plate 188. The ink introducing member 182 has an air supply hole 181 and an ink introducing inlet 183. The air supply hole 181 supplies air to the ink cartridge 180. The ink introducing inlet 183 introduces ink from the ink cartridge 180. The ink cartridge 180 has an air introducing inlet 185 and an ink supply port 187. The air introducing inlet 185 introduces air from the air supply hole 181 of the ink introducing member 182. The ink supply port 187 supplies ink to the ink introducing inlet 183 of the ink introducing member 182. By introducing air from the ink introducing member 182 to the ink cartridge 180, the ink cartridge 180 accelerates the supply of ink from the ink cartridge 180 to the ink introducing member 182.

Furthermore, the wave preventing wall, not shown in the figure, is provided inside the ink cartridge 180 such that the wave preventing wall faces to the actuator 106.

Figure 45A:
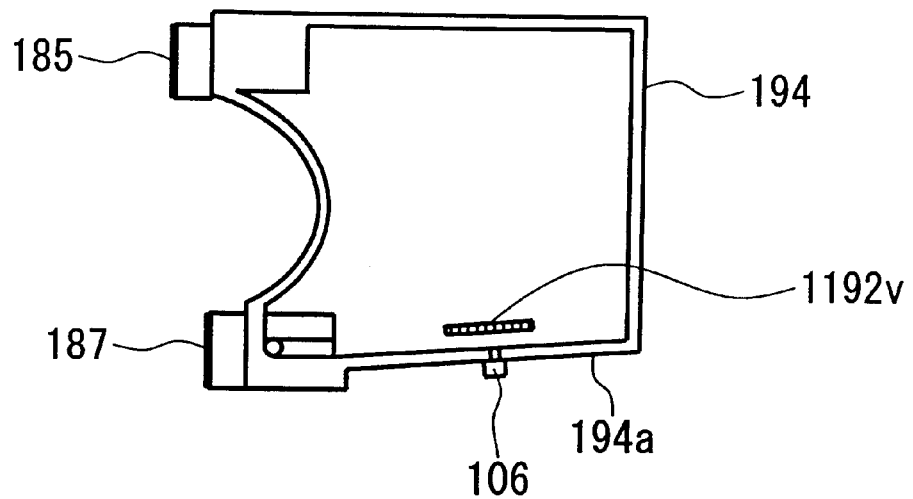
FIGS. 45(A) and 45(B) show other embodiment of the ink cartridge 180 shown in FIG. 44.

FIG. 45 shows other embodiment of the ink cartridge 180 shown in FIG. 44. The actuator 106 is mounted on the bottom face 194a, which is formed to be slanted in vertical direction, of the ink cartridge 180A shown in the FIG. 45(A). A wave preventing wall 1192v is provided on the position where has the predetermined height from the bottom face of the inside the container 194 and also faces to the actuator 106 inside the container 194 of the ink cartridge 180. Because the actuator 106 is mounted on the container 194 slanted in vertical direction, the drainage of ink can be improved.

A gap, which is filled with ink, is formed between the actuator 106 and the wave preventing wall 1192v. The gap between the wave preventing wall 1192v and the actuator 106 does not hold ink by capillary force. When the container 194 is rolled, ink wave is generated inside the container 194 by the waving, and there is possibility that the actuator 106 malfunctions by detecting gas or an air bubble caused by the shock of the ink wave. By providing the wave preventing wall 1192v, ink wave around the actuator 106 can be prevented so that the malfunction of the actuator 106 can be prevented.

Figure 45B:
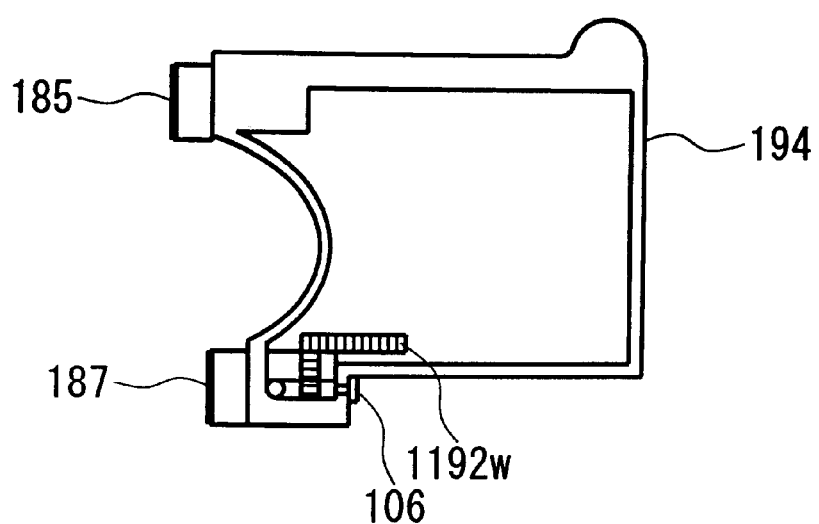

The actuator 106 of the ink cartridge 180B shown in FIG. 45(B) is mounted on the side wall of the supply port of the container 194. The actuator 106 can be mounted on the side wall or bottom face of the container 194 if the actuator 106 is mounted nearby the ink supply port 187. The wave preventing wall 1192W is provided nearby the ink supply port 187 inside the container 194 such that the wave preventing wall 1192W faces to the actuator 106. The wave preventing wall 1192w is formed in L-shape to effectively prevent the wave of ink. Moreover, the actuator 106 is preferably mounted on the center of the width direction of the container 194. Because ink is supplied to the outside through the ink supply port 187, ink and actuator 106 reliably contacts until the timing of the ink near end by providing the actuator 106 nearby the ink supply port 187. Therefore, the actuator 106 can reliably detect the timing of the ink near end.

Furthermore, by providing the actuator 106 nearby the ink supply port 187, the setting position of the actuator 106 to the connection point on the carriage on the ink container becomes reliable during the mounting of the ink container on the cartridge holder of the carriage. It is because the reliability of coupling between the ink supply port with the ink supply needle is most important during the coupling of the ink container and the carriage. If there is even a small gap, the tip of the ink supply needle will be hurt or a sealing structure such as O-ring will be damaged so that the ink will be leaked. To prevent this kind of problems, the ink jet printer usually has a special structure that can accurately positioning the ink container during the mounting of the ink container on the carriage. Therefore, the positioning of the actuator 106 becomes reliable by arranging the actuator nearby the ink supply port. Furthermore, the actuator 106 can be further reliably positioned by mounting the actuator 106 at the center of the width direction of the container 194. It is because the waving is the smallest when the ink container rolls along an axis, the center of which is center line of the width direction, during the mounting of the ink container on the holder.

Figure 46A:
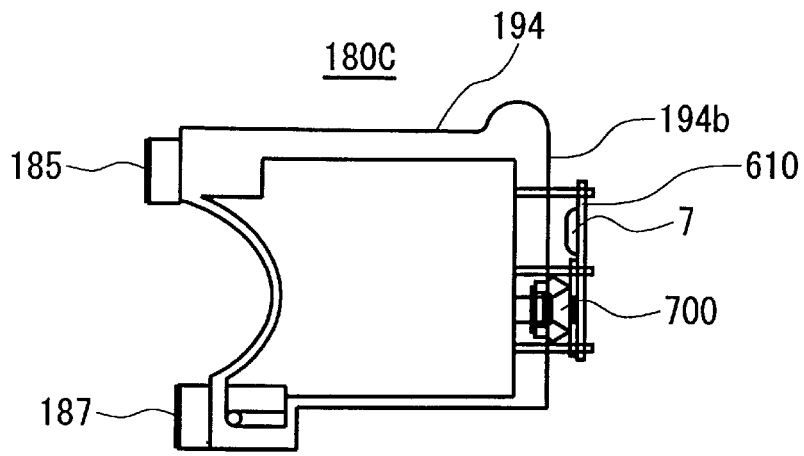
FIGS. 46(A) to 46(C) show further other embodiment of the ink cartridge 180.
Figures 46B, 46C:
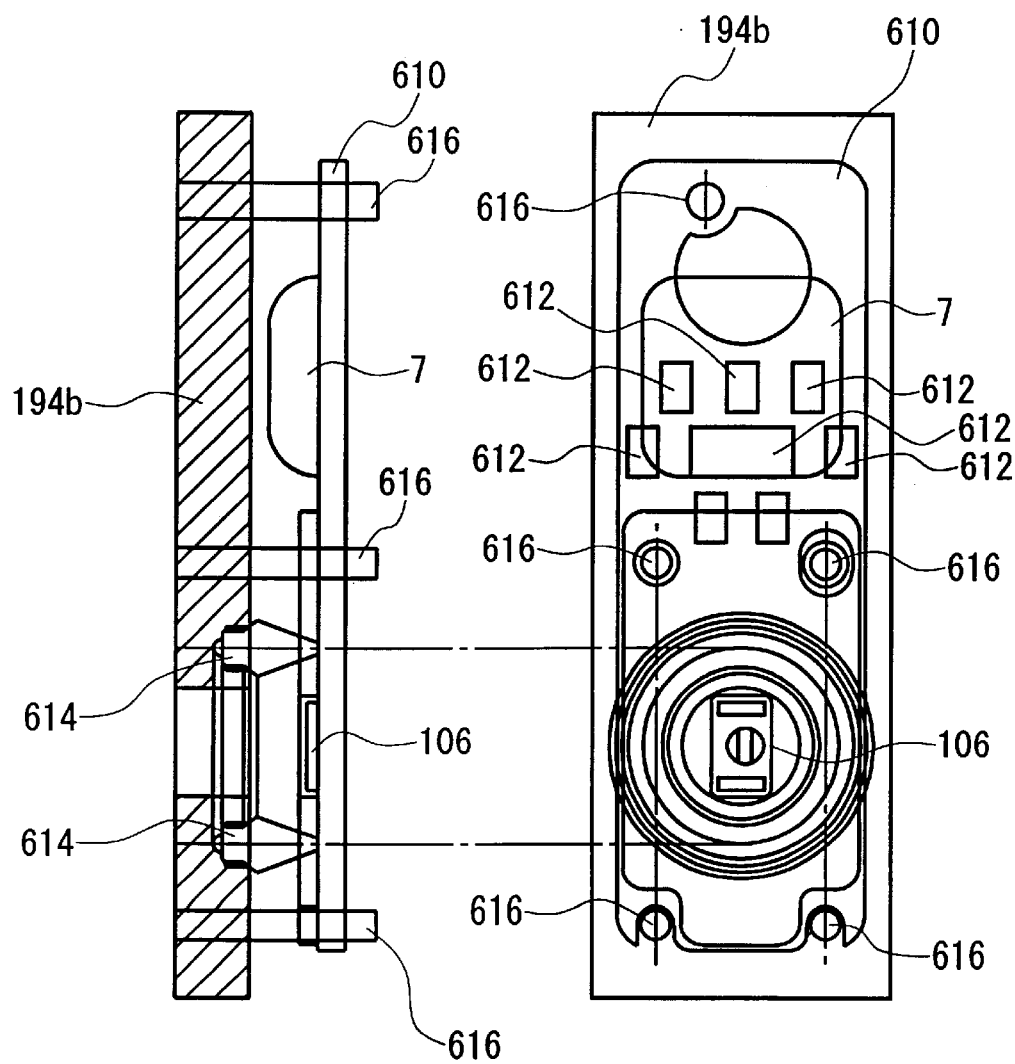

FIG. 46 shows further other embodiment of the ink cartridge 180. FIG. 46(A) shows a cross section of an ink cartridge 180C, and FIG. 46(B) shows a cross section which enlarges the side wall 194b of an ink cartridge 180C shown in FIG. 46(A). FIG. 46(C) shows perspective view from the front of the side wall 194b of the ink cartridge 180C. The semiconductor memory device 7 and the actuator 106 are formed on the same circuit board 610 in the ink cartridge 180C. As shown in FIG. 46(A), the wave preventing wall 1192x is provided inside the container 194 such that the wave preventing wall 1192x faces to the actuator 700. As shown in FIG. 46(B) and (C), the semiconductor memory device 7 is formed on the upper side of the circuit board 610, and the actuator 106 is formed on the lower side of the semiconductor memory device 7 on the same circuit board 610. A different-type O-ring 614 is mounted on the side wall 194b such that the different-type O-ring 614 surrounds the actuator 106. A plurality of caulking part 616 is formed on the sidewall 194b to couple the circuit board 610 with the container 194. By coupling the circuit board 610 with the container 194 using the caulking part 616 and pushing the different-type O-ring 614 to the circuit board 610, the vibrating region of the actuator 106 can contacts with ink, and at the same time, the inside of the ink cartridge is sealed from outside of the ink cartridge.

A terminals 612 are formed on the semiconductor memory device 7 and around the semiconductor memory device 7. The terminal 612 transfer the signal between the semiconductor memory device 7 and outside the ink jet recording apparatus. The semiconductor memory device 7 can be constituted by the semiconductor memory which can be rewritten such as EEPROM. Because the semiconductor memory device 7 and the actuator 106 are formed on the same circuit board 610, the mounting process can be finished at one time during mounting the semiconductor memory device 7 and the actuator 106 on the ink cartridge 180C. Moreover, the working process during the manufacturing of the ink cartridge 180C and the recycling of the ink cartridge 180C can be simplified. Furthermore, the manufacturing cost of the ink cartridge 180C can be reduced because the numbers of the parts can be reduced.

The actuator 106 detects the ink consumption status inside the container 194. The semiconductor memory device 7 stores the information of ink such as residual quantity of ink detected by the actuator 106. That is, the semiconductor memory device 7 stores the information related to the characteristic parameter such as the characteristic of ink and the ink cartridge used for the actuator 106 when detecting the ink consumption status. The semiconductor memory device 7 previously stores the resonant frequency of when ink inside the container 194 is full, that is, when ink is filled in the container 194 sufficiently, or when ink in the container 194 is end, that is, ink in the container 194 is consumed, as one of the characteristic parameter. The resonant frequency when the ink inside the container 194 is full status or end status can be stored when the ink container is mounted on the ink jet recording apparatus for the first time. Moreover, the resonant frequency when the ink inside the container 194 is full status or end status can be stored during the manufacturing of the container 194. Because the unevenness of the detection of the residual quantity of ink can be compensated by storing the resonant frequency when the ink inside the container 194 is full status or end status in the semiconductor memory device 7 previously and reading out the data of the resonant frequency at the ink jet recording apparatus side, it can be accurately detected that the residual quantity of ink is decreased to the reference value.

Figure 47A:
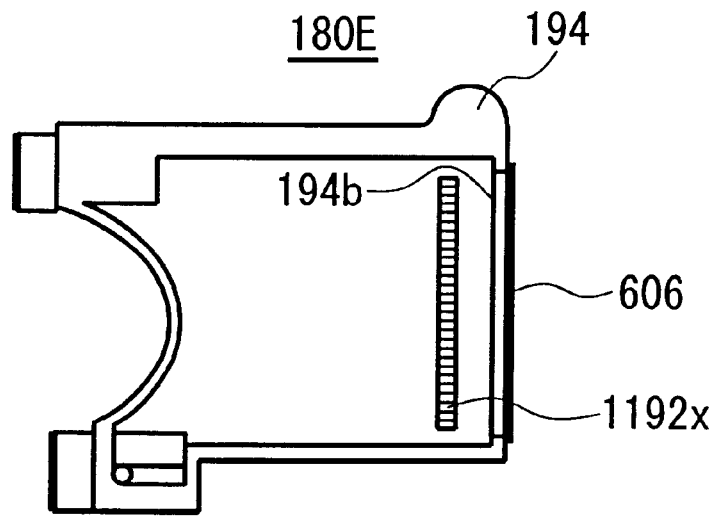
FIGS. 47(A) and 47(B) show further other embodiment of the ink cartridge 180.

FIG. 47 shows further other embodiment of the ink cartridge 180. The ink cartridge 180E shown in FIG. 47(A) mounts a actuator 606 which is long in vertical direction on the side wall 194b of the container 194. The wave preventing wall 1192x is provided inside the container 194 such that the wave preventing wall 1192x faces to the whole of the vibrating region of the actuator 106. The change of the residual quantity of ink inside the container 194 can be detected continuously by the actuator 606 which is long in vertical direction. The length of the actuator 606 is preferably longer than the half of the height of the side wall 194b. In FIG. 47(A), the actuator 606 has the length from the substantially from the top end to the bottom end of the side wall 194b. Therefore, the wave preventing wall 1192x also has a length substantially from the top end to the bottom end of the side wall 194b. By providing the wave preventing wall 1192x, the wave preventing wall 1192x prevents the wave of ink around the actuator 606 and prevents the malefaction of the actuator 606. Furthermore, the wave preventing wall 1192x prevents the bubble generated by the waving of ink to enter to the actuator 606.

Figure 47B:
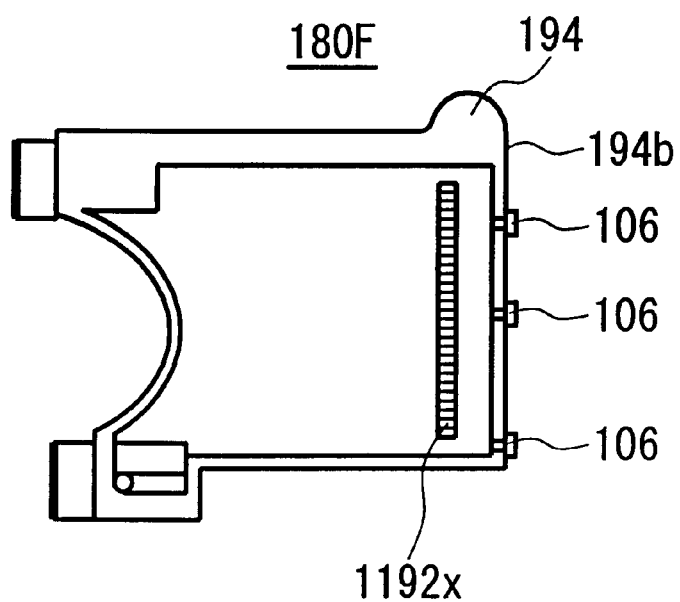

The ink cartridge 180F shown in FIG. 47(B) mounts a plurality of actuators 106 on the side wall 194b of the container 194 and comprises a wave preventing wall 1192x on the face of the plurality of actuators 606. The ink cartridge 180F further comprises the wave preventing wall 1192x, which is long in vertical direction, along the side wall 194b with predetermined gap with the side wall 194b inside the container 194. A gap which is filled with ink is formed between the actuator 106 and the wave preventing wall 1192x. Moreover, the gap between the wave preventing wall 1192x and the actuator 106 has a enough distance such that the gap does not hold ink by capillary force. When the container 194 is rolled, ink wave is generated inside the container 194 by the waving, and there is possibility that the actuator 106 malfunctions by detecting gas or an air bubble caused by the shock of the ink wave. As similar to the embodiment shown in FIG. 47(B), by providing the wave preventing wall 1192x, ink wave around the actuator 106 can be prevented so that the malfunction of the actuator 106 can be prevented. The wave preventing wall 1192x also prevents the air bubble generated by the waving of ink to enter to the actuator 106.

FIG. 48 shows further other embodiment of the ink cartridge 180. The ink cartridge 180G shown in FIG. 48(A) has a top wall 1080 and a bottom wall 1090, each of which is located on the upside and downside of the ink surface inside the container 194. A plurality of wave preventing walls 212a are extended from the top wall 1080 downward to the bottom wall 1090. Because each of lower end of the partition walls 212 and the bottom face of the container 194 has a predetermined gap, the bottom part of the container 194 communicates with each other. The ink cartridge 180G has a plurality of containing chambers 213 divided by the each of plurality of partition walls 212. The bottom part of the plurality of the containing chambers 213 communicates with each other. The actuator 106 is mounted on the side wall 1070 which faces to the ink supply port 187. The actuator 106 is arranged on substantially center of the top face 194c of the containing chamber 213 of the container 194. The volume of the containing chamber 213 is arranged such that the volume of the containing chamber 213 of the ink supply port 187 is the largest, and the volume of the containing chamber 213 gradually decreases as the distance from the ink supply port 187 increases to the inner part of the ink cartridge 180G. Therefore, the containing chamber 213 becomes wider towards from the actuator 106 mounting side of the containing chamber 213 to the ink supply port 187 side of the containing chamber 213.

Because ink is drained from the ink supply port 187, and air enters from the air introducing inlet 185, ink is consumed from the containing chamber 213 of the ink supply port 187 side to the containing chamber 213 of the inner part of the ink cartridge 180G. For example, the ink in the containing chamber 213 which is most near to the ink supply port 187 is consumed, and during the ink level of the containing chamber 213 which is most near to the ink supply port 187 decreases, the other containing chamber 213 are filled with ink. When the ink in the containing chamber 213 which is most near to the ink supply port 187 is consumed totally, air enters to the containing chamber 213 which is second by counted from the ink supply port 187, then the ink in the second containing chamber 213 is beginning to be consumed so that the ink level of the second containing chamber 213 begin to decrease. At this time, ink is filled in the containing chamber 213 which is third or more than third by counted from the ink supply port 187. In this way, ink is consumed from the containing chamber 213 which is most near to the ink supply port 187 to the containing chamber 213 which is far from the ink supply port 187 in order.

As shown above, because the actuator 106 is arranged on the containing chamber 213 that is farthermost from the ink supply port 187, the actuator 106 can detect the ink end. Furthermore, the plurality of wave preventing walls 212 can effectively prevent the waves of ink.

Figure 48A:
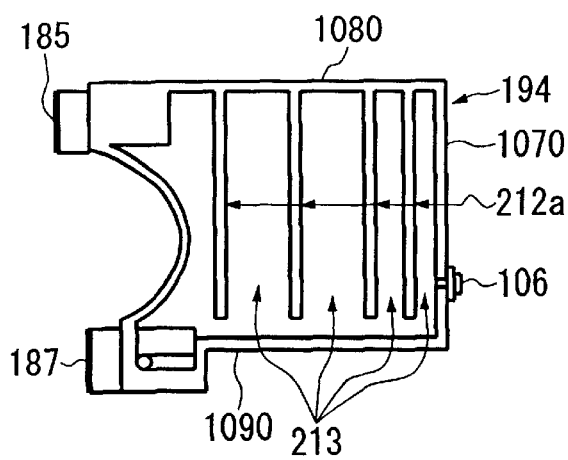
FIGS. 48(A) to 48(D) show further other embodiment of the ink cartridge 180.
Figure 48B:
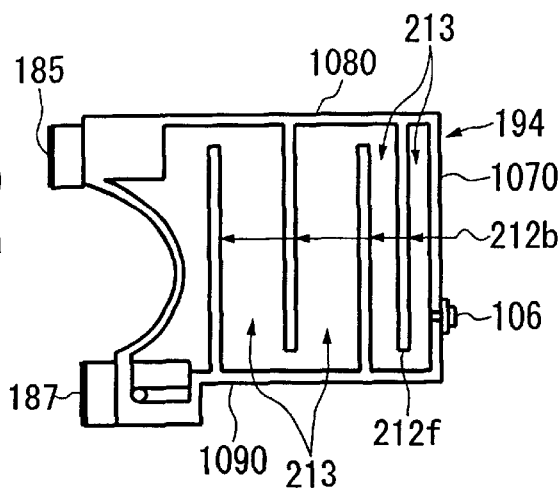

The ink cartridge 180H shown in FIG. 48(B) has a top wall 1080 and a bottom wall 1090, each of which is located on the upside and downside of the ink surface inside the container 194. A plurality of wave preventing walls 212b are extended from the top wall 1080 and the bottom wall 1090 alternately. There are gap between the partition wall 212b, which extends from the bottom wall 1090, among the plurality of the wave preventing wall 212b and the sidewall, not shown in the figure, located on width direction of the container 194. Therefore, the level of ink surface in each containing chamber 213 is equal.

Furthermore, among the plurality of wave preventing wall 212b, the wave preventing wall 212b which extends from the top wall 1090 and the side wall, not shown in the figure, located on width direction of the container 194 can be coupled liquid-tightly or air-tightly. In case the wave preventing wall 212b which is nearest to the actuator 106 among the plurality of wave preventing wall 212b extends from the top wall 1080, gas enters to the containing chamber 213 which is nearest to the actuator 106 when the level of ink surface inside the container 194 reaches to the lower end of the wave preventing wall 212b which is nearest to the actuator 106. Therefore, the level of ink surface for detecting the ink end is determined by the position of the lower end 212f to the level of ink surface along a vertical direction In the ink cartridge 180I shown in FIG. 48(C), the actuator 106 is mounted on the side wall 1070 around the boundary of the side wall 1070 and the top wall 1080. The ink cartridge 180I includes at least two containing chambers of containing chamber 213a and containing chamber 213b which are partitioned by the wave preventing wall 212c. Among two containing chambers, a negative pressure generating member 1100 which generates a negative pressure is provided on the supply port side containing chamber 213a which is relatively near to the ink supply port 187. Among two containing chambers, the actuator 106 is provided on the inner side containing chamber 213b which is relatively far from the ink supply port 187.

Figure 48C:
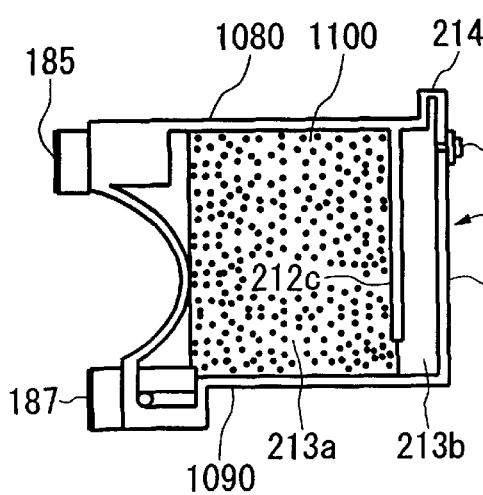

A buffer 214 is formed on the top wall 1080 of the containing chamber 213b The buffer 214 is a concave part which accepts the bubble which enters into the ink cartridge 180I when the ink cartridge 180I is manufactured or when the ink cartridge 180I is left for a long period without to be used. In FIG. 48(C), the buffer 214 is formed as a concave part which overhangs from the side wall 194b of the container 194. Because the negative pressure generating member 1100 and the buffer 214 accepts the bubbles enters inside the containing chamber 213b, the negative pressure generating member 1100 and the buffer 214 can prevent the malfunction of the actuator 106 such as detecting the ink end by the attaching of bubbles on the actuator 106. Furthermore, the ink quantity which can be consumed after detecting the ink end can be changed by changing the capacity of containing chamber 213b and the length of the wave preventing wall 212c.

Figure 48D:
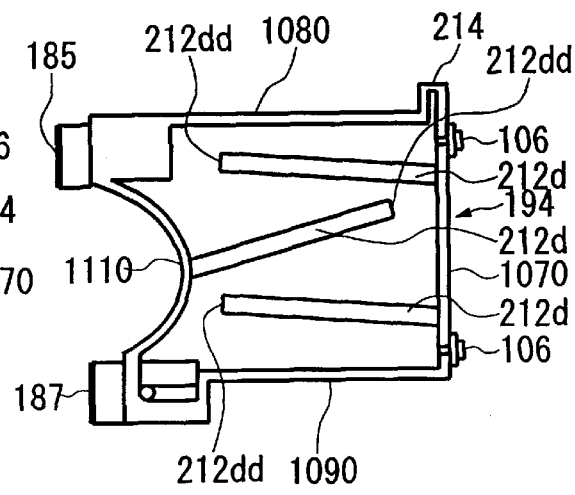

In the ink cartridge 180J shown in FIG. 48(D), a plurality of wave preventing walls 212d are extended from the side wall 1070 and the side wall 1110 of the container 194 alternately. Furthermore, each of one end 212d of each of the wave preventing wall 212d is sloped toward the upside of ink surface. Moreover, A gap, in a degree which can pass through ink, is provided between the each of wave preventing walls 212d and the side wall, not shown in the figure, which intervene between the side wall 1070 of the container 194 and the side wall 1110. Therefore, ink does not remain on the wave preventing wall 212d. A plurality of actuators 106 are mounted on the side wall 1070 which extends substantially vertically to ink surface among the wall of container 194. A plurality of actuators 106 is mounted on the different height to the ink surface with each other. Thereby the actuator 106 can detect the ink consumption status step by step. In the present embodiment, the buffer 214 is provided around the side wall 1070 of the actuator 106 mounting side among the top wall 1080.

Figure 49:
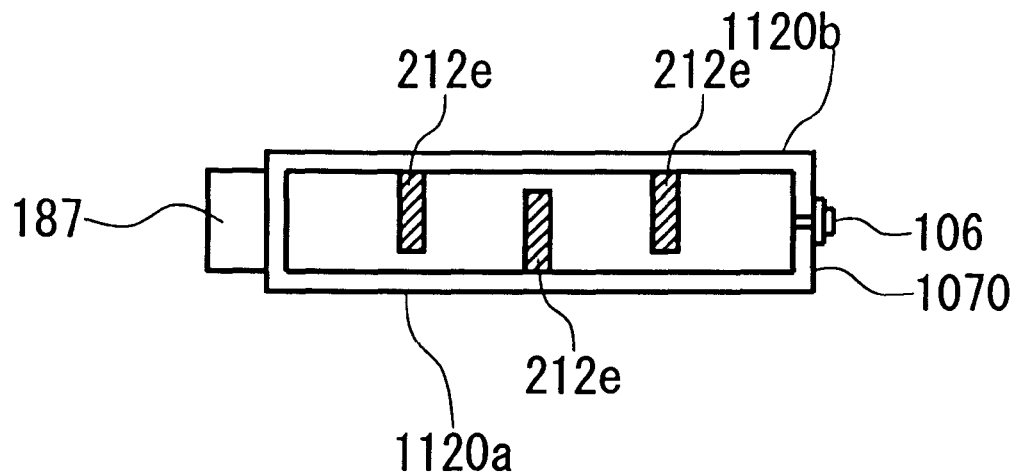
FIG. 49 shows a plan cross sectional view of the further another embodiment of the ink cartridge according to the present invention.

FIG. 49 shows a plan cross sectional view of the further another embodiment of the ink cartridge according to the present invention. In the ink cartridge 180K of the present embodiment, the actuator 106 is mounted on the side wall 1070 which faces to the ink supply port 187. Each of a plurality of wave preventing wall 212e extends from the first side wall 1120a and the second side wall 1120b, which intervene between side wall 1070 and the side face where the ink supply port 187 is provided, alternatively. By the plurality of wave preventing wall 212e which extends from the side wall 1120a and the 1120b, the actuator 106 is effectively protected from the wave of ink and the generation of the bubbles is suppressed.

Figure 50:
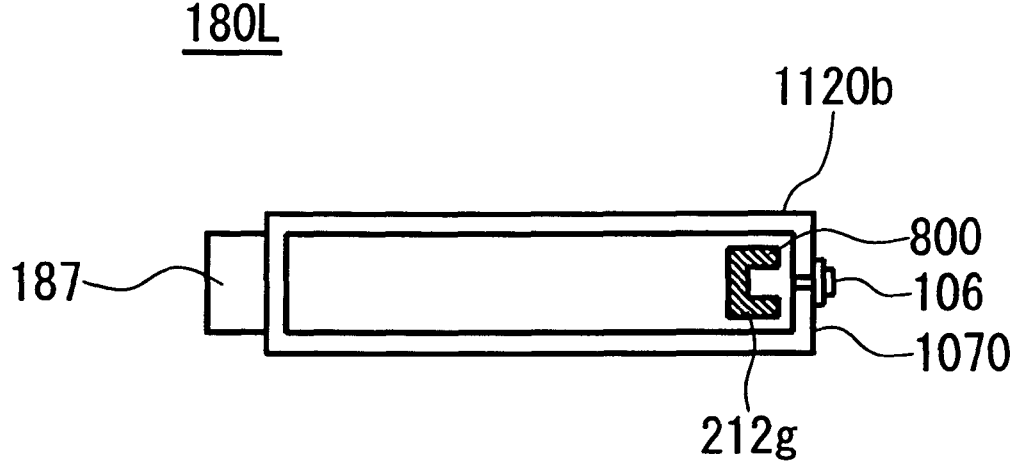
FIG. 50 shows a plan cross sectional view of the further another embodiment of the ink cartridge according to the present invention.

FIG. 50 shows a plan cross sectional view of the further another embodiment of the ink cartridge according to the present invention. In the ink cartridge 180L of the present embodiment, the actuator 106 is mounted on the side wall 1070 which faces to the ink supply port 187. The wave preventing wall 212g includes a bending part 800, at least a part of the end of the wave preventing wall of which is bent toward the side wall 1070 where the actuator 106 is mounted. A capillary force does not work between the wave preventing wall 212g and the actuator 106. Furthermore, a gap, on which a capillary force works, is provided between the bending part 800 and the side wall 1070. Therefore, the entering of the bubbles between the actuator 106 and the wave preventing wall 212g can be prevented. The ink level around the actuator 106 is equal to the other ink level in the ink cartridge 180L. Therefore, the actuator 106 can accurately detect the ink consumption status inside the ink cartridge 180L.

FIG. 51 shows other embodiment of the ink cartridge using the actuator 106. The ink cartridge 220A shown in FIG. 51(A) has a first wave preventing wall 222 provided such that it extends from the top wall 1081, which locates upside of the ink surface, downward to the ink surface among the wall of the ink cartridge 220A. Because there is a predetermined gap between the lower end of the first wave preventing wall 222 and the bottom wall 1091 of the ink cartridge 220A, ink can flows into the ink supply port 230 through the bottom face of the ink cartridge 220A. A second wave preventing wall 224 is formed such that the second wave preventing wall 224 extends upward from the bottom face of the ink cartridge 220A on the ink supply port 230 side of the first wave preventing wall 222. Because there is a predetermined gap between the upper end of the second wave preventing wall 224 and the top face of the ink cartridge 220A, ink can flows into the ink supply port 230 through the top face of the ink cartridge 220A.

A ventilation side ink chamber 225a is formed on the inner part of the first wave preventing wall 222, seen from the ink supply port 230, by the first wave preventing wall 222. On the other hand, a detection side ink chamber 225b is formed on the front side of the second wave preventing wall 224, seen from the ink supply port 230, by the second wave preventing wall 224. The volume of the ventilation side ink chamber 225a is larger than the volume of the detection side ink chamber 225b. A detection side small ink chamber 227 is formed by providing a gap, which can generate the capillary phenomenon, between the first wave preventing wall 222 and the second wave preventing wall 224. Therefore, the ink in the ventilation side ink chamber 225a is collected to the detection side small ink chamber 227 by the capillary force of the detection side small ink chamber 227. Therefore, the detection side small ink chamber 227 can prevent that the air or air bubble enters into the detection side ink chamber 225b. Furthermore, the ink level in the detection side ink chamber 225b can decrease steadily and gradually. Because the ventilation side ink chamber 225a is formed at more inner part of the detection side ink chamber 225b, seen from the ink supply port 230, the ink in the detection side ink chamber 225b is consumed after the ink in the ventilation side ink chamber 225a is consumed.

The actuator 106 is mounted on the side wall 1071 of the ink cartridge 220A of the ink supply port 230 side, that is, the side wall 1071 of the detection side ink chamber 225b of the ink supply port 230 side. The actuator 106 detects the ink consumption status inside the detection side ink chamber 225b. The residual quantity of ink at the timing closed to the ink near end can be detected stably by mounting the actuator 106 on the side wall 1071 of the detection side ink chamber 225b. Furthermore, by changing the height of the mounting position of the actuator 106 on the side wall 1071 of the detection side ink chamber 225b, the timing to determine which ink residual quantity as an ink end can be freely set. Because ink is sullied from the ventilation side ink chamber 225a to the detection side ink chamber 225b by the detection side small ink chamber 227, the actuator 106 does not influenced by the waving of ink caused by the waving of the ink cartridge 220A, and actuator 106 can thus reliably measure the ink residual quantity. Furthermore, because the detection side small ink chamber 227 holds ink, the detection side small ink chamber 227 can prevent ink to flow backward from the detection side ink chamber 225b to the ventilation side ink chamber 225a.

A check valve 228 is provided on the top face of the ink cartridge 220A. The leaking of ink outside of the ink cartridge 220A caused by the waving of the ink cartridge 220A can be prevented by the check valve 228. Furthermore, the evaporation of ink from the ink cartridge 220A can be prevented by providing the check valve 228 on the top face of the ink cartridge 220A. If ink in the ink cartridge 220A is consumed, and negative pressure inside the ink cartridge 220A exceeds the pressure of the check valve 228, the check valve 228 opens and introduces air into the ink cartridge 220A. Then the check valve 228 closes to maintain the pressure inside the ink cartridge 220A to be stable.

FIG. 51(C) and (D) shows a detailed cross-section of the check valve 228. The check valve 228 shown in FIG. 51(C) has a valve 232 which includes flange 232a formed by rubber. An air hole 233, which communicates air between inside and outside of the ink cartridge 220, is provided on the ink cartridge 220 such that the airhole 233 faces to the flange 232a. The airhole 233 is opened and closed by the flange 232a. The check valve 228 opens the flange 232a inward the ink cartridge 220 when the negative pressure in the ink cartridge 220 exceeds the pressure of the check valve 228 by the decrease of ink inside the ink cartridge 220A, and thus the air outside the ink cartridge 220 is introduced into the ink cartridge 220. The check valve 228 shown in FIG. 51(D) has a valve 232 formed by rubber and a spring 235. If the negative pressure inside the ink cartridge 220 exceeds the pressure of the check valve 228, the valve 232 presses and opens the spring 235 to introduce the outside air into the ink cartridge 220 and then closes to maintain the negative pressure inside the ink cartridge 220 to be stable.

The ink cartridge 220B shown in FIG. 51(B) has a porous member 242 in the ventilation side ink chamber 225a instead of providing the check valve 228 on the ink cartridge 220A as shown in FIG. 51(A). The porous member 242 holds the ink inside the ink cartridge 220B and also prevents ink to be leaked outside of the ink cartridge 220B during the waving of the ink cartridge 220B.

Figure 52:
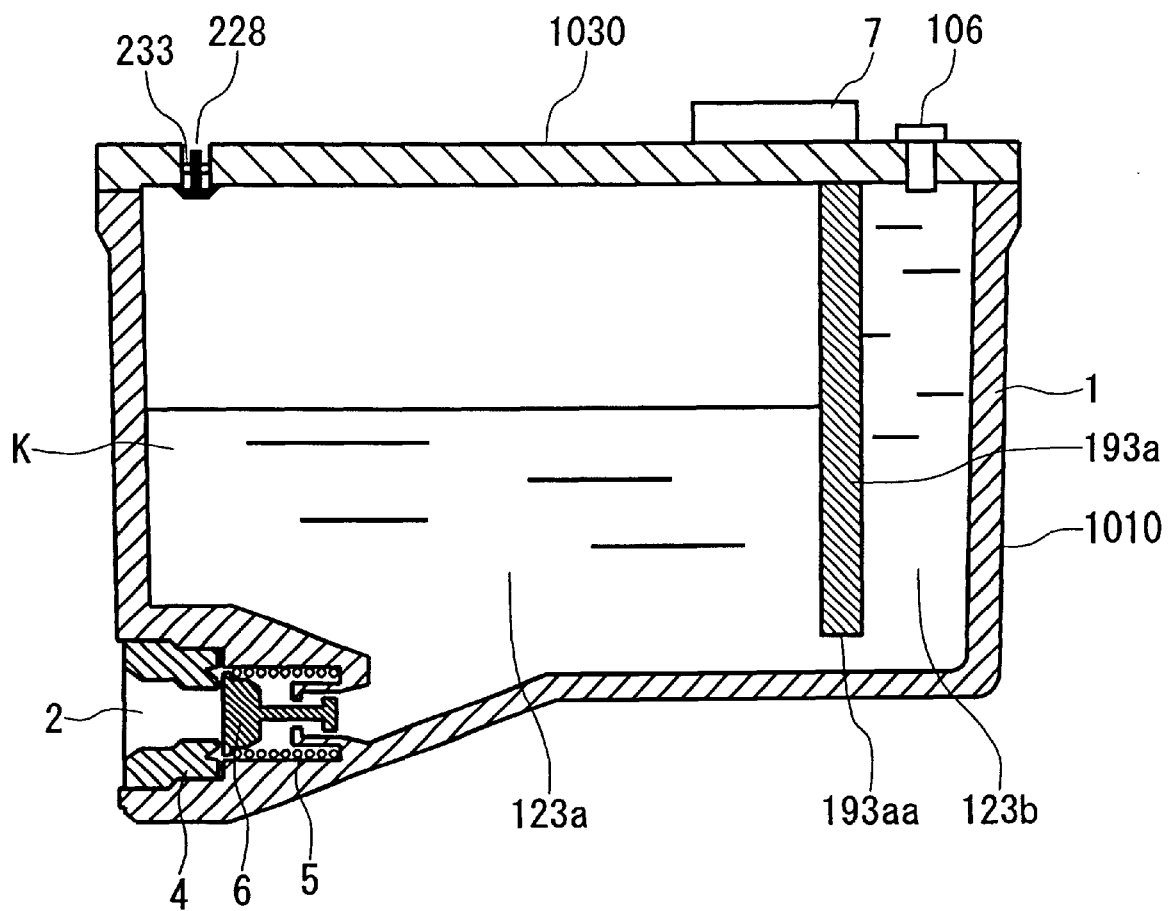
FIG. 52 is a cross sectional view of an embodiment of an ink cartridge as an embodiment of the liquid container according to the present invention.

FIG. 52 is a cross sectional view of an embodiment of an ink cartridge for use with a single color, for example, the black ink as an embodiment of the liquid container according to the present invention. An ink cartridge shown in FIG. 52 is based on the method that detects the position of the liquid surface or an existence of liquid inside a liquid container by detecting a resonant frequency by measuring the counter electromotive force generated by the residual vibration remained in the vibrating section among the above mentioned method. The actuator 106 is used for an embodiment of the liquid censor that detects liquid. The ink cartridge of the embodiment shown in FIG. 52 comprises a container 1 which contains liquid K and includes top wall 1030 located upside of the liquid surface of ink K, an ink supply port 2 which supplies liquid K outside the container 1, an actuator 106 which detects ink consumption status inside the container 1, and a first partition wall 193a which partitions at least two ink chamber such that ink K in both of the ink chamber can communicate with each other inside the container 1. At least two ink chambers include a ventilation side ink chamber 123a which communicate with atmosphere and the detecting side ink chamber 123b. The actuator 106 is mounted on the top wall 1030 of the ink chamber 123b.

The airhole 233 is provided on the top wall 1030 of the ventilation side ink chamber 123a which ventilates with atmosphere. The check valve 228 shown in FIG. 56 can be used for airhole 233. However, the form of the airhole 233 is not limited to the check valve 228 shown in FIG. 56. If ink K is consumed and the container 1 inside becomes extremely negative pressure, air is introduced to the ventilation side ink chamber 123a from the outside of the container 1 by the airhole 233, and the airhole 233 thus prevents the pressure inside the container 1 to be negative. Therefore, with the consumption of ink advanced, air is introduced to the ventilation side ink chamber 123a through the airhole 233, and the level of liquid surface of ink K decreases.

The partition wall 193a is coupled with the top wall 1030 liquid-tightly. Therefore, even the ink is consumed, ink K is filled in the detection side ink chamber 123b in the container 1 until the level of liquid surface of ink K reaches to the lower end 193aa of the partition wall 193a. When the ink consumption advances and the level of liquid surface of ink K reaches to the lower end 193aa of the partition wall 193a, gas enters to the detection side ink chamber 123b. Thereby the ink k remained in the detection side ink chamber 123b flows out to the ink supply port 2, and the medium existed around the actuator 106 changes from ink K to atmosphere. Therefore, the actuator 106 can detect that the status inside the ink cartridge is in ink end status. Thus, it is the lower end 193aa to determine which level of the liquid surface of ink K to be a ink end. Furthermore, the volume of the detection side ink chamber 132b is determined by the width between the side wall 1010, which extends substantially vertical to the ink surface, and the partition wall 193a. Therefore, the ink quantity remains inside the container 1 when detecting the ink end can be set by the width between the side wall 1010 and the partition wall 193a and the height of the lower end 193aa in the direction vertical to the ink surface.

The volume of the detection side ink chamber 123b is preferably half or smaller than half of the volume of the ventilation side ink chamber 123a. A capillary force such as to hold ink K does not work on the detection side ink chamber 123b.

The actuator 106 can be used as a means of merely detecting the vibration without vibrating itself. Moreover, the detailed configuration of the airhole will be described in FIG. 56.

Figure 54:
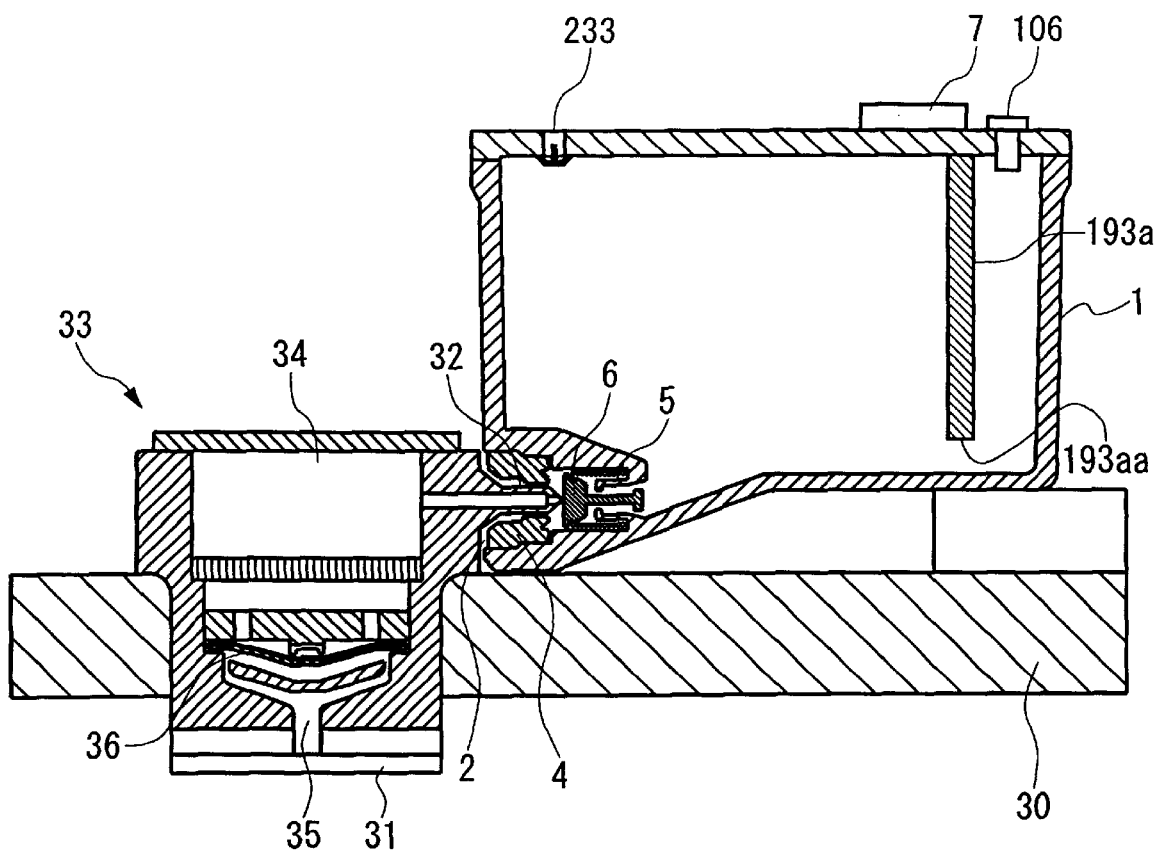
FIG. 54 is a cross sectional view showing an embodiment of a major part of the ink-jet recording apparatus suitable for the ink cartridge shown in FIG. 52 and FIG. 53.

A packing ring 4 and a valve body 6 are provided in the ink supply port 2. Referring to FIG. 54, the packing ring 4 is engaged with the ink supply needle 32 communicating with a recording head 31, in a fluid-tight manner. The valve body 6 is constantly and elastically contacted against the packing ring 4 by way of a spring 5. When the ink supply needle 32 is inserted, the valve body 6 is pressed by the ink supply needle 32 so as to open an ink passage, so that ink inside the container 1 is supplied to the recording head 31 via the ink supply port 2 and the ink supply needle 32. On an upper wall of the container 1, there is mounted a semiconductor memory means 7 which stores data on ink inside the ink cartridge.

If there is no partition wall 193a in the container 1, bubbles may be generated by the waving of ink, which is caused by the vibration of ink cartridge generated by such as the scanning operation during the printing process. Then, there is a danger that the actuator 106 may detect mistakenly that there is enough ink in the container 1 if the ink attaches to the actuator 106 by the waving of ink even if there is little amount of ink in the container 1. Moreover, there is also a danger that the actuator 106 may detect mistakenly that there is no ink if the bubble attaches to the actuator 106 even if the ink is filled in the container 1.

However, according to the embodiment of the liquid container of the present embodiment, the partition wall prevents the waving of ink around the piezoelectric device even when the ink cartridge vibrates by such as the scanning operation during the printing process. By preventing the waving of ink around the piezoelectric device, the partition wall 193a prevents the generation of the bubbles. Furthermore, even the bubbles generate in the ventilation side ink chamber, the partition wall separates the ventilation side ink chamber and the detection side ink chamber airtightly and liquid-tightly. Therefore, the partition wall prevents the bubbles to move close to the actuator 106 and contact with the actuator 106.

There is no limitation of the size, thickness, shape, flexibility, and material for the partition wall. Therefore, the size of the partition wall can be made relatively larger or smaller. The thickness of the partition wall can be made relatively thicker or thinner. Furthermore, the shape of the partition wall can be square or rectangular. Preferably the shape, size and thickness of the partition wall is changed according to the shape of the ink cartridge. Furthermore, the partition wall can be made from the hard material or flexible material. For example, material such as plastic, tefron, nylon, polypropylene, or PET can be used for the partition wall. Preferably, the partition wall is made from the air-tight or liquid-tight material which does not pass through gas or liquid. Moreover, the container and the partition wall are made from same material so that the container and the partition wall can be formed in one body. The manufacturing process of the ink cartridge can thereby be reduced.

Figure 53:
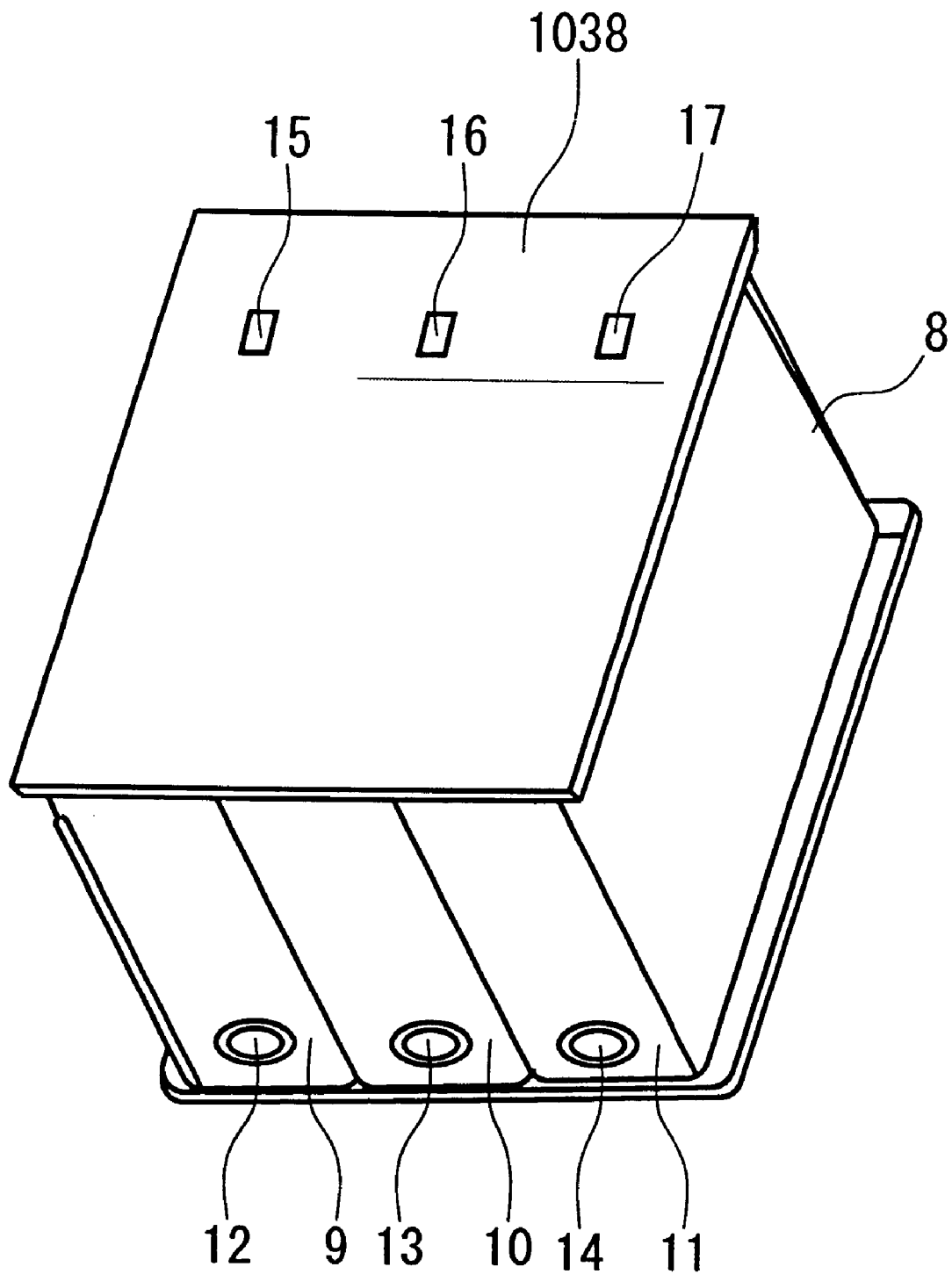
FIG. 53 is a perspective view of the ink cartridge which stores plural types of inks, viewed from an outside thereof, according to an embodiment.

FIG. 53 is a perspective view of the ink cartridge which stores plural types of inks, viewed from an outside thereof, according to an embodiment. FIG. 53 is a perspective view from the side of the top wall 1038 which is located upside of the liquid surface of ink K among the wall of the container 8. A container 8 is divided into three ink chambers 9, 10 and 11. Ink supply ports 12, 13 and 14 are formed for the respective ink chambers. On a top wall 1038 of the respective ink chambers 9, 10 and 11, the respective actuators 15, 16 and 17 are mounted on the container 8 so that the actuators 15, 16, and 17 can contact with the ink which is housed in each ink chambers via the through hole, not shown in the figure, provided on the container 8. Partition walls, not shown in the figure, is provided each of inside of the ink container 9, 10 and 11 as similar to the ink cartridge shown in FIG. 52. The partition walls provided in each of ink chambers 9, 10, and 11 separates the each ink chambers 9, 10, and 11 into ventilation side ink chamber and detection side ink chamber.

FIG. 54 is a cross sectional view showing an embodiment of a major part of the ink-jet recording apparatus suitable for the ink cartridge shown in FIG. 52 and FIG. 53. A carriage 30 capable of reciprocating in the direction of the width of the recording paper is equipped with a subtank unit 33, while the recording head 31 is provided in a lower face of the subtank unit 33. Moreover, the ink supply needle 32 is provided in an ink cartridge mounting face side of the subtank unit 33. In FIG. 54, the ink cartridge shown in FIG. 52 and FIG. 53 are used. However, the ink cartridge shown in other figures also can be used.

When the ink supply port 2 of the container 1 is inserted through the ink supply needle 32 of the subtank unit 33, the valve body 6 recedes against the spring 5, so that an ink passage is formed and the ink inside the container 1 flows into the ink chamber 34. At a stage where the ink chamber 34 is filled with ink, a negative pressure is applied to a nozzle opening of the recording head 31 so as to fill the recording head with ink. Thereafter, the recording operation is performed.

When the ink is consumed in the recording head 31 by the recording operation, a pressure in the downstream of the flexible valve 36 decreases. Then, the flexible valve 36 is positioned away from a valve body 38 so as to become opened. When the flexible valve 36 is opened, the ink in the ink chamber 34 flows into the recording head 31 through the ink passage 35. Accompanied by the ink which has flowed into the recording head 31, the ink in the container 1 flows into the subtank unit 33 via the ink supply needle 32.

Figure 55:
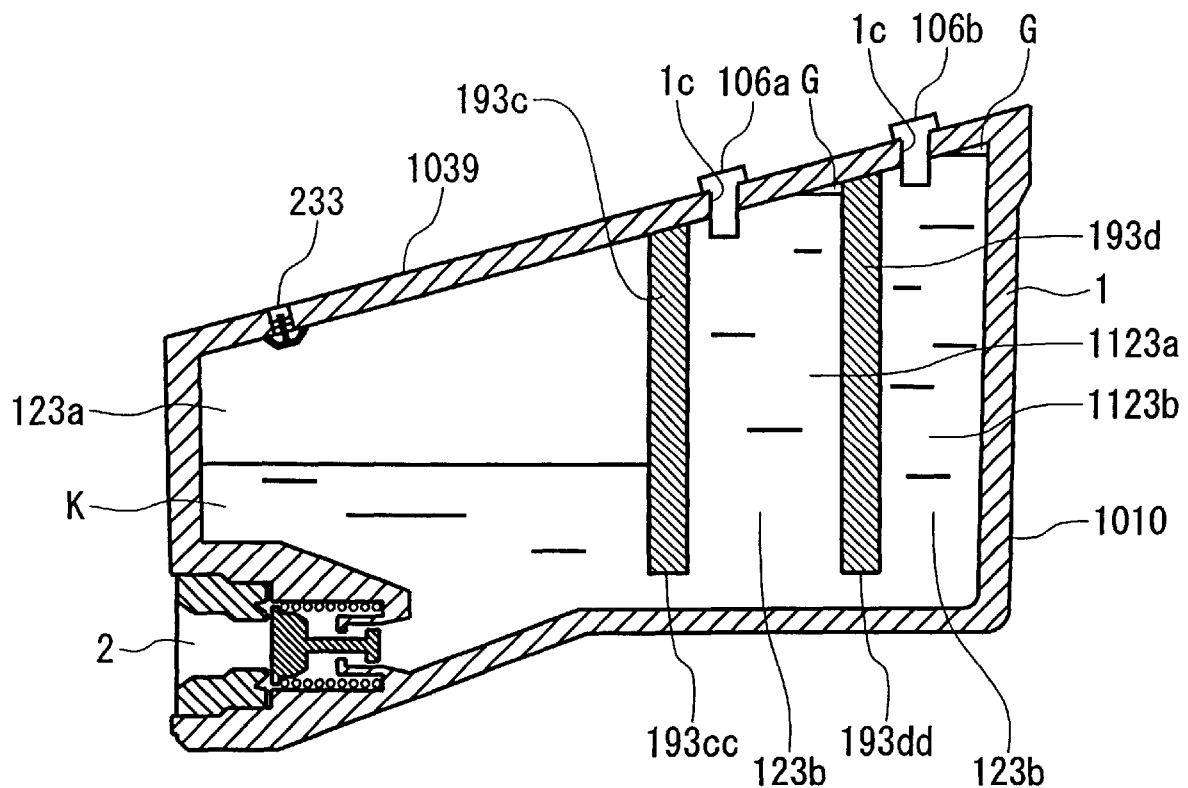
FIG. 55 is a cross sectional view of an another embodiment of an ink cartridge as an embodiment of the liquid container according to the present invention.

FIG. 55 is a cross sectional view of an another embodiment of an ink cartridge as an embodiment of the liquid container according to the present invention. In an ink cartridge of the present embodiment, a top wall 1039, which locates upside of the liquid surface of ink K, is sloped to the liquid surface of ink K. The actuators 106 are mounted on the top wall 1039 such that the actuator 106 can contacts with ink through the through hole 1c provided on the top wall 1039. The partition wall 193c extends from the top wall 1039 downward to the ink surface. Furthermore, the present embodiment has a second partition wall 193d which extends from the top wall 10398 inside the detection side ink chamber 123b and separates the detection side ink chamber 123b at least into two detection side small ink chambers 1123a and 1123b such that ink housed in both of the detection side small ink chamber 1123a and 1123b can communicate each other. Each of two actuators 106a and 106b is mounted on the top wall 1039 of each of the detection side small ink chambers 1123a and 1123b, respectively.

The volume of the ventilation side ink chamber 123a which is close to the ink supply port 2 is larger than the volume of the detection side ink chamber 123b which is relatively far from the ink supply port 2. Furthermore, the volume of the detection side small ink chamber 1123a which is close to the ink supply port 2 is larger than the volume of the detection side small ink chamber 1123b which is relatively far from the ink supply port 2 within the detection side ink chamber 123b. Therefore, ink in the ventilation side ink chamber 123a is consumed at first. With consumption of ink advanced, the level of ink surface in the ventilation side ink chamber 123a decreases. On the other hand, because the partition wall 193cc and the top wall 1039 is coupled liquid-tightly or air-tightly, the detection side ink chamber 123b is filled with ink until the level of ink surface reaches to the lower end 193cc of the partition wall 193c.

Next, if the ink surface in the ventilation side ink chamber 123a reaches to the lower end 193cc of the partition wall 193c, ink in the detection side small ink chamber 1123a is beginning to be consumed because ink in the detection side small ink chamber 1123a flows out to the ink supply port 2. With consumption of ink advanced, the level of ink surface in the detection side small ink chamber 1123a decreases. On the other hand, because the partition wall 193dd and the top wall 1039 is coupled liquid-tightly or air-tightly, the detection side small ink chamber 1123b is filled with ink until the level of ink surface reaches to the lower end 193dd of the partition wall 193d. Finally, if the level of ink surface of the detection side small ink chamber 1123a reaches to the lower end 193dd of the partition wall 193d, ink in the detection side small ink chamber 1123b is beginning to be consumed because ink in the detection side small ink chamber 1123b flows out to the ink supply port 2.

Therefore, the actuators 106a and 106b can detect the ink consumption status step by step. Moreover, because the volume of the ink chambers are designed such that the volume decreases from the ventilation side ink chamber 123a, which is nearest to the ink supply port 2, to the detection side small ink chamber 1123a and further to the detection side small ink chamber 1123b, which is farthest from the ink supply port 2, the frequency of detecting an ink by the actuators 106a and 106b increases with the advance of ink consumption. Therefore, the frequency of detection of ink increases with the decreasing of residual quantity. of ink.

The container of the ink cartridge shown in FIG. 55 has one second partition wall. As other embodiment, the container can have a plurality of partition walls so that the detection side ink chamber 123b is separated into three or over detection side small ink chambers. A plurality of second partition walls separates the detection side ink chamber 123b into two or over detection side small ink chambers. Each of the volumes of the of the detection side small ink chambers 1123b can be varied gradually from the one side of the side wall to the other side of side wall which faces each other. Preferably, as shown in FIG. 55, each of the volume of the detection side small ink chambers decreases gradually from the detection side small ink chamber, which is relatively near to the ink supply port 2, to the detection side small ink chamber, which is relatively far from the ink supply port 2. Then, the actuator 106 can detects the process of gradual consumption of ink K inside the ink cartridge.

Moreover, because the volume of the ink chambers are designed such that the volume decreases from the detection side small ink chamber 1123a, which is near to the ink supply port 2, to the detection side small ink chamber, which is far from the ink supply port 2, the time interval of detecting a decrease of ink by the actuator 106 gradually decreases as the ink cartridge shown in FIG. 55. Therefore, the frequency of detection of ink increases with the decreasing of residual quantity of ink.

Furthermore, the actuator 106a is mounted nearby the partition wall 193c, and the actuator 106b is mounted nearby the partition wall 193d. Therefore, even if the bubble G generates and enters into the detection side ink chamber 123b when the ink inside the ventilation side ink chamber 123a does not reach to the lower end 193cc of the partition wall 193c, the bubble G stays in the upper side of boundary between the top wall 1039 and the partition wall 193c or the upper side of boundary between the top wall 1039 and the side wall 1030. Therefore, the bubble G does not attaches to the actuator 106.

Figure 56:
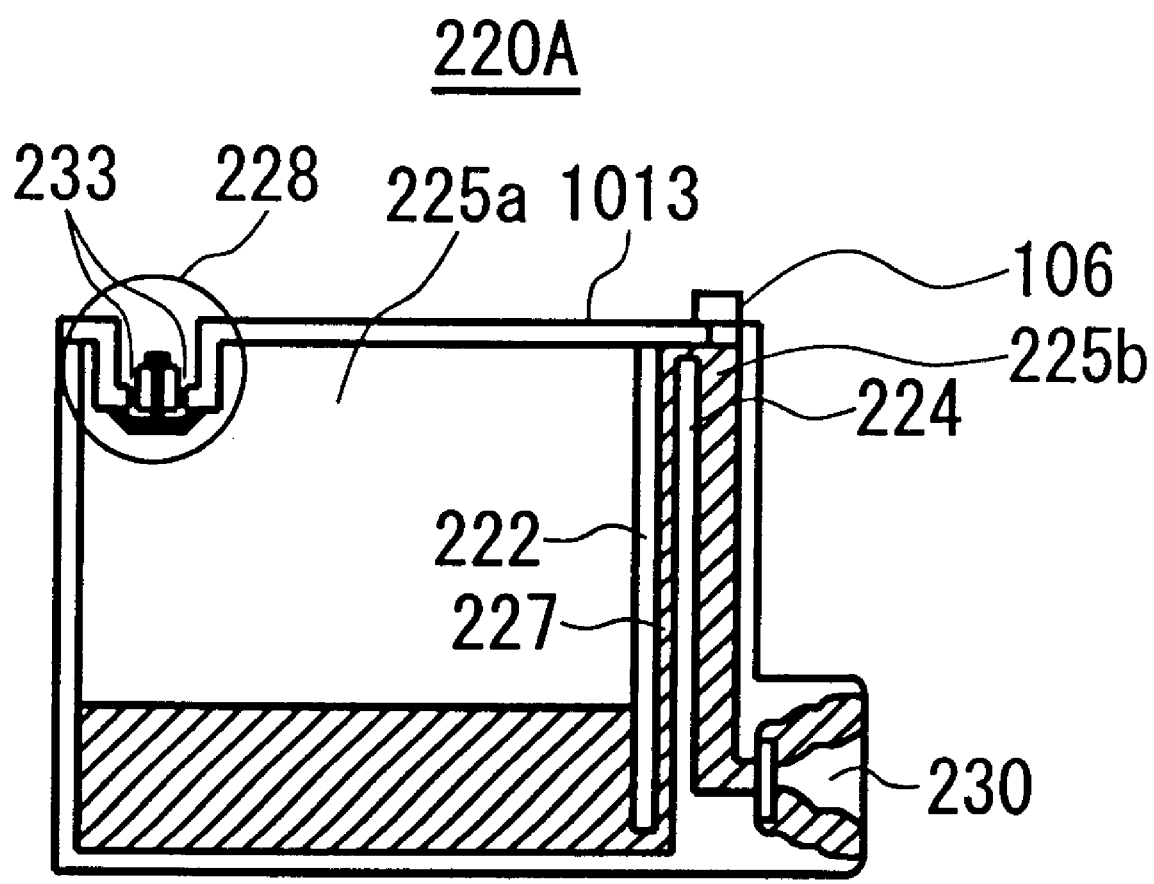
FIG. 56 shows further other embodiment of the ink cartridge using the actuator 106.

FIG. 56 shows further other embodiment of the ink cartridge using the actuator 106. The ink cartridge 220A shown in FIG. 56(A) has a first partition wall 222 provided such that it extends downward from the top face of the ink cartridge 220A. Because there is a predetermined space between the lower end of the first partition wall 222 and the bottom face of the ink cartridge 220A, ink can flows into the ink supply port 230 through the bottom face of the ink cartridge 220A. A second partition wall 224 is formed such that the second partition wall 224 extends upward from the bottom face of the ink cartridge 220A on the more ink supply port 230 side of the first partition wall 222. Because there is a predetermined space between the upper end of the second partition wall 224 and the top face of the ink cartridge 220A, ink can flows into the ink supply port 230 through the top face of the ink cartridge 220A.

A ventilation side ink chamber 225a is formed relatively near to the airhole 233. On the other hand, a detection side ink chamber 225b is formed relatively far from the airhole 233. By the second partition wall 224, the detection side ink chamber 225b and a detection side small ink chamber 227 are formed. The volume of the ventilation side ink chamber 225a is larger than the volume of the detection side ink chamber 225b. A detection side small ink chamber 227 is formed by providing a gap, which can generate the capillary phenomenon, between the first partition wall 222 and the second partition wall 224. Therefore, the ink in the ventilation side ink chamber 225a is collected to the detection side small ink chamber 227 by the capillary force of the detection side small ink chamber 227. The first partition wall 222 can prevent that the gas or air bubble to enter into the detection side ink chamber 225b. Furthermore, the ink level in the detection side ink chamber 225b can decrease steadily and gradually. Because the ventilation side ink chamber 225a is formed at more inner part of the detection side ink chamber 225b, seen from the ink supply port 230, the ink in the detection side ink chamber 225b is consumed after the ink in the ventilation side ink chamber 225a is consumed.

Because ink is supplied from the ventilation side ink chamber 225a to the detection side ink chamber 225b by the detection side small ink chamber 227, the actuator 106 does not influenced by the rolling of ink caused by the rolling of the ink cartridge 220A, and actuator 106 can thus reliably measure the ink residual quantity. Furthermore, because the detection side small ink chamber 227 holds ink, the detection side small ink chamber 227 can prevent ink to flow backward from the detection side ink chamber 225b to the ventilation side ink chamber 225a.

The actuator 106 is mounted on the top wall 1013 of the ink supply port 230 side of the detection side ink chamber 225b. The actuator 106 detects the ink consumption status inside the detection side ink chamber 225b. The residual quantity of ink at the timing closed to the ink near end can be detected stably by mounting the actuator 106 on the side wall of the detection side ink chamber 225b.

A airhole 233 is provided on the top wall 1013 of the ink cartridge 220A. Moreover, a check valve 228 is provided on the airhole 233. The leaking of ink outside the ink cartridge 220A caused by the rolling of the ink cartridge 220A can be prevented by the check valve 228. Furthermore, the evaporation of ink from the airhole 233 of the ink cartridge 220A can be prevented by providing the check valve 228 on the top face of the ink cartridge 220A. If ink in the ink cartridge 220A is consumed, and negative pressure inside the ink cartridge 220A exceeds the pressure of the check valve 228, the check valve 228 opens and introduces air into the ink cartridge 220A. Then the check valve 228 closes to accelerate the drainage of ink from the ink cartridge 220A.

Figure 57:
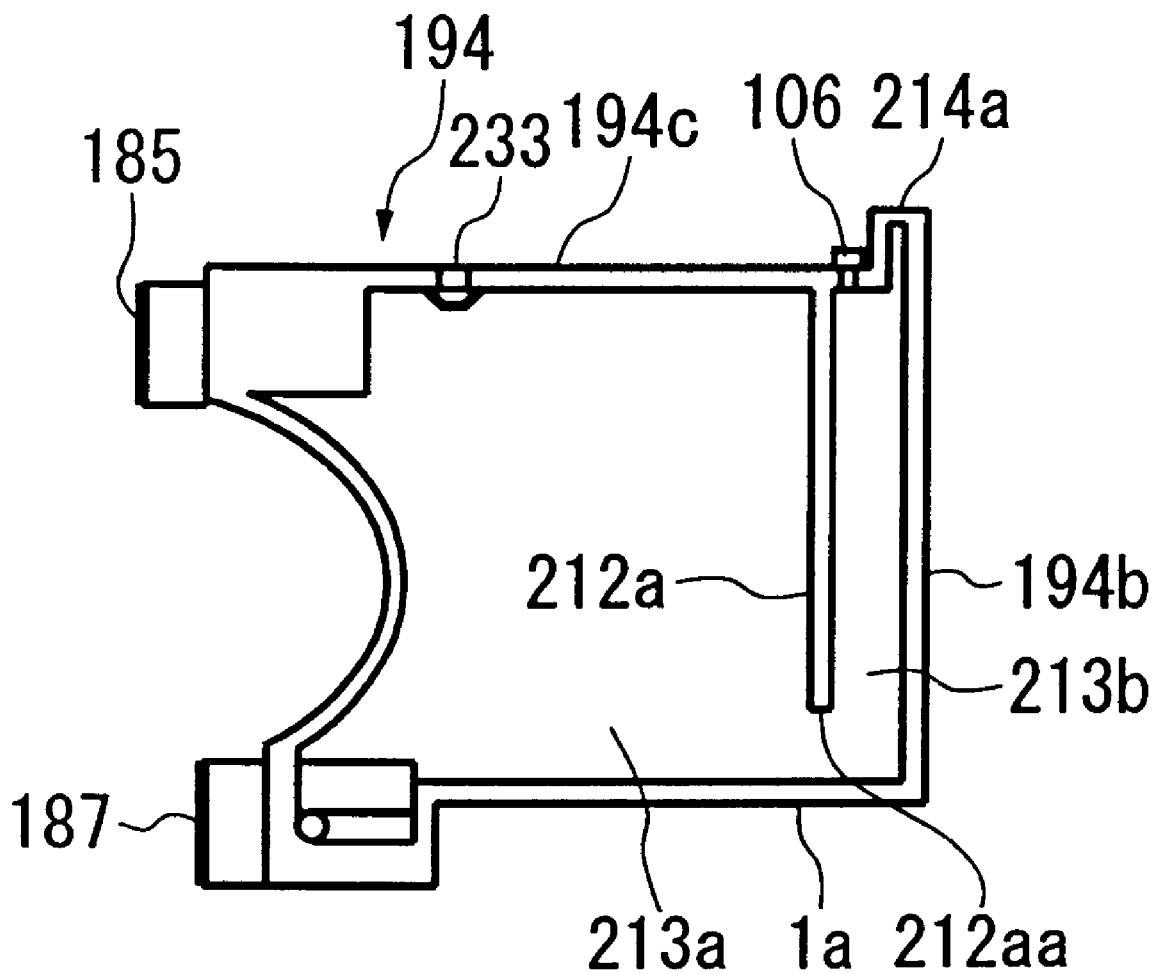
FIG. 57 shows further another embodiment of the ink cartridge using the actuator 106.

FIG. 57 shows further another embodiment of the ink cartridge using the actuator 106. An ink cartridge 180A shown in FIG. 57 has a partition wall 212a which extends downward from the top face 194c of the ink container 194. The container 194 is separated into a ventilation side ink chamber 213a and a detection side ink chamber 213b by the partition wall 212a. Because lower end 212aa of the partition wall 212a and the bottom wall 1a of the container 194 have a predetermined space, the ventilation side ink chamber 213a and the detection side ink chamber 213b communicates with each other. The actuator 106 is mounted on the top wall 194c of the detection side ink chamber 213b. The volume of the detection side ink chamber 213b is smaller than the volume of the ventilation side ink chamber 213a. The volume of the detection side ink chamber 213b is preferably smaller than the half of the volume of the ventilation side ink chamber 213a.

A buffer 214a, that is a concave part for accepting the air bubble which enters to the ink cartridge 180A is formed on the top wall 194c of the detection side ink chamber 213b. In FIG. 57, the buffer 214a is formed as a concave part overhang upward from the top wall 194c of the container 194. The buffer 214a accepts the air bubble which enters into the detection side ink chamber 213b mistakenly when the ink is filled in the detection side ink chamber 213b. The buffer 214a thereby prevents the bubbles to attach to the actuator 106. Therefore, the buffer 214b prevents the malfunction of the actuator 106 to detect the ink end wrongly by the attaching of air bubble to the actuator 106. Furthermore, by adjusting the volume of the detection side ink chamber 213b by changing the length of the partition wall 212a or changing the width between the partition wall 212a and the side wall 194b, the predetermined ink quantity remained after the detection of the ink end can be changed.

Figure 58:
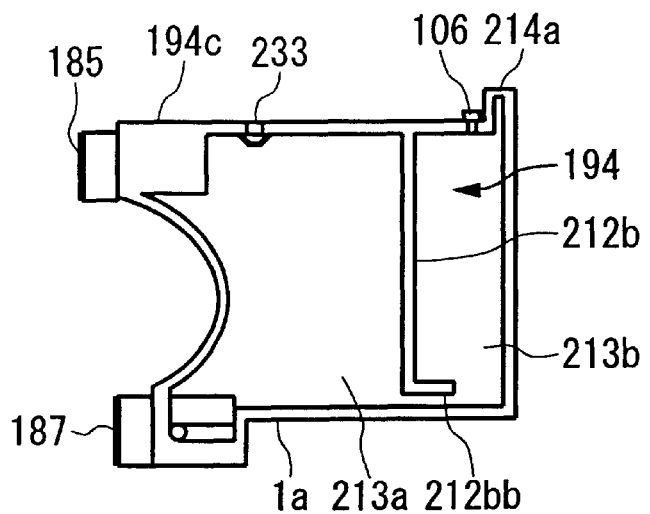
FIG. 58 shows further another embodiment of the ink cartridge 180.

FIG. 58 shows further another embodiment of the ink cartridge 180. An ink cartridge 180B shown in FIG. 58 has a partition wall 212b which is formed in L-shape. The partition wall 212f extends from a top wall 194c. A lower end 212bb of the partition wall 212b is longer than the lower end 212aa of the partition wall 212a in the embodiment shown in FIG. 57. Therefore, gas existed in the ventilation side ink chamber 213a is difficult to enter into the detection side ink chamber 213b. Therefore, the malfunction of the actuator 106 to detects the ink end wrongly caused by the attaching of bubble to the actuator 106 can be further prevented. Furthermore, a gap is provided between the lower end 212bb and the bottom wall 1a. A capillary force, which can hold ink, does not work on the gap provided between the lower end 212bb and the bottom wall 1a.

Figure 59:
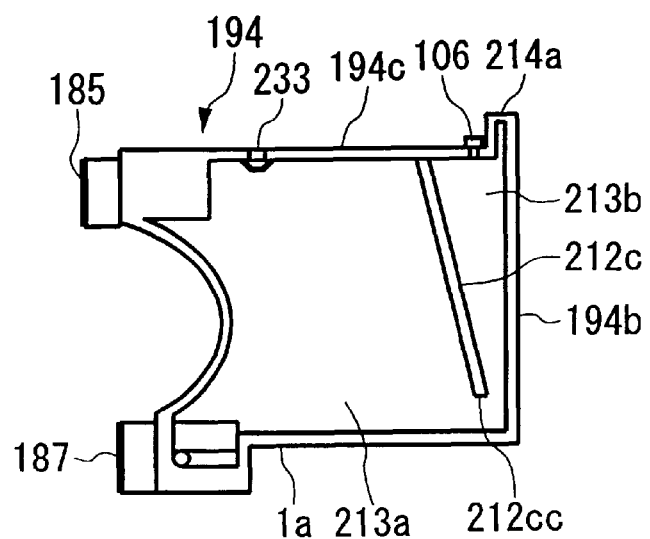
FIG. 59 shows further another embodiment of the ink cartridge 180.

FIG. 59 shows further another embodiment of the ink cartridge 180. An ink cartridge 180C shown in FIG. 59 has a partition wall 212c which is sloped toward the ink surface. The partition wall 212c extends from a top wall 194c. The distance between the side wall 194b of the ink cartridge 180C and the partition wall 212c narrows toward downside. Therefore, gas existed in the ventilation side ink chamber 213a is difficult to enter into the detection side ink chamber 213b. Therefore, the malfunction caused by the attaching of bubble to the actuator 106 can be further prevented. Furthermore, a gap is provided between the lower end 212cc and the bottom wall 1a of the container 194. A capillary force, which can hold ink, does not work on the gap provided between the lower end 212cc of the partition wall 212c and the side wall 194b.

Figure 60:
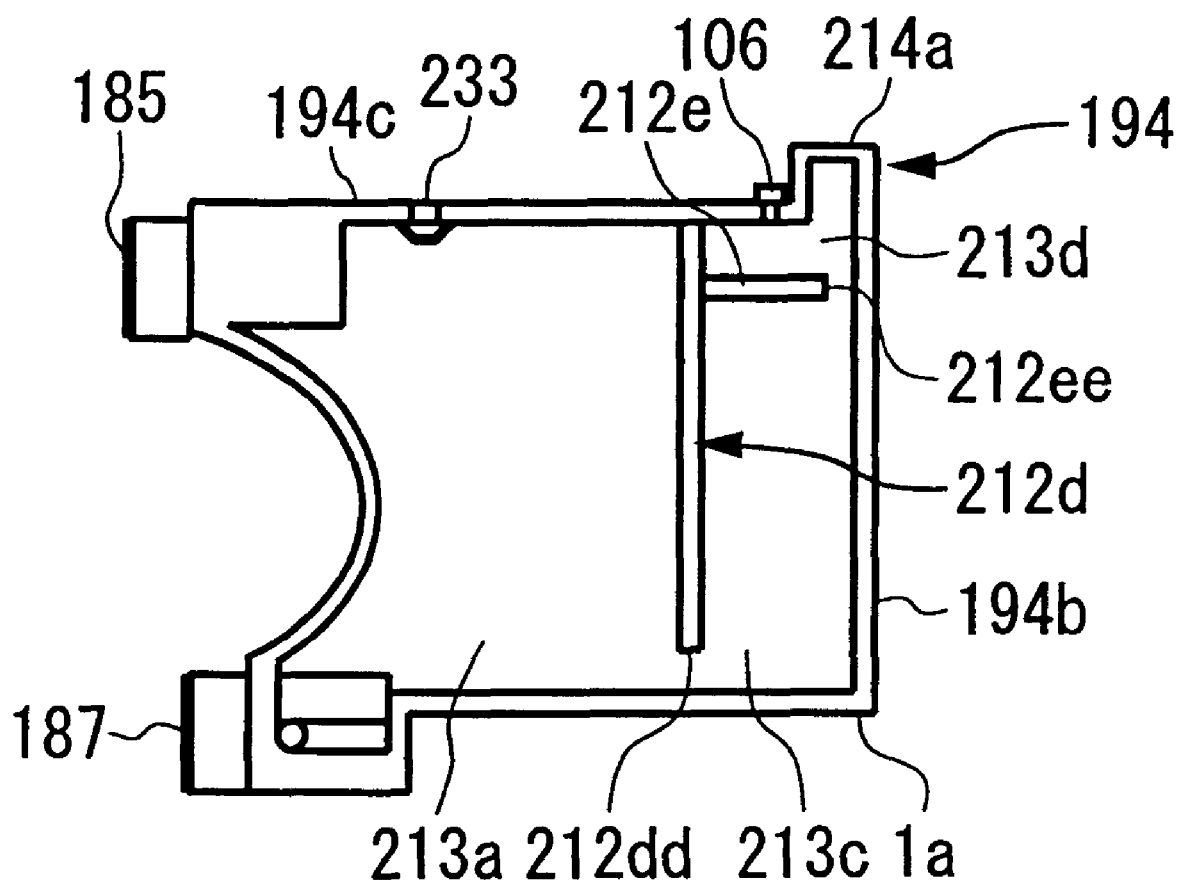
FIG. 60 shows further another embodiment of the ink cartridge 180.

FIG. 60 shows further another embodiment of the ink cartridge 180. An ink cartridge 180D shown in FIG. 60 has a first partition wall 212d which extends downward from the top face 194c of the ink container 194. Furthermore, a second wall extends from the first partition wall 212d toward the side wall 194b substantially parallel to the ink surface. The container 194 is separated into a ventilation side ink chamber 213a and a detection side ink chamber 213b by the first partition wall 212d. Furthermore, the second partition wall 212e separates the detection side ink chamber into a first detection side ink chamber 213c and a second detection side ink chamber 213d. A gap is provided between the bottom wall 1a and the first partition wall 212d. Furthermore, a gap is provided between the side wall 194b and the one end 212ee of the second partition wall 212e. A concave part is provided on a part of top wall 194c to form a buffer 214a which accepts the bubble.

One end of the second partition wall 212e, which extends from the partition wall 212d toward the side wall 194b, extends until to the position where just under the buffer 214b. Therefore, first, the first partition wall 212d prevents the entering of bubble into the first detection side ink chamber 213c. If the bubble enters into the detection side ink chamber 213c mistakenly, the bubble is introduced to the position which is just under the buffer 214a by the second partition wall 212e. Therefore, the bubble is caught by the buffer 214a. Therefore, the malfunction of the actuator 106 to detects the ink end wrongly by the attaching of bubble to the actuator 106, which is provided in the second detection side ink chamber 213d, can be further prevented.

Figure 61:
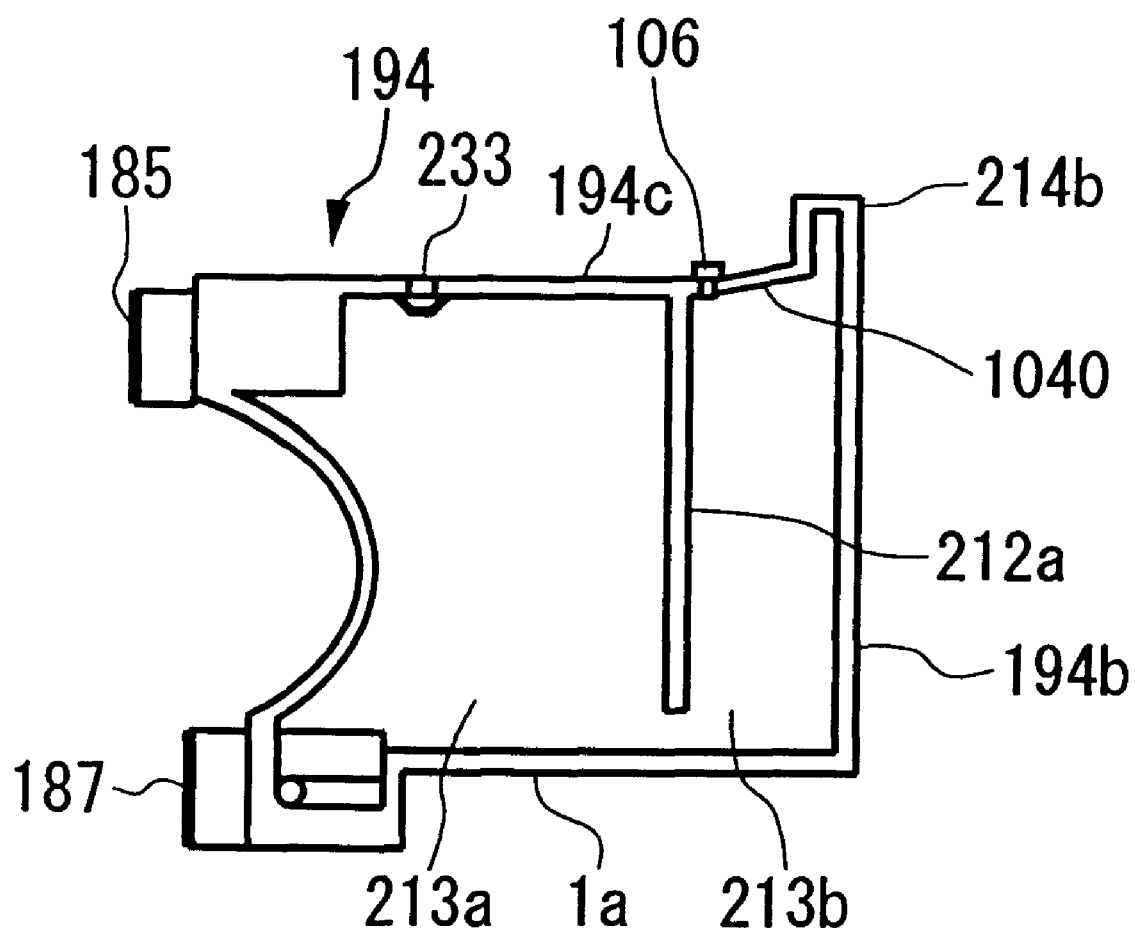
FIG. 61 shows further another embodiment of the ink cartridge 180.

FIG. 61 shows further another embodiment of the ink cartridge 180. An ink cartridge 180E shown in FIG. 61 has a partition wall 212a as same as the partition wall 212a of FIG. 57. The partition wall 212a extends downward from the top face 194c of the ink container 194. The container 194 is separated into a ventilation side ink chamber 213a and a detection side ink chamber 213b by the partition wall 212a. A gap is provided between the bottom wall 1a and the partition wall 212a. Furthermore, a concave part is provided on a part of top wall 194c to form a buffer 214b which accepts the bubble. A tapered face 1040 is provided between the buffer 149b and the actuator 106.

Therefore, first, the partition wall 212a prevents the entering of bubble into the detection side ink chamber 213b. If the bubble enters into the detection side ink chamber 213b mistakenly, the bubble is directly caught by the buffer 214a or introduced to the buffer 214b along the tapered face 1040. Therefore, the malfunction of the actuator 106 to detects the ink end wrongly by the attaching of bubble to the actuator 106 can be further prevented. The shape and size of the buffer can be other arbitrary shape and size.

Figure 62:
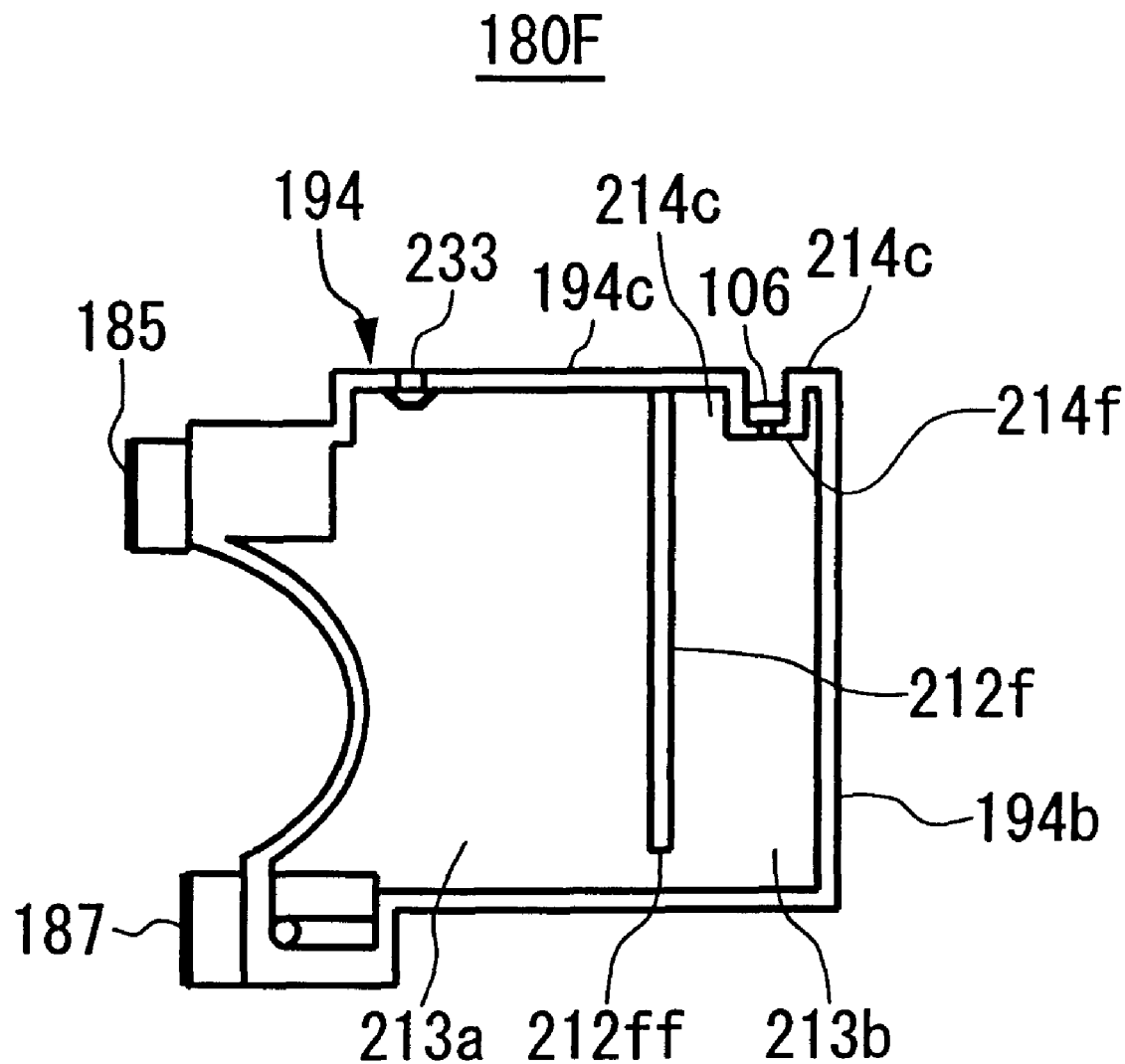
FIG. 62 shows further another embodiment of the ink cartridge 180.

FIG. 62 shows further another embodiment of the ink cartridge 180. An ink cartridge 180F shown in FIG. 62 has a protruding part 214f, which protrudes inside the container 194, on a part of the top wall 194c. The actuator 106 is mounted on the bottom part of the protruding part 214f. A partition wall 212f extends downward from the top face 194c. A buffer 214c is provided for each of the position between the actuator 106 and the partition wall 212f and between the actuator 106 and the side wall 194b. Therefore, the periphery of the actuator 106 is surrounded by the buffer 214c.

Figure 63:
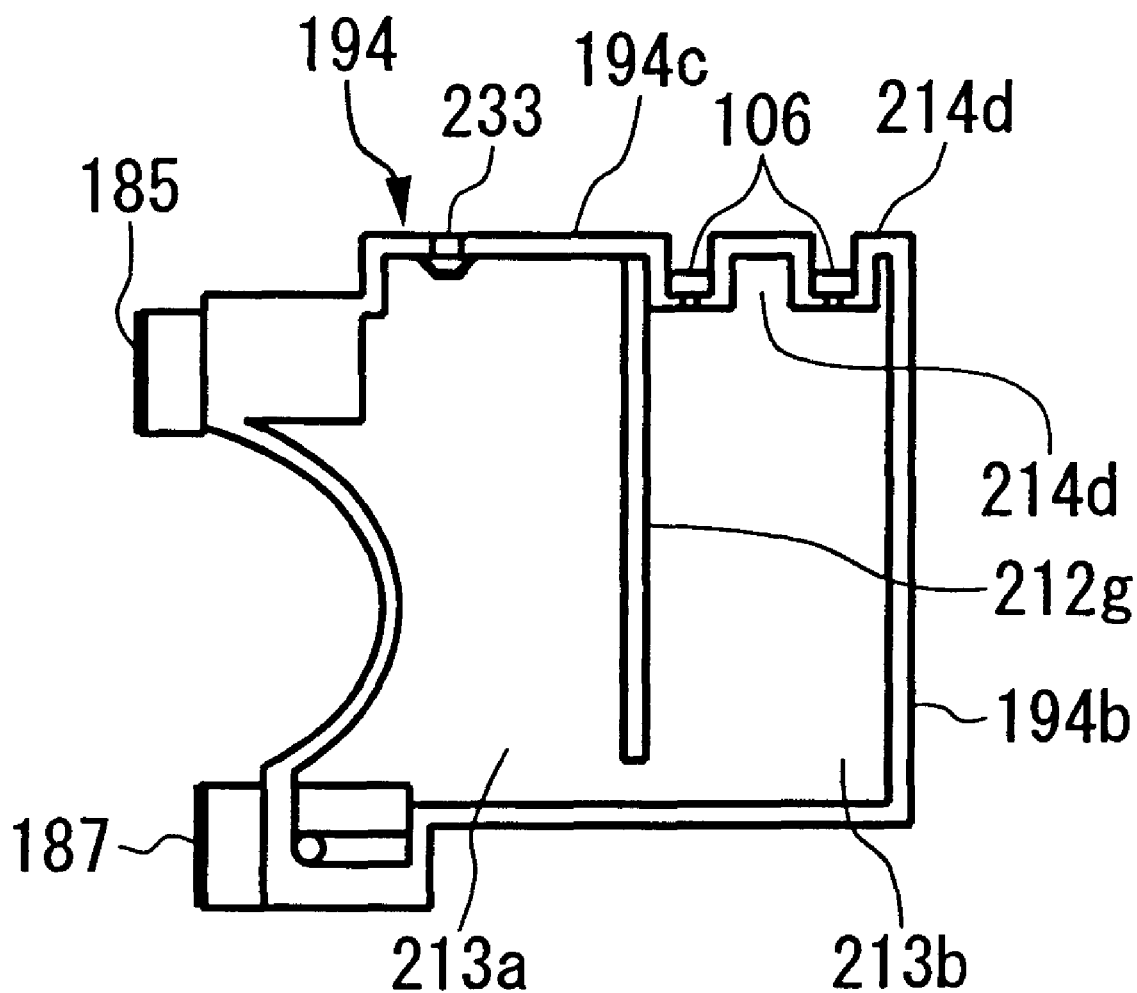
FIG. 63 shows further another embodiment of the ink cartridge 180.

FIG. 63 shows further another embodiment of the ink cartridge 180. An ink cartridge 180G shown in FIG. 63 has a partition wall 212 extends downward from the top face 194c. The container 194 is separated into a ventilation side ink chamber 213a and a detection side ink chamber 213b by the partition wall 212g. Uneven part is provided on the top wall 194c, and two actuators 106 are mounted on the protruding part which protrudes inside the detection side ink chamber 213b. The concave part of the top wall 194c works as a buffer 214c which accepts bubble.

Figure 64:
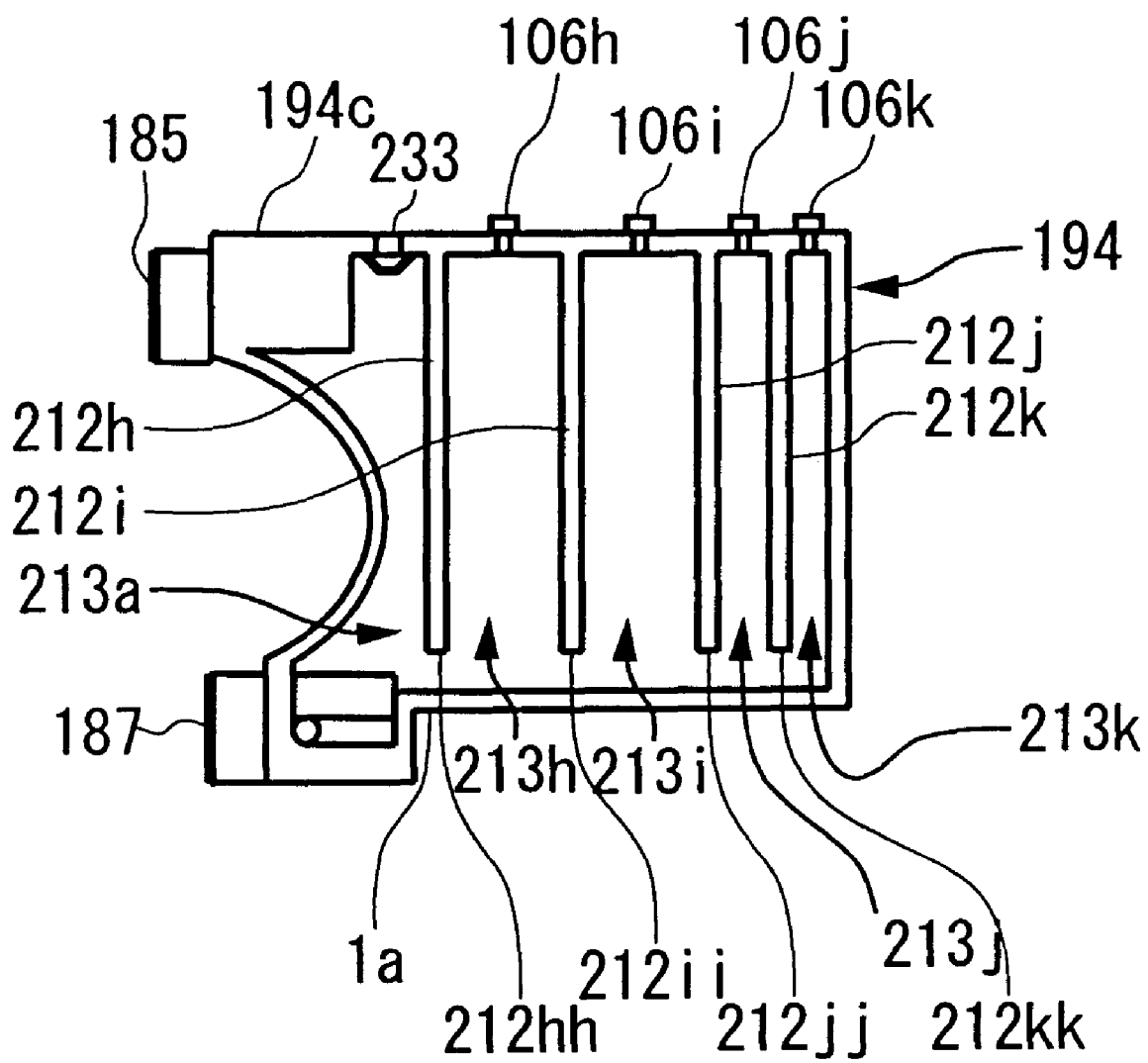
FIG. 64 shows further other embodiment of the ink cartridge 180.

FIG. 64 shows further other embodiment of the ink cartridge 180. The ink cartridge 180I shown in FIG. 64 has a plurality of partition walls 212h, 212i, 212j, and 212k, each of which extends downward from the top face 194c of the ink container 194. The partition wall 212h is first partition wall, and the partition walls 212i, 212j, and 212k are the second partition walls. Because each of lower ends 212hh, 212ii, 212jj, and 212kk of each of the partition walls 212h, 212i, 212j, and 212k and the bottom wall 1a of the container 194 have a predetermined gap, the bottom part of the container 194 communicates with each other. The ink cartridge 180I has a ventilation side ink chamber 213a and a plurality of detection side small ink chambers 213h, 213i, 213j, and 213k separated by the each of plurality of partition walls 212h, 212i, 212j, and 212k. The bottom part of the ventilation side ink chamber 213a and a plurality of the detection side small ink chambers 213h, 213i, 213j, and 213k communicates with each other. Each of the actuators 106h, 106i, 106j, and 106k is mounted on the top face 194c of each of the plurality of the detection side small ink chambers 213h, 213i, 213j, and 213k, respectively. Each of the actuators 106h, 106i, 106j, and 106k is arranged on substantially center of the top face 194c of each of the plurality of the detection side small ink chambers 213h, 213i, 213j, and 213k, respectively. The volume of the ink chamber is arranged such that the volume of the ventilation side ink chamber 213a which locates ink supply port 187 side is the largest. Moreover, the volume of the ink chamber gradually decreases as the distance from the ink supply port 187 increases. Therefore, the volume of the detection side small ink chamber 213k which is farthest from the ink supply port 187 is the smallest among the volume of the ink chambers.

Because gas is introduced from the airhole 233, ink is consumed from the ventilation side ink chamber 213a of the ink supply port 187 side to the detection side ink chamber 213k. For example, the ink in the ventilation side ink chamber 213a which is nearest to the ink supply port 187 is consumed, and during the ink level of the ventilation side ink chamber 213a decreases, the other detection side small ink chambers are filled with ink. When the ink level in the ventilation side ink chamber 213a reaches to the lower end 212hh of the partition wall 212h, air enters into the detection side small ink chamber 213h, and then the ink in the detection side small ink chamber 213h is beginning to be consumed. At this time, ink is filled in the detection side small ink chamber 213i, 213j, and 213k. Furthermore, if the ink level in the detection side small ink chamber 213h reaches to the lower end 212*ii* of the partition wall 212*i*, air enters into the detection side small ink chamber 213*i*, and then the ink in the detection side small ink chamber 213*i* is beginning to be consumed. In this way, ink is sequentially consumed from the ventilation side ink chamber 213*a* to the detection side small ink chamber 213*k*.

Each of the actuators 106*h*, 106*i*, 106*j*, and 106*k* is mounted on the top wall 194*c* of each of the detection side small ink chambers. Therefore, the actuators 106*h*, 106*i*, 106*j*, and 106*k* can detect the decrease of the ink quantity step by step. Furthermore, the volume of the ink chambers decreases from the ventilation side ink chamber 213*a*, which is near to the ink supply port 187, to the detection side small ink chamber 213*k* gradually. Therefore, the time interval of detecting the decrease of the ink quantity gradually decreases. Therefore, the frequency of the ink quantity detection can be increased as the ink end is drawing near.

Figure 65:
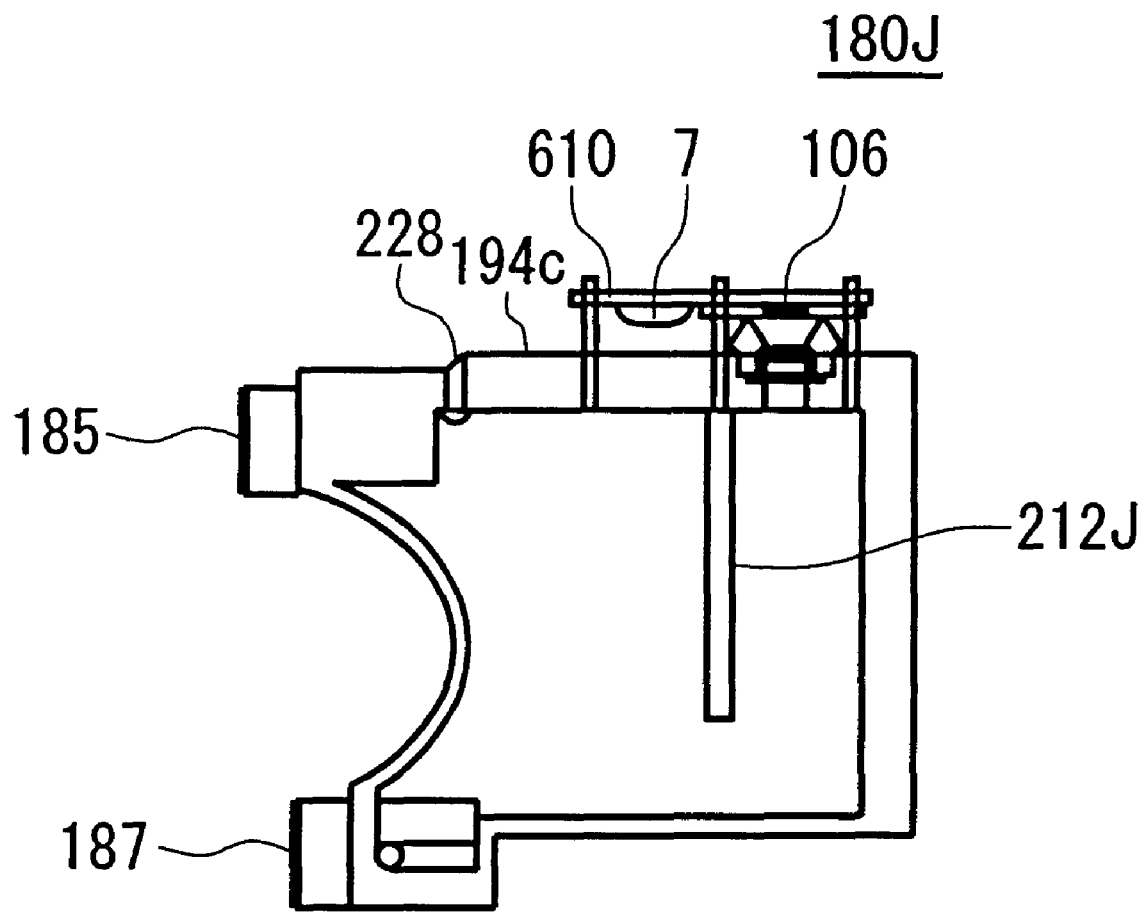
FIG. 65 shows further other embodiment of the ink cartridge 180.

FIG. 65 shows further other embodiment of the ink cartridge 180. FIG. 65 shows a cross section of an ink cartridge 180J. The semiconductor memory device 7 and the actuator 106 are formed on the same circuit board 610 in the ink cartridge 180J.

The semiconductor memory device 7 can be constituted by the semiconductor memory which can be rewritten such as EEPROM. Because the semiconductor memory device 7 and the actuator 106 are formed on the same circuit board 610, the mounting process can be finished at one time during mounting the semiconductor memory device 7 and the actuator 106 on the ink cartridge 180C. Moreover, the working process during the manufacturing of the ink cartridge 180C and the recycling of the ink cartridge 180C can be simplified. Furthermore, the manufacturing cost of the ink cartridge 180C can be reduced because the numbers of the parts can be reduced. Furthermore, a partition wall 212J extends from the top wall 194*c* downward to the ink surface. The partition wall 212J prevents the waving of ink or bubbling. The partition wall 212J thereby prevents the malfunction of the actuator 106.

The actuator 106 detects the ink consumption status inside the container 194. The semiconductor memory device 7 stores the information of ink such as residual quantity of ink detected by the actuator 106. That is, the semiconductor memory device 7 stores the information related to the characteristic parameter such as the characteristic of ink and the ink cartridge used for the actuator 106 when detecting the ink consumption status. The semiconductor memory device 7 previously stores the resonant frequency of when ink inside the container 194 is full, that is, when ink is filled in the container 194 sufficiently, or when ink in the container 194 is end, that is, ink in the container 194 is consumed, as one of the characteristic parameter. The resonant frequency when the ink inside the container 194 is full status or end status can be stored when the ink container is mounted on the ink jet recording apparatus for the first time. Moreover, the resonant frequency when the ink inside the container 194 is full status or end status can be stored during the manufacturing of the container 194. Because the unevenness of the detection of the residual quantity of ink can be compensated by storing the resonant frequency when the ink inside the container 194 is full status or end status in the semiconductor memory device 7 previously and reading out the data of the resonant frequency at the ink jet recording apparatus side, it can be accurately detected that the residual quantity of ink is decreased to the reference value.

Figure 66:
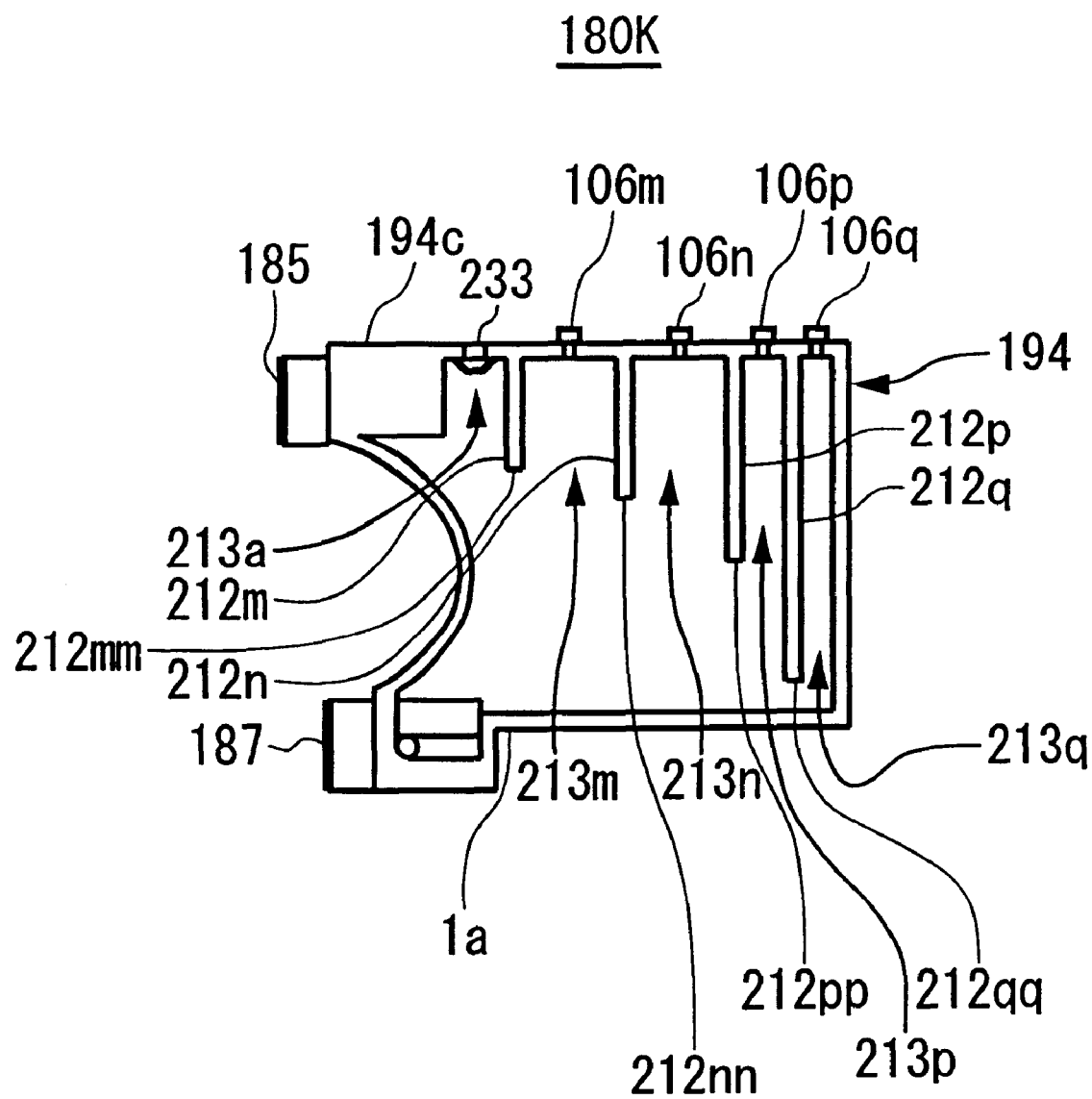
FIG. 66 shows further other embodiment of the ink cartridge 180.

FIG. 66 shows further other embodiment of the ink cartridge 180. The ink cartridge 180K shown in FIG. 66 has a plurality of partition walls 212*m*, 212*n*, 212*p*, and 212*q*, each of which extends downward from the top face 194*c* of the ink container 194. The partition wall 212*m* is the first partition wall, and the partition walls 212*n*, 212*p*, and 212*q* are the second partition walls. Because each of lower ends 212*mm*, 212*nn*, 212*pp*, and 212*qq* of the partition walls 212*m*, 212*n*, 212*p*, and 212*q*, respectively, and the bottom wall of the container 194 has a predetermined gap, the bottom part of the container 194 communicates with each other. Moreover, the length of the partition walls 212*m*, 212*n*, 212*p*, and 212*q* increases from the side near to the airhole 233 in order. Therefore, each of the gap between the lower ends 212*mm*, 212*nn*, 212*pp*, and 212*qq* and the bottom wall 1*a* narrows in the order of 212*m*, 212*n*, 212*p*, and 212*q*, sequentially.

Furthermore, the ink cartridge 180K has a ventilation side ink chamber 213*a* and a plurality of detection side small ink chamber 213*m*, 213*n*, 213*p*, and 213*q* separated by the each of plurality of partition walls 212*m*, 212*n*, 212*p* and 212*q*. The bottom part of the ventilation side ink chamber 213*a* and a plurality of the detection side small ink chambers 213*m*, 213*n*, 213*p*, and 213*q* communicates with each other. Each of the actuators 106*m*, 106*n*, 106*p*, and 106*q* is mounted on the top face 194*c* of each of the plurality of the detection side small ink chambers 213*m*, 213*n*, 213*p*, and 213*q*, respectively. Each of the actuators 106*m*, 106*n*, 106*p*, and 106*q* is arranged on substantially center of the top face 194*c* of each of the plurality of the detection side small ink chambers 213*m*, 213*n*, 213*p*, and 213*q*, respectively.

If ink is consumed, gas is introduced from the airhole 233. Therefore, ink is consumed from the ventilation side ink chamber 213*a* which is near to the airhole 233 to the detection side ink chamber 213*q*. For example, the ink in the ventilation side ink chamber 213*a* which is nearest to the airhole 233 is consumed, and during the ink level of the ventilation side ink chamber 213*a* decreases, the other detection side small ink chambers are filled with ink. When the ink level in the ventilation side ink chamber 213*a* reaches to the lower end 212*mm* of the partition wall 212*m*, air enters into the detection side small ink chamber 213*m*, and then the ink in the detection side small ink chamber 213*m* is beginning to be consumed. At this time, ink is filled in the detection side small ink chamber 213*n*, 213*p*, and 213*q*. Furthermore, if the ink level in the detection side small ink chamber 213*m* reaches to the lower end 212*nn* of the partition wall 212*n*, air enters into the detection side small ink chamber 213*n*, and then the ink in the detection side small ink chamber 213*n* is beginning to be consumed. In this way, ink is sequentially consumed from the ventilation side ink chamber 213*a* to the detection side small ink chamber 213*q*.

Because the gap between the each of the lower ends and the bottom wall 1*a* narrows gradually in the order from the lower ends 212*mm*, 212*nn*, 212*pp*, and 212*qq*, ink is consumed in the order from the ventilation side ink chamber 213*a*, detection side small ink chamber 212*m*, 212*n*, 212*p*, and 212*q*, sequentially. Therefore, the gas is difficult to enter mistakenly into the ink chambers in the same order mentioned above. For example, even if gas enters into the detection side small ink chamber 213*m* and 213*n* mistakenly, and the actuator 106 detects the ink end mistakenly, the partition walls 212*p* and 212*q*, which is longer than the partition walls 212*m* and 212*n*, prevents the gas to enter into the detection side small ink chamber 213*p* and 213*q*. Therefore, the actuators 106*p* and 106*q* do not mistakenly detect the ink end. Thus, in the present embodiment, the actuator 106*q* detects the ink end finally and most reliably.

Furthermore, because the partition walls 212*m*, 212*n*, 212*p*, and 212*q* prevent the waving of ink, the partition walls 212*m*, 212*n*, 12*p*, and 212*q* also prevent the generation of the bubble.

Moreover, the intervals between each of the partition walls 212*m*, 212*n*, 212*p*, and 212*q* with each other can be equal, and the interval between the partition wall 212*q* and the side wall 194*b* of the container 1 can be equal. In this case, the capacity of each of the detection side small ink chambers 213*m*, 213*n*, 213*p*, and 213*q* can be adjusted by adjusting the length of the partition walls 212*m*, 212*n*, 212*p*, and 212*q*.

Figure 67:
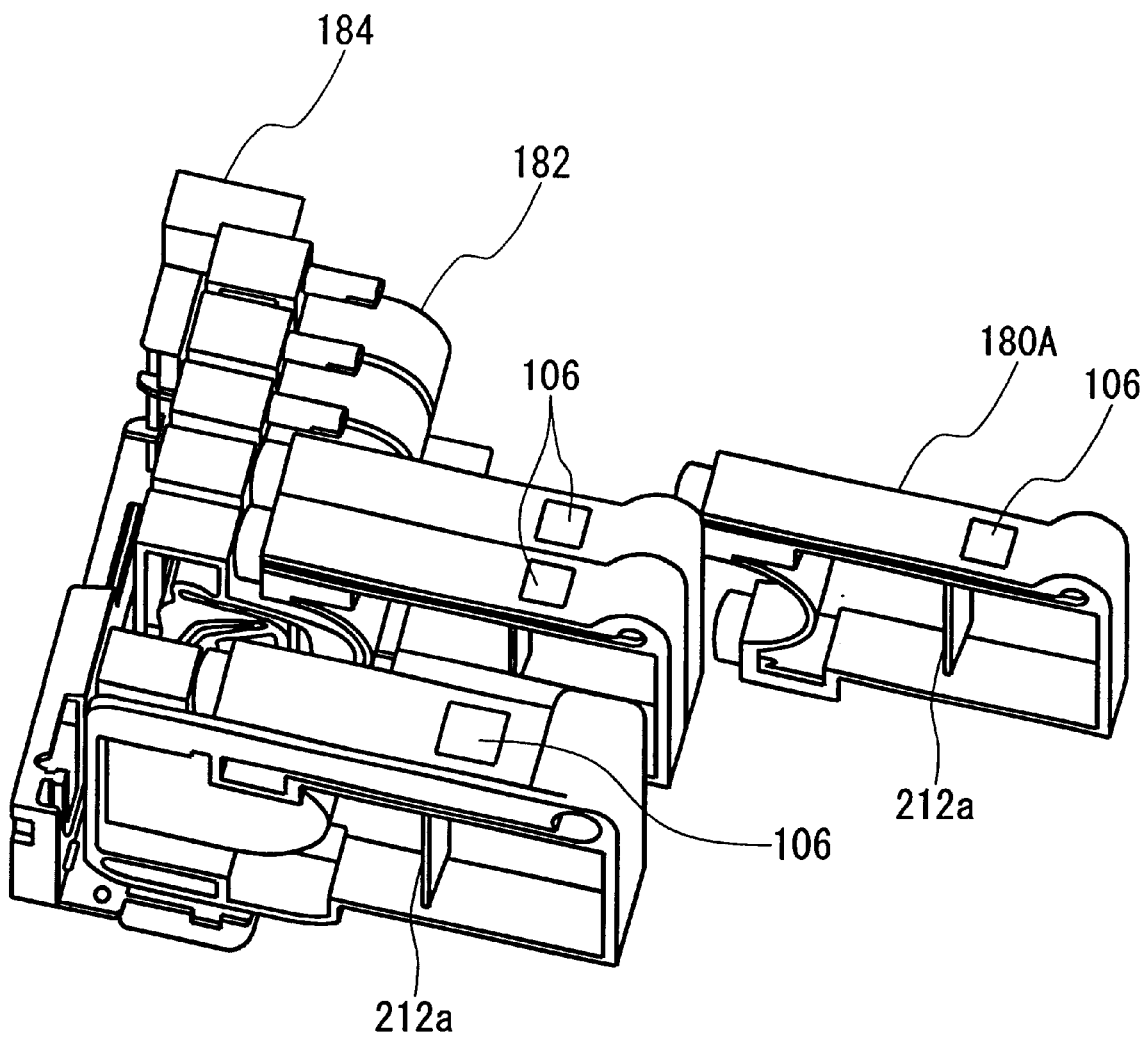
FIG. 67 shows an embodiment around a recording head of part of the ink cartridge and an ink jet recording apparatus which uses the actuator 106.

FIG. 67 shows an embodiment around a recording head of part of the ink cartridge and an ink jet recording apparatus which uses the actuator 106. In the present embodiment, the ink cartridge 180A shown in FIG. 57 is used. However, the ink cartridge in any of the ink cartridge shown in FIG. 58 to FIG. 64 also can be used. Furthermore, the ink cartridge of the other form also can be used. A plurality of ink cartridges 180A is mounted on the ink jet recording apparatus which has a plurality of ink introducing members 182 and a holder 184 each corresponding to the each of ink cartridge 180, respectively. Each of the plurality of ink cartridges 180A contains different types of ink, for example, different color of ink. The actuator 106, which detects at least acoustic impedance, is mounted on the each of top wall of the plurality of ink cartridge 180A. The actuator 106 and a partition wall 212*a* are provided for each top wall of the plurality of ink cartridge 180A. The residual quantity of ink in the ink cartridge 180 can be detected by mounting the actuator 106 on the ink cartridge 180. The partition wall 212*a* prevents the waving and bubbling of ink.

Figure 68:
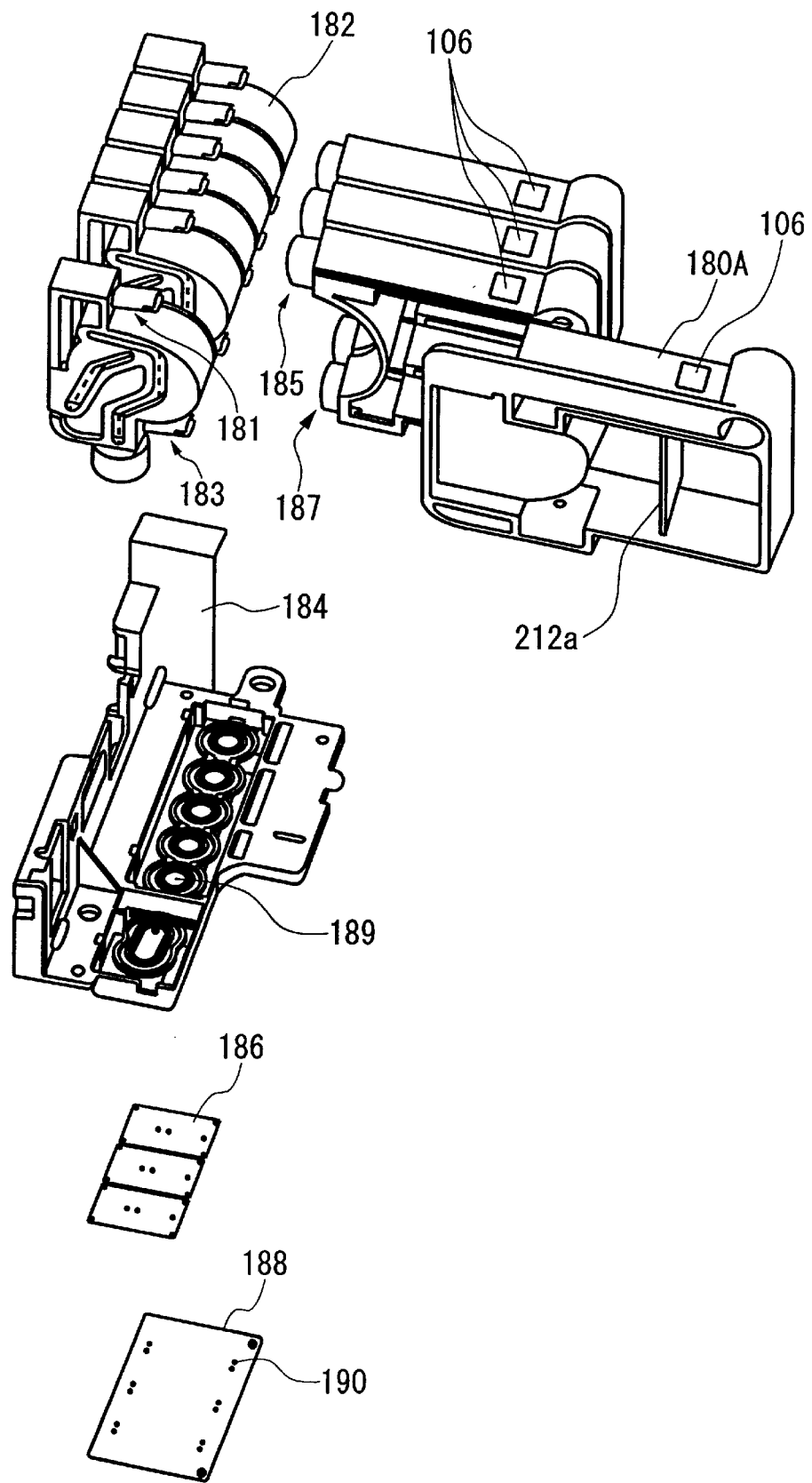
FIG. 68 shows a detail around the head member of the ink jet recording apparatus.

FIG. 68 shows a detail around the head member of the ink jet recording apparatus. In the present embodiment, the ink cartridge 180A shown in FIG. 57 is used. However, the ink cartridge in any of the ink cartridge shown in FIG. 58 to FIG. 64 also can be used. Furthermore, the ink cartridge of the other form also can be used. The ink jet recording apparatus has an ink introducing member 182, a holder 184, a head plate 186, and a nozzle plate 188. A plurality of nozzle 190, which jet out ink, is formed on the nozzle plate 188. The ink introducing member 182 has an air supply hole 181 and an ink introducing inlet 183. The air supply hole 181 supplies air to the ink cartridge 180. The ink introducing inlet 183 introduces ink from the ink cartridge 180A. The ink cartridge 180A has an air introducing inlet 185 and an ink supply port 187. The air introducing inlet 185 introduces air from the air supply hole 181 of the ink introducing member 182. The ink supply port 187 supplies ink to the ink introducing inlet 183 of the ink introducing member 182. By introducing air from the ink introducing member 182 to the ink cartridge 180, the ink cartridge 180 accelerates the supply of ink from the ink cartridge 180A to the ink introducing member 182. The holder 184 communicates ink, which is supplied from the ink cartridge 180A through the ink introducing member 182, to the head plate 186. Ink is supplied to the head from the ink cartridge 180A through the ink introducing member 182 and discharged to the recording medium from nozzle. In this way, the ink jet recording apparatus performs the printing on the recording medium.

Figure 69:
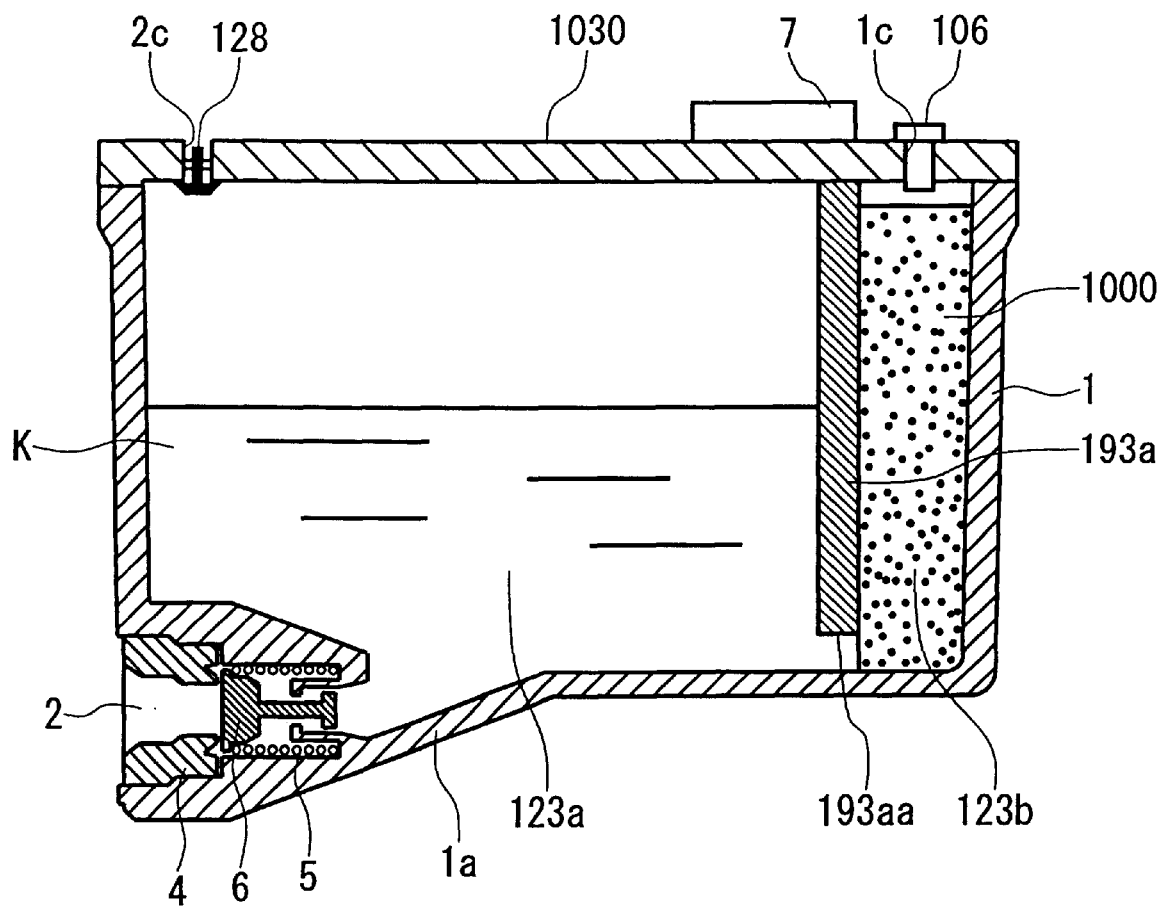
FIG. 69 is a cross sectional view of an embodiment of an ink cartridge as an embodiment of the liquid container according to the present invention.

FIG. 69 is a cross sectional view of an embodiment of an ink cartridge for use with a single color, for example, the black ink as an embodiment of the liquid container according to the present invention. An ink cartridge shown in FIG. 69 is based on the method that detects the position of the liquid surface or an existence of liquid inside a liquid container by detecting a resonant frequency by measuring the counter electromotive force generated by the residual vibration remained in the vibrating section among the above mentioned method. The actuator 106 is used for an embodiment of the liquid censor that detects liquid. The ink cartridge of the embodiment shown in FIG. 69 comprises a container 1 which contains liquid K and includes top wall 1030 located upside of the liquid surface of ink K, an ink supply port 2 which supplies liquid K outside the container 1, an actuator 106 which detects ink consumption status inside the container 1, and a first partition wall 193*a* which partitions at least two ink chamber such that ink K in both of the ink chamber can communicate with each other inside the container 1.

At least two ink chambers include a ventilation side ink chamber 123*a* which communicate with atmosphere and the detecting side ink chamber 123*b*. The actuator 106 is mounted on the top wall 1030 of the ink chamber 123*b*, and a porous member 1000 is provided in the detection side ink chamber 123*b* as a buffer member. A coarse buffer material such as filter can be used instead of the porous member 1000.

The airhole 2*c* is provided on the top wall 1030 of the ventilation side ink chamber 123*a* which ventilates with atmosphere. The check valve 228 shown in FIG. 85 can be used for airhole 2*c*. However, the form of the airhole 2*c* is not limited to the check valve 228 shown in FIG. 85. If ink K is consumed and the container 1 inside decreases, air is introduced to the ventilation side ink chamber 123*a* from the outside of the container 1 by the airhole 2*c*, and the airhole 2*c* thus prevents the pressure inside the container 1 to be negative. Therefore, with the consumption of ink advanced, air is introduced to the ventilation side ink chamber 123*a* through the airhole 2*c*, and the level of liquid surface of ink K decreases.

The partition wall 193*a* is coupled with the top wall 1030 and side wall, not shown in the figure, liquid-tightly. Therefore, even the ink is consumed, ink K is sufficiently absorbed in the porous member 1000 and filled in the detection side ink chamber 123*b* in the container 1 until the level of liquid surface of ink reaches to the lower end 193*a* a of the partition wall 193*a*. When the ink consumption advances, and the level of liquid surface of ink K reaches to the lower end 193*a* a of the partition wall 193*a*, as enters to the detection side ink chamber 123*b*. The ink k absorbed by the porous member 1000 in the detection side ink chamber 123*b* thereby flows out to the ink supply port 2, and the medium existed around the actuator 106 changes from ink to atmosphere. Therefore, the actuator 106 can detect that the status inside the ink cartridge is in ink end status. Thus, it is the lower end 193*a* a to determine which level of the liquid surface of ink K to be a ink end. Furthermore, the volume of the detection side ink chamber 132*b* is determined by the position of partition wall 193*a* to the top wall 1030. Therefore, the ink quantity remains inside the container 1 when detecting the ink end can be set by the position of the partition wall 193*a* to the top wall 1030 and the height of the lower end 193*a* a in the direction vertical to the ink surface.

Here, the case of using an on-carriage type ink jet recording apparatus, the ink cartridge of which is move together with recording head during the scanning process will be considered. If there is no partition wall 193*a* in the container 1, or if no buffer material is provide around the actuator 106, bubbles may be generated by the waving of ink, which is caused by the vibration of ink cartridge generated by such as the scanning operation during the printing process because the ink cartridge moves together with recording head. Then, there is a danger that the actuator 106 may detect mistakenly that there is enough ink in the container 1 if the ink attaches to the actuator 106 by the waving of ink even if there is little amount of ink in the container 1. Moreover, there is also a danger that the actuator 106 may detect mistakenly that there is no ink if the bubble attaches to the actuator 106 even if the ink is filled in the container 1.

However, according to the embodiment of the liquid container of the present embodiment, the partition wall prevents the waving of ink around the piezoelectric device even when the ink cartridge vibrates by such as the scanning operation during the printing process. By preventing the waving of ink around the piezoelectric device, the partition wall 193a prevents the generation of the bubbles. Furthermore, even the bubbles generate in the ventilation side ink chamber, the partition wall separates the ventilation side ink chamber and the detection side ink chamber. Therefore, the partition wall prevents the bubbles to move close to the actuator 106 and contact with the actuator 106.

Moreover, the porous member 1000 is provided on the detection side ink chamber 123b to intervene between the actuator 106 and the ventilation side ink chamber 123a. Therefore, even if the bubbles generated in the ventilation side ink chamber 123a enters into the detection side ink chamber 123b mistakenly, the porous member 1000 prevents the bubbles to move close to the actuator 106 and contact with the actuator 106.

Furthermore, because the porous member 1000 is provided in the detection side ink chamber 123b, ink inside the detection side ink chamber 123b does not wave by the vibration of the actuator 106. Therefore, the actuator 106 can reliably and stably detect the ink consumption status in the container 1.

The volume of the detection side ink chamber 123b is preferably half or smaller than half of the volume of the ventilation side ink chamber 123a. The detection side ink chamber 123b preferably has a width in a degree not to arise a capillary force such as to hold ink K.

The actuator 106 can be used as a means of merely detecting the vibration without vibrating itself.

There is no limitation of the size, thickness, shape, flexibility, and material for the partition wall of the ink cartridge of the embodiment of the liquid container according to the present embodiment. Therefore, the size of the partition wall can be made further larger or smaller. The thickness of the partition wall can be made further thicker or thinner. Furthermore, the shape of the partition wall can be square or rectangular. Furthermore, the partition wall can be made from the hard material or flexible material. For example, material such as plastic, tefron, nylon, polypropylene, or PET can be used for the partition wall. Preferably, the partition wall is made from the air-tight or liquid-tight material which does not pass through gas or liquid. Moreover, the container and the partition wall are made from same material so that the container and the partition wall can be formed in one body. The manufacturing process of the ink cartridge can thereby be reduced.

Moreover, there is no limitation of the size, thickness, shape, flexibility, and material for the porous member of the ink cartridge of the embodiment of the liquid container according to the present embodiment. Therefore, the size of the porous member can be made further larger or smaller. The thickness of the porous member can be made further thicker or thinner. Furthermore, the shape of the porous member can be cubic or rectangular parallelepiped.

Moreover, there is no limitation of the shape of the hole included in the porous member. Therefore, for example, the negative pressure or capillary force of the porous member, which includes the hole of spherical shape, can be increased by reducing the size of the hole. On the other hand, the negative pressure or capillary force of the porous member, which includes the hole of spherical shape, can be decreased by enlarging the size of the hole. Preferably, the porous member 1000 is made from a flexible material such as sponge. Moreover, it is preferable to set the diameter of hole of the porous member to predetermined diameter so that the porous member can absorb ink from a cavity, referring to FIG. 19, which is formed in the actuator 106, and introduce ink to ink supply port, referring to FIG. 1.

The porous member 1000 of the embodiment shown in FIG. 69 has a shape of rectangular parallelepiped. The porous member 1000 is filled in the detection side ink chamber 123b such that the porous member 1100 fills from the periphery of the actuator 106 to the bottom wall 1a which is located below the ink surface in the ink cartridge.

Figure 70:
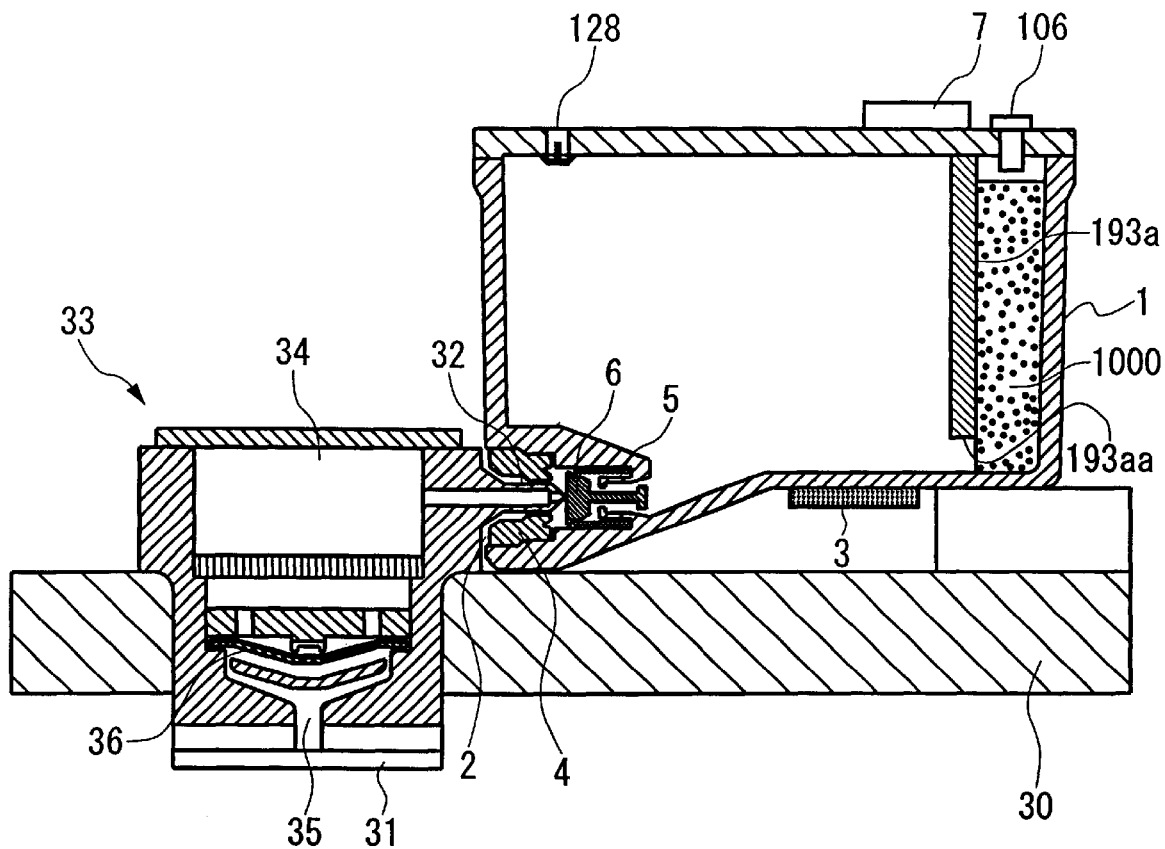
FIG. 70 is a cross sectional view of an embodiment of an ink jet recording apparatus and ink cartridge according to the present invention.

A packing ring 4 and a valve body 6 are provided in the ink supply port 2. Referring to FIG. 70, the packing ring 4 is engaged with the ink supply needle 32 communicating with a recording head 31, in a fluid-tight manner. The valve body 6 is constantly and elastically contacted against the packing ring 4 by way of a spring 5. When the ink supply needle 32 is inserted, the valve body 6 is pressed by the ink supply needle 32 so as to open an ink passage, so that ink inside the container 1 is supplied to the recording head 31 via the ink supply port 2 and the ink supply needle 32. On an upper wall of the container 1, there is mounted a semiconductor memory means 7 which stores data on ink inside the ink cartridge.

Figure 71:
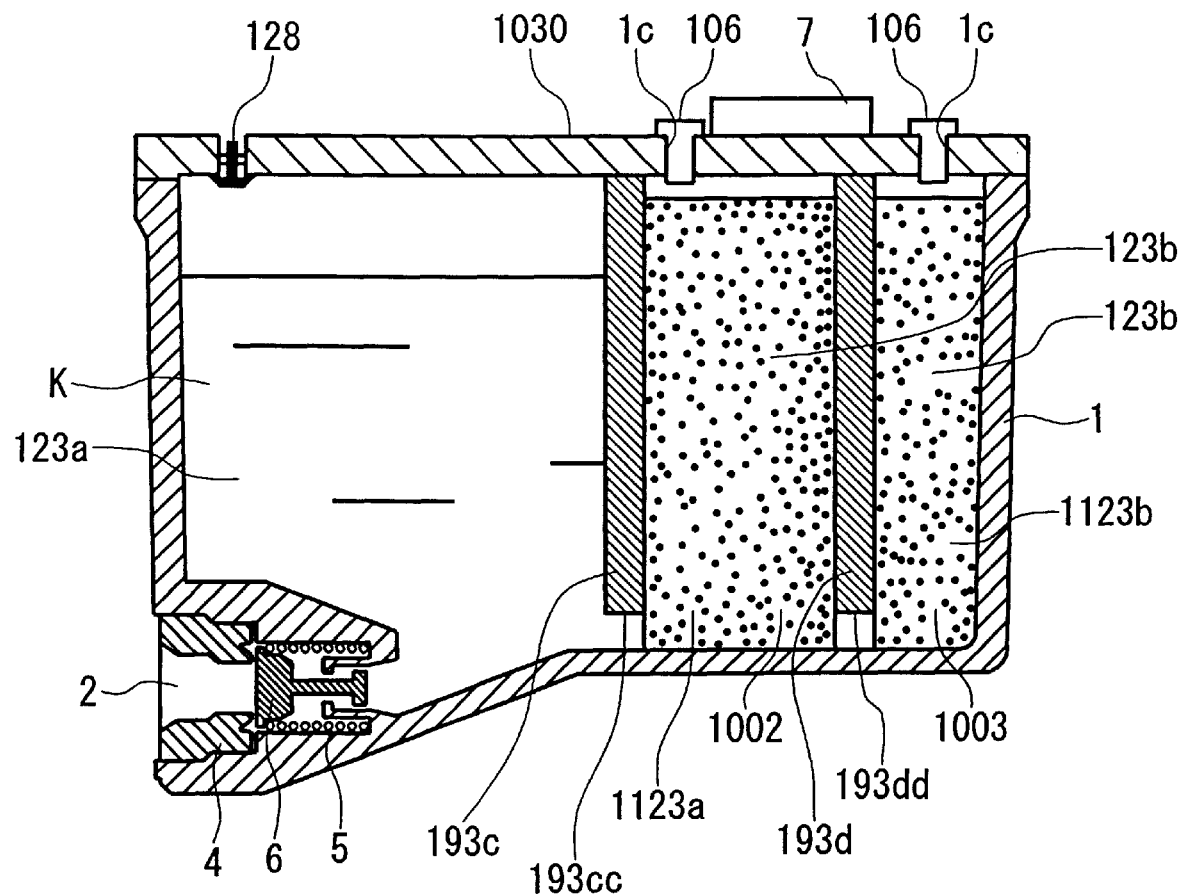
FIG. 71 is a cross sectional view of a further another embodiment of an ink cartridge as an embodiment of the liquid container according to the present invention.

FIG. 71 is a cross sectional view of a further another embodiment of an ink cartridge as an embodiment of the liquid container according to the present invention. An ink cartridge of the present embodiment has a top wall 1030, which locates upside of the liquid surface of ink K. The actuators 106 are mounted on the top wall 1030 such that the actuator 106 can contacts with ink through the through hole 1c provided on the top wall 1030. A first partition wall 193c extends from the top wall 1030 downward to the ink surface. Furthermore, the present embodiment has a second partition wall 193d which extends from the top wall 1030 inside the detection side ink chamber 123b and separates the detection side ink chamber 123b at least into two detection side small ink chambers 1123a and 1123b such that ink housed in both of the detection side small ink chamber 1123a and 1123b can communicate each other. The actuator 106 is mounted on the top wall 1030 of each of the detection side small ink chambers 1123a and 1123b, respectively.

Furthermore, a porous member 1002 and a porous member 1003 are provided to each of the inside of the detection side small ink chamber 1123a and the detection side small ink chamber 1123b.

Because gas is introduced from the airhole 128, ink is consumed from the ventilation side ink chamber 123a, which is near to the airhole 128, to the detection side small ink chamber 1123b, which is far from the airhole 128. Therefore, during ink in the ventilation side ink chamber 123a which is nearest to the airhole 128 is consumed, the detection side ink chamber 123b is filled with ink. When the ink level in the ventilation side ink chamber 123a reaches to the lower end 193cc of the partition wall 193c, air enters into the detection side small ink chamber 1123a, and then the ink in the detection side small ink chamber 1123a is beginning to be consumed. At this time, ink is filled in the detection side small ink chamber 1123b. Furthermore, if the ink level in the detection side small ink chamber 1123a reaches to the lower end 193dd of the second partition wall 193d, air enters into the detection side small ink chamber 1123b, and then the ink in the detection side small ink chamber 1123b is beginning to be consumed. In this way, ink is sequentially consumed from the ventilation side ink chamber 123*a* to the detection side small ink chamber 1123*b*.

Because each of the actuators 106 is mounted on the top wall 1030 of each of the detection side small ink chambers 1123*a* and 1123*b*, the actuators 106 can detect the decrease of the ink quantity step by step. Furthermore, the volume of the detection side ink chamber 123*b* is smaller than the volume of the ventilation side ink chamber 213*a*. Furthermore, the volume of the detection side small ink chamber 1123*a* and 1123*b* gradually decreases from the detection side small ink chamber 1123*a* which is near to the airhole 128 to the detection side small ink chamber 1123*b*, which is far from the airhole 128. Therefore, the time interval of detecting the decrease of the ink quantity gradually decreases. The frequency of the ink quantity detection can thereby be increased as the ink end is drawing near.

FIG. 72 shows further another embodiment of the ink cartridge using the actuator 106. An ink cartridge 180A shown in FIG. 72 has a partition wall 212*a* which extends downward from the top face 194*c* of the ink container 194. The container 194 is separated into a ventilation side ink chamber 213*a* and a detection side ink chamber 213*b* by the partition wall 212*a*. Because lower end 212*aa* of the partition wall 212*a* and the bottom wall 1*a* of the container 194 have a predetermined space, the ventilation side ink chamber 213*a* and the detection side ink chamber 213*b* communicates with each other.

A buffer member 1005*a* is provided to block the communicating port between the ventilation side ink chamber 213*a* and the detection side ink chamber 213*b*. A filter-like material, which includes many holes on its surface, can be used for buffer member 1050*a* if the buffer member closes the communicating port. Furthermore, the buffer member can be porous member. Therefore, the ventilation side ink chamber 213*a* and the detection side ink chamber 123*b* communicates each other through the buffer member 1005*a*. Because the buffer member 1005*a* is made from porous material, the buffer material pass through gas and liquid. However, if the buffer member 1005*a* holds liquid by the capillary force, the buffer member becomes airtight. Therefore, the buffer member 1050*a* can suppress bubbles to passing through the buffer member 1050*a*. Thus, the buffer member 1050*a* can prevents the bubbles, which is generated in the ventilation side ink chamber 213*a*, to enter inside the detection side ink chamber 213*b* and attach to the actuator 106.

The actuator 106 is mounted on the top wall 194*c* of each of the ventilation side ink chamber 213*a* and the detection side ink chamber 213*b*. The volume of the detection side ink chamber 213*b* is smaller than the volume of the ventilation side ink chamber 213*a*. The volume of the detection side ink chamber 213*b* is smaller than the half of the volume of the ventilation side ink chamber 213*a* in the ink cartridge of according to the present embodiment.

A buffer 214*a*, that is a concave part for accepting the air bubble which enters to the ink cartridge 180A is formed on the top wall 194*c* of the detection side ink chamber 213*b*. In FIG. 72, the buffer 214*a* is formed as a concave part overhang upward from the top wall 194*c* of the container 194. The buffer 214*a* accepts the air bubble which enters into the detection side ink chamber 213*b* mistakenly when the ink is filled in the detection side ink chamber 213*b*. The buffer 214*a* thereby prevents the bubbles to attach to the actuator 106. Therefore, the buffer 214*b* prevents the malfunction of the actuator 106 to detect the ink end wrongly by the attaching of air bubble to the actuator 106. Furthermore, the level of ink surface on which the actuator 106 detects the ink end can be changed by changing the length of the partition wall 212*a*. Furthermore, by changing the width between the partition wall 212*a* and the side wall 194*b*, the predetermined ink quantity remained after the detection of the ink end can be changed.

The ink cartridge 180B shown in FIG. 73 fills a porous member 1005*b* in the detection side ink chamber 123*b* of the ink cartridge 180A shown in FIG. 72. The porous member 1005*b* is filled inside the detection side ink chamber 213*b* from the top wall 194*c* to the bottom wall 194*a*. The porous member 1005*b* contacts with the actuator 106. There is a case that the actuator 106 malfunctions by the entering of the air inside the detection side ink chamber 213*b* when the ink cartridge fall down or when the detection side ink chamber 213*b* moves back and forth with the carriage. If the porous member 1005*b* is provided on the detection side ink chamber 213*b*, the porous member 1005*b* captures air to prevent entering of air into the actuator 106. Furthermore, because the porous member 1005*b* holds ink, the porous member 1005*b* can prevent the actuator 106 to malfunction as detecting the ink end status as ink exist status which is caused by attaching of the ink on the actuator 106 when the ink container rolls. The ink quantity which can be consumed after the detection of the ink end can be changed by adjusting the volume of the detection side ink chamber 213*b* by changing the width between the side wall 194*b* and the partition wall 212*a*. Furthermore, the level of ink surface on which the actuator 106 detects the ink end can be changed by adjusting the height of the lower end 212*aa* of the partition wall 212*a* from the ink surface.

FIG. 74 shows an ink cartridge 180C, the porous member of which is constituted by two kinds of porous members 1005*c* and 1005*d* having a different hole diameter with each other. The porous member 1005*c* is located closer to the actuator 106 than the porous member 1005*d*. The hole diameter of the porous member 1005*c* is larger than the hole diameter of the porous member 1005*d*. The capillary force of the porous member 1005*d*, which has small hole diameter, is larger than the capillary force of the porous member 1005*c*, which has large hole diameter. Therefore, the ink, which once flows from the porous member 1005*c* to the porous member 1005*d*, does not flow backward to the porous member 1005*c* because the capillary force works at the porous member 1005*d*. Therefore, the porous members 1005*c* and 1005*d* prevents the attaching of ink to the actuator 106 by the waving of ink and thereby prevents the malfunction of the actuator 106 to detect the ink end status as ink exist status. The porous member 1005*c* can be formed by the material which has a lower affinity for liquid than the affinity for liquid of the material which forms the porous member 1005*d*.

Figure 75:
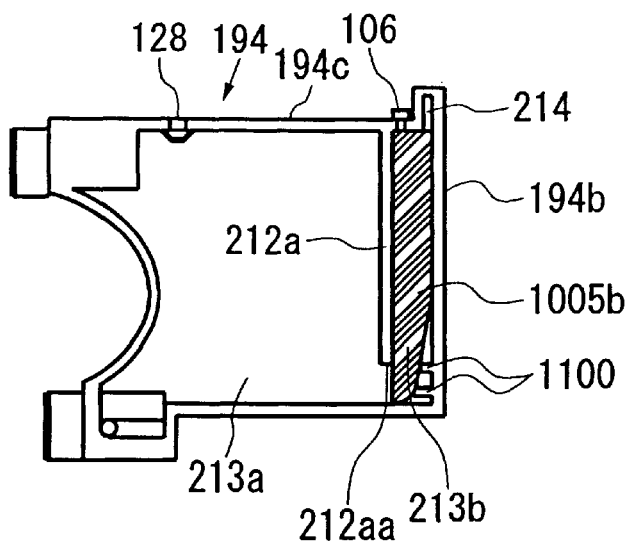
FIG. 75 shows a cross section of an ink cartridge 180D which is further other embodiment of the ink cartridge 180 using actuator 106.

FIG. 75 shows a cross section of an ink cartridge 180D which is further other embodiment of the ink cartridge 180 using actuator 106. Ribs 1100, which protrudes inside the ink container 194, are provided on the bottom side of the side wall 194*b* of the detection side ink chamber 213*b*. The porous member 1005*b* which is provided inside the detection side ink chamber 213*b* is gradually compressed by the ribs 1100 such that the area of the cross section on the horizontal plane of the porous member 1005*b* gradually decreases downwards along the vertical direction. Therefore, the hole diameter of the porous member 1005*b* decreases gradually in the direction downward to the ink surface. Because the hole diameter of the lower part of the porous member 1005*b* reduced by the ribs 1100, the ink, which once flows into the lower part of the porous member 1005*b* does not flow backward to the upside of the porous member 1005*b* by the capillary force. Furthermore, the porous member 1005*b* of the present embodiment prevents ink to attach to the actuator 106, which is mounted on the top wall 194*c*, by the waving of ink. Therefore, the malfunction of the actuator 106 to detect the ink end status as the ink exist status can be prevented.

Figure 76A:
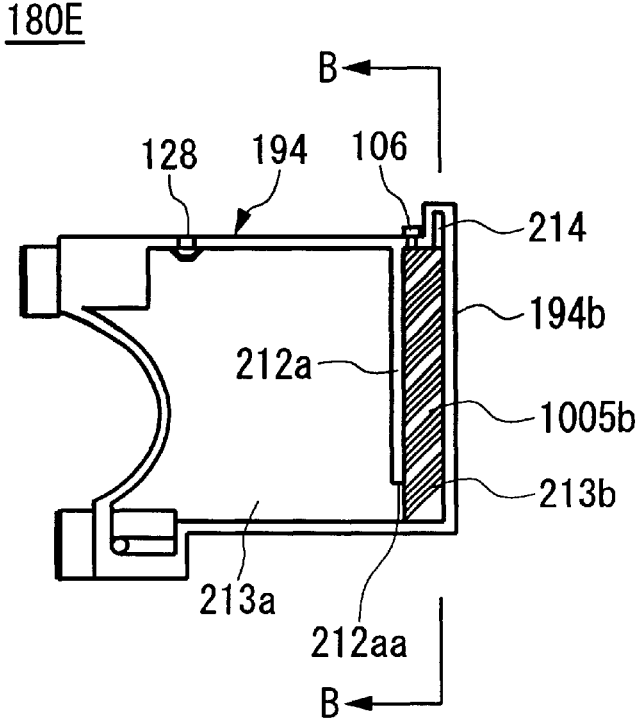
FIGS. 76(A) and 76(B) show further another embodiment of the ink cartridge using actuator 106.
Figure 76B:
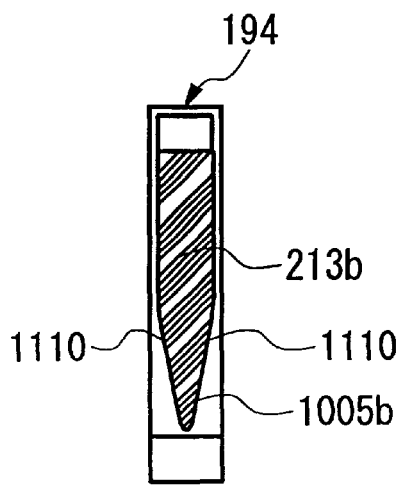

FIG. 76(A) and FIG. 76(B) shows further another embodiment of the ink cartridge using actuator 106. FIG. 76(A) is a cross sectional view along the longitudinal direction of a ink cartridge 180E. FIG. 76(B) shows B—B cross sectional view of the ink cartridge 180E shown in FIG. 76(A). A taper 1110 is provided on the lower side of the side wall of the detection side ink chamber 213*b*. The width of the detection side ink chamber 213*b* gradually narrows downward along the vertical direction by the taper 1110. Therefore, the porous member 1005*b* is compressed gradually by the taper 1110 such that the area of the cross section on the horizontal plane of the porous member 1005*b* gradually decreases downwards along the vertical direction. Therefore, lower side of the hole diameter of the porous member 1005*b* gradually becomes smaller than the upper side of the hole diameter of the porous member 1005*b* by the taper 1110. Because the hole diameter of the lower part of the porous member 1005*b* reduced by the taper 1110, the ink, which once flows into the lower part of the porous member 1005*b* does not flow backward to the upside of the porous member 1005*b* by the capillary force. Furthermore, the porous member 1005*b* of the present embodiment prevents ink to attach to the actuator 106, which is mounted on the top wall 194*c*, by the waving of ink. Therefore, the malfunction of the actuator 106 to detect the ink end status as the ink exist status can be prevented.

Figure 77:
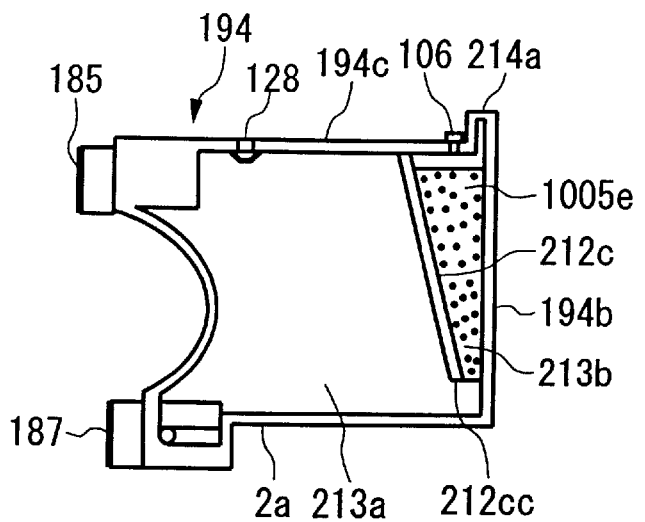
FIG. 77 shows further another embodiment of the ink cartridge using actuator 106.

FIG. 77 shows further another embodiment of the ink cartridge using actuator 106. An ink cartridge 180F shown in FIG. 77 has a partition wall 212*c* which is sloped toward the ink surface. A porous member 1105*e* is filled in the detection side ink chamber 213*b*. The partition wall 212*c* extends from a top wall 194*c*. The distance between the side wall 194*b* of the ink cartridge 180C and the partition wall 212*c* gradually narrows toward downside. Therefore, the porous member 1005*e* is compressed gradually by the partition wall 212*c* such that the area of the cross section on the horizontal plane of the porous member 1005*b* gradually decreases toward downside. Therefore, lower side of the hole diameter of the porous member 1005*e* gradually becomes smaller than the upper side of the hole diameter of the porous member 1005*e* by the partition wall 212*c*. Because the hole diameter of the lower part of the porous member 1005*e* is reduced by the partition wall 212*c*, the ink, which once flows into the lower part of the porous member 1005*e* does not flow backward to the upside of the porous member 1005*e* by the capillary force. Furthermore, the porous member 1005*e* of the present embodiment prevents ink to attach to the actuator 106, which is mounted on the top wall 194*c*, by the waving of ink. Therefore, the malfunction of the actuator 106 to detect the ink end status as the ink exist status can be prevented.

Moreover, gas existed in the ventilation side ink chamber 213*a* is difficult to enter into the detection side ink chamber 213*b*. Therefore, the malfunction caused by the attaching of bubble to the actuator 106 can be further prevented. Furthermore, a gap is provided between the lower end 212*cc* and the bottom wall 2*a* of the ink cartridge 180F. A capillary force, which can hold ink, does not work on the gap provided between the lower end 212*cc* and the side wall 194*b*.

Figure 78:
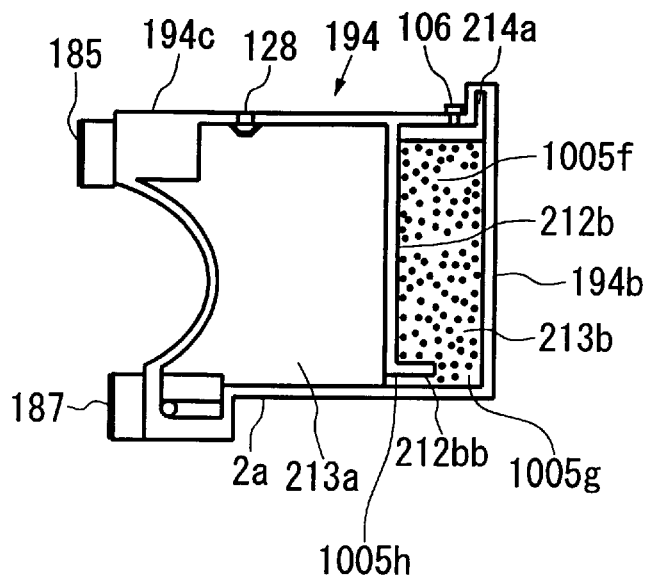
FIG. 78 shows further another embodiment of the ink cartridge using the actuator 106.

FIG. 78 shows further another embodiment of the ink cartridge using the actuator 106. An ink cartridge 180G shown in FIG. 78 has a partition wall 212*b* which is formed in L-shape. The partition wall 212*b* extends from a top wall 194*c*. A lower end 212*bb* of the partition wall 212*b* is longer than the lower end 212*aa* of the partition wall 212*a* in the embodiment shown in FIG. 72 to FIG. 77. A porous member 1005*f* is filled in the detection side ink chamber 213*b*.

A porous member 1005*g*, which is a bottom part of porous member 1005*f*, is sandwiched and compressed by the lower end 212*bb* and the side wall 194*b*. Therefore, the hole diameter of the porous member 1005*g* is smaller than the hole diameter of the porous member 1005*f*. Thus, the hole diameter of the porous member decreases from the porous member 1005*f*, which locates nearby the actuator 106, to the porous member 1005*g* and further to porous member 1005*h*. The hole diameter of the porous member 1005*f* thereby decreases step by step downward to the ink surface. Therefore, the ink, which once flows into the lower part of the porous member 1005*f* does not flow backward to the upside of the porous member 1005*f* by the capillary force. Furthermore, the porous member 1005*f* of the present embodiment prevents ink to attach to the actuator 106, which is mounted on the top wall 194*c*, by the waving of ink. Therefore, the malfunction of the actuator 106 to detect the ink end status as the ink exist status can be prevented.

Moreover, the bottom end 212*bb* is longer than the lower end 212*aa* of the partition wall 212*a* of the embodiments shown in FIG. 72 to FIG. 77. Therefore, gas existed in the ventilation side ink chamber 213*a* is difficult to enter into the detection side ink chamber 213*b*. Therefore, the malfunction of the actuator 106 to detects the ink end wrongly caused by the attaching of bubble to the actuator 106 can be further prevented. Furthermore, a gap is provided between the lower end 212*bb* and the bottom wall 2*a*. A capillary force, which can hold ink, does not work on the gap provided between the lower end 212*bb* and the bottom wall 2*a*.

Figure 79:
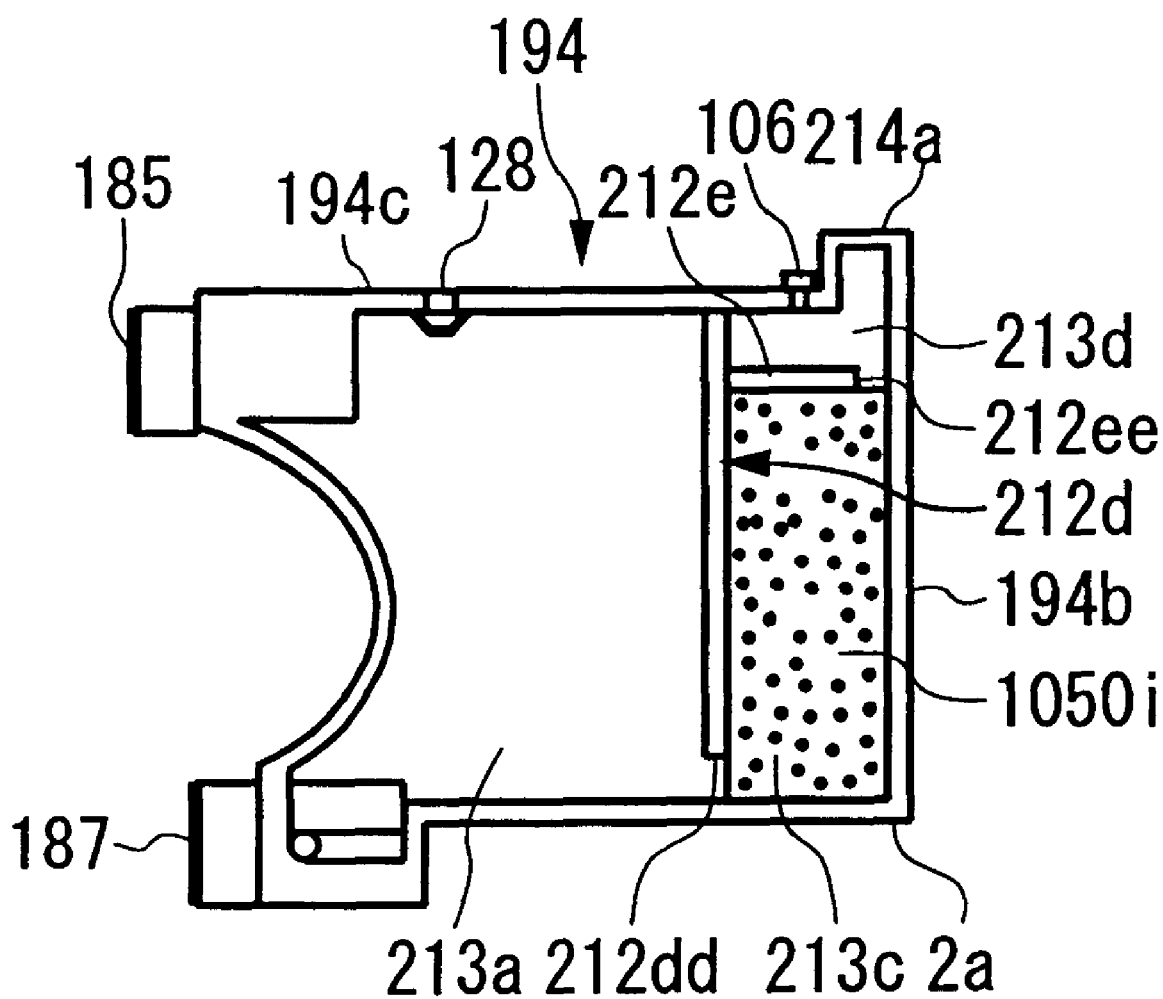
FIG. 79 shows further another embodiment of the ink cartridge 180.

FIG. 79 shows further another embodiment of the ink cartridge 180. An ink cartridge 180H shown in FIG. 79 has a first partition wall 212*d* which extends downward from the top face 194*c* of the ink container 194. Furthermore, a second wall extends from the first partition wall 212*d* toward the side wall 194*b* substantially parallel to the ink surface. The container 194 is separated into a ventilation side ink chamber 213*a* and a detection side ink chamber 213*b* by the first partition wall 212*d*. Furthermore, the second partition wall 212*e* separates the detection side ink chamber into a first detection side ink chamber 213*c* and a second detection side ink chamber 213*d*. A gap is provided between the bottom wall 2*a* and the lower end 212*dd* of the first partition wall 212*d*. Furthermore, a gap is provided between the side wall 194*b* and the one end 212*ee* of the second partition wall 212*e*. A concave part is provided on a part of top wall 194*c* to form a buffer 214*a* which accepts the bubble. Furthermore, porous member 1005*i* is filled inside the first detection side small ink chamber 213*c*. One end 212*ee* of the second partition wall 212*e*, which extends toward the side wall 194*b*, extends until to the position where just under the buffer 214*b*.

Therefore, first, the first partition wall 212*d* prevents the entering of bubble into the first detection side ink chamber 213*c*. If the bubble enters into the detection side ink chamber 213*c* mistakenly, the bubble is absorbed by the porous member 1005*i*. Furthermore, if the bubble reaches to the second partition wall 212*e*, the bubble is introduced to the position which is just under the buffer 214*a* by the second partition wall 212*e*. Therefore, the bubble is caught by the buffer 214*a*. Therefore, the malfunction of the actuator 106 to detects the ink end wrongly by the attaching of bubble to the actuator 106, which is provided in the second detection side ink chamber 213d, can be further prevented.

Figure 80:
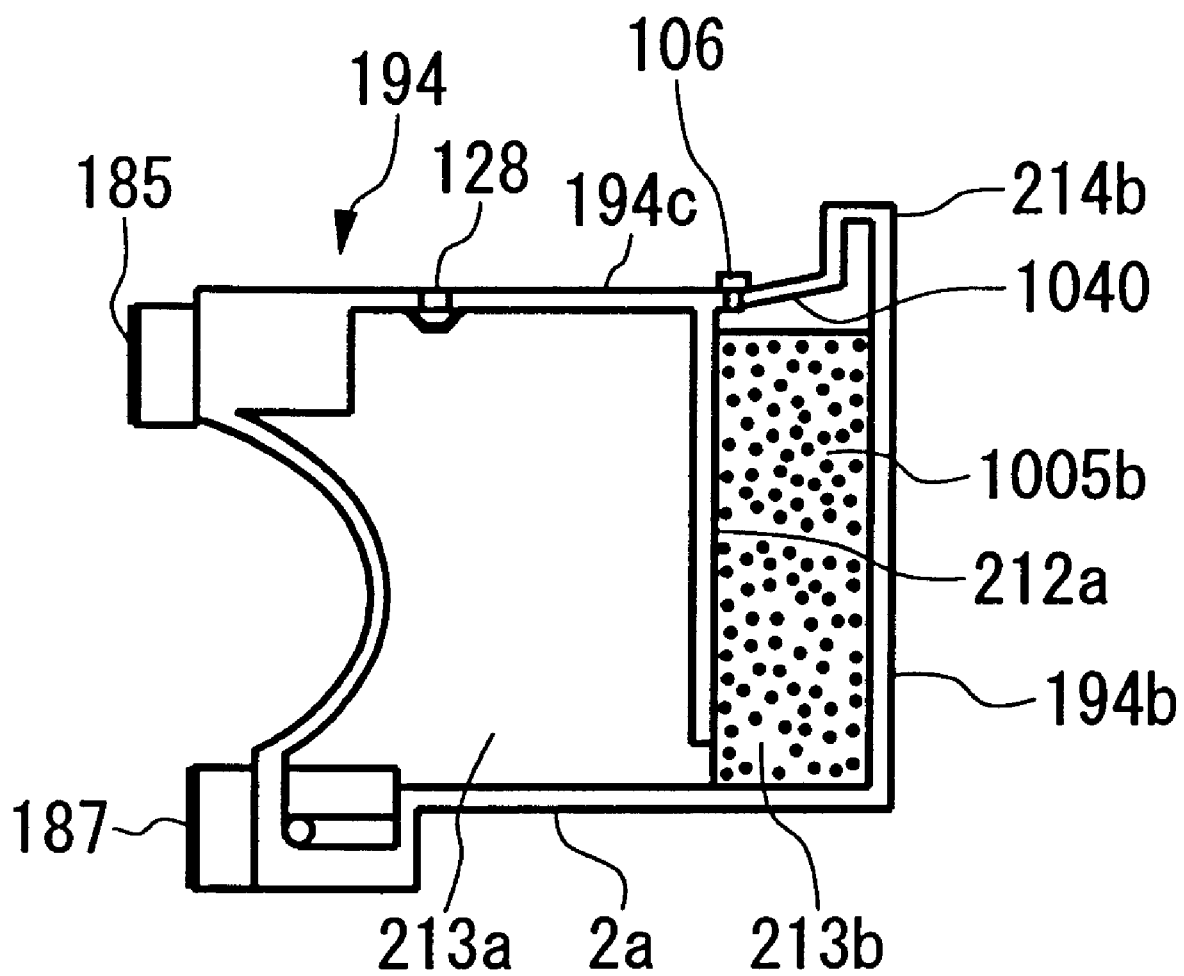
FIG. 80 shows further another embodiment of the ink cartridge 180.

FIG. 80 shows further another embodiment of the ink cartridge 180. An ink cartridge 180I shown in FIG. 80 has a partition wall 212a as same as the partition wall 212a of FIG. 72. The partition wall 212a extends downward from the top face 194c of the ink container 194. The container 194 is separated into a ventilation side ink chamber 213a and a detection side ink chamber 213b by the partition wall 212a. A gap is provided between the bottom wall 1a and the partition wall 212a. A porous member 1005b is provided inside the detection side ink chamber 213b. Furthermore, a concave part is provided on a part of top wall 194c to form a buffer 214b which accepts the bubble. A tapered face 1040 is provided between the buffer 214b and the actuator 106.

Therefore, first, the partition wall 212a prevents the entering of bubble into the detection side ink chamber 213b. If the bubble enters into the detection side ink chamber 213b mistakenly, the bubble is absorbed by the porous member 1005b. If the bubble reaches to the upper side of the detection side ink chamber 213b, the bubble is directly caught by the buffer 214a or introduced to the buffer 214b along the tapered face 1040.

Therefore, the malfunction of the actuator 106 to detects the ink end wrongly by the attaching of bubble to the actuator 106 can be further prevented. The shape and size of the buffer can be other arbitrary shape and size.

Moreover, the second partition wall 212e in the embodiment shown in FIG. 79 can be provided on the ink cartridge 180I of the embodiment shown in FIG. 80 such that the second partition wall 212e extends from the first partition wall 212a toward the side wall 214b in the direction parallel to the ink surface. In this case, one end 212ee of the second partition wall 212e is extended to the position just under the taper face 1040.

Figure 82:
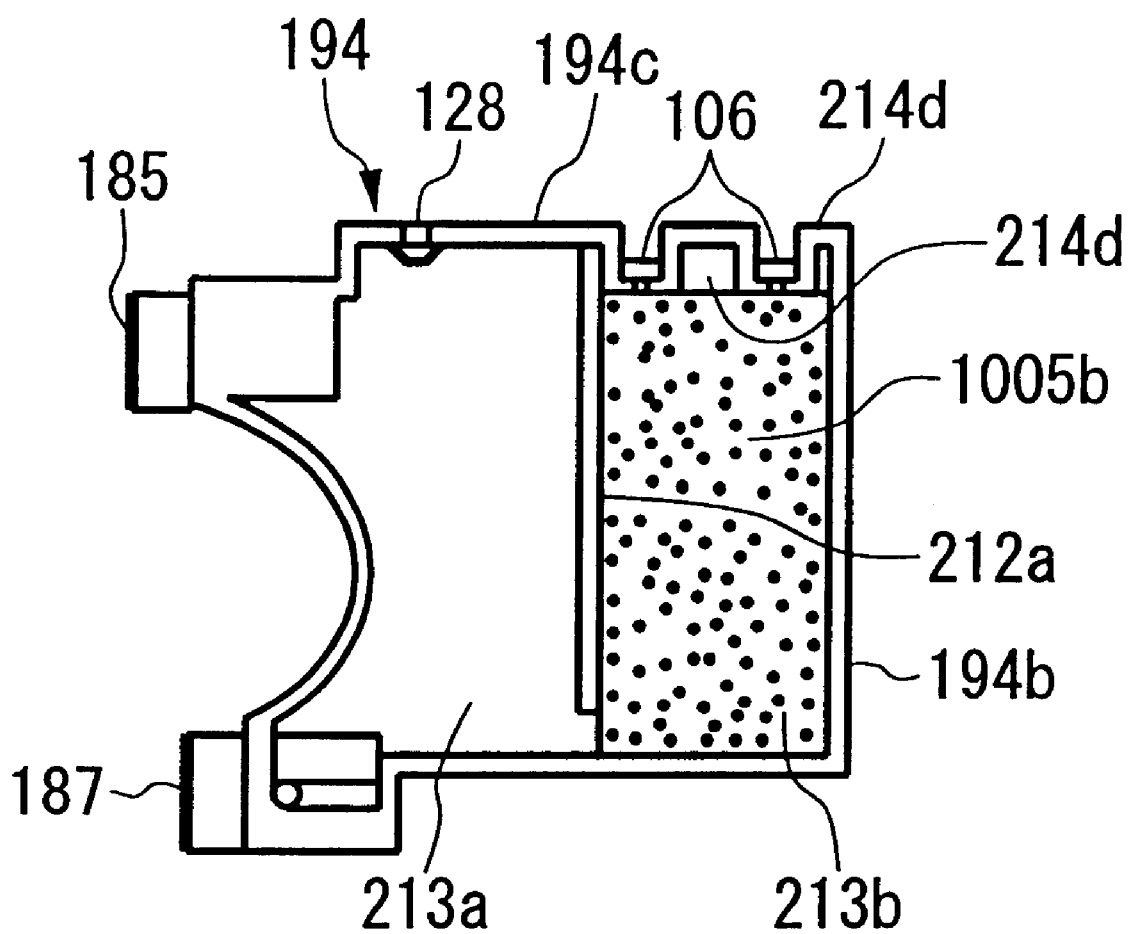
FIG. 82 shows further another embodiment of the ink cartridge 180.

FIG. 82 shows further another embodiment of the ink cartridge 180 using actuator 106. An ink cartridge 180K shown in FIG. 82 has a protruding part 214f, which protrudes inside the container 194, on a part of the top wall 194c. The actuator 106 is mounted on the bottom part of the protruding part 214f. A partition wall 212f extends downward from the top face 194c. A buffer 214c is. provided for each of the position between the actuator 106 and the partition wall 212a and between the actuator 106 and the side wall 194b. Therefore, the periphery of the actuator 106 is surrounded by the buffer 214c. A porous member 1005b is provided inside the detection side ink chamber 213b. By providing the actuator 106 on the protruding part 214f, positioning for mounting the actuator 106 on the ink cartridge 180J becomes easier when manufacturing the ink cartridge 180J.

Figure 81:
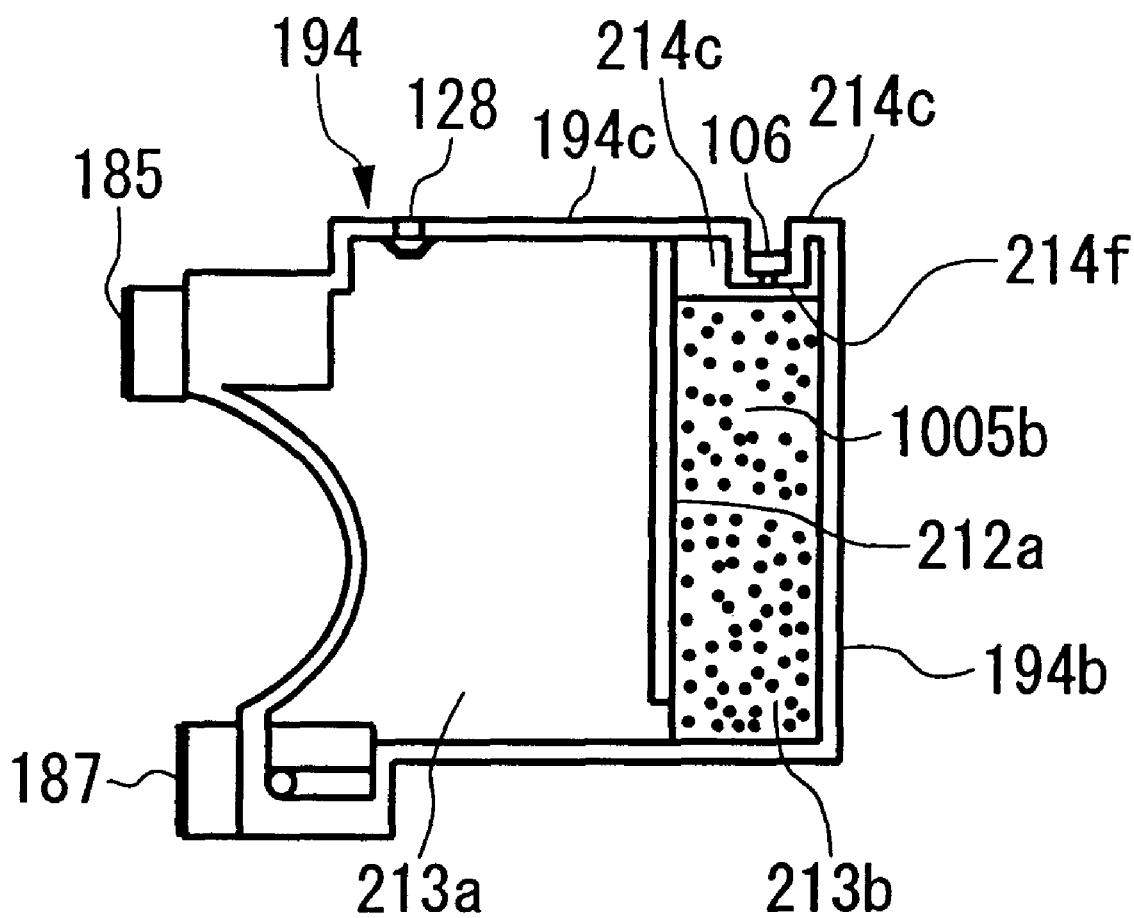
FIG. 81 shows further another embodiment of the ink cartridge 180.

FIG. 82 shows further another embodiment of the ink cartridge 180 using actuator 106. An ink cartridge 180K shown in FIG. 82 has a partition wall 212a extends downward from the top face 194c. The container 194 is separated into a ventilation side ink chamber 213a and a detection side ink chamber 213b by the partition wall 212g. Uneven part is provided on the top wall 194c, and two actuators 106 are mounted on the protruding part which protrudes inside the detection side ink chamber 213b. The concave part of the top wall 194c works as a buffer 214c which accepts bubble. Furthermore, a porous member 1005b is provided inside the detection side ink chamber 213b. By providing two actuators 106 on the protruding part 214f, detecting the ink consumption status mistakenly can be prevented. The number of the actuators 106 can be more than three. Moreover, as shown in FIG. 81, positioning for mounting the actuator 106 on the ink cartridge 180K becomes easier when manufacturing the ink cartridge 180K. The number of uneven part and the number of the actuator 106 can be further increased.

Figure 83:
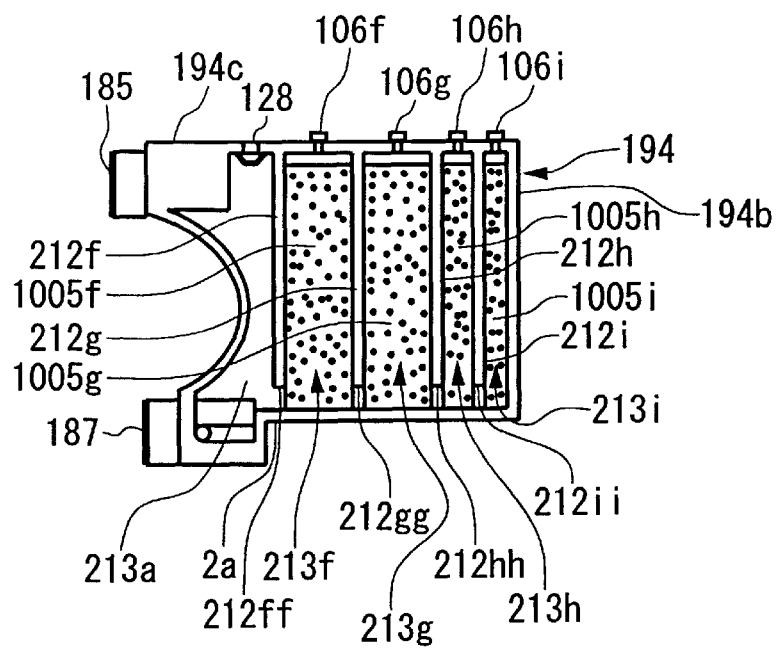
FIG. 83 shows further another embodiment of the ink cartridge 180.

FIG. 83 shows further other embodiment of the ink cartridge 180 using actuator 106. The ink cartridge 180M shown in FIG. 83 has a plurality of partition walls 212f, 212g, 212h, and 212i, each of which extends downward from the top face 194c of the ink container 194. The partition wall 212f is first partition wall, and the partition walls 212g, 212h, and 212i are the second partition walls. Because each of lower ends 212ff, 212gg, 212hh, and 212ii of each of the partition walls 212f, 212g, 212h, and 212i and the bottom wall 2a of the container 194 have a predetermined gap, the bottom part of the container 194 communicates with each other. The ink cartridge 180M has a ventilation side ink chamber 213a and a plurality of detection side small ink chambers 213f, 213g, 213h, and 213i separated by the each of plurality of partition walls 212f, 212g, 212h and 212i. The bottom part of a plurality of the detection side small ink chambers 213f, 213g, 213h, and 213i communicate with each other. Each of the actuators 106f, 106g, 106h, and 106i is mounted on the top face 194c of each of the plurality of the detection side small ink chambers 213f, 213g, 213h, and 213i, respectively. Each of the actuators 106f, 106g, 106h, and 106i is arranged on substantially center of the top face 194c of each of the plurality of the detection side small ink chambers 213f, 213g, 213h, and 213i, respectively.

The volume of the ventilation side ink chamber 213a, and the detection side small ink chamber 213f, 213g, 213h, and 213i are gradually decreases as the distance from the airhole 128 increases to the inner side of the ink container 194. Therefore, the volume of the ink chambers gradually decreases in the order from the ventilation side ink chamber 213a, the detection side small ink chamber 213f, 213g, 213h, and 213i. Therefore, the interval of the mounting position of the actuator 106 is wider on the airhole 128 side and becomes narrower as the distance from the airhole increases to the inner side of the ink container 194.

Furthermore, each of the porous members 1005f, 1005g, 1005h and 1005i are filled in the each of the detection side small ink chambers 213f, 213g, 213h, and 213i. The each of the porous members 1005f, 1005g, 1005h and 1005i are filled from the detection side small ink chambers 213f, which is near to the airhole 128, to the detection side small ink chamber 213i, which is far from the airhole 128, sequentially. The porous members are designed such that the hole diameter increases in the order from the porous member 1005f, 1005g, 1005h and 1005i. The porous members can be formed such that the affinity for ink decreases in the order from the porous member 1005f, 1005g, 1005h and 1005i.

Because gas is introduced from the airhole 128, ink is consumed from the ventilation side ink chamber 213a of the airhole 128 side to the detection side ink chamber 213i. For example, the ink in the ventilation side ink chamber 213a which is nearest to the airhole 128 is consumed, and during the ink level of the ventilation side ink chamber 213a decreases, the other detection side small ink chambers 213f, 213g, 213h, and 213i are filled with ink. When the ink level in the ventilation side ink chamber 213a reaches to the lower end 21ff of the partition wall 212f, air enters into the detection side small ink chamber 213f, and then the ink in the detection side small ink chamber 213f is beginning to be consumed. The ink level in the detection side small ink chamber 213f there by begin to decrease. At this time, ink is filled in the detection side small ink chambers 213g, 213h, and 213i. In this way, ink is sequentially consumed from the ventilation side ink chamber 213a to the detection side small ink chamber 213i.

Furthermore, the porous members are designed such that the hole diameter increases in the order from the porous members 1005f, 1005g, 1005h and 1005i. Therefore, ink is consumed in the order from the detection side small ink chamber 213f which is relatively near to the airhole 128 to the detection side small ink chamber 213I which is far from the airhole 128, sequentially. Moreover, the porous members 1005f, 1005g, 1005h and 1005I prevent ink to flow back from the detection side small ink chamber 213f to the detection side small ink chamber 213i.

In the present embodiment, each of the actuators 106f, 106g, 106h, and 106i is mounted on the top wall 194c of each of the detection side small ink chambers 213f, 213g, 213h, and 213I with interval. Therefore, the actuators 106f, 106g, 106h, and 106i can detect the decrease of the ink quantity step by step. Furthermore, the volume of the ink chambers decreases from the ventilation side ink chamber 213a to the detection side small ink chamber 213i gradually. Therefore, the time interval of detecting the decrease of the ink quantity gradually decreases. Therefore, the frequency of the ink quantity detection can be increased as the ink end is drawing near.

Figure 87:
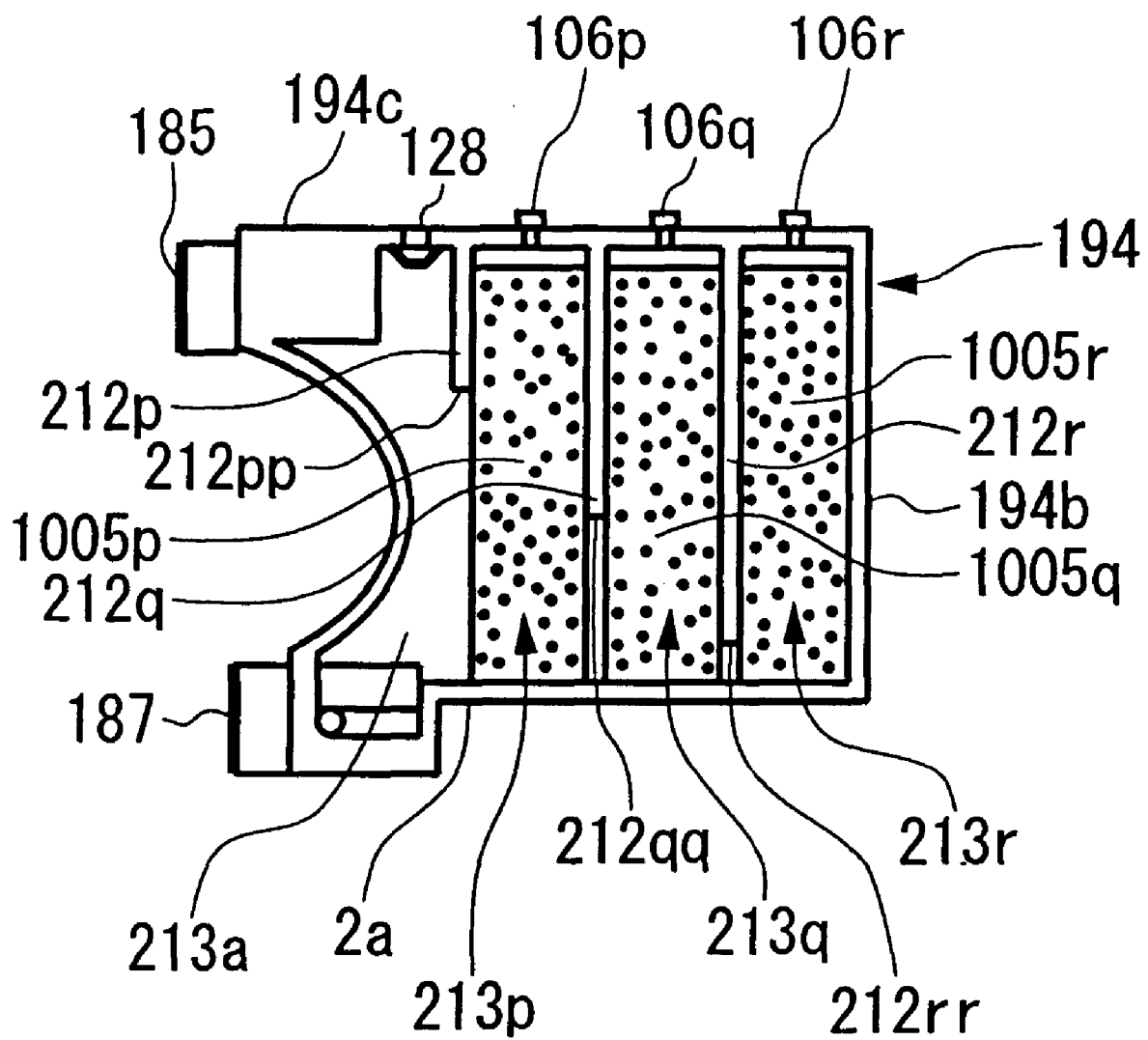
FIG. 87 shows further other embodiment of the ink cartridge 180.

Furthermore, each of the volume of the detection side small ink chamber can be changed by changing the length of the partition wall as in the embodiment shown in FIG. 87.

Figure 84:
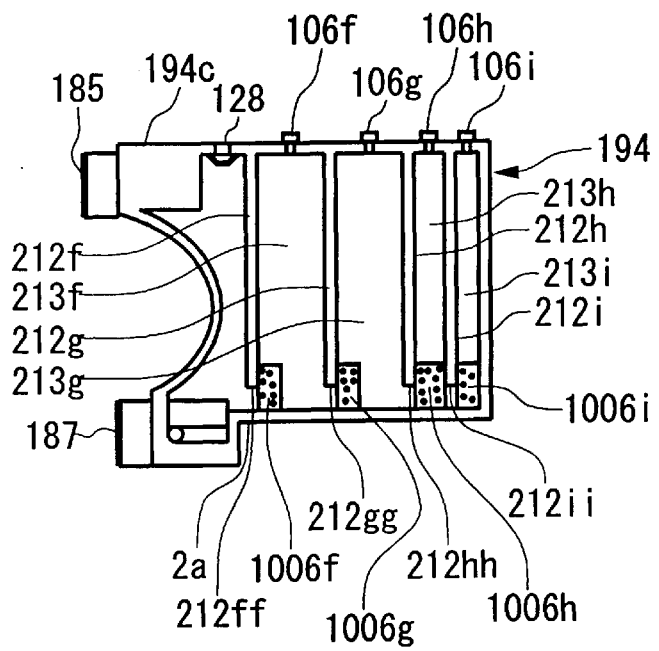
FIG. 84 shows further another embodiment of the ink cartridge 180.

FIG. 84 shows further other embodiment of the ink cartridge 180 using actuator 106. In the ink cartridge 180N shown in FIG. 84, porous members 1006f, 1006g, 1006h and 1006i are provided in the ink cartridge 180N such that each porous members 1006f, 1006g, 1006h and 1006i closes the each of the communication port of the ventilation side ink chamber 213a, the detection side small ink chambers 213f, 213g, 213h, and 213i. Each of the ventilation side ink chamber 213a, the detection side small ink chambers 213f, 213g, 213h, and 213i communicates each other through the porous members 1006f, 1006g, 1006h and 1006i. Therefore, the porous members prevent the bubble, which is generated in the ink container 194, to enter into the ventilation side ink chamber 213a, the detection side small ink chambers 213f, 213g, 213h, and 213i. Therefore, even if the bubble generates in one of the detection side ink chambers, and one of the actuators 106f, 106g, 106h, and 106i detects the ink end status mistakenly, the other actuators 106f, 106g, 106h, and 106i do not detect the ink end status mistakenly.

Figure 85:
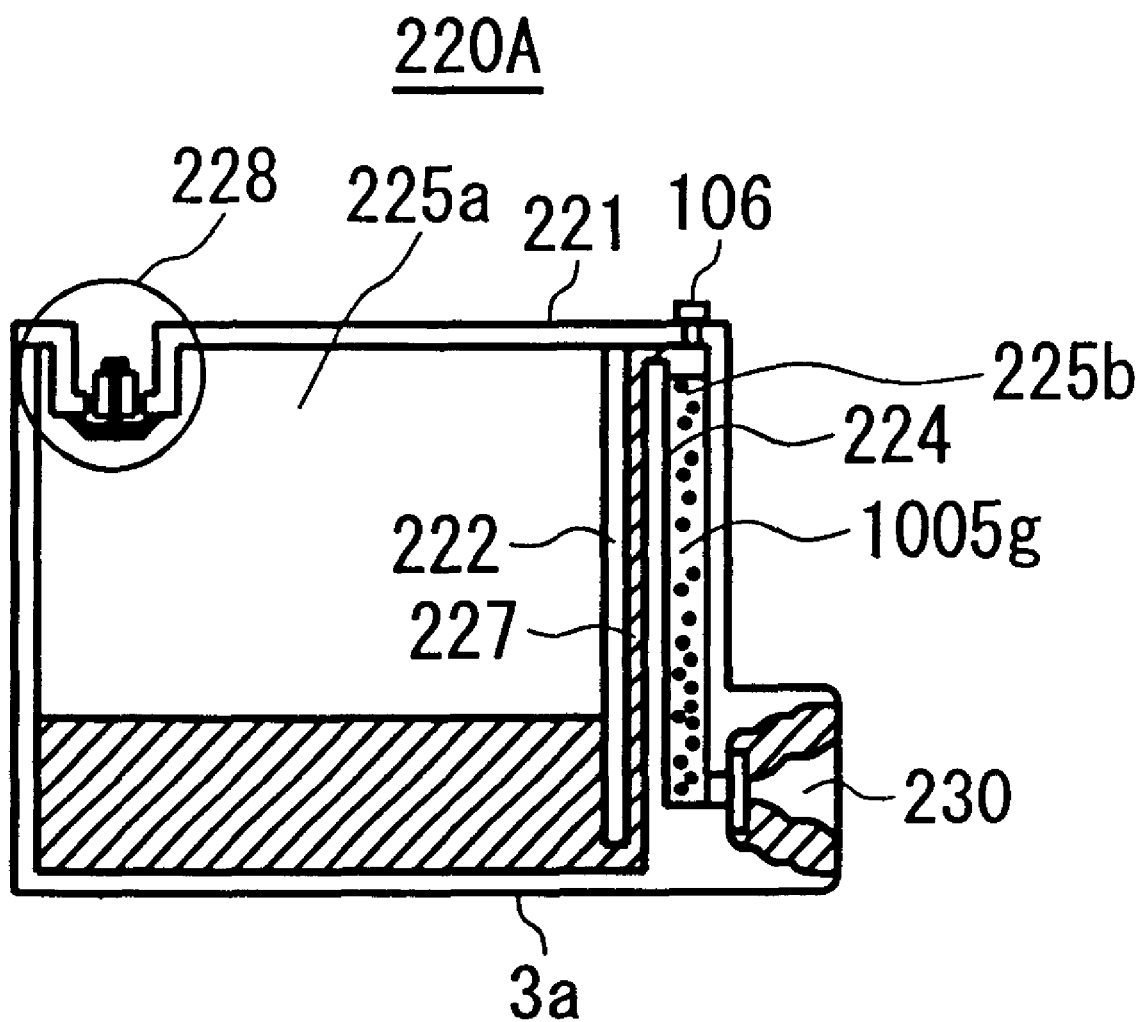
FIG. 85 shows further other embodiment of the ink cartridge using the actuator 106.

FIG. 85 shows further other embodiment of the ink cartridge using the actuator 106. The ink cartridge 220A shown in FIG. 85 has a first partition wall 222 provided such that it extends downward from the top wall of the ink cartridge 220A. Because there is a predetermined space between the lower end of the first partition wall 222 and the bottom wall 3a of the ink cartridge 220A, ink can flows into the ink supply port 230 through the bottom wall 3a of the ink cartridge 220A. A second partition wall 224 is formed such that the second partition wall 224 extends upward from the bottom wall 3a of the ink cartridge 220A on the more ink supply port 230 side of the first partition wall 222. Because there is a predetermined space between the upper end of the second partition wall 224 and the top wall 221 of the ink cartridge 220A, ink can flows into the ink supply port 230 through the top wall 221 of the ink cartridge 220A.

A ventilation side ink chamber 225a is formed relatively near to the airhole 233. On the other hand, a detection side ink chamber 225b is formed relatively far from the airhole 233. By the second partition wall 224, the detection side ink chamber 225b and a detection side small ink chamber 227 are formed. The detection side small ink chamber 227 is formed between the first partition wall 222 and the second partition wall 224. The detection side small ink chamber 227 is formed by providing a gap, which can generate the capillary phenomenon, between the first partition wall 222 and the second partition wall 224. Therefore, the ink in the ventilation side ink chamber 225a is collected to the detection side small ink chamber 227 by the capillary force of the detection side small ink chamber 227. Therefore, the detection side small ink chamber 227 can prevent that the air bubble to enter into the detection side ink chamber 225b. Furthermore, the ink level in the detection side ink chamber 225b can decrease steadily and gradually.

Moreover, a porous member 1005g is provided inside the detection side ink chamber 225b. The volume of the ventilation side ink chamber 225a is larger than the volume of the detection side ink chamber 225b. Because the ventilation side ink chamber 225a is formed closer to the airhole 223 than the detection side small ink chamber 225b, the ink in the detection side small ink chamber 225b is consumed after the ink in the ventilation side ink chamber 225a is consumed. Furthermore, the waving of ink inside the detection side small ink chamber 225b is prevented by providing the porous member 1005g inside the detection side small ink chamber 225b. Moreover, the porous member 1005g prevents the bubble, which is entered from the ink supply port 230, to attach to the actuator 106.

Furthermore, the capillary force of the porous member 1005g is greater than the capillary force of the detection side small ink chamber 227. The porous member 1005g thereby prevents ink to flow back from the ink supply port 230 to the ventilation side small ink chamber 225a. The capillary force of the porous member 1005g can be increased by adjusting the hole diameter. Moreover, the capillary force of the porous member 1005g can be increased by compressing the porous member 1005g.

A airhole 233 is provided on the top wall of the ink cartridge 220A. Moreover, a check valve 228 is provided on the airhole 233 for preventing the leaking of ink from the airhole 233. The leaking of ink outside the ink cartridge 220A caused by the rolling of the ink cartridge 220A can be prevented by the check valve 228. Furthermore, the evaporation of ink from the airhole 233 of the ink cartridge 220A can be prevented by providing the check valve 228 on the top face of the ink cartridge 220A. If ink in the ink cartridge 220A is consumed, and negative pressure inside the ink cartridge 220A exceeds the pressure of the check valve 228, the check valve 228 opens and introduces air into the ink cartridge 220A. Then the check valve 228 closes to accelerate the drainage of ink from the ink cartridge 220A.

Here, a piezoelectric device as an embodiment of a liquid censor will be explained. The piezoelectric device, or actuator, detects a state of the liquid inside a liquid container by utilizing vibration phenomena. The state of the liquid includes whether or not the liquid in the liquid container is empty, amount of the liquid, level of the liquid, types of the liquid and combination of liquids. Several specific methods realizing for detection of the state of the liquid inside the liquid container utilizing vibration phenomena are considered. For example, a method is considered in which the medium and the change of its state inside the liquid container are detected in such a manner that an elastic wave generating device generates an elastic wave inside the liquid container, and then the reflected wave which is thus reflected by the liquid surface or a wall disposed counter thereto is captured. There is another method in which a change of acoustic impedance is detected by vibrating characteristics of a vibrating object. As a method utilizing the change of the acoustic impedance, a vibrating portion of a piezoelectric device or an actuator having a piezoelectric element therein is vibrated. Thereafter, a resonant frequency or an amplitude of the back electromotive force waveform is detected by measuring the back electromotive force which is caused by residual vibration which remains in the vibrating portion, so as to detect the change of the acoustic impedance. As another method utilizing the change of the acoustic impedance, the impedance characteristic or admittance characteristic of the liquid is measured by a measuring apparatus such as an impedance analyzer and a transmission circuit, so that the change of a current value or a voltage value, or the change of the current value or voltage value due to the frequency caused by the vibration given to the liquid is measured. In the present embodiment, the actuator 106 can detect the liquid status inside the liquid container by any method mentioned above.

Figure 86:
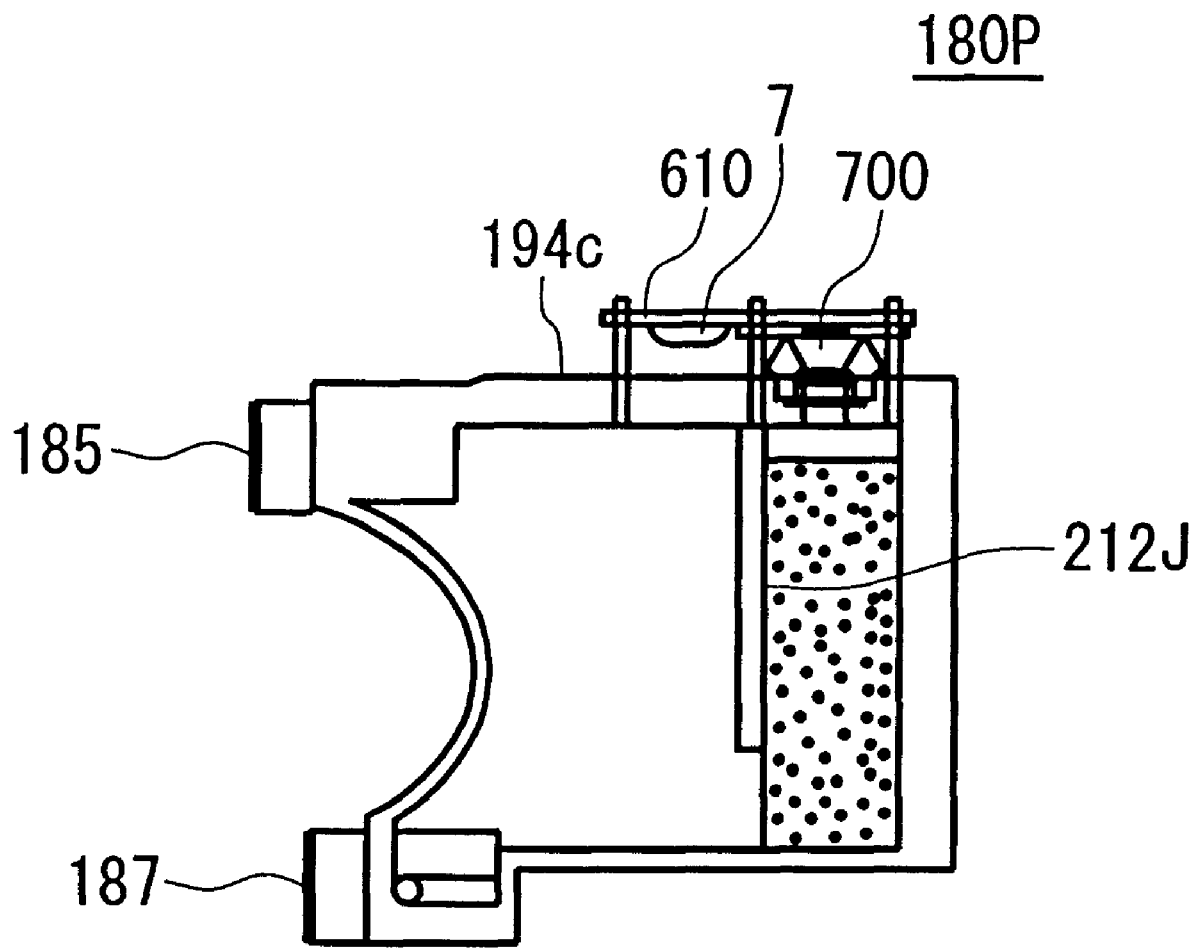
FIG. 86 shows further other embodiment of the ink cartridge 180.

FIG. 86 shows further other embodiment of the ink cartridge 180. FIG. 86 shows a cross section of an ink cartridge 180P. The semiconductor memory device 7 and the actuator 106 are formed on the same circuit board 610 in the ink cartridge 180P.

A different-type O-ring 614 is mounted on the side wall 194b such that the different-type O-ring 614 surrounds the actuator 106. A plurality of caulking part 616 is formed on the side wall 194b to couple the circuit board 610 with the container 194. By coupling the circuit board 610 with the container 194 using the caulking part 616 and pushing the different-type O-ring 614 to the circuit board 610, the vibrating region of the actuator 106 can contacts with ink, and at the same time, the inside of the ink cartridge is sealed from outside of the ink cartridge.

A terminals 612 are formed on the semiconductor memory device 7 and around the semiconductor memory device 7. The terminal 612 transfer the signal between the semiconductor memory device 7 and outside the ink jet recording apparatus. The semiconductor memory device 7 can be constituted by the semiconductor memory which can be rewritten such as EEPROM. Because the semiconductor memory device 7 and the actuator 106 are formed on the same circuit board 610, the mounting process can be finished at one time during mounting the semiconductor memory device 7 and the actuator 106 on the ink cartridge 180P. Moreover, the working process during the manufacturing of the ink cartridge 180C and the recycling of the ink cartridge 180P can be simplified. Furthermore, the manufacturing cost of the ink cartridge 180P can be reduced because the numbers of the parts can be reduced.

The actuator 106 detects the ink consumption status inside the container 194. The semiconductor memory device 7 stores the information of ink such as residual quantity of ink detected by the actuator 106. That is, the semiconductor memory device 7 stores the information related to the characteristic parameter such as the characteristic of ink and the ink cartridge used for the actuator 106 when detecting the ink consumption status. The semiconductor memory device 7 previously stores the resonant frequency of when ink inside the container 194 is full, that is, when ink is filled in the container 194 sufficiently, or when ink in the container 194 is end, that is, ink in the container 194 is consumed, as one of the characteristic parameter. The resonant frequency when the ink inside the container 194 is full status or end status can be stored when the ink container is mounted on the ink jet recording apparatus for the first time. Moreover, the resonant frequency when the ink inside the container 194 is full status or end status can be stored during the manufacturing of the container 194. Because the unevenness of the detection of the residual quantity of ink can be compensated by storing the resonant frequency when the ink inside the container 194 is full status or end status in the semiconductor memory device 7 previously and reading out the data of the resonant frequency at the ink jet recording apparatus side, it can be accurately detected that the residual quantity of ink is decreased to the reference value.

FIG. 87 shows further other embodiment of the ink cartridge 180. The ink cartridge 180Q shown in FIG. 87 has a plurality of partition walls 212p, 212q, and 212r. The partition walls 212p, 212q, and 212r separates the ink container 194 into the ventilation side ink chamber 213a and the detection side small ink chamber 213p, 213q, and 213r. The partition wall 212p is the first partition wall, and the partition walls 212q and 212r are the second partition walls. Each of porous members 1005p, 1005q, and 1005r are provided in the each of the detection side small ink chamber 213p, 213q, and 213r. Furthermore, each of partition walls 212p, 212q, and 212r are provided on the top wall 194c with substantially equal intervals. Furthermore, each of the partition walls 212p, 212q, and 212r extends from the top wall 194c toward the bottom wall 2a. Each of the partition walls 212p, 212q, and 212r have different length. Moreover, the length of the partition walls 212p, 212q, and 212r increases in the order of the partition wall 212p, 212q, and 212r. Therefore, even the interval between the each of the partition walls 212p, 212q, and 212r is different, the volume of the each of the detection side small ink chambers are different with each other.

Because the length of each of the partition walls 212p, 212q, and 212r increases with the increase of the distance from the airhole 128, gas is most difficult to enter into the detection side small ink chamber 213r which is farthest from the airhole 128. Therefore, the actuator 106r can detect the ink existence most accurately among the actuators 106p, 106q, and 106r which is mounted on the each of the detection side small ink chamber 213p, 213q, and 213r.

Figure 88:
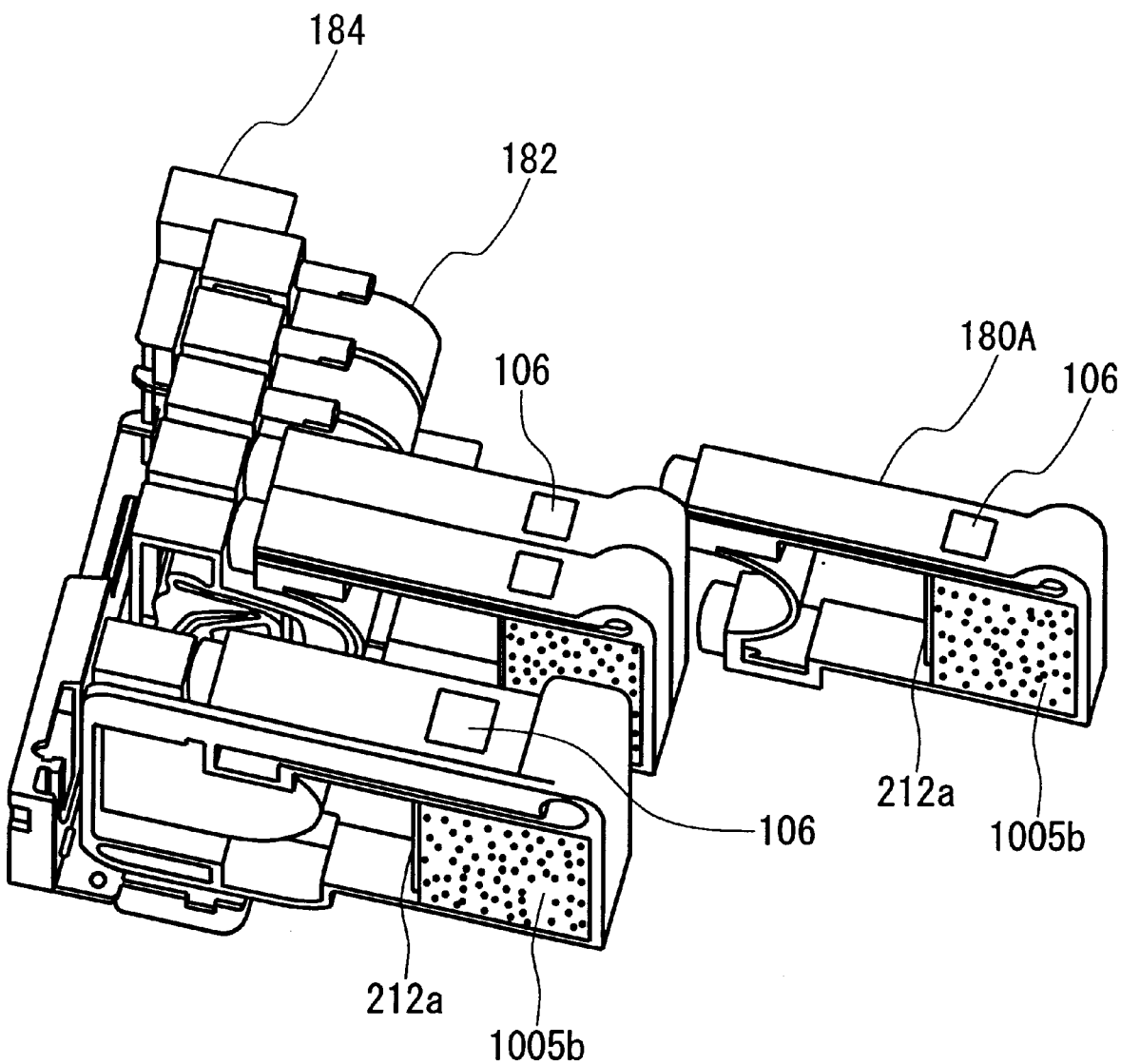
FIG. 88 shows an embodiment around a recording head of part of the ink cartridge and an ink jet recording apparatus which uses the actuator 106.

FIG. 88 shows an embodiment around a recording head of part of the ink cartridge and an ink jet recording apparatus which uses the actuator 106. In the present embodiment, the ink cartridge 180A shown in FIG. 72 is used. However, the ink cartridge in any of the ink cartridge shown in FIG. 73 to FIG. 84 also can be used. Furthermore, the ink cartridge of the other form also can be used. A plurality of ink cartridges 180A is mounted on the inkjet recording apparatus which has a plurality of ink introducing members 182 and a holder 184 each corresponding to the each of ink cartridge 180, respectively. Each of the plurality of ink cartridges 180A contains different types of ink, for example, different color of ink. The actuator 106, which detects at least acoustic impedance, is mounted on the each of top wall of the plurality of ink cartridge 180A. The actuator 106, a partition wall 212a, and a porous member 1005b are provided for each top wall of the plurality of ink cartridge 180A. The residual quantity of ink in the ink cartridge 180 can be detected by mounting the actuator 106 on the ink cartridge 180. The partition wall 212a prevents the waving and bubbling of ink.

Figure 89:
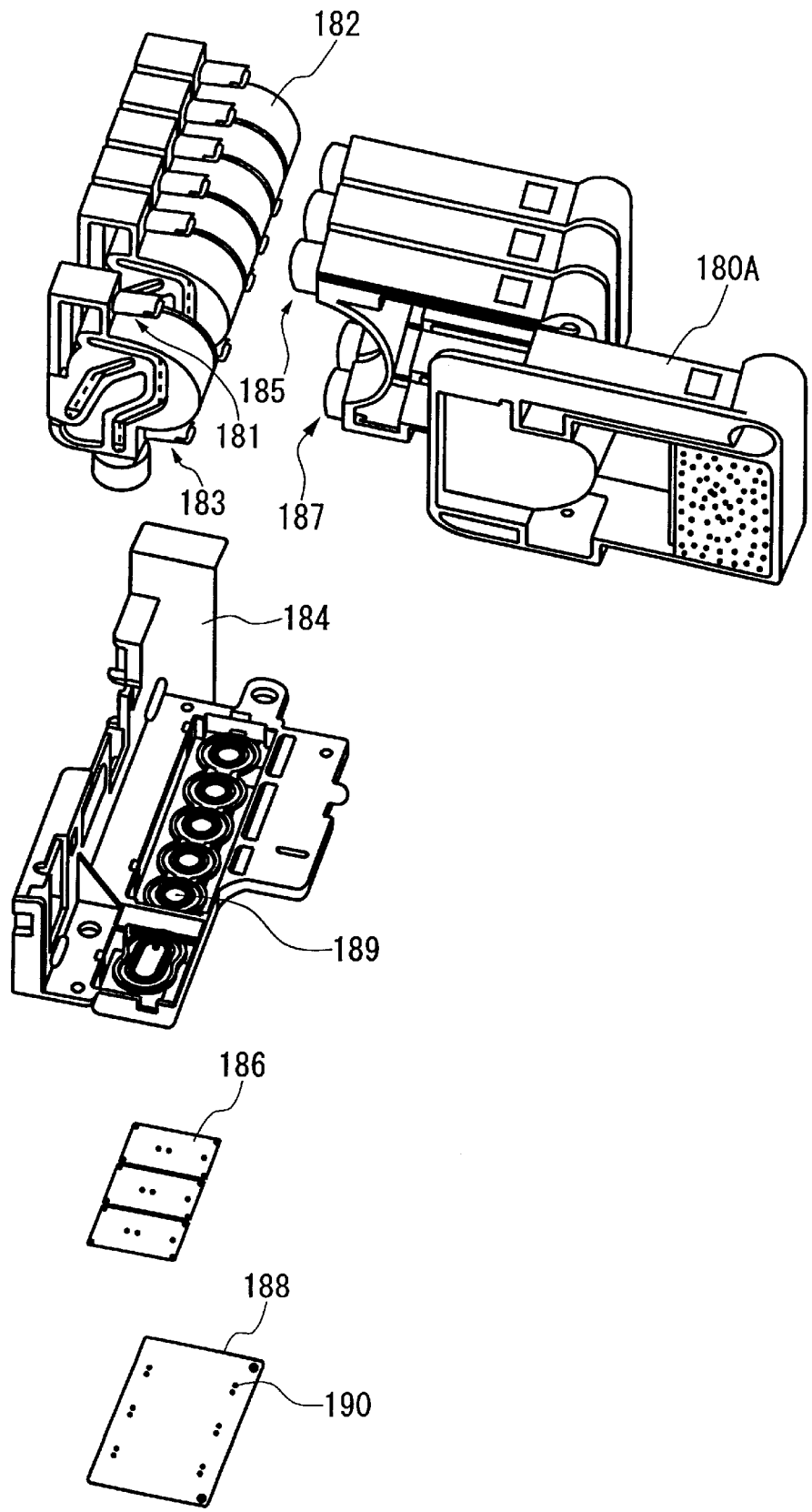
FIG. 89 shows a detail around the head member of the ink jet recording apparatus.

FIG. 89 shows a detail around the head member of the ink jet recording apparatus. In the present embodiment, the ink cartridge 180A shown in FIG. 72 is used. However, the ink cartridge in any of the ink cartridge shown in FIG. 73 to FIG. 84 also can be used. Furthermore, the ink cartridge of the other form also can be used. The inkjet recording apparatus has an ink introducing member 182, a holder 184, a head plate 186, and a nozzle plate 188. A plurality of nozzle 190, which jet out ink, is formed on the nozzle plate 188. The ink introducing member 182 has an air supply hole 181 and an ink introducing inlet 183. The air supply hole 181 supplies air to the ink cartridge 180. The ink introducing inlet 183 introduces ink from the ink cartridge 180A. The ink cartridge 180A has an air introducing inlet 185 and an ink supply port 187. The air introducing inlet 185 introduces air from the air supply hole 181 of the ink introducing member 182. The ink supply port 187 supplies ink to the ink introducing inlet 183 of the ink introducing member 182. By introducing air from the ink introducing member 182 to the ink cartridge 180, the ink cartridge 180 accelerates the supply of ink from the ink cartridge 180A to the ink introducing member 182. The holder 184 communicates ink, which is supplied from the ink cartridge 180A through the ink introducing member 182, to the head plate 186. Ink is supplied to the head from the ink cartridge 180A through the ink introducing member 182 and discharged to the recording medium from nozzle. In this way, the ink jet recording apparatus performs the printing on the recording medium.

Figure 90:
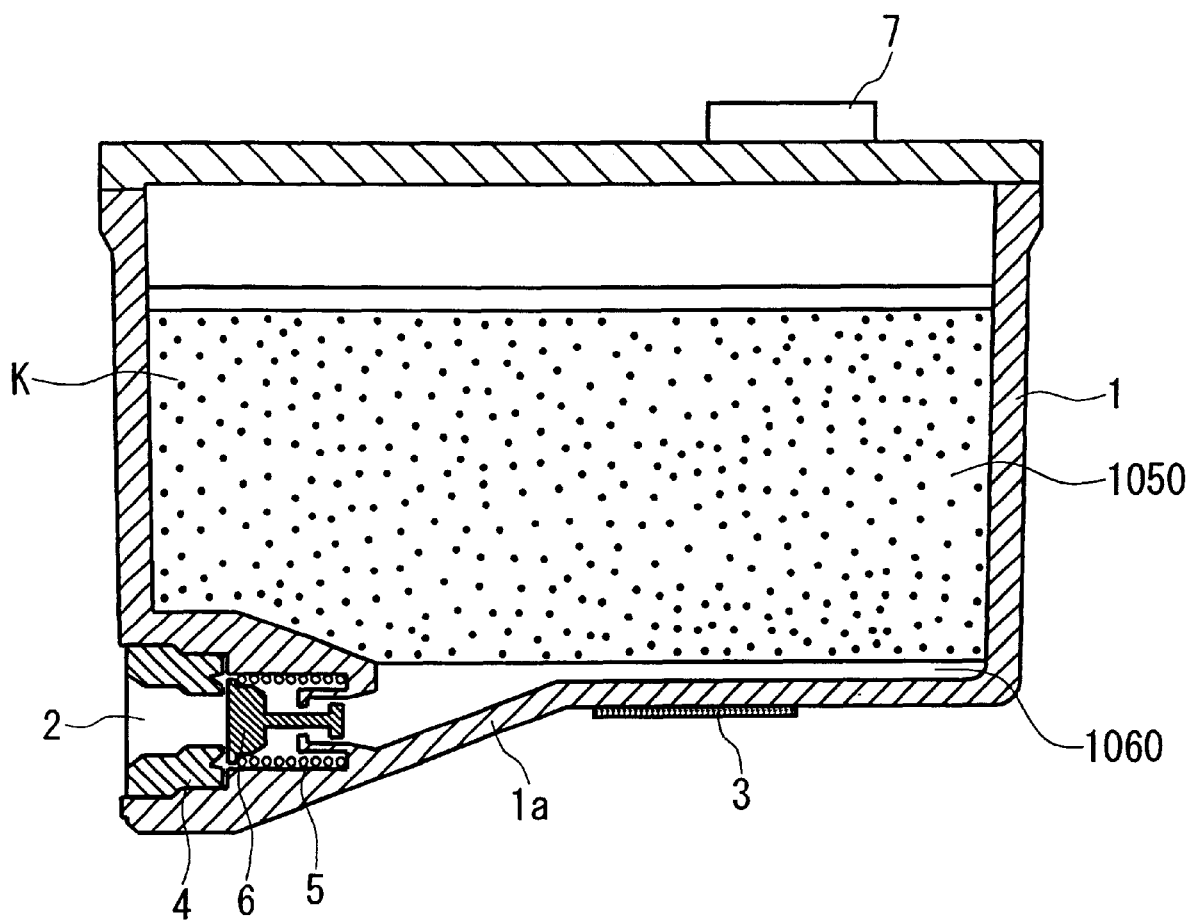
FIG. 90 is a cross sectional view of an embodiment of an ink cartridge for use with a single color, for example, the black ink.

FIG. 90 is a cross sectional view of an embodiment of an ink cartridge for use with a single color, for example, the black ink. In the ink cartridge shown in FIG. 90, the detection method implemented is based on a method, among methods described above, in which the position of the liquid surface in the liquid container and whether or not the liquid is empty are detected by receiving the reflected wave of the elastic wave. As a means for generating and receiving the elastic wave, an elastic wave generating device 3 is utilized. An ink supply port 2 which comes in contact with an ink supply needle of the recording apparatus in a sealed manner is provided in a container 1 which houses the ink. In an outside portion of a bottom face 1a of the container 1, the elastic wave generating device 3 is mounted such that the elastic wave can be communicated, via the container, to the ink inside the container.

In order that at a stage at which the ink K is almost used up, i.e. at the time when the ink becomes an ink-end state, the transfer of the elastic wave can change from the liquid to the gas, the elastic wave generating device 3 is provided in a slightly upward position from the ink supply port 2. Moreover, an elastic wave receiving means may be separately provided instead, so that the elastic wave generating device 3 is used as an elastic wave generating device only.

Figure 91:
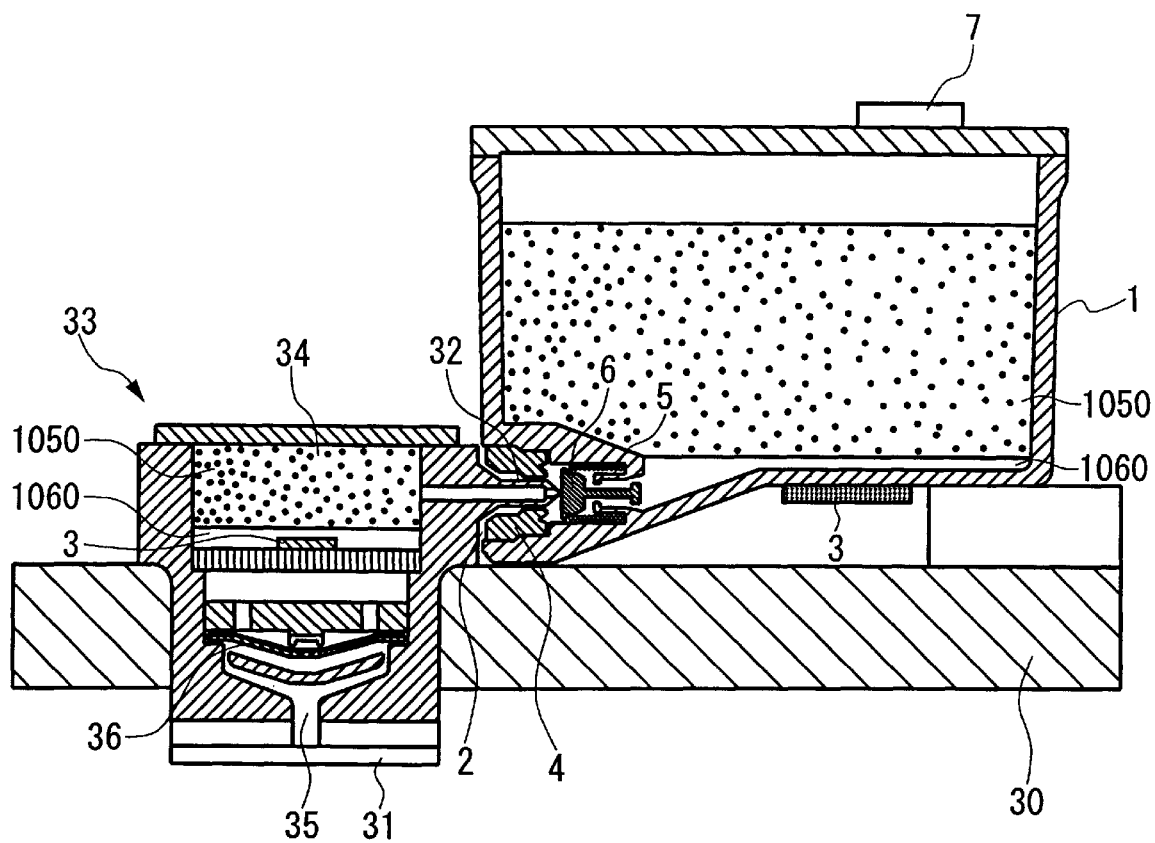
FIG. 91 is a cross sectional view showing an embodiment of a major part of the ink-jet recording apparatus suitable for the ink cartridge shown in FIG. 90.

A packing ring 4 and a valve body 6 are provided in the ink supply port 2. Referring to FIG. 91, the packing ring 4 is engaged with the ink supply needle 32 communicating with a recording head 31, in a fluid-tight manner. The valve body 6 is constantly and elastically contacted against the packing ring 4 by way of a spring 5. When the ink supply needle 32 is inserted, the valve body 6 is pressed by the ink supply needle 32 so as to open an ink passage, so that ink inside the container 1 is supplied to the recording head 31 via the ink supply port 2 and the ink supply needle 32. On an upper wall of the container 1, there is mounted a semiconductor memory means 7 which stores data on ink inside the ink cartridge.

Furthermore, a porous member 1050 is provided inside the container 1. A gap is provided between the porous member 1050 and the elastic wave generating device 3 to form an ink layer. By providing the porous member 1050 inside the container 1, the porous member 1050 prevents the waving or bubbling of ink inside the container 1 when the ink cartridge moves together with the recording head by the scanning operation during the printing process. Therefore, the bubble and wave of ink is difficult to generate around the elastic wave generating device 3, the elastic wave generating device 3 can accurately detect the ink consumption status.

Furthermore, the hole diameter of porous member 1050 is set such that the porous member 1050 does not absorbs ink existed in the ink layer 1060 when the ink surface reaches to the ink layer 1060 by the consumption of ink inside the container 1. In other words, the porous member 1050 is designed such that the capillary force works in the porous member 1050 does not hold ink in the container 1. Therefore, ink does not remain in the porous member 1050 by its own weight and remains in the ink layer 1060 when the ink inside the container 1 is in an ink near end status.

An airhole, not shown in the figure, is provided on the container 1. The airhole is provided on the upper side of the ink surface to communicate with outside of container 1. Air is introduced inside the container 1 by the airhole, and ink flows downward by its own weight with advance of ink consumption. The residual ink thereby stays in the ink layer 1060. Because the porous member 1050 is provided inside the container 1, the elastic wave generating device 3 can detect the ink quantity only when the ink status is near to the ink end if the width of the ink layer is small. However, ink does not wave by providing the porous member 1050 in the container 1. Therefore, the elastic wave generating device 3 can detect the ink surface accurately when the ink surface inside the container 1 reaches to the lower end of the porous member 1050, and ink surface exists within the ink layer 1060.

Moreover, the width of the gap between the porous member 1050 and the elastic wave generating device 3 is not limited. To suppress the bubbling of ink as much as possible, the width of ink layer 1060 is reduced by providing the porous member 1050 on lower side of the container 1. If the width of the ink layer 1060 is small, the elastic wave generating device 3 can detect the ink quantity only when the ink status is near to the ink end. However, ink does not wave inside the container 1. Therefore, the elastic wave generating device 3 can accurately detect the ink quantity and existence of ink when the ink consumption status is near to the ink end status. Therefore, the porous member 1050 is preferably located nearby the elastic wave generating device 3 without limiting the width of gap between the porous member 1050 and elastic wave generating device 3. Moreover, even the bubble of ink generates, because the bubble of ink is absorbed in the porous member 1050, the bubble does not stays around the elastic wave generating device 3. The porous member 1050 thereby prevents the elastic wave generating device 3 to detect the ink consumption status mistakenly.

FIG. 91 is a cross sectional view showing an embodiment of a major part of the ink-jet recording apparatus suitable for the ink cartridge shown in FIG. 90. A carriage 30 capable of reciprocating in the direction of the width of the recording paper is equipped with a subtank unit 33, while the recording head 31 is provided in a lower face of the subtank unit 33. Moreover, the ink supply needle 32 is provided in an ink cartridge mounting face side of the subtank unit 33.

While the recording apparatus is operating, a drive signal is supplied to the elastic wave generating device 3 at a detection timing which is set in advance, for example, at a certain period of time. The elastic wave generated by the elastic wave generating device 3 is transferred to the ink by propagating through the bottom face 1a of the container 1 so as to be propagated to the ink.

By adhering the elastic wave generating device 3 to the container 1, since a process of embedding electrodes for use in detecting the liquid surface is unnecessary in the course of forming the container 1, an injection molding process can be simplified and the leakage of the liquid from a place in which the electrodes are supposedly embedded can be avoided, thus improving the reliability of the ink cartridge.

Furthermore, a porous member 1050 is provided inside the container 1. By providing the porous member 1050 inside the container 1, the porous member 1050 prevents the waving or bubbling of ink inside the container 1 when the ink cartridge moves together with the recording head by the scanning operation during the printing process. Because the bubble and wave of ink is difficult to generate around the elastic wave generating device 3, the elastic wave generating device 3 can accurately detect the ink consumption status.

Figure 92:
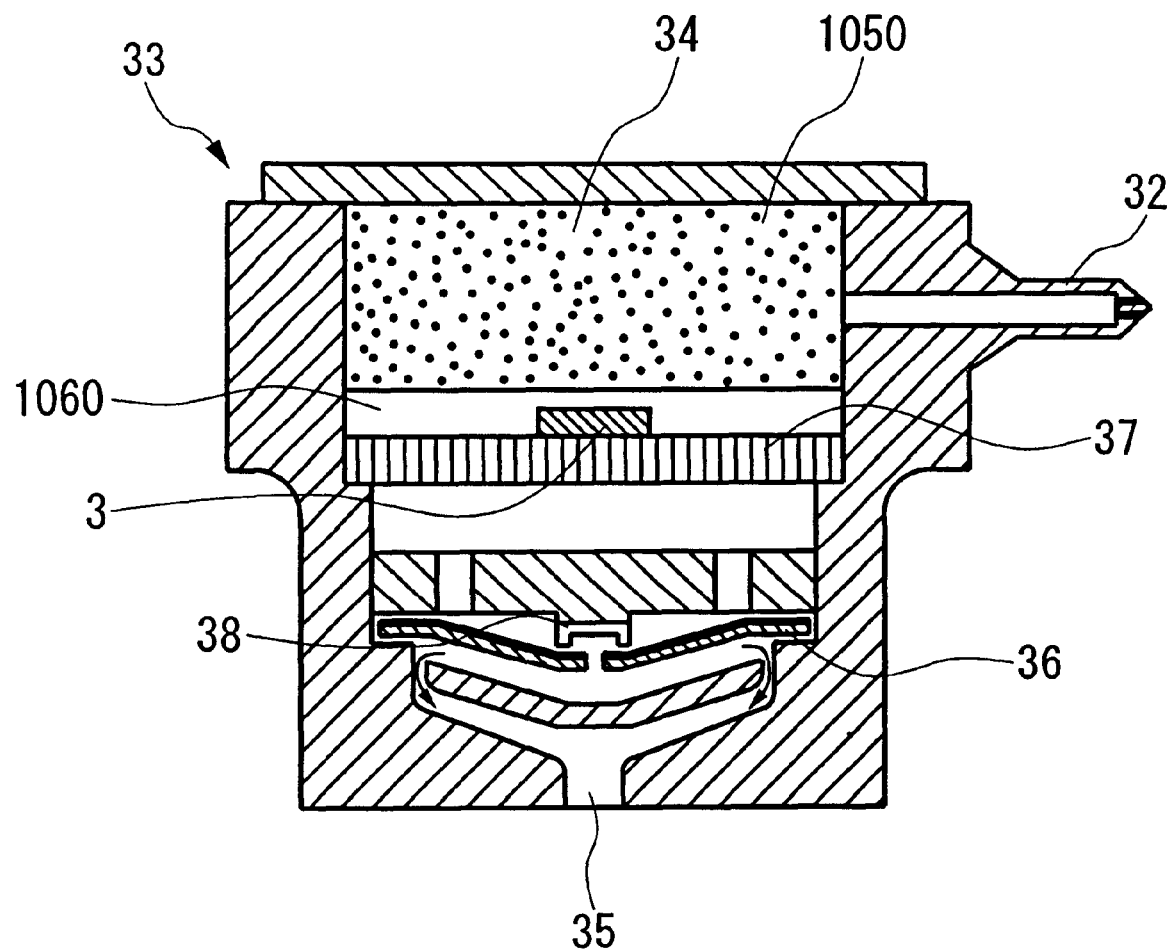
FIG. 92 is a detailed cross sectional view of a subtank unit 33.

FIG. 92 is a detailed cross sectional view of a subtank unit 33. The subtank unit 33 comprises the ink supply needle 32, the ink chamber 34, a flexible valve 36 and a filter 37. In the ink chamber 34, the ink is housed which is supplied from the ink cartridge via ink supply needle 32. The flexible valve 36 is so designed that the flexible valve 36 is opened and closed by means of the pressure difference between the ink chamber 34 and the ink supply passage 35. The subtank unit 33 is so constructed that the ink supply passage 35 is communicated with the recording head 31 so that the ink can be supplied up to the recording head 31.

Referring to FIG. 91, when the ink supply port 2 of the container 1 is inserted through the ink supply needle 32 of the subtank unit 33, the valve body 6 recedes against the spring 5, so that an ink passage is formed and the ink inside the container 1 flows into the ink chamber 34. At a stage where the ink chamber 34 is filled with ink, a negative pressure is applied to a nozzle opening of the recording head 31 so as to fill the recording head with ink. Thereafter, the recording operation is performed.

When the ink is consumed in the recording head 31 by the recording operation, a pressure in the downstream of the flexible valve 36 decreases. Then, the flexible valve 36 is positioned away from a valve body 38 so as to become opened. When the flexible valve 36 is opened, the ink in the ink chamber 34 flows into the recording head 31 through the ink passage 35. Accompanied by the ink which has flowed into the recording head 31, the ink in the container 1 flows into the subtank unit 33 via the ink supply needle 32.

According to the embodiment shown in FIG. 91 and FIG. 92, the elastic wave generating device 3 and the porous member 1050 are provided also in the subtank unit 33. The porous member 1050 is provided nearby the elastic wave generating device 3. A gap is provided to form a ink layer 1060 between the elastic wave generating device 3 and the porous member 1050.

The elastic wave generating device 3 detects the ink quantity or existence of ink inside the subtank unit 33. In case of the present embodiment, because the porous member 1050 is provided inside the subtank unit 33, if the width of the ink layer 1060 becomes small, the elastic wave generating device 3 can detect the ink quantity only when the ink status is near to the ink end. However, ink does not wave inside the container 1 because the porous member 1050 is provided inside the subtank unit 33. Therefore, the elastic wave generating device 3 can accurately detect the ink surface when the ink surface inside the subtank unit 33 reaches to the lower end of the porous member 1050 and exits between the ink layer 1060. Moreover, the elastic wave generating device 3 can detect the ink quantity and existence of ink inside the subtank unit 33 accurately.

Moreover, because the elastic wave generating device 3 is provided inside the subtank unit 33, the elastic wave generating device 3 can detect the ink quantity and the existence of ink inside the subtank unit 33 even when the ink inside the ink cartridge 180 is used up. Therefore, the ink jet recording apparatus can judge whether the printing process can be continued or not.

The elastic wave generating device 3 and the porous member 1050 are provided inside the container 1 of the ink cartridge in the embodiment shown in FIG. 91. Moreover, as shown in FIG. 91 and FIG. 92, the elastic wave generating device 3 and the porous member 1050 are also provided inside the subtank unit 33. Therefore, the elastic wave generating device 3 and the porous member 1050 are provided on both of the ink cartridge shown in FIG. 91 and the subtank unit 33 shown in FIG. 92. However, the elastic wave generating device 3 and the porous member 1050 can be provided to only one of the ink cartridge shown in FIG. 91 or the subtank unit 33 shown in FIG. 92.

Figure 93A:
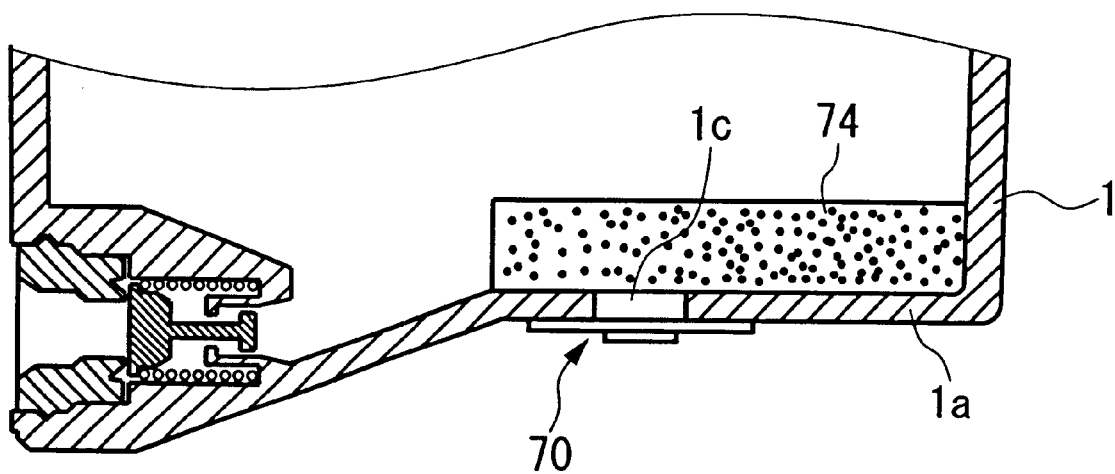
FIGS. 93(A) and 93(B) are cross sectional views showing an another embodiment of the ink cartridge.
Figure 93B:
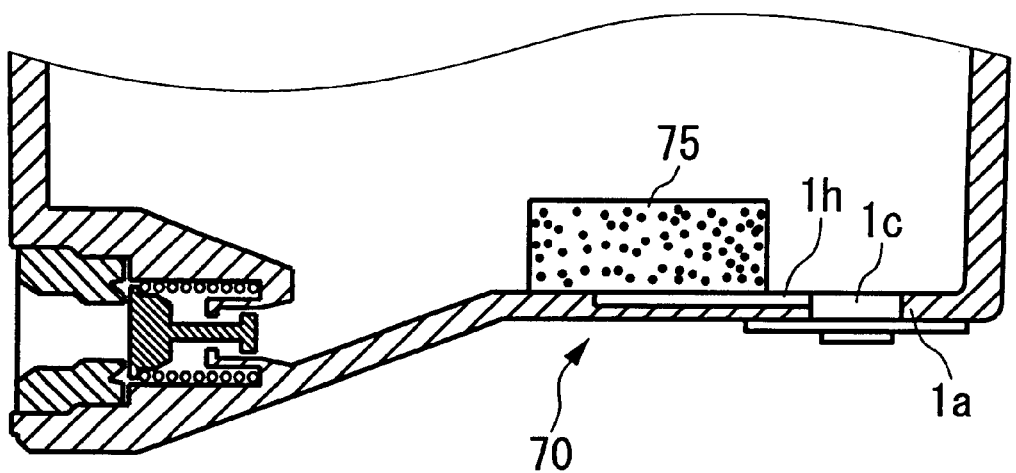

According to the embodiment shown in FIG. 93, if the ink absorbing member 74 and 75 expose from the ink by consumption of ink inside the container 1, ink contained in the ink absorbing member 74 and 75, which is made from a porous material, flows out by the own weight and is supplied to the recording head 31. If ink is used up, the ink absorbing member 74 and 75 absorbs the ink remained in the through hole 1c, the ink is thereby drained from the concave part of the through hole 1c. Therefore, the condition of the reflective wave of the elastic wave generated by the elastic wave generating device 70 at the ink end status changes, and thus the timing of ink end status can be further accurately detected. Furthermore, the ink absorbing member 74 and 75 are designed such that the capillary force works in the ink absorbing member 74 and 75 is equal to the capillary force which can hold ink or greater than the capillary force which can hold ink. The ink absorbing member 74 and 75 thereby absorb ink remained in the through hole 1c.

Figure 94:
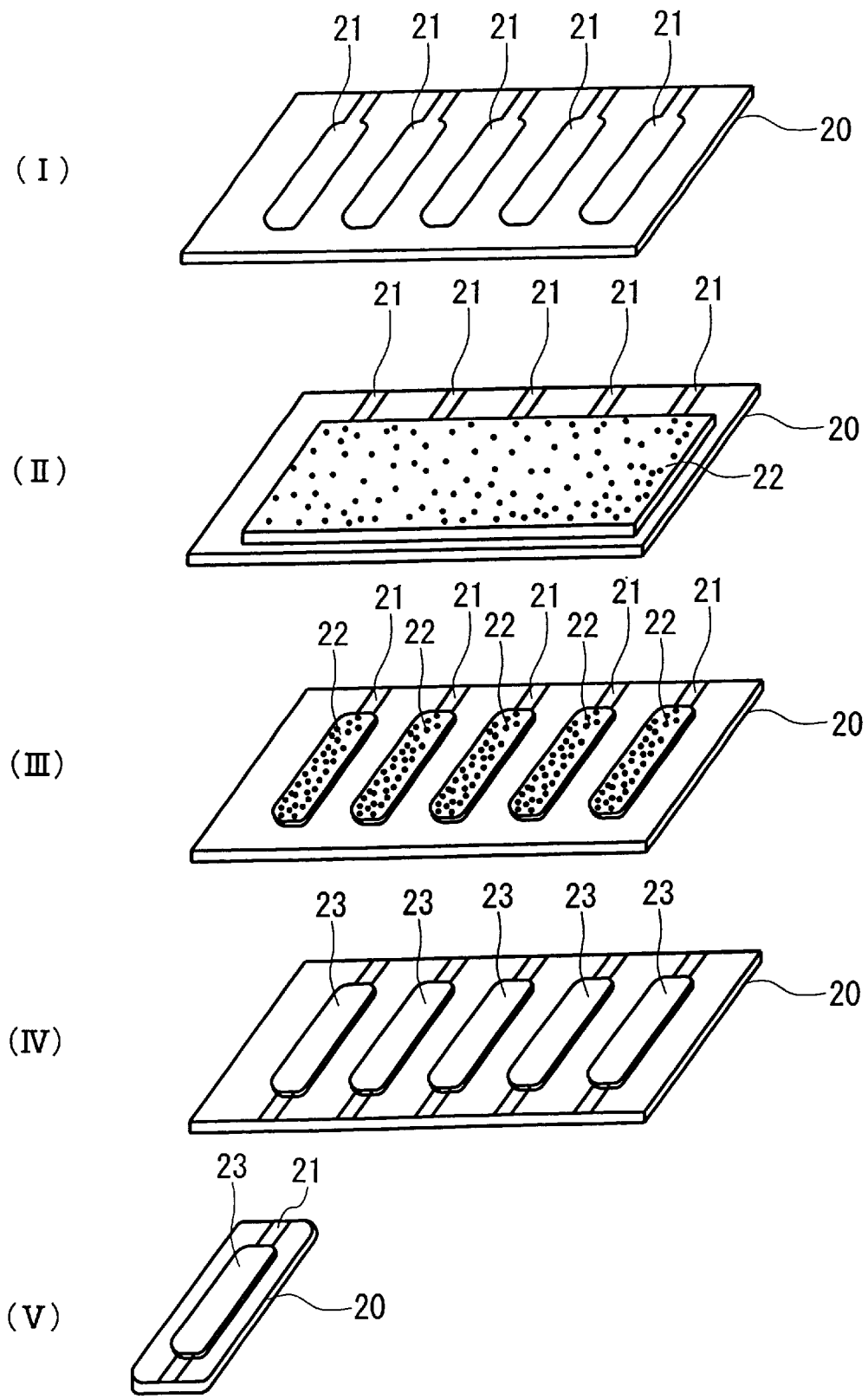
FIGS. 94(I) to (V) show manufacturing methods of the elastic wave generating device 3, 15, 16 and 17.

FIGS. 94(I)–94(V) show manufacturing methods of the elastic wave generating device 3, 15, 16 and 17. A base plate 20 is formed by material such as the burning-endurable ceramic. Referring to FIG. 94(I), first of all, a conductive material layer 21 which becomes an electrode at one side is formed on the base plate 20. Next, referring to FIG. 94 (II), a green sheet 22 serving as piezoelectric material is placed on the conductive material layer 21. Next, referring to FIG. 94(III), the green sheet 22 is formed in a predetermined shape by a press processing or the like and is made into the form of a vibrator, and is air-dried. Thereafter, the burning is performed on the green sheet 22 at a burning temperature of, for example, 1200° C. Next, referring to FIG. 94(IV), a conductive material layer 23 serving as other electrode is formed on the surface of the green sheet 22 so as to be polarized in a capable of flexural-oscillation manner. Finally, referring to FIG. 94(V), the base plate 20 is cut along each element. By fixing the base plate 20 in a predetermined face of the container 1 by use of adhesive or the like, the elastic wave generating device 3 can be fixed on the predetermined face of the container and the ink cartridge is completed which has a built-in function which detects the ink remaining amount.

Figure 95:
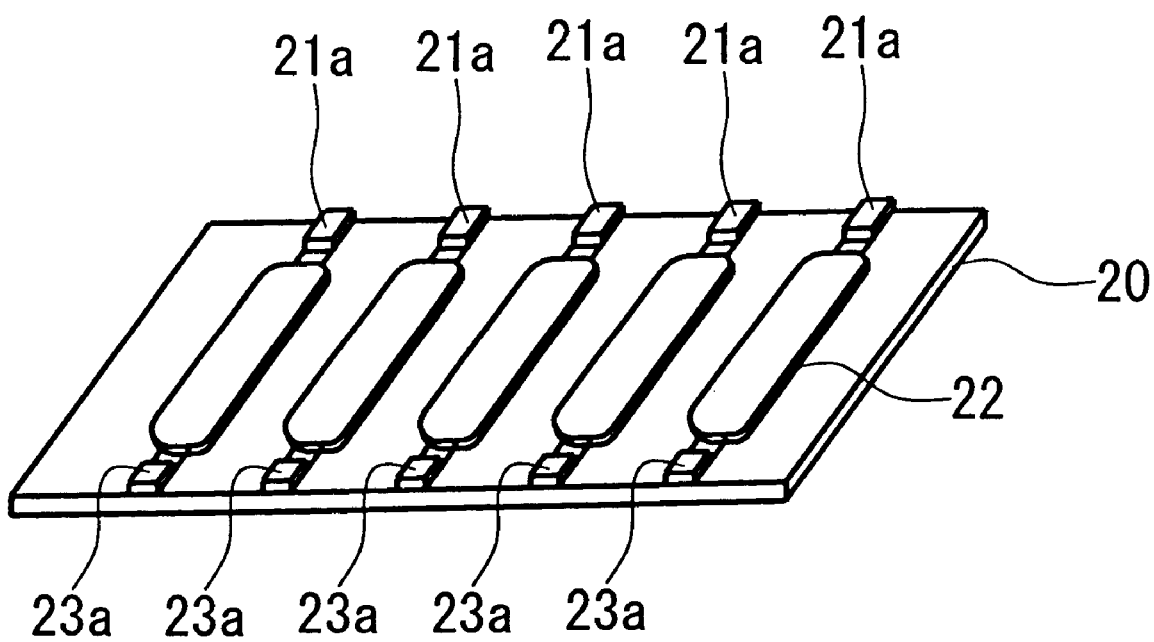
FIG. 95 shows manufacturing methods of the elastic wave generating device 3, 15, 16 and 17.

FIG. 95 shows another embodiment of the elastic wave generating device 3 shown in FIG. 94. In the embodiment shown in FIG. 94, the conductive material layer 21 is used as a connecting electrode. On the other hand, in the embodiment shown in FIG. 95, connecting terminals 21a and 23a are formed by a solder in an upper position than the surface of the piezoelectric material layer comprised of the green sheet 22. By the provision of the connecting terminals 21a and 23a, the elastic wave generating device 3 can be directly mounted to the circuit board, so that inefficient connection such as one by lead wires can be avoided.

Now, the elastic wave is a type of waves which can propagate through gas, liquid and solid as medium. Thus, the wavelength, amplitude, phase, frequency, propagating direction and propagating velocity of the elastic wave change based on the change of medium in question. On the other hand, the state and characteristic of the reflected wave of the elastic wave change according to the change of the medium. Thus, by utilizing the reflected wave which changes based on the change of the medium through which the elastic wave propagates, the state of the medium can be observed. In a case where the state of the liquid inside the liquid container is to be detected by this method, an elastic wave transmitter-receiver will be used for example. Let us explain this by referring to embodiments shown in FIGS. 90–91. First, the transmitter-receiver gives out the elastic wave to the medium, for example, the liquid or the liquid container. Then, the elastic wave propagates through the medium and arrives at the surface of the liquid. Since a boundary is formed between the liquid and the gas on the liquid surface, the reflected wave is returned to the transmitter-receiver. The transmitter-receiver receives the reflected wave. A distance between the liquid surface and a transmitter or receiver can be measured based on an overall traveled time of the reflected wave, or a damping factor of the amplitudes of the elastic wave generated by the transmitter and the reflected wave reflected on the liquid surface, and so on. Utilizing these, the state of the liquid inside the liquid container can be detected. The elastic wave generating device 3 may be used as a single unit of the transmitter-receiver in the method utilizing the reflected wave based on the change of the medium through which the elastic wave propagates, or a separately provided receiver may be mounted thereto.

As described above, in the elastic wave, generated by the elastic wave generating device 3, propagating through the ink liquid, the traveling time of the reflected wave occurring on the ink liquid surface to arrive at the elastic wave generating device 3 varies depending on density of the ink liquid and the liquid level. Thus, if the composition of ink is fixed, the traveling time of the reflected wave which occurred in the ink liquid surface varies depending on the ink amount. Therefore, the ink amount can be detected by detecting the time period during which the elastic wave generating device 3 generates the elastic wave and then the wave reflected from the ink surface arrives at the elastic wave generating device 3. Moreover, the elastic wave vibrates particles contained in the ink. Thus, in a case of using pigment-like ink which uses pigment as a coloring agent, the elastic wave contributes to prevent precipitation of the pigment or the like.

By providing the elastic wave generating device 3 in the container 1, when the ink of the ink cartridge approaches (decreases to) an ink-end state and the elastic wave generating device 3 can no longer receive the reflected wave, it is judged as an ink-near-end and thus can give indication to replace the cartridge.

Figure 96:
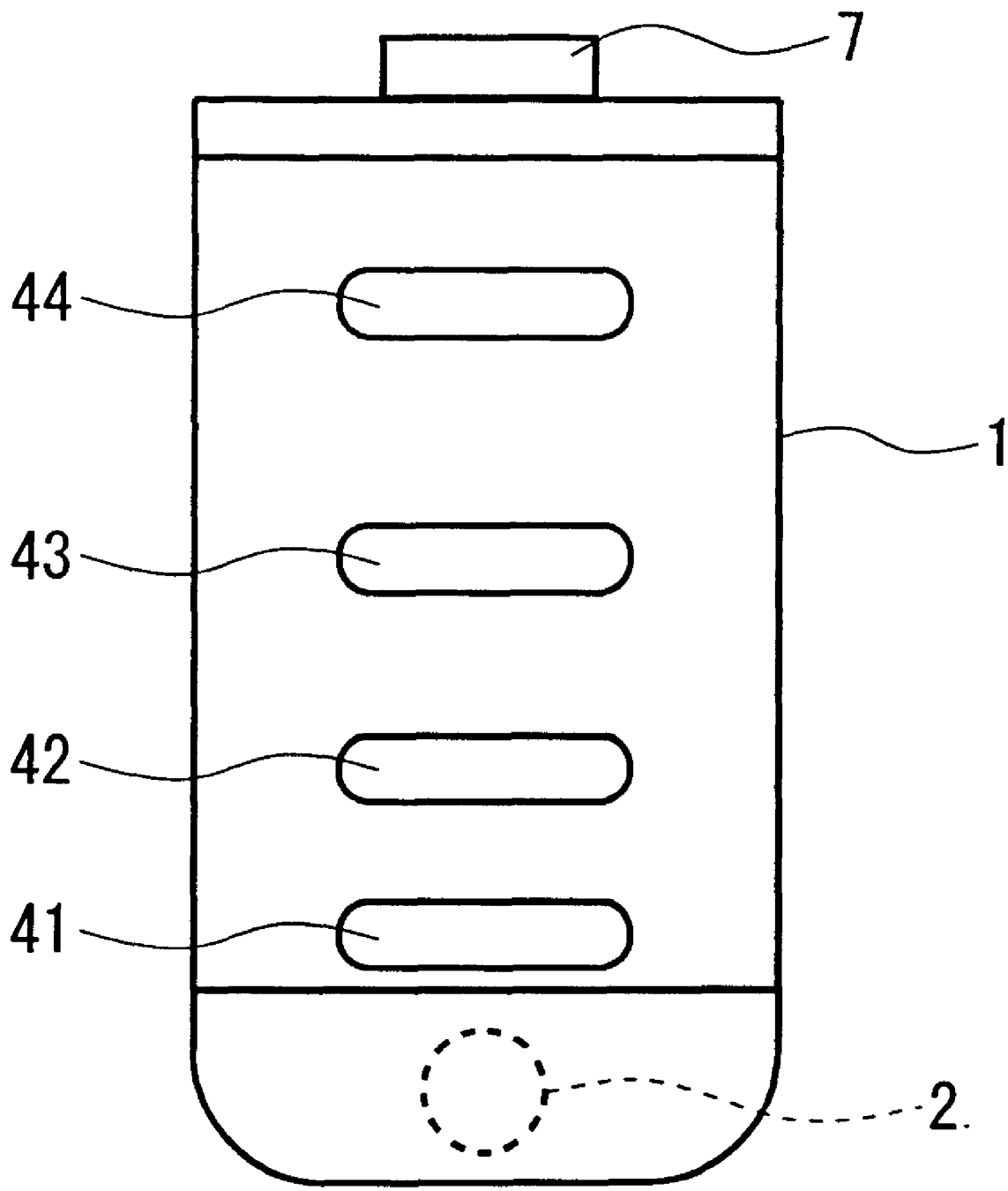
FIG. 96 shows an ink cartridge according to another embodiment of the present invention.

FIG. 96 shows an ink cartridge according to another embodiment of the present invention. Plural elastic wave generating device 41–44 are provided on the side wall of the container 1, spaced at a variable interval from one another in the vertical direction. In the ink cartridge shown in FIG. 96, whether or not the ink is present at mounting levels of respective elastic wave generating device 41–44 can be detected by whether or not the ink is present at respective positions of the elastic wave generating device 41–44. For example, suppose that the liquid level of ink is at a point between the elastic wave generating device 44 and 43. Then, the elastic wave generating device 44 detects and judges that the ink is empty while the elastic wave generating device 41, 42 and 43 detect and judge respectively that the ink is present. Thus, it can be known that the liquid level of ink lies in a level between the elastic wave generating device 44 and 43. Thus, provision of the plural elastic wave generating device 41–44 makes possible to detect the ink remaining amount in a step-by-step manner.

Figure 97:
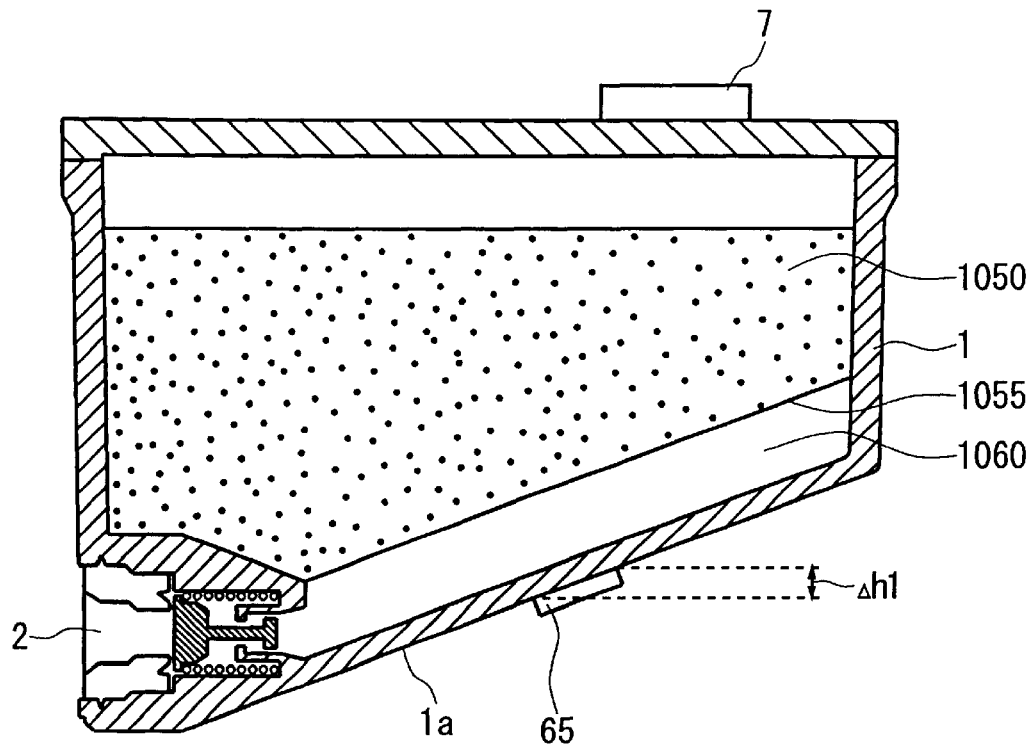
FIG. 97 shows ink cartridges according to still another embodiments of the present invention.
Figure 98:
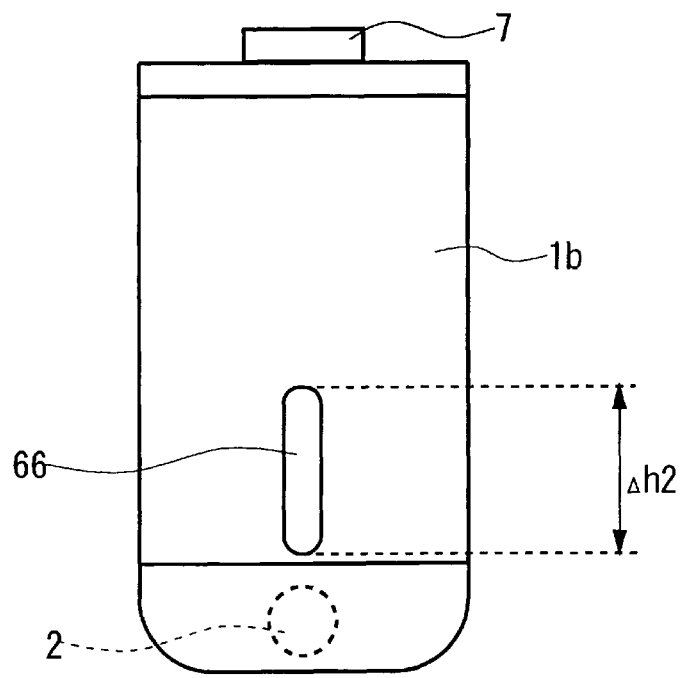
FIG. 98 shows ink cartridges according to still another embodiments of the present invention.

FIG. 97 and FIG. 98 show ink cartridges according to still another embodiments of the present invention. In an embodiment shown in FIG. 97, an elastic wave generating device 65 is mounted in a bottom face 1a formed aslope in the vertical direction. In an embodiment shown in FIG. 98, an elastic wave generating device 66 of an elongated shape in the vertical direction is provided in the vicinity of the bottom face of a side wall 1b.

According to the embodiments shown in FIG. 97 and FIG. 98, when part of the elastic wave generating device 65 and 66 is exposed from the liquid surface, the traveled time of the reflected wave and the acoustic impedance of the elastic waves generated by the elastic wave generating device 65 continuously change corresponding to the change ($\Delta$h1, $\Delta$h2) of the liquid surface. Thus, the process from the ink-near-end state to the ink-end state of ink remaining amount can be accurately detected by detecting the degree of change in the traveled time of the reflected wave or the acoustic impedance of the elastic waves.

Furthermore, a porous member 1050 is provided inside the container 1. The porous member 1050 prevents the waving and bubbling of ink inside the container 1. The porous member 1050 thereby prevents the elastic wave generating device 65 and 66 to detects the ink existence mistakenly.

In the embodiment shown in FIG. 97, the porous member 1050 is provided in the container 1 such that the slope of the bottom face 1055 of the porous member 1050 is parallel to the slope of the elastic wave generating device 65. A gap is provided between the bottom face 1055 and the elastic wave generating device 65 and forms a ink layer 1060. Therefore, as the embodiment shown in FIG. 90, when the ink surface in the container 1 reaches to the lower end of the porous member 1050 and exists within the ink layer 1060, the elastic wave generating device 3 can detect the ink surface accurately.

In the embodiment shown in FIG. 98, one side face of the porous member, not shown in the figure, is provided in the container 1 such that the one side face is parallel to the elastic wave generating device 66. A gap is provided between the one side face and the side wall 1a. In the present embodiment, when ink is filled inside the container 1 and gap between the one side face of the porous member and the side wall 1b, the reflective wave of the elastic wave generated by the elastic wave generating device 66 does not change. On the other hand, if ink inside the container 1 is consumed, and the gap between the one side face of the porous member and the side wall 1b arises, the reflective wave of the elastic wave generated by the elastic wave generating device 66 gradually changes. Therefore, the elastic wave generating device 66 can detect the ink consumption status when the ink surface exists within the region of the length $\Delta$h2 of the elastic wave generating device 66. The length of the elastic wave generating device 66 is not limited.

Though in the above embodiments a flexural oscillating type piezoelectric vibrator is used so as to suppress the increase of the cartridge size, a vertically vibrating type piezoelectric vibrator may also be used. In the above embodiments, the elastic wave is transmitted and received by a same elastic wave generating device. In still another embodiment, the elastic wave generating device may be provided separately as one for use in transmitting the elastic wave and other for receiving the elastic wave, so as to detect the ink remaining amount.

Figure 99:
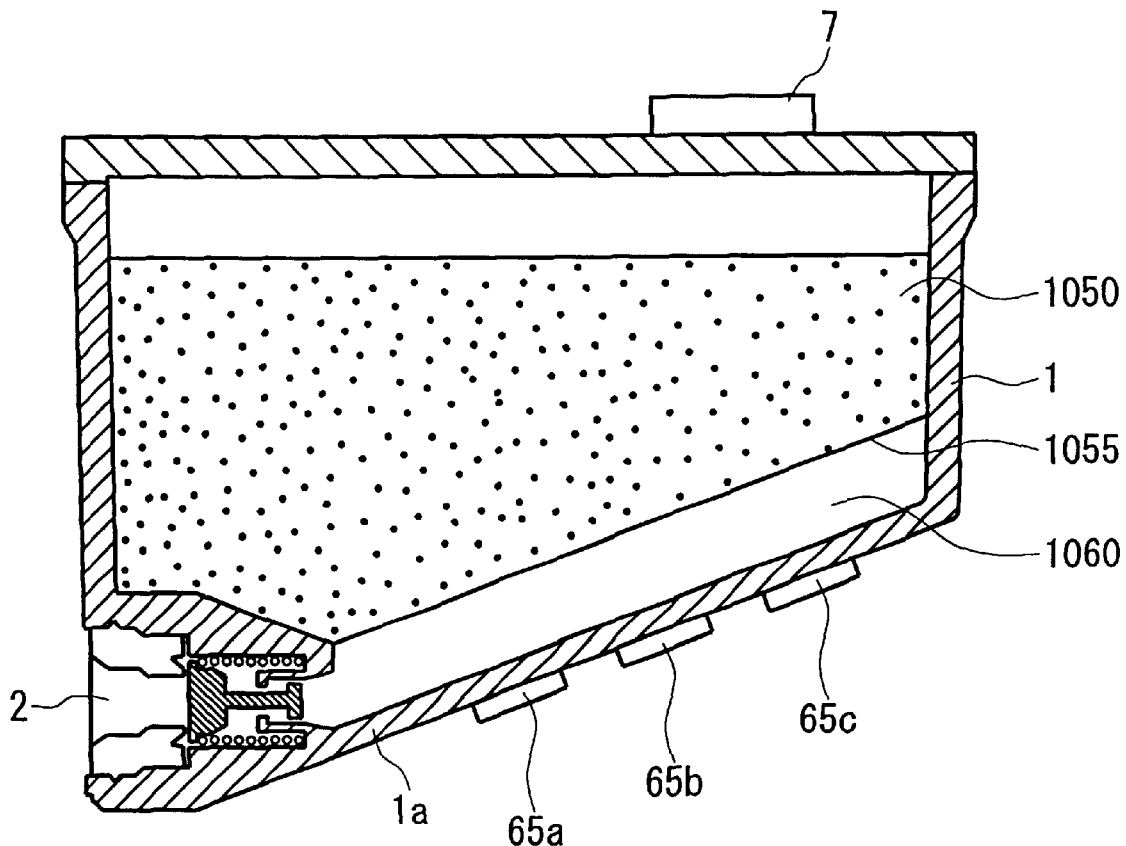
FIG. 99 shows an ink cartridge according to still another embodiment of the present invention.

FIG. 99 shows an ink cartridge according to still another embodiment of the present invention. Plural elastic wave generating device 65a, 65b and 65c on the bottom face 1a formed aslope in the vertical direction spaced at an interval are provided in the container 1.

Furthermore, a porous member 1050 is provided inside the container 1. A gap is provided between the porous member 1050 and the elastic wave generating device 65a, 65b, and 65c to form an ink layer 1060. By providing the porous member 1050 inside the container 1, the porous member 1050 prevents the waving or bubbling of ink inside the container 1 when the ink cartridge moves together with the recording head by the scanning operation during the printing process. Therefore, the bubble of ink is difficult to generate around the elastic wave generating device 65z, 65b, and 65c. Furthermore, even if the bubble of ink generates, because the porous member 1050 absorbs the bubble of ink, the bubble does not stay around the elastic wave generating device 65a, 65b, and 65c. The elastic wave generating device 65a, 65b, and 65c can thereby accurately detect the ink consumption status.

The width of the ink layer 1060 is not limited as the embodiment t shown in FIG. 97.

According to the present embodiment, the arrival time (traveled time) of the reflected waves of the elastic waves to the respective elastic wave generating device 65a, 65b and 65c in the respective mounting positions of the elastic wave generating device 65a, 65b and 65c differs depending on whether or not the ink is present in the respective positions of the plural elastic wave generating device 65a, 65b and 65c. Thus, whether or not the ink is present in the respective mounted position levels of the elastic wave generating device 65a, 65b and 65c can be detected by scanning each elastic generating means (65a, 65b and 65c) and by detecting the traveled time of the reflected wave of the elastic wave in the elastic wave generating device 65a, 65b and 65c. Hence, the ink remaining amount can be detected in a step-by-step manner. For example, suppose that the liquid level of ink is at a point between the elastic wave generating device 65b and 65c. Then, the elastic wave generating device 65c detects and judges that the ink is empty while the elastic wave generating device 65a and 65b detect and judge respectively that the ink is present. By overall evaluating these results, it becomes known that the liquid level of ink lies in a level between the elastic wave generating device 65b and 65c.

Figure 100:
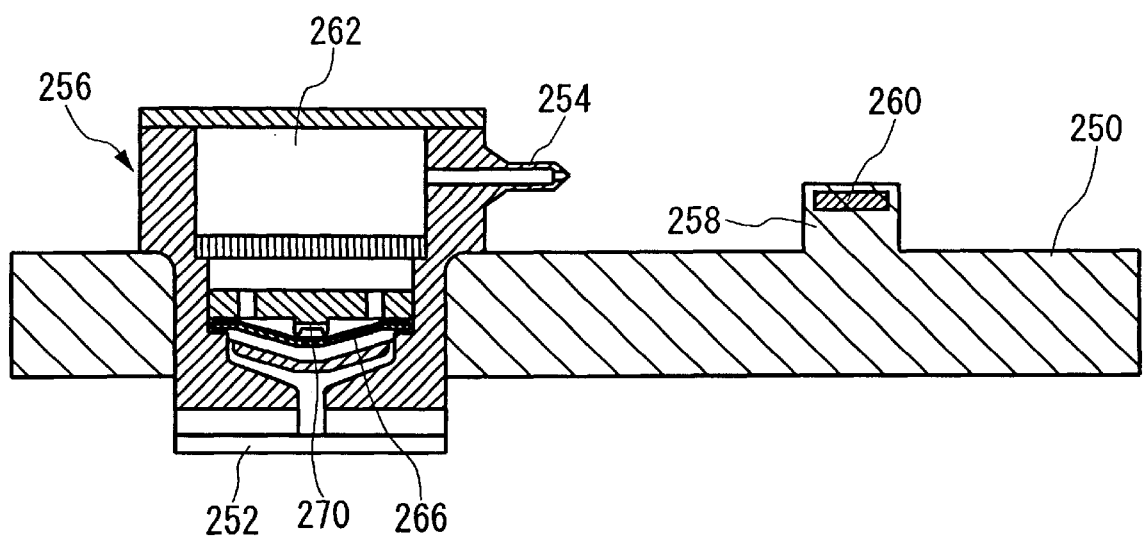
FIG. 100 shows a cross section of the ink-jet recording apparatus alone.
Figure 101:
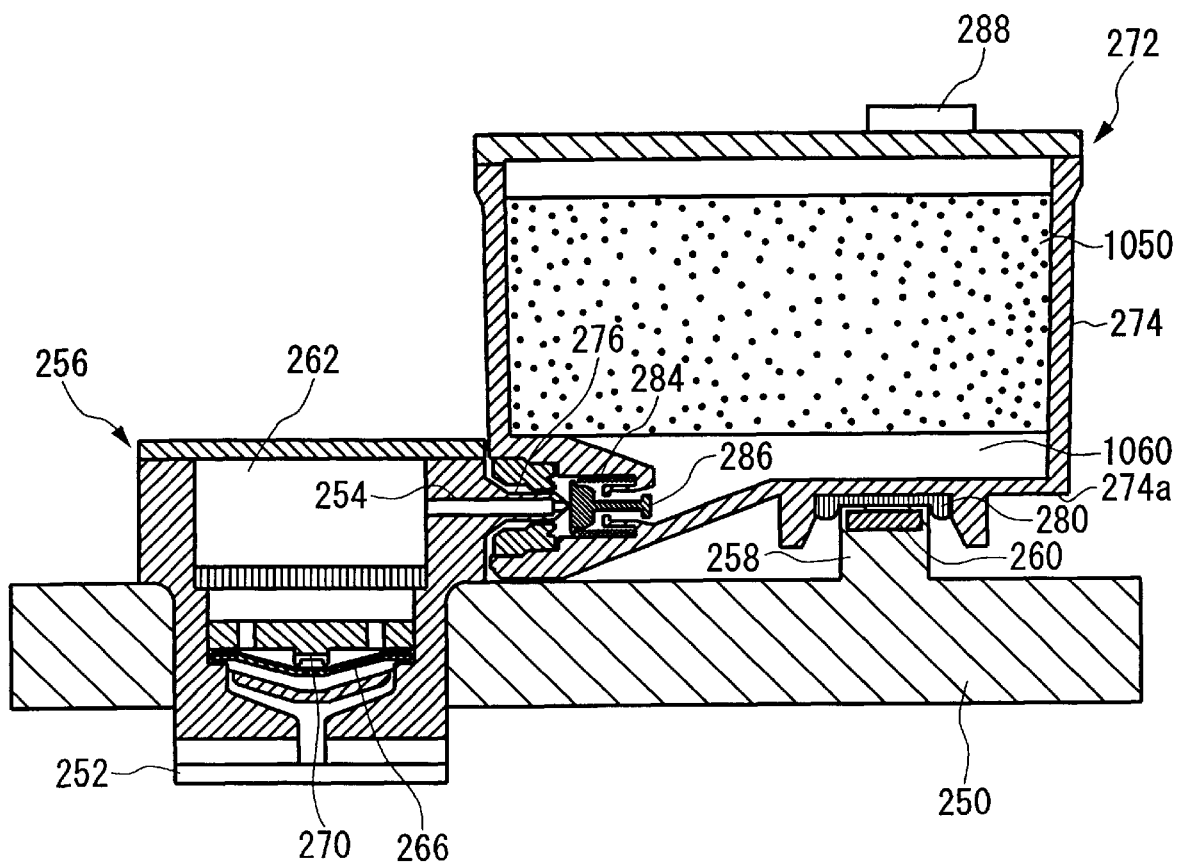
FIG. 101 is across section of the ink-jet recording apparatus to which e ink cartridge 272 is mounted.

FIG. 100 and FIG. 101 show cross sections of the ink-jet recording apparatus according to still another embodiment of the present invention.

FIG. 100 shows a cross section of the ink-jet recording apparatus alone.

FIG. 101 is a cross section of the ink-jet recording apparatus to which the ink cartridge 272 is mounted. A carriage 250 capable of reciprocating in the direction of the width of the ink-jet recording paper includes a recording head 252 in a lower face thereof. The carriage 250 includes a subtank unit 256 in an upper face of the recording head 252. The subtank unit 256 has a similar structure to that shown in FIG. 92. The subtank unit 256 has an ink supply needle 254 facing an ink cartridge 272 mounting side. In the carriage 250, there is provided a convex part 258 in a manner such that the convex part 258 is disposed counter to a bottom portion of the ink cartridge 272 and in an area where the ink cartridge 272 is to be mounted there above. The convex part 258 includes an elastic wave generating device 260 such as the piezoelectric vibrator.

Figure 102:
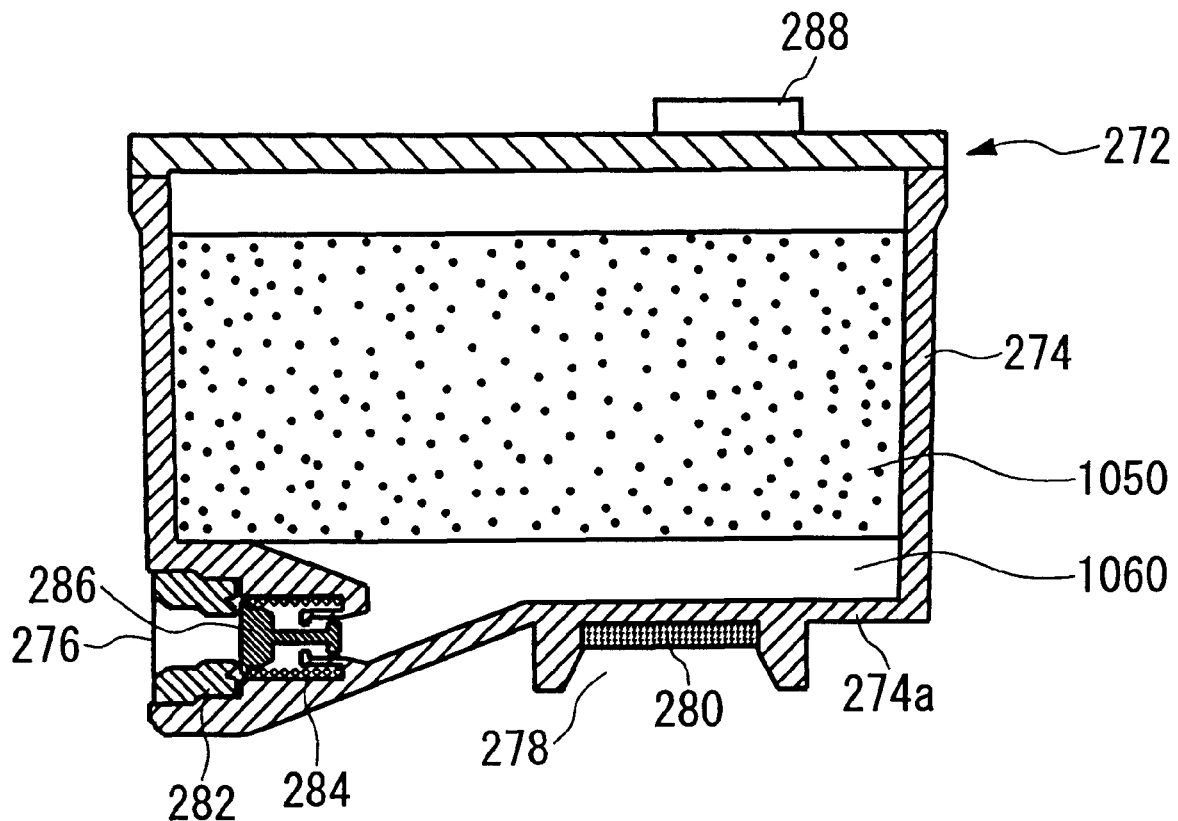
FIG. 102 shows an embodiment of the ink cartridge for use with a single color, for instance, the black color.

FIG. 102 show an embodiment of the ink cartridge suitable for the recording apparatus shown in FIG. 100.

FIG. 102 shows an embodiment of the ink cartridge for use with a single color, for instance, the black color. The ink cartridge 272 according to the present embodiment, comprises a container which houses ink and an ink supply port 276 which comes in contact with an ink supply needle 254 of the recording apparatus in a sealed manner. In the container 274, there is provided the concave part 278, positioned in a bottom face 274a, which is to be engaged with the convex part 258 shown in FIG. 101. The concave part 278 houses ultrasound transferring material such as gelated material 280.

The ink supply port 276 includes a packing ring 282, a valve body 286 and a spring 284. The packing ring 282 is engaged with the ink supply needle 254 in a fluid-tight manner. The valve body 286 is constantly and elastically contacted against the packing ring 282 by way of the spring 284. When the ink supply needle 254 is inserted to the ink supply port 276, the valve body 286 is pressed by the ink supply needle 254 so as to open an ink passage. On an upper wall of the container 274, there is mounted a semiconductor memory means 288 which stores data on ink inside the ink cartridge and so on.

A porous member 1050 is provided inside the container 274. A gap is provided between the porous member 1050 and the gelated material 280 to form an ink layer 1060. By providing the porous member 1050 inside the container 274, the porous member 1050 prevents the waving or bubbling of ink inside the container 274. Therefore, the elastic wave generating device 260 can accurately detect the ink consumption status as shown in FIG. 90.

As in the embodiment shown in FIG. 90, the present embodiment of the elastic wave generating device 260 can accurately detect the ink surface when the ink surface inside the container 274 reaches to the lower end of the porous member 1050 and exists within the ink layer 1060. The width of the gap between the porous member 1050 and the elastic wave generating device 260 is not limited. Preferably, the porous member 1050 is provided vicinity of the elastic wave generating device 260.

Referring to FIG. 101, when the ink supply port 276 of the ink cartridge 272 is inserted through the ink supply needle 254 of the subtank unit 256, the valve body 286 recedes against the spring 284, so that an ink passage is formed and the ink inside the ink cartridge 272 flows into the ink chamber 262. At a stage where the ink chamber 262 is filled with ink, a negative pressure is applied to a nozzle opening of the recording head 252 so as to fill the recording head with ink. Thereafter, the recording operation is performed. When the ink is consumed in the recording head 252 by the recording operation, a pressure in the downstream of a flexible valve 266 decreases. Then, the flexible valve 266 is positioned away from a valve body 270 so as to become opened. When the flexible valve 36 is opened, the ink in the ink chamber 262 flows into the recording head 252 through the ink passage 35. Accompanied by the ink which has flowed into the recording head 252, the ink in the ink cartridge 272 flows into the subtank unit 256.

While the recording apparatus is operating, a drive signal is supplied to the elastic wave generating device 260 at a detection timing which is set in advance, for example, at a certain period of time. The elastic wave generated by the elastic wave generating device 260 is radiated from the convex part 258 and is transferred to the ink inside the ink cartridge 272 by propagating through the gelated material 280 in the bottom face 274a of the ink cartridge 272. Though the elastic wave generating device 260 is provided in the carriage 250 in FIGS. 101, the elastic wave generating device 260 may be provided inside the subtank unit 256.

Since the elastic wave generated by the elastic wave generating device 260 propagates through the ink liquid, the traveling time of the reflected wave occurring on the ink liquid surface to arrive at the elastic wave generating device 260 varies depending on density of the ink liquid and the liquid level. Thus, if the composition of ink is fixed, the traveling time of the reflected wave which occurred in the ink liquid surface varies depending on the ink amount. Therefore, the ink amount can be detected by detecting the time duration during which the reflected wave arrives at the elastic wave generating device 260 from the ink liquid surface when the ink liquid surface is excited by the elastic wave generating device 260. Moreover, the elastic wave generated by the elastic wave generating device 260 vibrates particles contained in the ink. Thus, in a case of using pigment-like ink which uses pigment as a coloring agent, the elastic wave contributes to prevent precipitation of the pigment or the like.

After the printing operation and maintenance operation or the like and when the ink of the ink cartridge approaches (decreases to) an ink-end state and the elastic wave generating device 260 can no longer receive the reflected wave even after the elastic wave generating device sends out the elastic wave, it is judged that the ink is in an ink-near-end state and thus this judgment can give indication to replace the cartridge anew. Moreover, when the ink cartridge 272 is not mounted properly to the carriage 250, the shape of the elastic wave from the elastic generating means 260 changes in an extreme manner. Utilizing this, warning can be given to a user in the event that the extreme change in the elastic wave is detected, so as to prompt the user to check on the ink cartridge 272.

The traveling time of the reflected wave of the elastic wave generated by the elastic wave generating device 260 is affected by the density of ink housed in the container 274. Since the density of ink may differ by the type of ink used, data on the types of ink are stored in a semiconductor memory means 288, so that a detection sequence can be set based on the data and thus the ink remaining amount can be further precisely detected.

Figure 103:
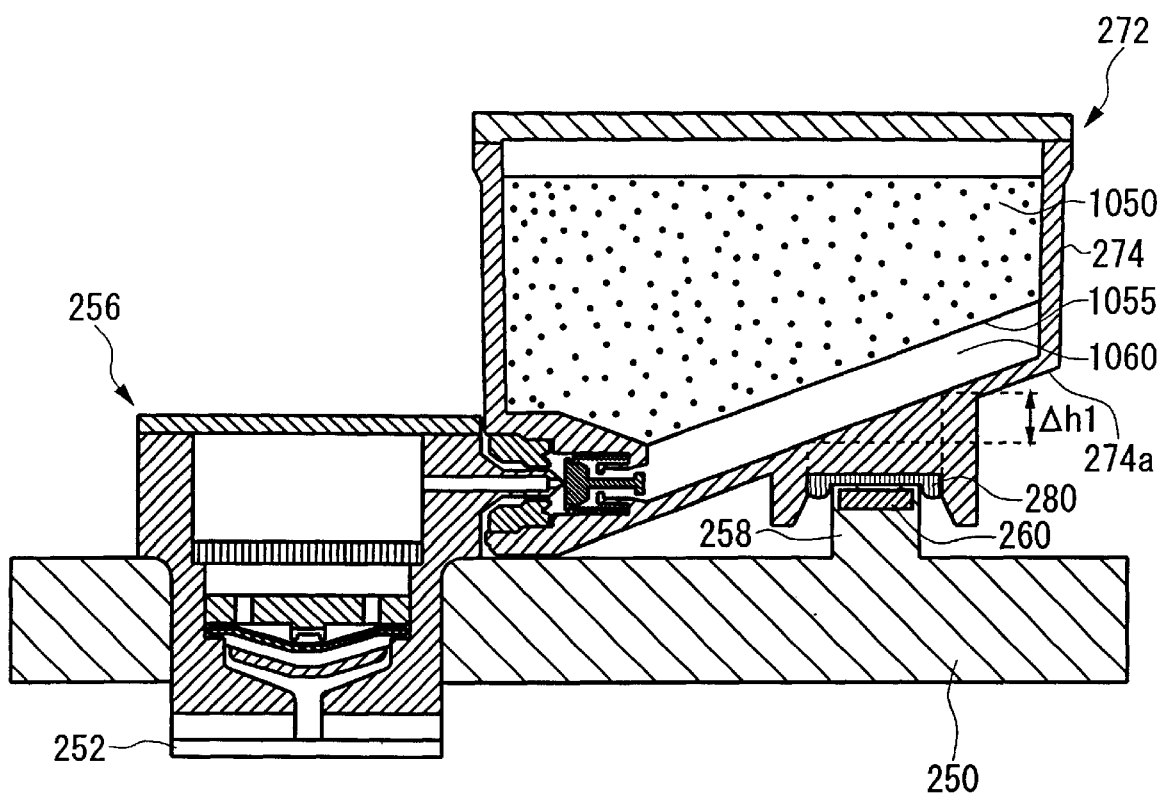
FIG. 103 shows an ink cartridge 272 according to still another embodiment of the present invention.

FIG. 103 shows an ink cartridge 272 according to still another embodiment of the present invention. In the ink cartridge 272 shown in FIG. 103, the bottom face 274a is formed aslope in the vertical direction.

In the ink cartridge 272 shown in FIG. 103, when the ink remaining amount is becoming low and part of a radiating area of the elastic wave generating device 260 is exposed from the liquid surface, the traveled time of the reflected wave of the elastic waves generated by the elastic wave generating device 260 continuously changes corresponding to the change $\Delta h1$ of the liquid surface. The $\Delta h1$ denotes change of the height of the bottom face 274a in both ends of the gelated material 280. Thus, the process from the ink-near-end state to the ink-end state of ink remaining amount can be accurately detected by detecting the degree of change in the traveled time of the reflected wave of the elastic wave generating device 260.

Furthermore, a porous member 1050 is provided inside the container 274. The porous member 1050 prevents the waving or bubbling of ink inside the container 274. Therefore, the elastic wave generating device 260 can accurately detect the ink consumption status.

The porous member 1050 is provided in the container 274 such that the slope of the bottom face 1055 of the porous member 1050 is parallel to the slope of the bottom face of the container 274. A gap is provided between the bottom face 1055 and the elastic wave generating device 260 and forms a ink layer 1060.

When ink is filled inside the container 274 and ink layer 1060, the reflective wave of the elastic wave generated by the elastic wave generating device 260 does not change. On the other hand, if ink inside the container 274 is consumed, gap arises in the ink layer 1060 instead of ink. With the arising of the gap in the ink layer 1060, the reflective wave of the elastic wave generated by the elastic wave generating device 260 gradually changes. Therefore, the elastic wave generating device 260 can detect the ink quantity when the ink status in the container 274 is near to ink end status. The width of the ink layer 1060 is not limited as the embodiment shown in FIG. 97.

Figure 104:
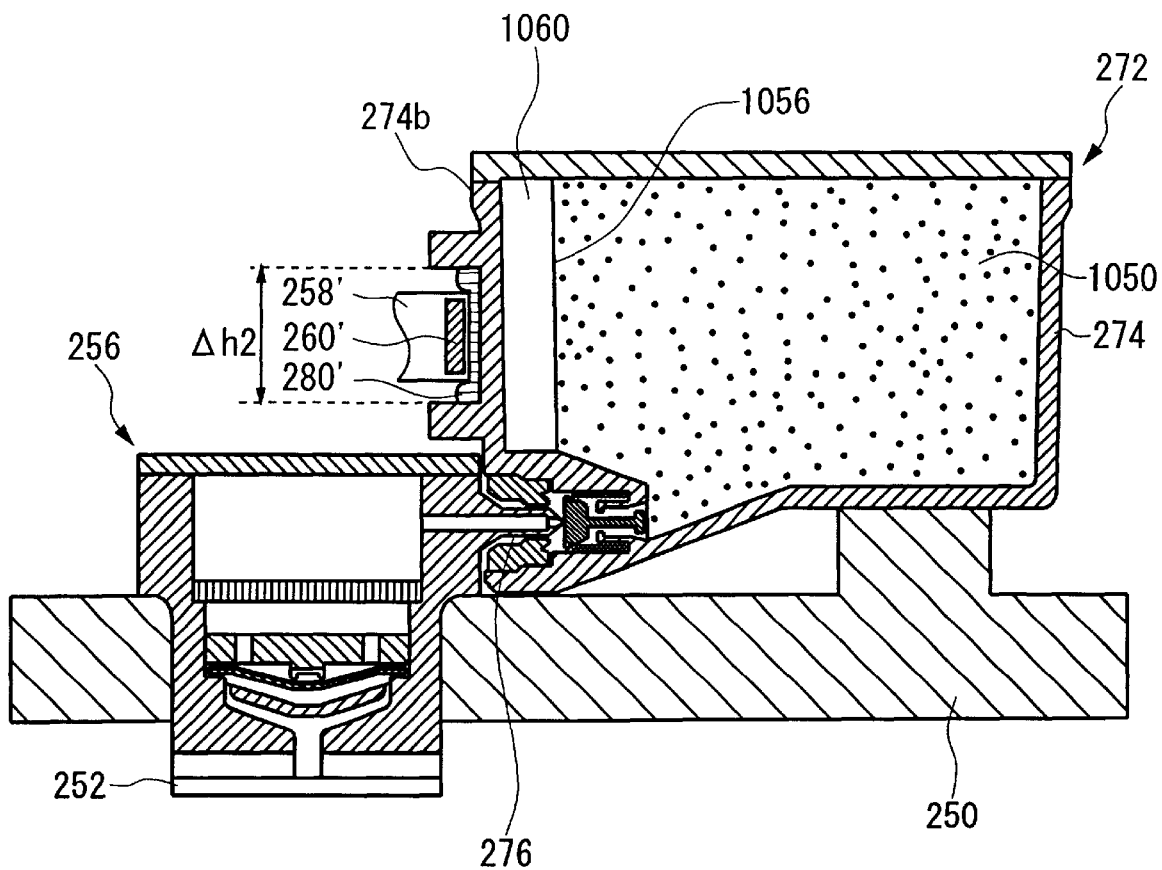
FIG. 104 shows an ink cartridge 272 and an ink-jet recording apparatus according to still another embodiment of the present invention.

FIG. 104 shows an ink cartridge 272 and an ink-jet recording apparatus according to still another embodiment of the present invention. The ink-jet recording apparatus shown in FIG. 104 includes a convex part 258' in a side face 274b in an ink supply port 276 side of the ink cartridge 272. The convex part 258' includes an elastic wave generating device 260'. Gelated material 280' is provided in the side face 274b of the ink cartridge 272 so as to engage with the convex part 258'. According to the ink cartridge 272 shown in FIG. 104, when the ink remaining amount is becoming low and part of a radiating area of the elastic wave generating device 260' is exposed from the liquid surface, the traveled time of the reflected wave of the elastic waves generated by the elastic wave generating device 260' and the acoustic impedance continuously change corresponding to the change $\Delta h2$ of the liquid surface. The $\Delta h2$ denotes difference in the height of both ends of the gelated material 280'. Thus, the process from the ink-near-end state to the ink-end state of ink remaining amount can be accurately detected by detecting the degree of change in the traveled time of the reflected wave of the elastic wave generating device 260 or change in the acoustic impedance.

The ink cartridge according to the present embodiment further has a porous member 1050 provided inside the container 274. The ink-jet recording apparatus includes a convex part 2581 in a side face 274b in an ink supply port 276 side of the ink cartridge 272. The convex part 258' includes an elastic wave generating device 260'. The side face 1056 of the porous member 1050 is parallel to the side face 274b of the container 274. An ink layer 1060 is formed on the gap between the side face 1056 and the elastic wave generating device 260'.

The porous member 1050 prevents the waving or bubbling of ink inside the container 274. Therefore, the elastic wave generating device 260' can accurately detect the ink consumption status.

When ink is filled inside the container 274 and ink layer 1060, the reflective wave of the elastic wave generated by the elastic wave generating device 260' does not change. On the other hand, if ink inside the container 274 is consumed, gap arises in the part corresponding to the $\Delta h2$ which is a width in the height direction of the gelated material 280' within the ink layer 1060. With the arising of the gap in the ink layer 1060, the reflective wave of the elastic wave generated by the elastic wave generating device 260' gradually changes. Therefore, the elastic wave generating device 260' can detect the ink consumption status when the is ink surface within the width $\Delta h2$ in the height direction.

If the ink surface is within the region of the $\Delta h2$, the elastic wave generating device 260' can detect the ink surface. According to the ink cartridge according to the present embodiment, there is a gap between the side face 1056 of the porous member 1050 and the elastic wave generating device 260', the elastic wave generating device 260' can detect the ink surface within the region of the $\Delta h2$ even if the porous member 1050 is provided in the container 274. Therefore, by widen the width of the $\Delta h2$, the elastic wave generating device 260' can detect the ink surface when ink is filled in the container 274 until the ink surface when ink in the container 274 is nearly end.

In the above embodiments, the elastic wave is transmitted and received by the same elastic wave generating device 260 and 260' when the ink remaining amount is detected based on the reflected wave at the liquid surface. The present invention is not limited thereby and for example, as still another embodiment the elastic wave generating device 260 may be provided separately as one for use in transmitting the elastic wave and other for receiving the elastic wave, so as to detect the ink remaining amount.

Figure 105:
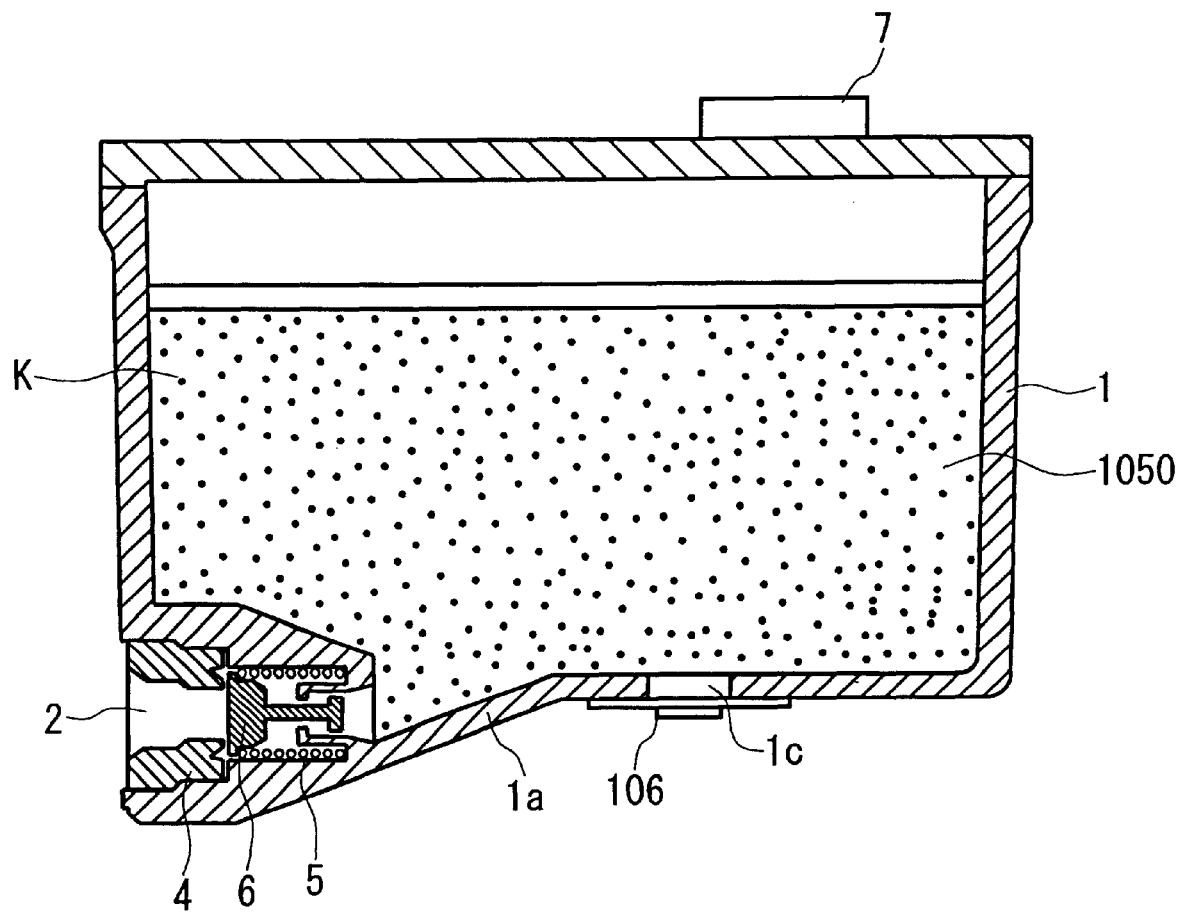
FIG. 105 is a cross sectional view of an embodiment of an ink cartridge for use with a single color, for example, the black ink.

FIG. 105 is a cross sectional view of an embodiment of an ink cartridge for use with a single color, for example, the black ink. The ink cartridge shown in FIG. 105 has a actuator 106. An ink supply port 2 which comes in contact with an ink supply needle of the recording apparatus in a sealed manner is provided in a container 1 which houses the ink. In an outside portion of a bottom face 1a of the container 1, the actuator 106 is mounted such that the actuator 106 can contact with ink inside the container 1 via the through hole 1c provided in the container 1. In order that at a stage at which the ink K is almost used up, i.e. at the time when the ink becomes an ink-end state, the status around the actuator 106 can change from the liquid to the gas, the actuator 106 is provided in a slightly upward position from the ink supply port 2. Moreover, an actuator 106 may be separately provided instead, so that the actuator 106 is used as an means for detecting liquid only.

Furthermore, a porous member 1050 is provided inside the container 1. The porous member 1050 is provided around the actuator 106 inside the container 1. A gap having a same depth with the through hole 1c is provided between the porous member 1050 and the actuator 106. By providing the porous member 1050 inside the container 1, the porous member 1050 prevents the waving or bubbling of ink inside the container 1 when the ink cartridge moves together with the recording head by the scanning operation during the printing process. Therefore, the bubble of ink is difficult to generate around the actuator 106. The actuator 106 can thereby detect the ink consumption status accurately.

Moreover, the width of the gap between the porous member 1050 and the actuator 106 is not limited. To suppress the bubbling of ink as much as possible, the width of ink layer 1060 is reduced by providing the porous member 1050 on lower side of the container 1. If the width of the ink layer 1060 is small, the actuator 106 can detect the ink quantity only when the ink status is near to the ink end. However, ink does not wave inside the container 1. Therefore, the actuator 106 can accurately detect the ink quantity when the ink consumption status is near to the ink end status. Therefore, the porous member 1050 is preferably located nearby the actuator 106 without limiting the width of gap between the porous member 1050 and the actuator 106.

Furthermore, the hole diameter of porous member 1050 is set such that the porous member 1050 does not absorbs ink existed in the through hole 1c before the ink surface reaches to the through hole 1c. In other words, the porous member 1050 is designed such that the capillary force works in the porous member 1050 is smaller than the capillary force which can hold ink in the container 1. Therefore, ink does not remain in the porous member 1050 by its own weight and exists in the through hole 1c when the ink inside the container 1 is in an ink near end status. Furthermore, an airhole, not shown in the figure, is provided on the container 1. The airhole is provided on the upper side of the container 1 to communicate with outside of container 1. Air is introduced inside the container 1 by the airhole, and ink flows downward by own weight with advance of ink consumption. The residual ink thereby stays in the through hole 1c.

On the other hand, the hold diameter of the porous member 1050 can be set such that the porous member 1050 absorbs ink existed in the through hole 1c when the predetermined amount of the ink is consumed. That is, the hole diameter of the porous member 1050 is set that the capillary force works in the porous member 1050 is equal to or larger than the capillary force which can hold ink inside the container 1. The porous member 1050 thereby absorbs ink existed in the through hole 1c when the predetermined amount of ink inside of the container 1 is consumed. Furthermore, the hole diameter of the porous member 1050 of a part nearby the ink supply port 2 is made smaller than the hole diameter of the other part of the porous member 1050. Ink existed in the through hole 1*lc* is there by absorbed by the porous member 1050 and further supplied to the ink supply port 2 from the porous member 1050.

For example, the hole diameter of the porous member 1050 is designed such that the porous member 1050 absorbs ink remained in the through hole 1c when the ink quantity in the ink cartridge becomes small amount in a degree that printing becomes defective. Furthermore, the hole diameter of the porous member 1050 is designed such that the porous member 1050 can send the ink, which is absorbed from the through hole 1c by the porous member 1050, to the ink supply port 2. The actuator 106 can thereby detects the ink end accurately when the predetermined amount of ink is consumed and prevents the defective printing. More specifically, the hole diameter of the porous member 1050 nearby the actuator 106 is made larger than the hole diameter of the porous member 1050 around the ink supply port 2.

The porous member 1050 occupies more than half of the volume of the container 1. However, a relatively small porous member, not shown in the figure, can be provided only around the actuator 106.

Figure 106A:
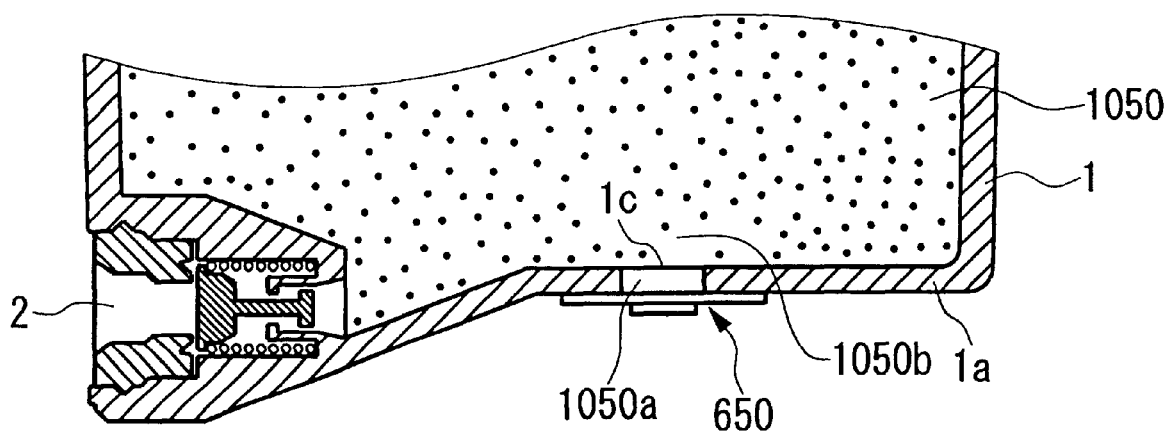
FIGS. 106(A) and 106(B) are cross sectional views of the bottom part of the ink cartridge of the present embodiment.
Figure 106B:
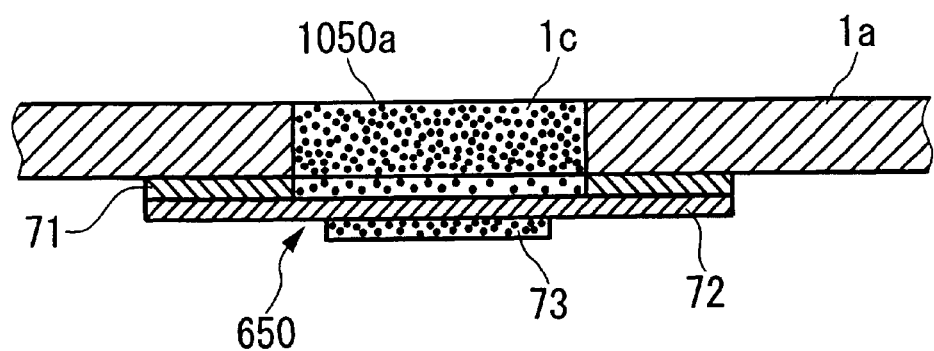

FIG. 106 is a cross sectional view of the bottom part of the ink cartridge of the present embodiment. The ink cartridge of the present embodiment has a through hole 1c on the bottom face 1a of the container 1, which contains ink. The bottom part of the through hole 1c is closed by the actuator 650 and forms an ink storing part.

The ink cartridge according to the present embodiment has a porous member 1050 provided inside the through hole 1c. The porous member 1050 thereby contacts with the vibrating region of the actuator 650. By providing the porous member 1050 to contact with the vibrating region of the actuator 650, ink does not remained in the through hole 1c.

For example, the hole diameter of the porous member 1050*b* provided around the through hole 1c is made smaller than the hole diameter of the porous member 1050*a* provided inside the through hole 1c. The capillary force of the porous member 1050*a* around the through hole 1c thereby becomes smaller than the capillary force of the porous member 1050*a* inside of the through hole 1c. Therefore, ink contained in the porous member 1050*a* inside the through hole 1c is absorbed by the porous member 1050*b* provided around the through hole 1c when the ink inside the ink cartridge is consumed. Thus, ink does not remain in the through hole 1c. Therefore, the accuracy of detecting the ink consumption status inside the ink cartridge by the actuator 650 can be improved.

Figure 107:
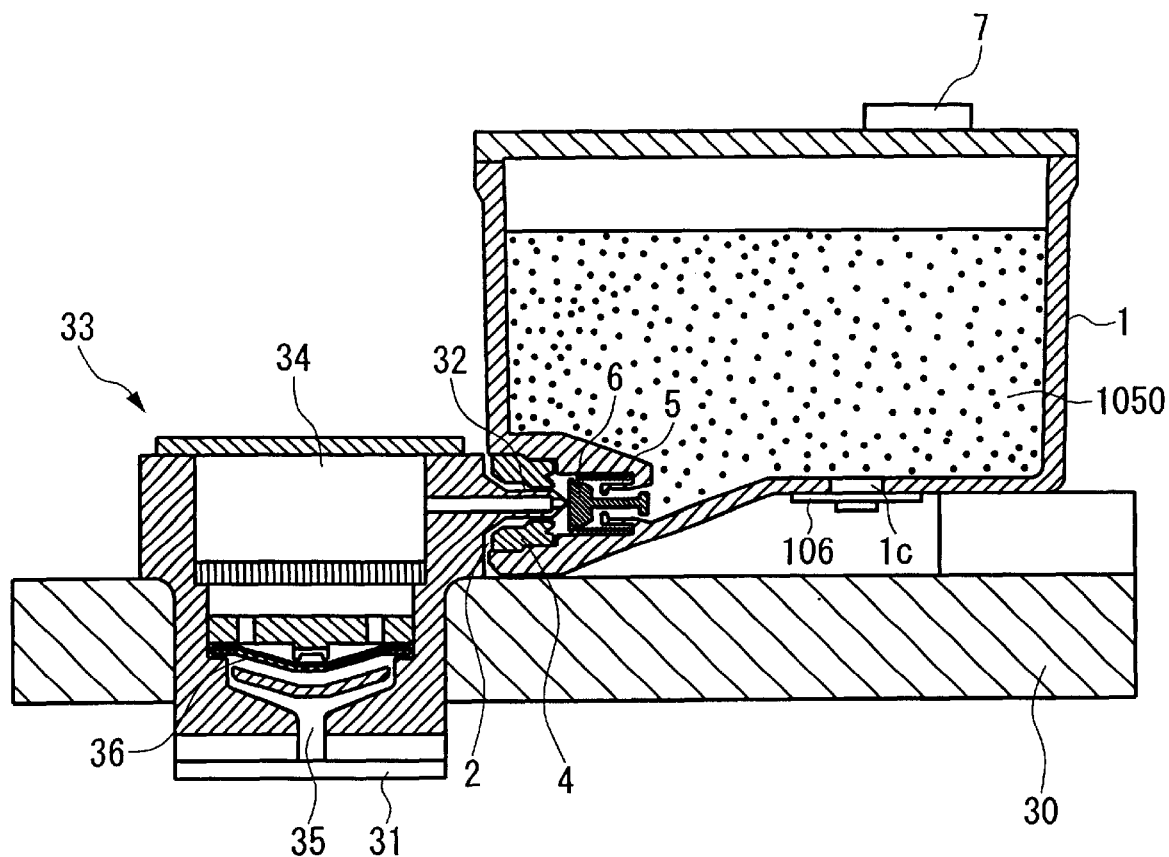
FIG. 107 is a cross sectional view showing an embodiment of a major part of the ink-jet recording apparatus suitable for the ink cartridge shown in FIG. 105 and FIG. 106.

FIG. 107 is a cross sectional view showing an embodiment of a major part of the ink-jet recording apparatus suitable for the ink cartridge shown in FIG. 105 and FIG. 106. A carriage 30 capable of reciprocating in the direction of the width of the recording paper is equipped with a subtank unit 33, while the recording head 31 is provided in a lower face of the subtank unit 33. Moreover, the ink supply needle 32 is provided in an ink cartridge mounting face side of the subtank unit 33.

While the recording apparatus is operating, a drive signal is supplied to the actuator 106 at a detection timing which is set in advance, for example, at a certain period of time.

By adhering the actuator 106 to the container 1, a process of embedding electrodes for use in detecting the liquid surface is unnecessary in the course of forming the container 1. Therefore, an injection molding process can be simplified and the leakage of the liquid from a place in which the electrodes are supposedly embedded can be avoided, thus improving the reliability of the ink cartridge.

Figure 108:
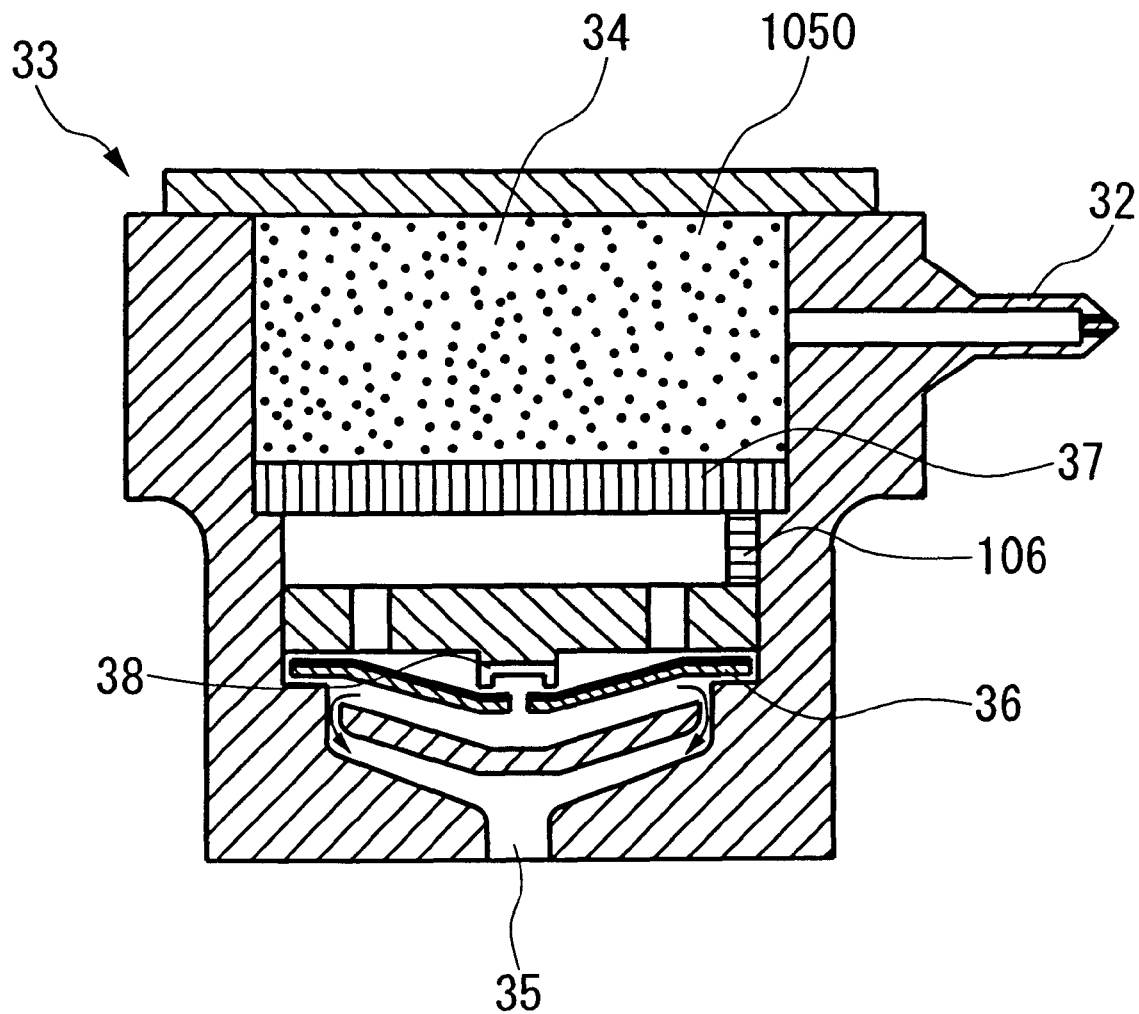
FIG. 108 is a cross sectional view of another embodiment of a subtank unit 33.

FIG. 108 is a cross sectional view of another embodiment of a subtank unit 33. The subtank unit 33 shown in FIG. 108 comprises the actuator 106 and a porous member 1050. In the embodiment shown in FIG. 27, the actuator 106 and the porous member 1050 are provided in the container 1 of the ink cartridge. However, as shown in FIG. 108, the actuator 106 and the porous member 1050 can be provided inside the subtank unit 33. Furthermore, the actuator 106 and the porous member 1050 can be provided in both of inside the container 1 of the ink cartridge and the subtank unit 33.

According to the embodiment shown in FIG. 108, the actuator 106 can detect the ink quantity and the existence of ink inside the subtank unit 33. Furthermore, the porous member 1050 can prevents the waving and bubbling of ink inside the subtank unit 33. Therefore, the actuator 106 can accurately detects the ink quantity and the existence of ink. Moreover, because the actuator 106 is provided inside the subtank unit 33, the actuator 106 can detect the ink quantity and the existence of ink inside the subtank unit 33 even when there is no ink inside the ink cartridge. The ink jet recording apparatus thereby can judges whether the printing operation can be continued or not.

If the actuator 106 and the porous member 1050 are provided on both inside of the container 1 of the ink cartridge and the subtank unit 33, the actuator 106 can detect the ink consumption status more accurately. Furthermore, the actuator 106 can detect the timing of ink end inside the container 1 of the ink cartridge.

Figure 109:
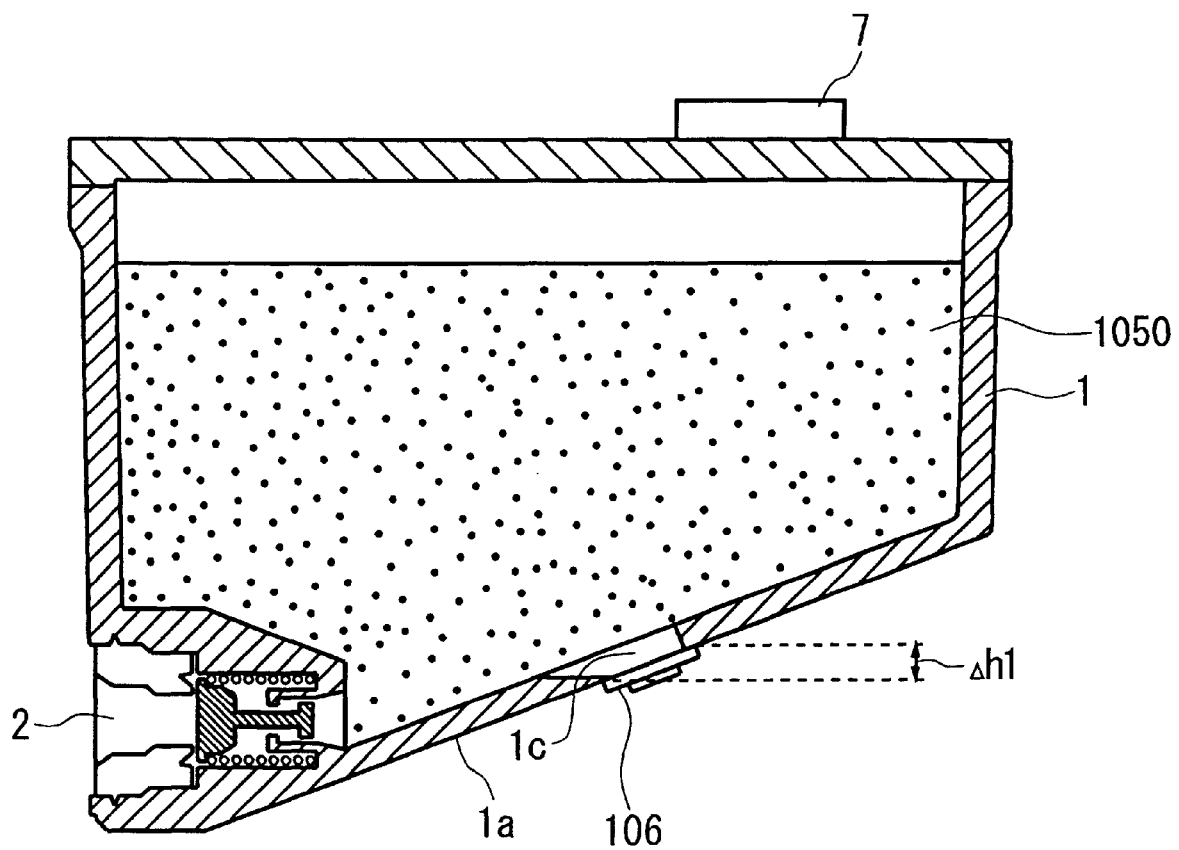
FIG. 109 show ink cartridges according to still another embodiments of the present invention.

FIG. 109 show ink cartidges according to still another embodiments of the present invention. In an embodiment shown in FIG. 109, a actuator 106 is mounted in a bottom face 1a formed a slope in the vertical direction.

According to the embodiments shown in FIG. 109, when part of the actuator 106 is exposed from the liquid surface, the residual vibration of the actuator 106 continuously changes. Therefore, the actuator 106 can accurately detect the ink consumption quantity by detecting the change of the acoustic impedance. For example, the actuator 106 can detect the ink surface while the ink surface exists within the region of the Δh1 shown in FIG. 109.

In the embodiment, the porous member 1050 is provided in the container 1. The porous member 1050 prevents the waving and bubbling of ink inside the container 1. The porous member 1050 thereby improves the accuracy of detecting the ink quantity by the actuator 106.

In the embodiment shown in FIG. 109, the porous member 1050 is provided nearby the actuator 106. However, the present embodiment does not provide the porous member 1050 inside the through hole 1c. Therefore, ink directly contacts with the vibration region of the actuator 106. Thus, the vibration region of the actuator 106 exposed to air with the increase in consumption of ink. Then, the vibration status at the vibration region of the actuator 106 changes. Therefore, to detect the ink quantity by the actuator 106 becomes easy.

To suppress the waving and bubbling of ink as much as possible, it is not preferable to have a gap between the porous member 1050 and the actuator 106. On the other hand, it is also not preferable that the porous member 1050 adhere to the vibrating region of the actuator 106 in a degree that the vibrating section of the actuator 106 cannot vibrate. Therefore, the porous member 1050 is preferable to provided around the vibrating region of the actuator 106. However, the porous member 1050 can be contacts with the vibrating region of the actuator 106 if the vibrating region of the actuator 106 can vibrate and detect the ink existence and the ink quantity.

Figure 110:
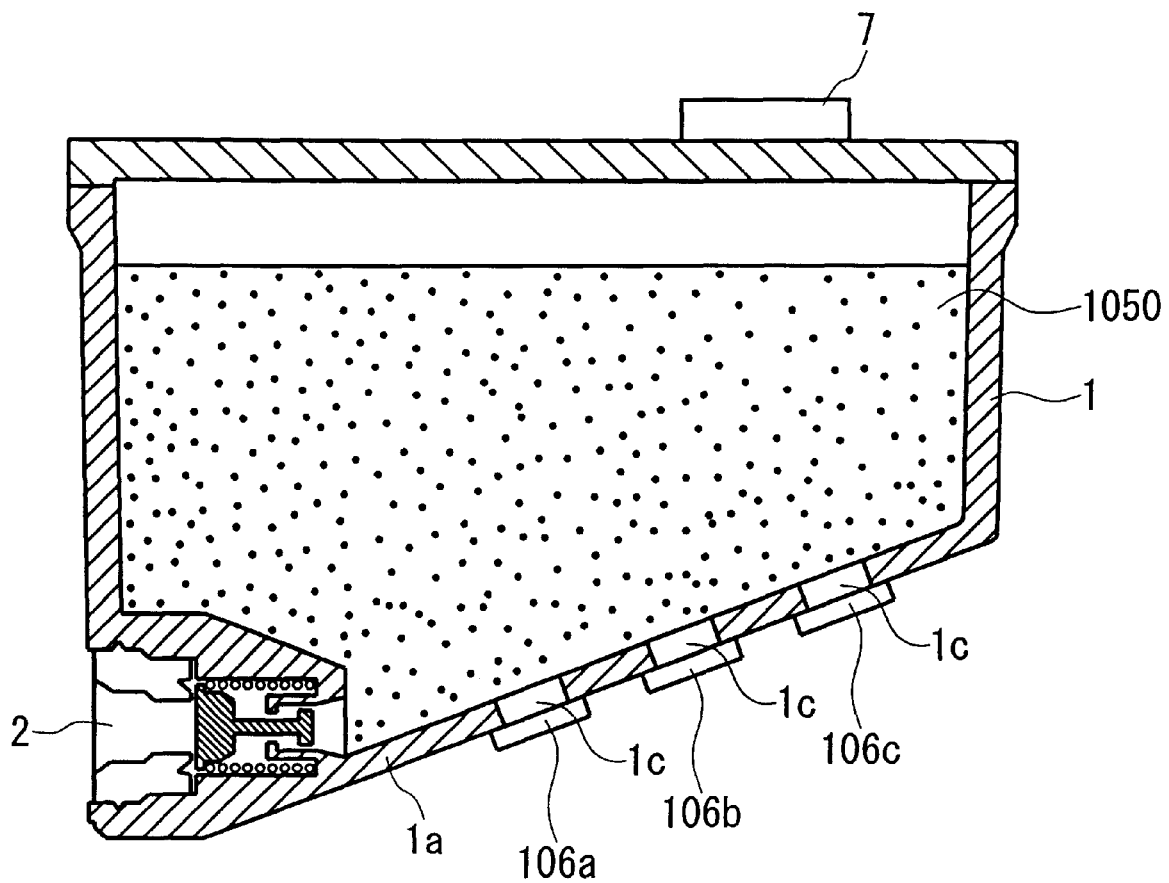
FIG. 110 shows an ink cartridge according to still another embodiment of the present invention.

FIG. 110 shows an ink cartridge according to still another embodiment of the present invention. Plural actuators 106a, 106b, and 106c on the bottom face 1a formed a slope in the vertical direction spaced at an interval are provided in the container 1. Furthermore, a porous member 1050 is provided inside the container 1. The porous member 1050 prevents the actuators 106a, 106b, and 106c to wrongly detect the ink consumption status as explained in the FIG. 109.

According to the present embodiment, depends on whether the ink is existed in the mounting position of each of the actuators 106a, 106b, and 106c, the amplitude of the residual vibration and a resonant frequency of the each of the actuators 106a, 106b, and 106c differs at each of the mounting position of the actuators 106a, 106b, and 106c. Therefore, the existence of ink at the level of the mounting position of each of the actuators 106a, 106b, and 106c can be detected by measuring the counter electromotive force of the residual vibration of each of the actuators 106a, 106b, and 106c. Therefore, residual quantity of ink can be detected step by step. For example, if the ink surface is at the level between the actuator 106b and the actuator 106c, the actuator 106a detects non-ink status, and the other actuators 106b and 106c detects ink-exist status. By comprehensively judging these detecting results, it can be known that the ink surface positions between the mounting position of the actuator 106b and actuator 106c.

Figure 28:
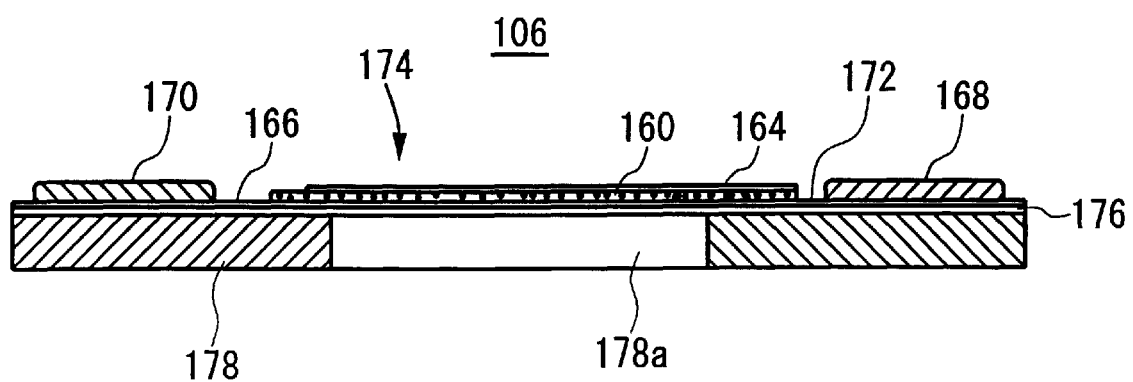
FIG. 28 shows a cross-section of the actuator 106.
Figure 111A:
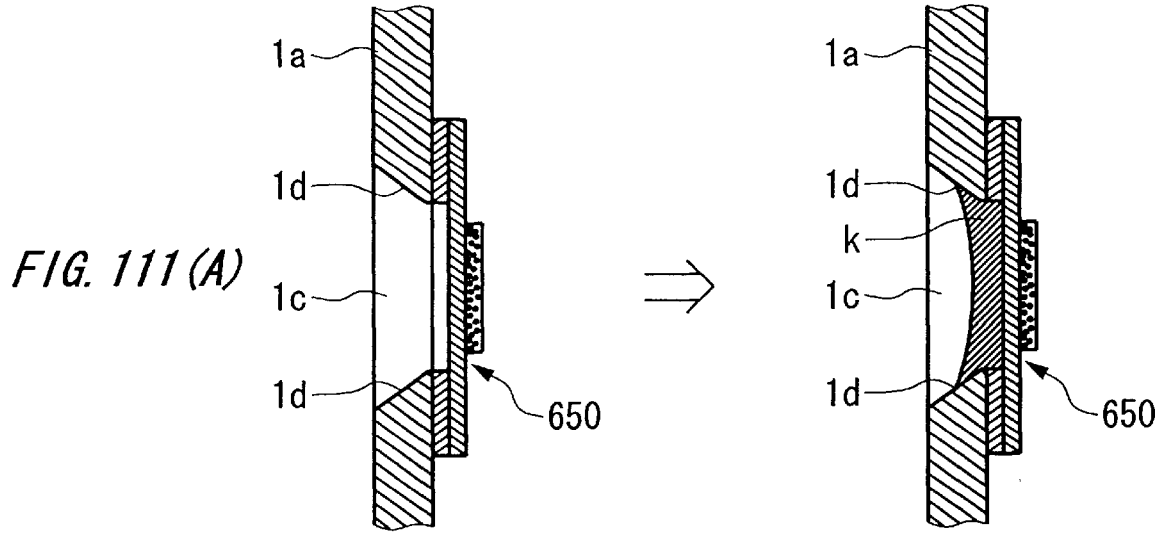
FIGS. 111(A) to 111(C) show other embodiment of the through hole 1c.
Figure 111B:
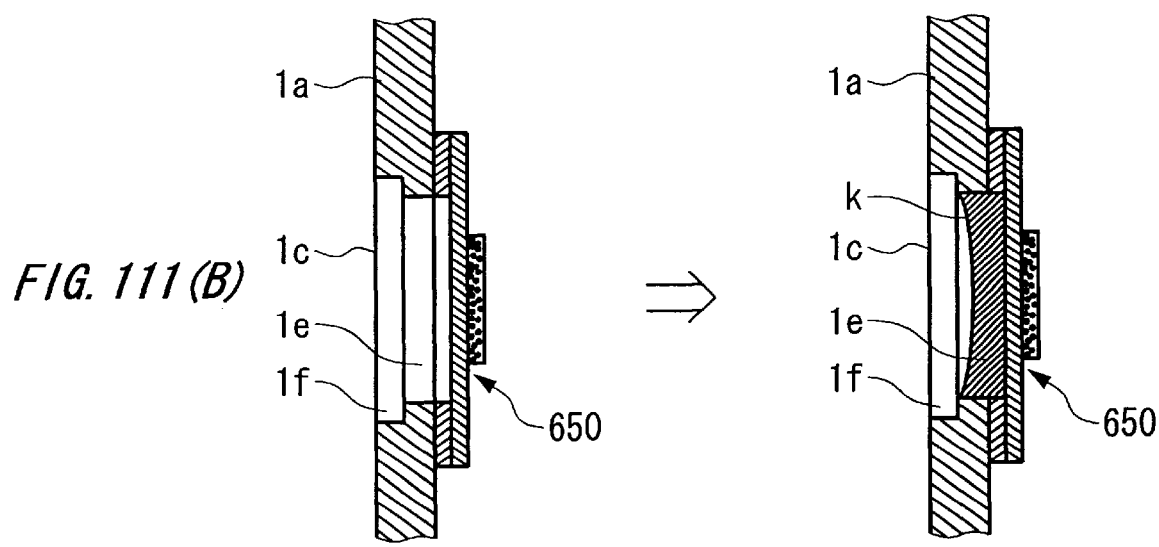
Figure 111C:
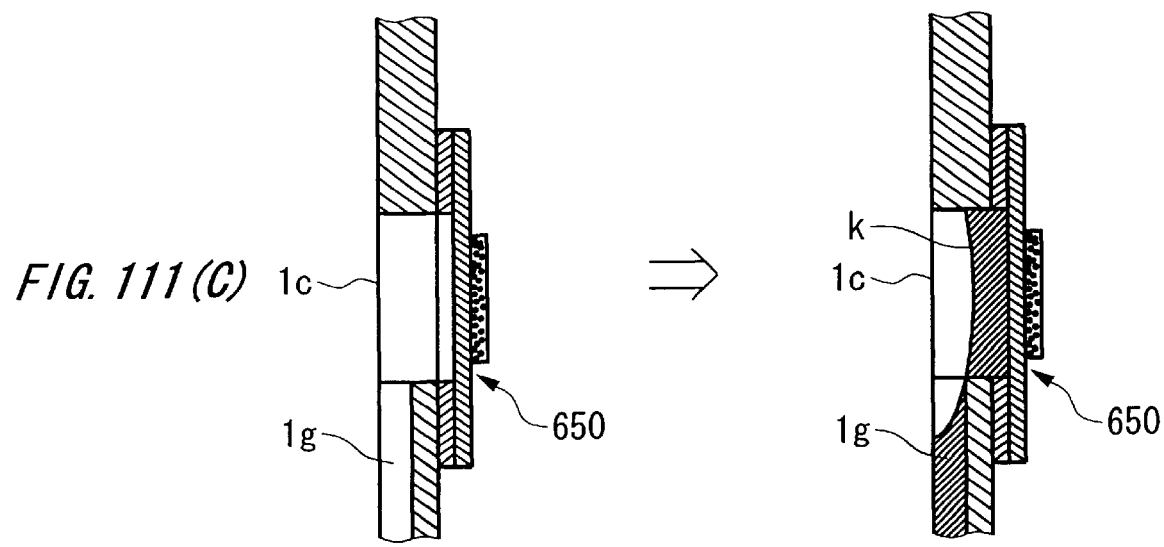

FIG. 111 shows other embodiment of the through hole 1c. In each of FIG. 111(A), (B), and (C), the left hand side of the figure shows the status that there is no ink K in the through hole 1c, and the right hand side of the figure shows the status that ink K is remained in the through hole 1c. In the embodiment of FIG. 28, the side face of the through hole 1c is formed as the vertical wall. In FIG. 111(A), the side face 1d of the through hole 1c is slanted in vertical direction and opens with expanding to the outside. In FIG. 111(B), a stepped portion 1e and if are formed on the side face of the through hole 1c. The stepped portion if, which is provided above the stepped portion e, is wider than the stepped portion 1e. In FIG. 111(C), the through hole 1c has a groove 1g that extends to the direction in which ink is easily discharged, that is, the direction to a ink supply port 2.

According to the shape of the through hole 1c shown in FIG. 111(A) to (C), the quantity of ink K in the ink storing part can be reduced. Therefore, because the M'cav can be smaller than the M'max explained in FIG. 22 and FIG. 23, the vibration characteristic of the actuator 650 at the time of the ink end status can be greatly different with the vibration characteristic when enough quantity of ink K for printing is remained in the container 1, and thus the ink end status can be reliably detected.

Furthermore, in the ink cartridge of the present embodiment, a porous member, not shown in FIG. 111, is provided around the through hole 1c of the FIG. 111(A), FIG. 111(B), and FIG. 111(C). The porous member 1050 becomes easy to absorb ink inside the through hole 1c by forming the side face 1d, stepped portion 1e, and 1f, or groove 1g.

Figure 112:
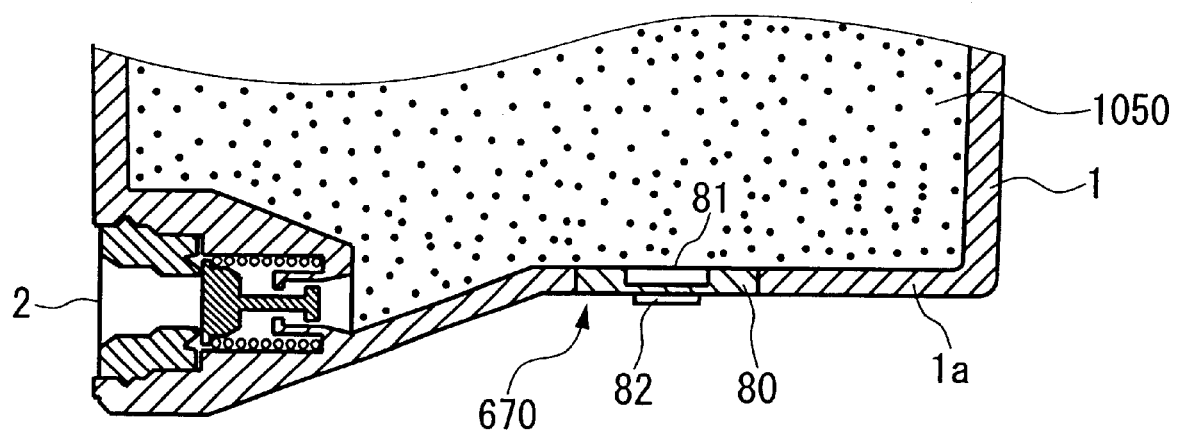
FIG. 112 is a slant view of the further other embodiment of the actuator.

FIG. 112 is a slant view of the further other embodiment of the actuator. In this embodiment, the actuator 670 comprises a concave part forming base plate 80 and a piezoelectric element 82. The concave part 81 is formed on the one side of the face of the concave part forming base plate 80 by the technique such as etching, and piezoelectric element 82 is mounted on the other side of the face of the concave part forming base plate 80. The bottom portion of the concave part 81 operates as a vibrating region within the concave part forming base plate 80. Therefore, the vibrating region of the actuator 670 is determined by the periphery of the concave part 81. Furthermore, the actuator 670 has the similar structure with the structure of the actuator 106 shown in FIG. 22, in which the base plate 178 and the vibrating plate 176 is formed as one body. Therefore, the manufacturing process during the manufacturing an ink cartridge can be reduced, and the cost for manufacturing an ink cartridge also can be reduced. The actuator 670 has a size which can be embedded into the through hole 1c provided on the container 1. By this embedding process, the concave part 81 can operates as the cavity. The actuator 106 shown in FIG. 22 can be formed to be embedded into through hole 1c as actuator 670 shown in FIG. 112. Furthermore, a porous member 1050 is provided around the actuator 670.

Figure 113:
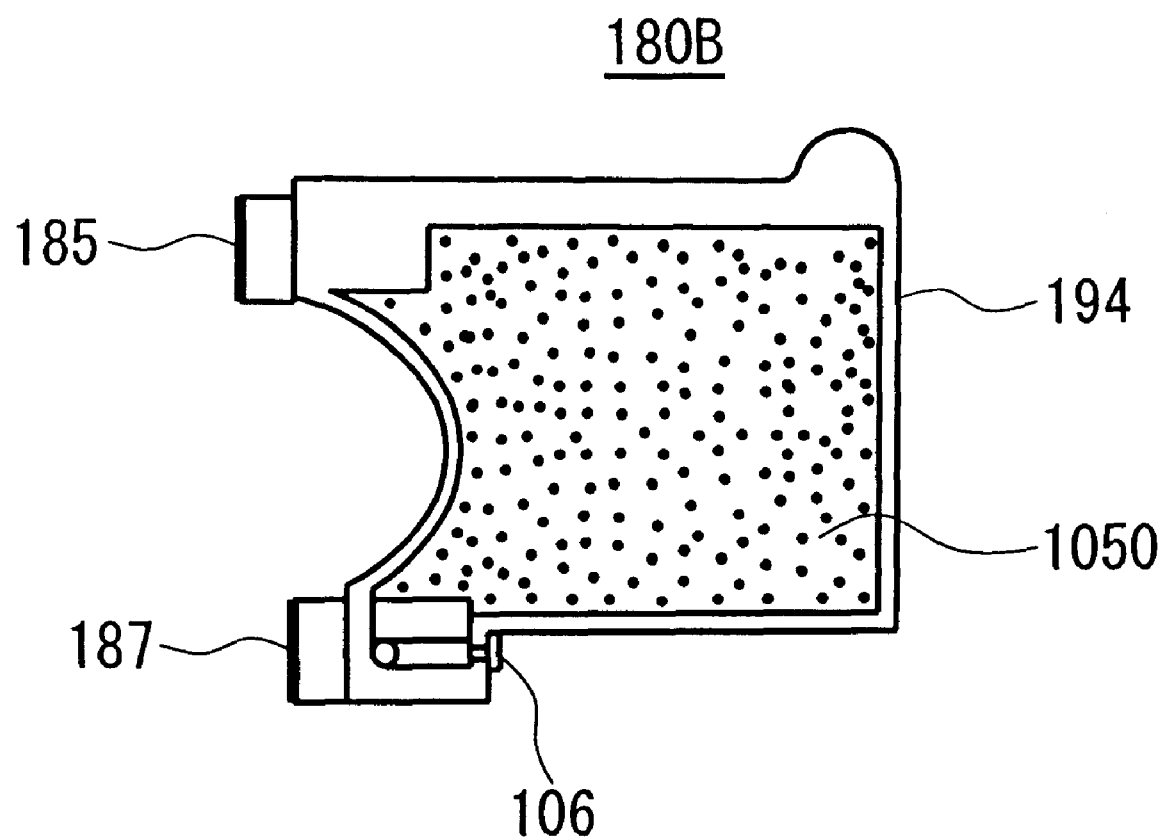
FIG. 113 shows a further embodiment of the ink cartridge 180.

The actuator 106 of the ink cartridge 180B shown in FIG. 113 is mounted on the sidewall of the supply port of the ink container 194. The actuator 106 can be mounted on the side wall or bottom face of the ink container 194 if the actuator 106 is mounted nearby the ink supply port 187. The actuator 106 is preferably mounted on the center of the width direction of the ink container 194. Because ink is supplied to the outside through the ink supply port 187, ink and actuator 106 reliably contacts until the timing of the ink near end by providing the actuator 106 nearby the ink supply port 187. Therefore, the actuator 106 can reliably detect the timing of the ink near end. A porous member 1050 is provided around the actuator 106. The porous member 1050 prevents the waving and the bubbling of ink and thereby prevent s the actuator 106 to wrongly detect the ink consumption status.

Furthermore, by providing the actuator 106 nearby the ink supply port 187, the setting position of the actuator 106 to the connection point on the carriage on the ink container becomes reliable during the mounting of the ink container on the cartridge holder of the carriage. It is because the reliability of coupling between the ink supply port with the ink supply needle is most important during the coupling of the ink container and the carriage. If there is even a small gap, the tip of the ink supply needle will be hurt or a sealing structure such as O-ring will be damaged so that the ink will be leaked. To prevent this kind of problems, the ink jet printer usually has a special structure that can accurately positioning the ink container during the mounting of the ink container on the carriage. Therefore, the positioning of the actuator 106 becomes reliable by arranging the actuator nearby the ink supply port. Furthermore, the actuator 106 can be further reliably positioned by mounting the actuator 106 at the center of the width direction of the ink container 194. It is because the rolling is the smallest when the ink container rolls along an axis, the center of which is center line of the width direction, during the mounting of the ink container on the holder.

Figure 114:
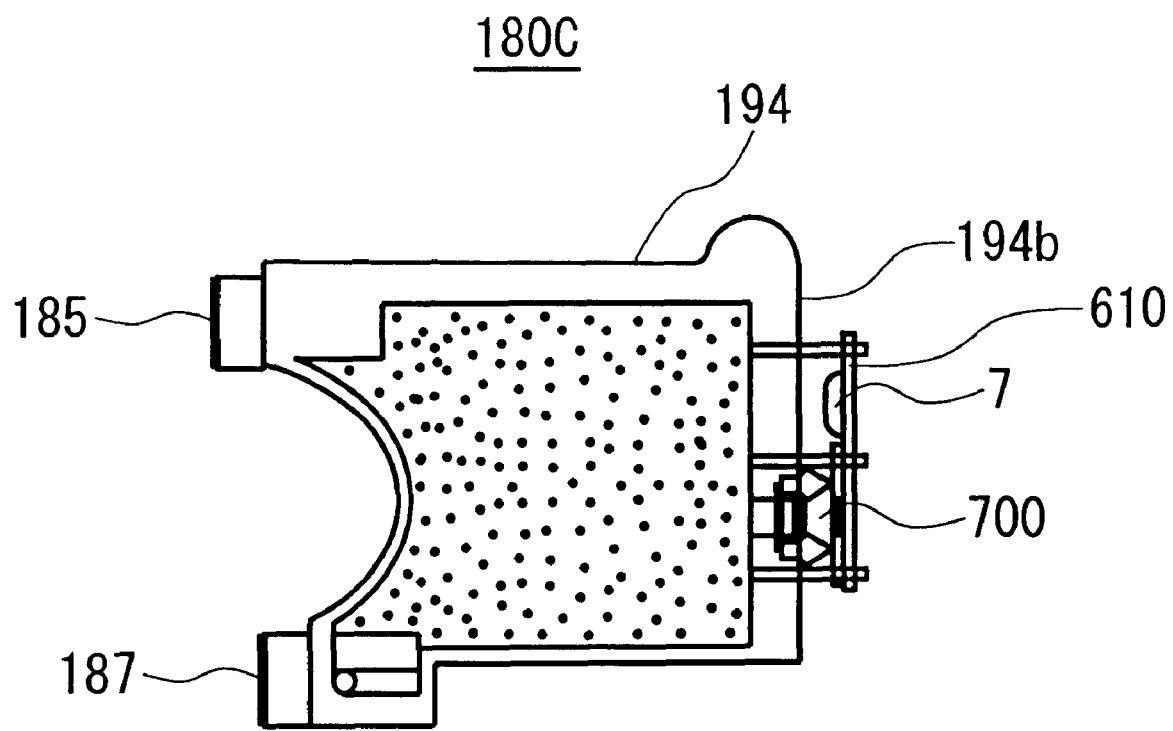
FIG. 114 shows further other embodiment of the ink cartridge 180.

FIG. 114 shows further other embodiment of the ink cartridge 180. FIG. 114 shows a cross section of an ink cartridge 180C. The semiconductor memory device 7 and the actuator 106 are formed on the same circuit board 610 in the ink cartridge 180C.

FIG. 115 shows further other embodiment of the ink cartridge 180. A plurality of actuators 106 is mounted on the side wall 194b of the ink container 194 in the ink cartridge 180D shown in FIG. 115. It is preferable to use the plurality of the actuators 106 which is formed in one body as shown in FIG. 26 for these plurality of actuators 106. The plurality of actuators 106 is arranged on the side wall 194b with interval in vertical direction. By arranging the plurality of actuators 106 on the side wall 194b with interval in vertical direction, the residual quantity of ink can be detected step by step.

The ink cartridge 180E shown in FIG. 115 mounts a actuator 606 which is long in vertical direction on the side wall 194b of the ink container 194. The change of the residual quantity of ink inside the ink container 194 can be detected continuously by the actuator 606 which is long in vertical direction. The length of the actuator 606 is preferably longer than the half of the height of the sidewall 194b. In FIG. 115, the actuator 606 has the length from the substantially from the top end to the bottom end of the side wall 194b.

The ink cartridge 180F shown in FIG. 115 mounts a plurality of actuators 106 on the side wall 194b of the ink container 194 as the ink cartridge 180D shown in FIG. 115. The ink cartridge 180F further comprises the wave preventing wall 192, which is long in vertical direction, along the side wall 194b with predetermined space with the side wall 194b such that the wave preventing wall 192 faces directly to the plurality of actuators 106. It is preferable to use the plurality of the actuators 106 which is formed in one body as shown in FIG. 26 for these plurality of actuators 106. A gap which is filled with ink is formed between the actuator 106 and the wave preventing wall 192. Moreover, the gap between the wave preventing wall 192 and the actuator 106 has a space such that the gap does not hold ink by capillary force. When the ink container 194 is rolled, ink wave is generated inside the ink container 194 by the rolling, and there is possibility that the actuator 106 malfunctions by detecting gas or an air bubble caused by the shock of the ink wave. By providing the wave preventing wall 192, ink wave around the actuator 106 can be prevented so that the malfunction of the actuator 106 can be prevented. The wave preventing wall 192 also prevents the air bubble generated by the rolling of ink to enter to the actuator 106.

Figure 115A:
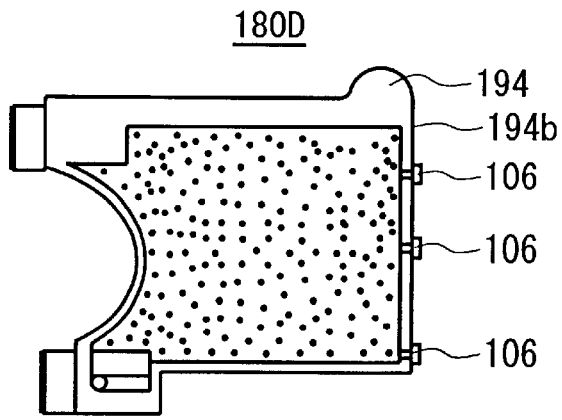
FIGS. 115(A) to 115(C) show further other embodiment of the ink cartridge 180.
Figure 115B:
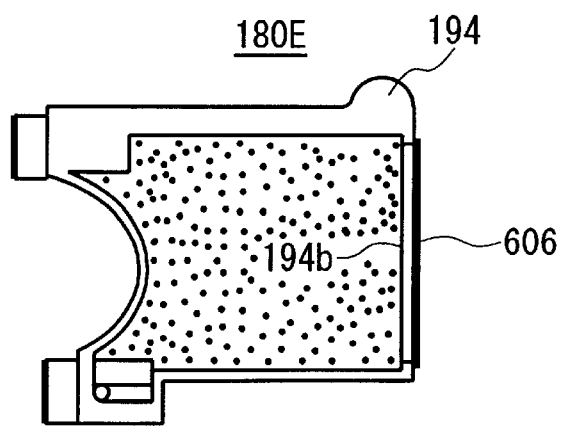
Figure 115C:
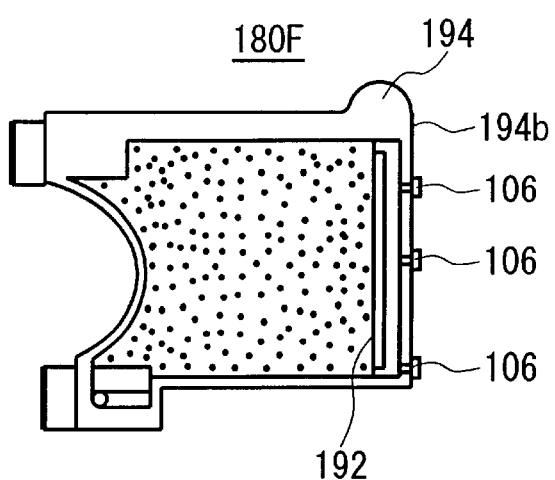

Furthermore, a porous member 1050 is provided around the actuator 106 in the embodiments shown in FIG. 115(A), FIG. 115(B), and FIG. 115(C). The porous member 1050 prevents the waving or bubbling of ink and prevents the actuator 106 to wrongly detect the ink consumption status.

The embodiment that the actuator 106 is mounted on an ink cartridge or a carriage, in which the ink cartridge is a separate body with the carriage and mounted on the carriage, has been explained above. However, the actuator 106 can be mounted on the ink tank which is mounted on the ink jet recording apparatus together with a carriage and formed together with a carriage as one body. Furthermore, the actuator 106 can be mounted on the ink tank of the off-carriage type. The off-carriage type ink tank is a separate body with a carriage and supplies ink to carriage through such as tube. Moreover, the actuator of the present embodiment can be mounted on the ink cartridge constituted so that a recording head and an ink container are formed as on body and possible to be exchanged.

Although the present invention has been described by way of exemplary embodiments, it should be understood that many changes and substitutions may be made by those skilled in the art without departing from the spirit and the scope of the present invention which is defined only by the appended claims.

The liquid container according to the present invention can reliably detect a liquid consumption status and dispense with a complicated sealing structure.

The liquid container according to the present invention can prevent the waving or bubbling of liquid around the piezoelectric device.

Furthermore, the liquid container according to the present invention has a piezoelectric device which can reliably detect a liquid consumption status by detecting the liquid surface even in the case that liquid inside the liquid container waves and bubbles.

Furthermore, the liquid container according to the present invention can reliably detect a liquid consumption status in the liquid container even if the piezoelectric device is mounted on the upper side of the liquid surface in the liquid container.

Furthermore, the liquid container according to the present invention can reliably detect a liquid consumption status in the liquid container even if the piezoelectric device is mounted on the top wall which is located above the liquid surface in the liquid container. Therefore, the degree of freedom to design the mounting position of the piezoelectric device can be increased.

Furthermore, the liquid container according to the present invention can reliably detect a liquid consumption status in the liquid container by reducing the amount of liquid remained inside of a cavity after the consumption of the liquid inside the liquid container.

What is claimed is:

1. A liquid container comprising:
a housing containing therein liquid;
a liquid supply opening formed in said housing for withdrawing the liquid from said housing;
a liquid sensor mounted on said housing for detecting a level of the liquid which is variable in accordance with a consumption of the liquid; and
a first partition wall extending in an interior of said housing and defining the interior of said housing into at least two liquid accommodating chambers which communicate with each other, said liquid accommodating chambers comprising:
an air-communication side liquid accommodating chamber which communicates with ambient air; and
a detection side liquid accommodating chamber in which said liquid sensor is disposed at an upper portion thereof,
wherein a volume of said air-communication side liquid accommodating chamber is larger than a volume of said detection side liquid accommodating chamber.

2. The liquid container according to claim 1, wherein said liquid supply opening is formed in said air-communication side liquid accommodating chamber.

3. The liquid container according to claim 1, wherein a volume of said air-communication side liquid accommodating chamber is different from that of said detection side liquid accommodating chamber.

4. The liquid container according to claim 3, wherein the volumes of said at least two liquid accommodating chambers decreases from one side wall of said housing to the other opposite wall.

5. The liquid container according to claim 1, wherein said detection side liquid accommodating chamber generates no capillary force for holding the liquid.

6. The liquid container according to claim 1, wherein the liquid container is mounted on an ink-jet printing apparatus having a printhead which ejects ink droplets, and the liquid container supplies the liquid contained therein to the printhead through said liquid supply opening.

7. The liquid container according to claim 1, wherein said upper portion of said detection side liquid accommodating chamber is substantially sloped against the level of the liquid.

8. The liquid container according to claim 7, wherein said liquid sensor is disposed in the vicinity of a lower edge of said sloped upper portion.

9. The liquid container according to claim 1, comprising a plurality of partition walls extending in an interior of said housing, wherein the length of at least one said partition wall differs from that of the others.

10. A liquid container, comprising:
a housing containing therein liquid;
a liquid supply opening formed in said housing for withdrawing the liquid from said housing;
a liquid sensor mounted on said housing for detecting a level of the liquid which is variable in accordance with a consumption of the liquid; and
a first partition wall extending in an interior of said housing and defining the interior of said housing into at least two liquid accommodating chambers which communicate with each other, said liquid accommodating chambers comprising:
an air-communication side liquid accommodating chamber which communicates with ambient air; and
a detection side liquid accommodating chamber in which said liquid sensor is disposed at an upper portion thereof, said detection side liquid accommodating chamber comprising a recessed part formed at a top wall thereof; and
wherein a volume of said air-communication side liquid accommodating chamber is larger than a volume of said detection side liquid accommodating chamber.

11. The liquid container according to claim 10, wherein said recess part is formed in the vicinity of said liquid sensor disposed in the upper portion of said housing.

12. A liquid container, comprising:
a housing containing therein liquid;
a liquid supply opening formed in said housing for withdrawing the liquid from said housing;
a liquid sensor mounted on said housing for detecting a level of the liquid which is variable in accordance with a consumption of the liquid; and
a first partition wall extending in an interior of said housing and defining the interior of said housing into at least two liquid accommodating chambers which communicate with each other, said liquid accommodating chambers comprising:
an air-communication side liquid accommodating chamber which communicates with ambient air; and
a detection side liquid accommodating chamber in which said liquid sensor is disposed at an upper portion thereof;

wherein the volumes of said at least two liquid accommodating chambers decrease from one side wall defining a part of said air-communication side liquid accommodating chamber of said housing to the opposite side wall defining a part of said detection side liquid accommodating chamber of said housing.

13. The liquid container according to claim 12, wherein a width of said at least two liquid accommodating chambers decreases in a direction from one side wall of said housing to the opposite side wall of said housing.

14. The liquid container according to claim 12, wherein the smallest volume of said at least two ink accommodating chambers is disposed in farthest location away from the location of said liquid supply opening.

15. A liquid container, comprising:

a housing containing therein liquid;

a liquid supply opening formed in said housing for withdrawing the liquid from said housing;

a liquid sensor mounted on said housing for detecting a level of the liquid which is variable in accordance with a consumption of the liquid, wherein said liquid sensor utilizes vibration phenomena to detect the level of liquid; and a first partition wall extending in an interior of said housing and defining the interior of said housing into at least two liquid accommodating chambers which communicate with each other, said liquid accommodating chambers comprising:

an air-communication side liquid accommodating chamber which communicates with ambient air; and a detection side liquid accommodating chamber in which said liquid sensor is disposed at an upper portion thereof; and wherein a volume of said air-communication side liquid accommodating chamber is larger than a volume of said detection side liquid accommodating chamber.

16. A liquid container, comprising:

a housing containing therein liquid;

a liquid supply opening formed in said housing for withdrawing the liquid from said housing;

a liquid sensor mounted on said housing for detecting a level of the liquid which is variable in accordance with a consumption of the liquid; and a first partition wall extending in an interior of said housing and defining the interior of said housing into at least two liquid accommodating chambers which communicate with each other, said liquid accommodating chambers comprising:

an air-communication side liquid accommodating chamber which communicates with ambient air; and a detection side liquid accommodating chamber in which said liquid sensor is disposed at an upper portion thereof, said detection side liquid accommodating chamber comprising a recess part formed at a top wall thereof, wherein said recess part communicates with said detection side liquid accommodating chamber; and wherein a volume of said air-communication side liquid accommodating chamber is larger than a volume of said detection side liquid accommodating chamber.

* * * * *

UNITED STATES PATENT AND TRADEMARK OFFICE
CERTIFICATE OF CORRECTION

PATENT NO.      : 6,536,861 B1
DATED           : March 25, 2003
INVENTOR(S)     : Minoru Usui, Kenji Tsukada and Munehide Kanaya It is certified that error appears in the above-identified patent and that said Letters Patent is hereby corrected as shown below:

<u>Column 92,</u>
Line 31, insert the following claims:

17. The liquid container according to claim 1, further comprising a porous member accommodated within said detection side liquid accommodating chamber.

18. The liquid container according to claim 1, wherein said liquid supply opening is formed in said detection side liquid accommodating chamber.

19. The liquid container according to claim 1, further comprising a porous member accommodated within said air-communication side liquid accommodating chamber.

20. The liquid container according to claim 1, further comprising a second partition wall extending in said detection side liquid accommodating chamber and defining a second detection chamber.

21. The liquid container according to claim 20, wherein said second partition wall is formed with a liquid communication opening at a lower part thereof.

22. The liquid container according to claim 20, wherein said second partition wall is formed with a liquid communication opening at an upper part thereof.

23. The liquid container according to claim 20, wherein said liquid sensor is disposed on said detection chamber and a second liquid sensor is disposed on said second detection chamber.

24. The liquid container according to claim 20, wherein volumes of said detection chambers are different from each other.

25. The liquid container according to claim 24, wherein the volumes of said detection chambers decrease from one side wall of said housing to the other opposite wall.

26. The liquid container according to claim 20, wherein said detection chambers generate no capillary force for holding the liquid.

27. The liquid container according to claim 1, wherein said liquid sensor comprises a cavity which opens toward an interior of said housing for contacting the liquid.

28. The liquid container according to claim 1, wherein said liquid sensor comprising a piezoelectric device having a vibrating section, said vibrating section generates a counter electromotive force in accordance with a residual vibration of said vibrating section.

29. The liquid container according to claim 1, wherein said liquid sensor detects at least an acoustic impedance of the liquid and detects a liquid consumption status in accordance with the acoustic impedance.

UNITED STATES PATENT AND TRADEMARK OFFICE
CERTIFICATE OF CORRECTION

PATENT NO. : 6,536,861 B1
DATED : March 25, 2003
INVENTOR(S) : Minoru Usui, Kenji Tsukada and Munehide Kanaya It is certified that error appears in the above-identified patent and that said Letters Patent is hereby corrected as shown below:

Column 92 (cont'd),

30. The liquid container according to claim 20, wherein a porous member is accommodated within each of said detection chambers.

31. The liquid container according to claim 20, wherein said air-communication side liquid accommodating chamber includes an airhole which communicates with ambient air, and said porous member is accommodated within said detection side liquid accommodating chamber farthest from said airhole among said detection chambers.

32. The liquid container according to claim 1, wherein said porous member comprises a first porous material disposed close to said liquid sensor and a second porous material disposed far from said liquid sensor compared to said first porous material, and a pore size of said second porous material is smaller than that of said first porous material.

33. The liquid container according to claim 32, wherein said first porous material contacts said liquid sensor.

Signed and Sealed this

Eleventh Day of April, 2006

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,536,861 B1 | Page 1 of 1 |
| APPLICATION NO. | : 09/574012 | |
| DATED | : March 25, 2003 | |
| INVENTOR(S) | : Minoru Usui, Kenji Tsukada and Munehide Kanaya | |

It is certified that error appears in the above-identified patent and that said Letters Patent is hereby corrected as shown below:

After Claim 33 as shown in the Certificate of Correction of April 11, 2006, Please insert:

--34. The liquid container according to claim 32, wherein a compression ratio of a portion of said porous member located far from said liquid sensor is higher than that of a portion of said porous member located close to said liquid sensor.

35. The liquid container according to claim 17, wherein said porous member comprises a first porous material disposed close to said liquid sensor and a second porous material disposed far from said liquid sensor compared with said first porous material, and said second porous material has higher liquid-philic characteristics than said first porous material.--

Signed and Sealed this

Twenty-ninth Day of August, 2006

JON W. DUDAS
*Director of the United States Patent and Trademark Office*